United States Patent
Zhu et al.

(10) Patent No.: US 7,609,695 B2
(45) Date of Patent: Oct. 27, 2009

(54) OPTIMIZING SWITCHING ELEMENT FOR MINIMAL LATENCY

(75) Inventors: Jian Zhu, Shenzhen (CN); Shuo-Yen Robert Li, New Territories (HK)

(73) Assignee: Industrial Technology Research Institute, Hsinchu (TW)

( * ) Notice: Subject to any disclaimer, the term of this patent is extended or adjusted under 35 U.S.C. 154(b) by 924 days.

(21) Appl. No.: 10/082,450

(22) Filed: Feb. 23, 2002

(65) Prior Publication Data

US 2003/0118054 A1    Jun. 26, 2003

Related U.S. Application Data

(63) Continuation-in-part of application No. 09/882,112, filed on Jun. 15, 2001, now Pat. No. 7,079,532.

(51) Int. Cl.
*H04L 12/56* (2006.01)
(52) U.S. Cl. .................................. 370/392; 370/388
(58) Field of Classification Search ......... 370/386–388, 370/389–393, 299, 422, 367–372
See application file for complete search history.

(56) References Cited

U.S. PATENT DOCUMENTS

| | | | |
|---|---|---|---|
| 4,523,273 A | 6/1985 | Adams et al. | |
| 4,623,996 A | 11/1986 | McMillen | |
| 4,852,091 A | 7/1989 | Li | |
| 4,899,334 A | 2/1990 | Shimizu | |
| 4,905,225 A | 2/1990 | Francois et al. | |
| 4,945,534 A | 7/1990 | Driscoll et al. | |
| 4,955,017 A | 9/1990 | Eng et al. | |
| 4,970,507 A | 11/1990 | Cooperman et al. | |
| 5,123,011 A | 6/1992 | Hein et al. | |
| 5,148,428 A | 9/1992 | Lee | |
| 5,166,926 A | 11/1992 | Cisneros et al. | |
| 5,184,346 A | 2/1993 | Kozaki et al. | |
| 5,216,668 A | 6/1993 | Zhang | |
| 5,299,317 A | 3/1994 | Chen et al. | |
| 5,303,383 A | 4/1994 | Neches et al. | |
| 5,327,552 A * | 7/1994 | Liew | 714/4 |
| 5,353,283 A | 10/1994 | Tsuchiya | |
| 5,367,518 A | 11/1994 | Newman | |

(Continued)

OTHER PUBLICATIONS

Jaehyung Park, Lillykutty Jacobm and Hyunsoo Yoon, "Performance Analysis of a Multicast Switch based on Multistage Interconnection Networks", pp. 939-946, IEEE, 1997.*

(Continued)

*Primary Examiner*—Aung S Moe
*Assistant Examiner*—Habte Mered
(74) *Attorney, Agent, or Firm*—Alston & Bird, LLP

(57) ABSTRACT

New coding scheme to minimize the total local delay in the switching elements. Under the new coding scheme, the switching element can be optimized such that it can start to produce the first output bits of the output packets without having to wait for the complete arrival of all of the local routing bits, and hence reduces the local buffering delay. In practical switching applications, each switching element in a multistage switching network supporting multicasting is a bicast cell, and the concomitant new coding scheme can even achieve a minimum delay in each bicast cell. Hence the total latency of the overall switching network is minimized.

12 Claims, 104 Drawing Sheets

U.S. PATENT DOCUMENTS

| | | | |
|---|---|---|---|
| 5,367,520 A | 11/1994 | Cordell | |
| 5,369,635 A | 11/1994 | Gandini et al. | |
| 5,371,495 A | 12/1994 | Sturges et al. | |
| 5,396,231 A | 3/1995 | Hein | |
| 5,426,733 A | 6/1995 | Masui | |
| 5,450,074 A | 9/1995 | Yoshifuji | |
| 5,451,936 A | 9/1995 | Yang et al. | |
| 5,471,628 A | 11/1995 | Phillips et al. | |
| 5,483,541 A | 1/1996 | Linsky | |
| 5,500,858 A | 3/1996 | McKeown | |
| 5,506,840 A | 4/1996 | Pauwels et al. | |
| 5,517,495 A | 5/1996 | Lund et al. | |
| 5,541,914 A | 7/1996 | Krishnamoorthy et al. | |
| 5,566,179 A | 10/1996 | Kobayashi et al. | |
| 5,568,477 A | 10/1996 | Galand et al. | |
| 5,583,861 A | 12/1996 | Holden | |
| 5,600,630 A | 2/1997 | Takano et al. | |
| 5,602,844 A * | 2/1997 | Lyles | 370/395.31 |
| 5,623,698 A | 4/1997 | Stephenson et al. | |
| 5,666,360 A * | 9/1997 | Chen et al. | 370/390 |
| 5,671,222 A | 9/1997 | Chen et al. | |
| 5,689,505 A | 11/1997 | Chiussi et al. | |
| 5,689,506 A * | 11/1997 | Chiussi et al. | 370/388 |
| 5,724,349 A | 3/1998 | Cloonan et al. | |
| 5,724,351 A | 3/1998 | Chao et al. | |
| 5,768,270 A | 6/1998 | Ha-Duong | |
| 5,802,052 A | 9/1998 | Venkataraman | |
| 5,809,021 A | 9/1998 | Diaz et al. | |
| 5,841,775 A | 11/1998 | Huang | |
| 5,852,407 A | 12/1998 | Ishii et al. | |
| 5,859,846 A | 1/1999 | Kim et al. | |
| 5,896,371 A | 4/1999 | Kobayashi et al. | |
| 5,940,389 A | 8/1999 | Yang et al. | |
| 5,949,778 A | 9/1999 | Abu-Amara et al. | |
| 5,963,554 A | 10/1999 | Song | |
| 5,987,028 A | 11/1999 | Yang et al. | |
| 6,052,373 A | 4/2000 | Lau | |
| 6,058,112 A | 5/2000 | Kerstein et al. | |
| 6,067,298 A | 5/2000 | Shinohara | |
| 6,081,512 A | 6/2000 | Muller et al. | |
| 6,157,643 A | 12/2000 | Ma | |
| 6,160,806 A | 12/2000 | Cantwell et al. | |
| 6,215,786 B1 | 4/2001 | Larson et al. | |
| 6,219,349 B1 | 4/2001 | Kobayashi et al. | |
| 6,259,699 B1 | 7/2001 | Opalka et al. | |
| 6,307,854 B1 | 10/2001 | Webb | |
| 6,335,930 B1 * | 1/2002 | Lee | 370/387 |
| 6,370,155 B1 | 4/2002 | Cantwell et al. | |
| 6,400,708 B1 | 6/2002 | Bartholomew et al. | |
| 6,427,037 B1 | 7/2002 | Okayama | |
| 6,445,705 B1 * | 9/2002 | Holden et al. | 370/394 |
| 6,473,827 B2 | 10/2002 | McMillen et al. | |
| 6,493,347 B2 | 12/2002 | Sindhu et al. | |
| 6,553,031 B1 | 4/2003 | Nakamura et al. | |
| 6,556,725 B1 | 4/2003 | Kondo et al. | |
| 6,563,819 B1 | 5/2003 | Park | |
| 6,563,837 B2 | 5/2003 | Krishna et al. | |
| 6,600,741 B1 | 7/2003 | Chrin et al. | |
| 6,611,519 B1 | 8/2003 | Howe | |
| 6,621,828 B1 | 9/2003 | Field et al. | |
| 6,628,651 B1 | 9/2003 | Ryan et al. | |
| 6,647,017 B1 | 11/2003 | Heimann | |
| 6,657,998 B2 | 12/2003 | Li | |
| 6,714,562 B1 | 3/2004 | Calvignac et al. | |
| 6,721,324 B1 | 4/2004 | Shinohara | |
| 6,735,203 B1 | 5/2004 | Heiman | |
| 6,747,971 B1 | 6/2004 | Hughes et al. | |
| 6,757,281 B1 | 6/2004 | Irish | |
| 6,757,282 B1 | 6/2004 | Ofek | |
| 6,798,777 B1 | 9/2004 | Ferguson et al. | |
| 6,829,237 B2 * | 12/2004 | Carson et al. | 370/386 |
| 6,834,038 B1 | 12/2004 | Zelig et al. | |
| 6,850,524 B1 | 2/2005 | Troxel et al. | |
| 2002/0018475 A1 | 2/2002 | Ofek et al. | |
| 2002/0031124 A1 | 3/2002 | Li | |
| 2002/0176526 A1 | 11/2002 | Mejia | |

OTHER PUBLICATIONS

Cheng Li, Howard M. Heys, and R. Venkatesan, "Design and Implementation of the Scalable Multicast Balanced Gamma (BG) Switch", pp. 518-521, IEEE, Oct. 2002.*

Yuanyuan Yang and Jianchao Wang, "A New Self-Routing Multicast Network", IEEE, 1999, pp. 1299-1316.*

Cheng Li, Howard M. Heys, and R. Venkatesan, "Design and Implementation of the Scalable Multicast Balanced Gamma (BG) Switch", IEEE, Oct. 14-16, 2002.*

"Access and Alignment of Data in an Array Processor", by Lawrie, IEEE Trans. on Computers, vol. c-24, No. 12, Dec. 1975 pp. 1145-1155.

"The Knockout Switch: A Simple, Modular Architecture for High-Performance Packet Switching", by Yeh et. al, IEEE Journal on Selected Comm, vol. SAC-5, No. 8, Oct. 1987, pp. 274-282.

"Optimal, Multi-Stage Interconnection by Divide-and-Conquer Networks", by Li, Proc. of Second IASTED Conf, Dec. 1998, pp. 318-323.

* cited by examiner

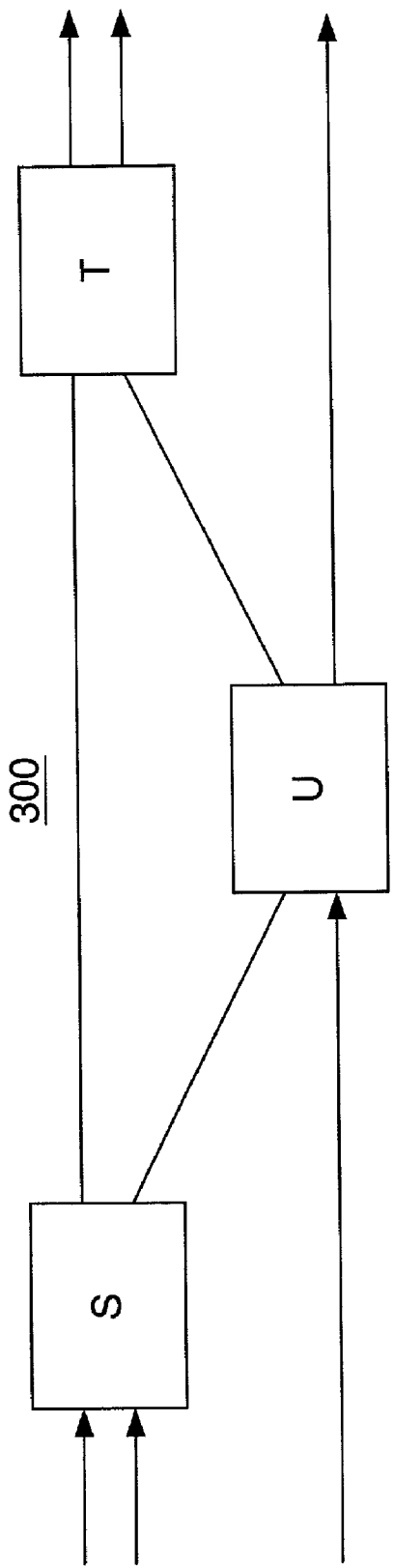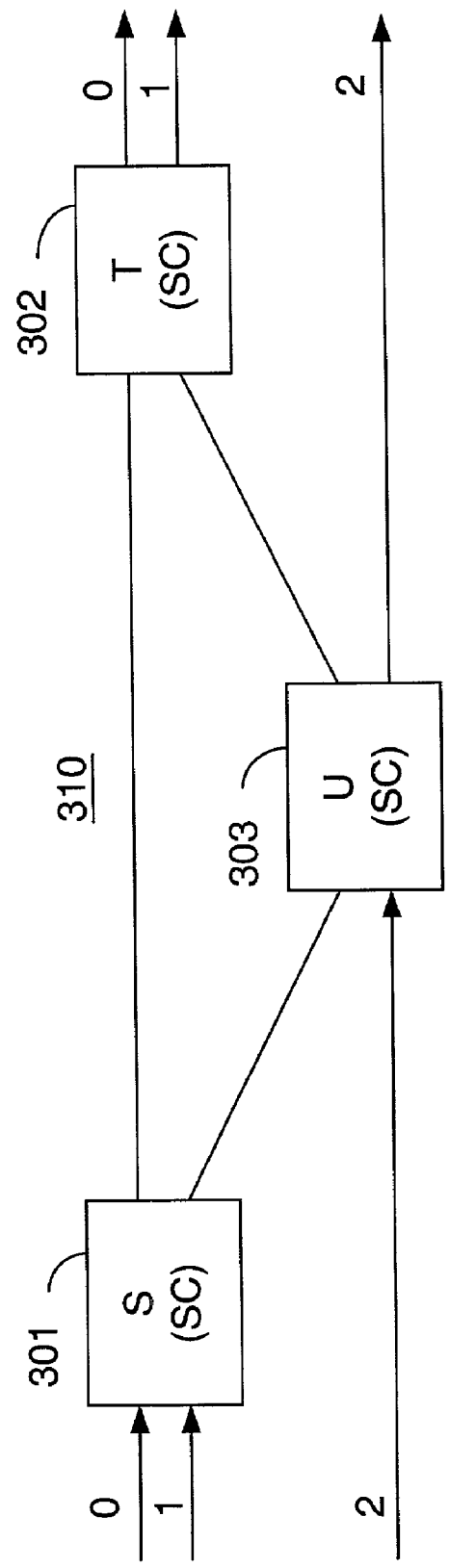

2500

2600

Trace

Guide

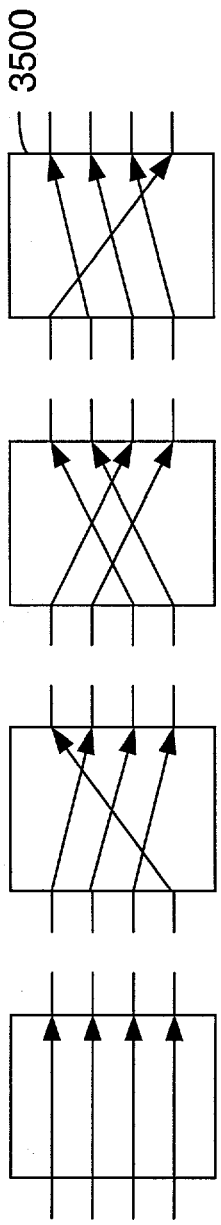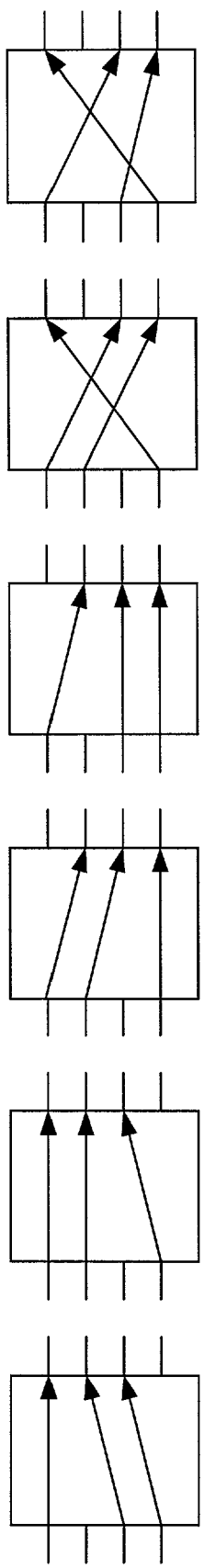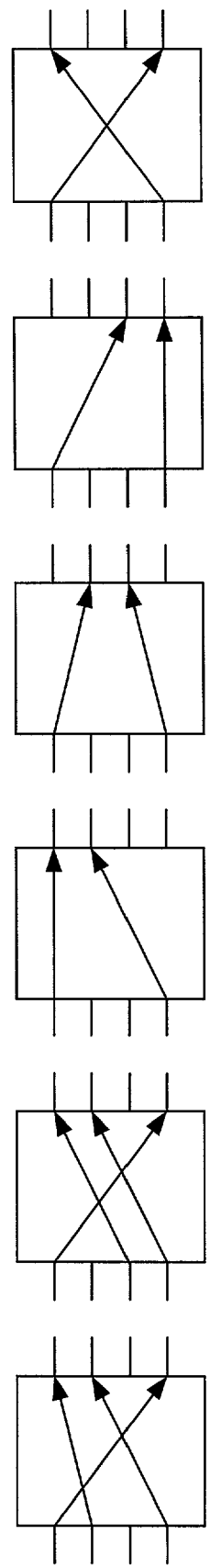

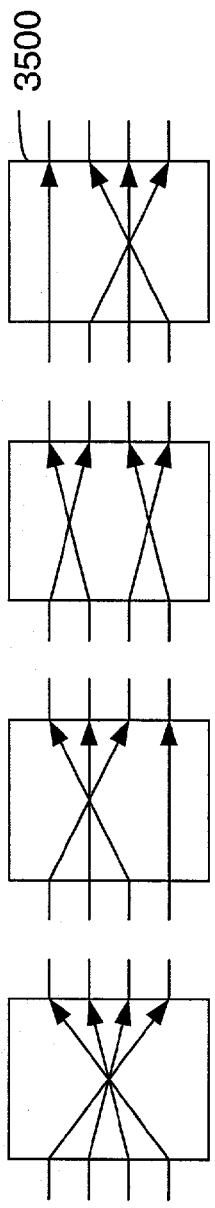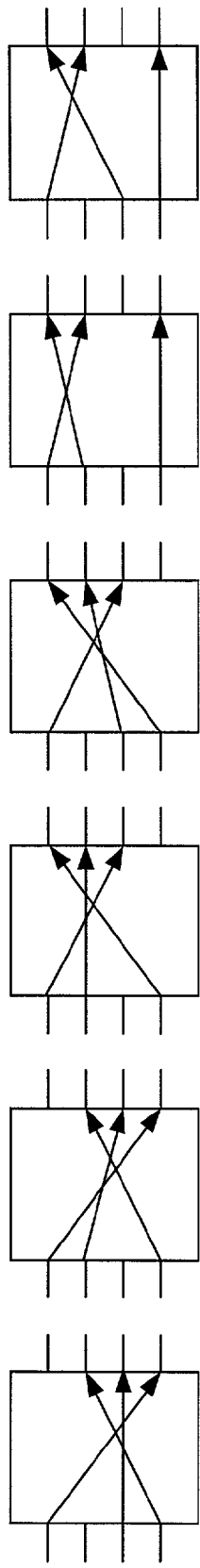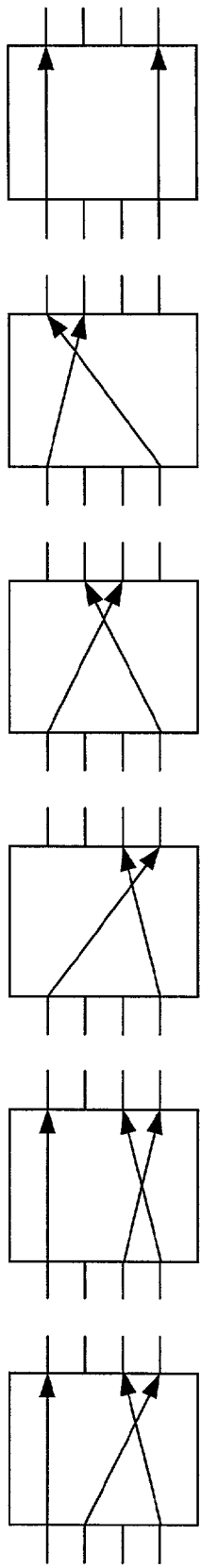

Preservation of the (1) compressor,
(2) upturned compressor and
(3) UC nonblocking properties of a switch

- Recursive 2X constructions from arbitrary building blocks
- Recursive 2X constructions from cells
- Banyan-type networks with monotonically decreasing trace and guide

4110

Preservation of the (4) decompressor,
(5) upturned decompressor,
(6) CU nonblocking,
(7) expander,
(8) upturned expander and
(9) circular expander
properties of a switch

- Recursive X2 constructions from arbitrary building blocks
- Recursive X2 constructions from cells
- Banyan-type networks with monotonically increasing trace and guide

Equivalence requiring the match of I/O exchanges
(<==> common trace and guide among the networks)

Equivalence requiring the match of output exchange only
(<==> common guide among the networks)

⬅ Equivalence among banyan-type networks in stronger sense

Equivalence requiring the match of input exchange only
(<==> common trace among the networks)

Equivalence without requiring the match of I/O exchanges
(unconditional)

FIG. 45

FIG. 53
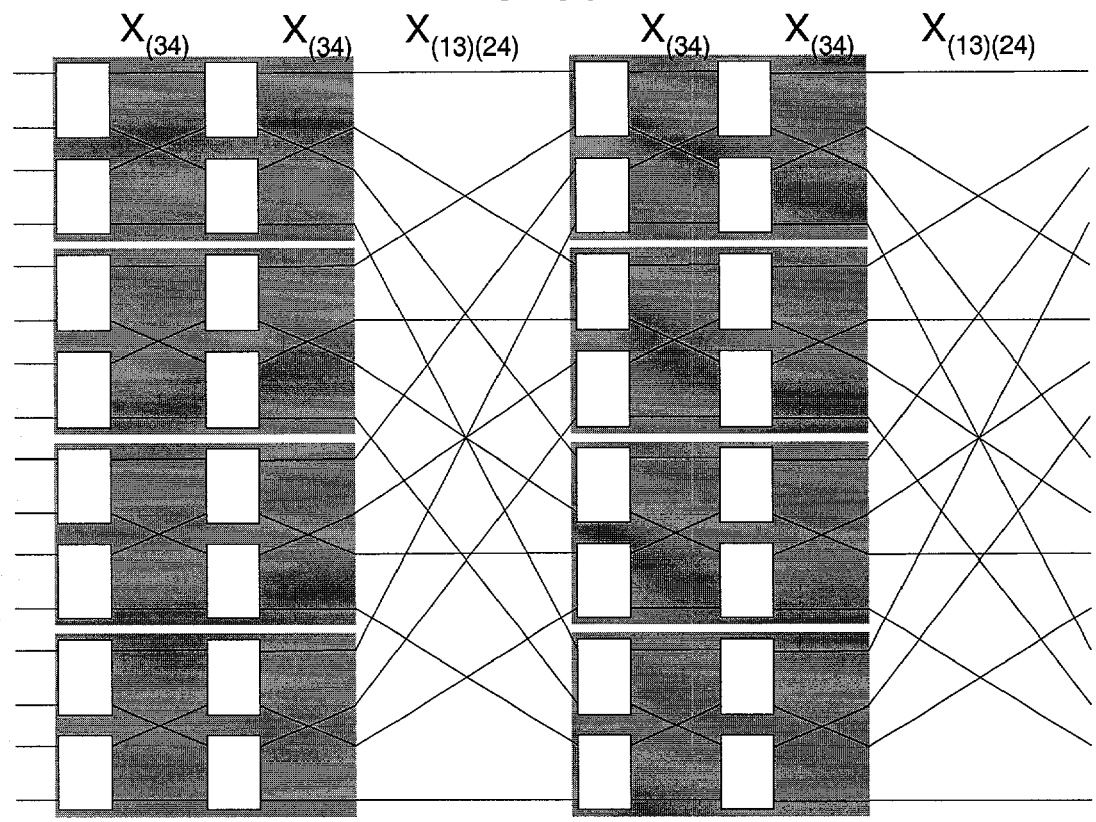
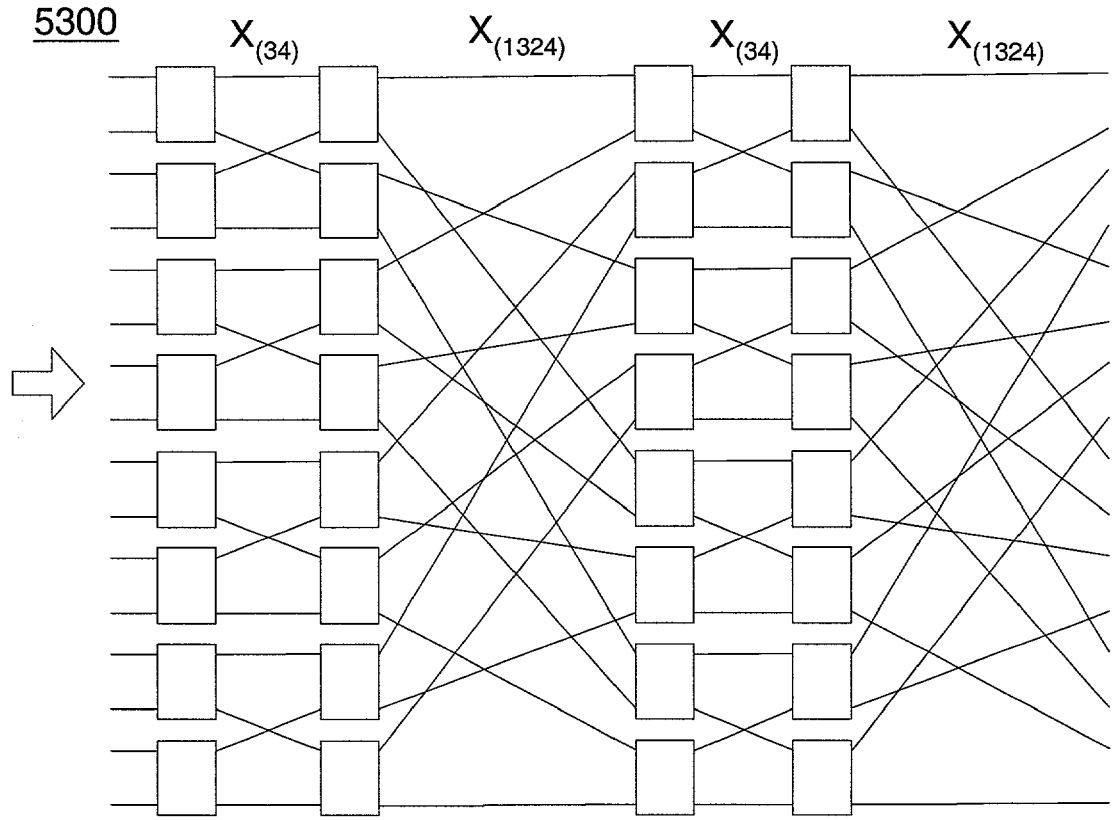

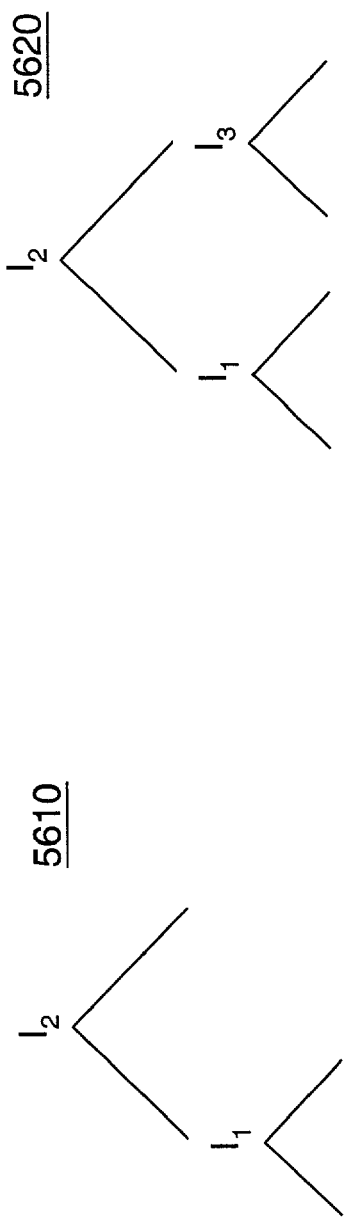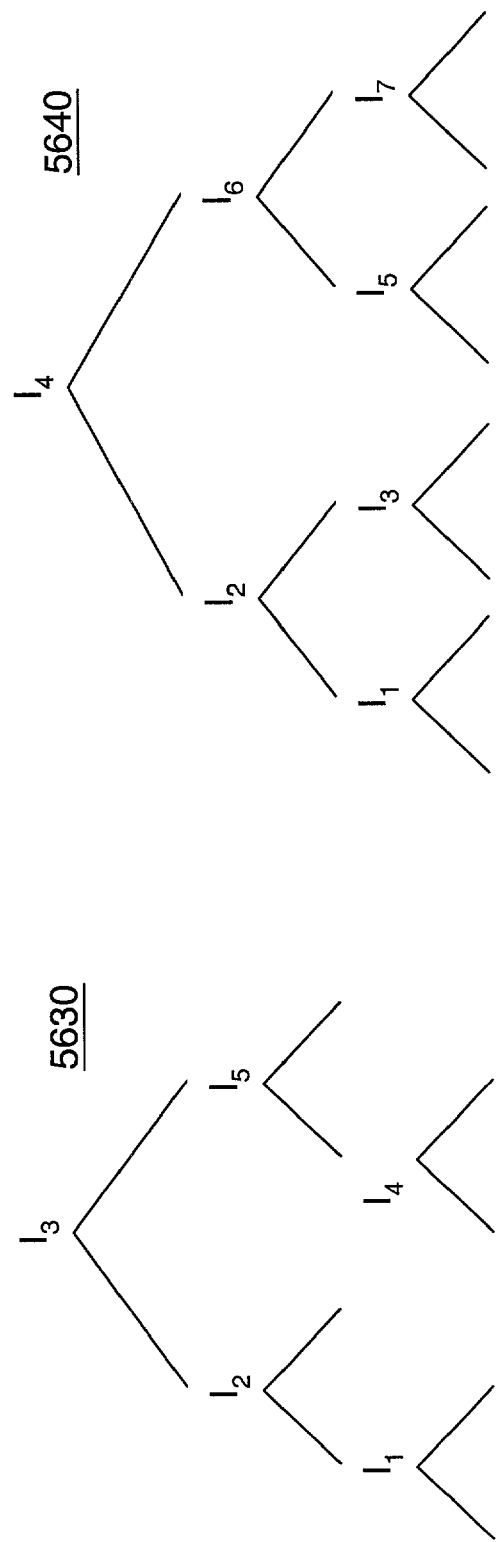
FIG. 56A  FIG. 56B  FIG. 56C  FIG. 56D

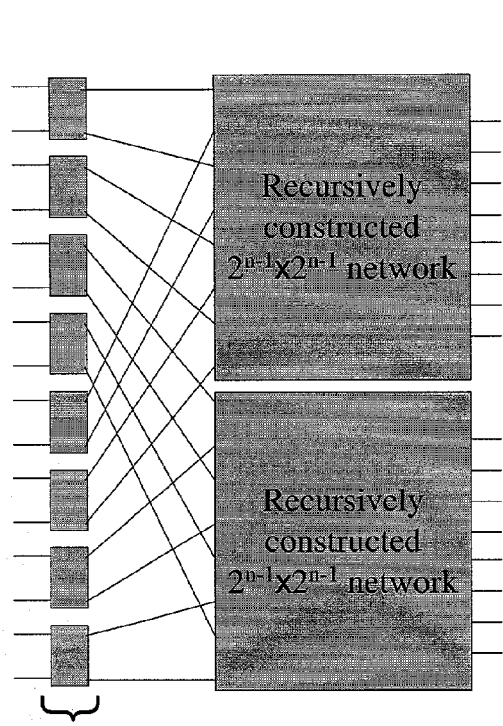
7701  FIG. 77A
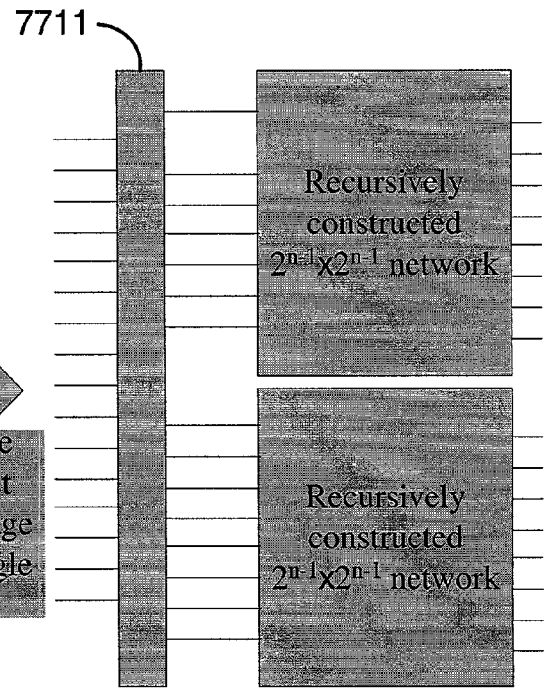
FIG. 77B

OPTIMIZING SWITCHING ELEMENT FOR MINIMAL LATENCY

CROSS-REFERENCE TO RELATED APPLICATION

This application is continuation-in-part of application Ser. No. 09/882,112 filed Jun. 15, 2001 now U.S. Pat No. 7,079,532.

BACKGROUND OF THE DISCLOSURE

1. Field of the Invention

This invention relates generally to broadband switching and, more particularly, to the design of the sub-microsecond switching and control over a massive broadband switching network.

2. Description of the Background Art

As telecommunication systems have evolved, the demand for bandwidth has been ever increasing in both transmission and switching. Advances in fiber optics afford ample transmission capacity, while switching—the technology that puts transmission capacity to flexible use—has not kept pace. Because the scale of a switching fabric is subject to various constraints (e.g., electronic or physical), a large switch is often constructed from the networking of smaller ones. Thus, for example, the public switched telephone network is an interconnection of numerous switch offices; likewise, the core of the modern digital switching system is typically a multi-stage network of smaller switches. Most important, in this modern era of broadband communications, countless primitive switching units inside a single chip are integrated into a large switch. Massive integration of switching components has been a fertile area of research and exploratory development efforts.

The results of such efforts are generally ad hoc in nature, without rigorous underpinnings; such underpinnings, when uncovered, lead to general elucidating principles and, accordingly, more efficient implementations of switching networks follow naturally from the principles. In this way, known but specific industrial designs and/or commercial applications are understood as merely special cases of a broad array of cases. From another viewpoint, sporadic findings in the literature translate into instances of different special cases of the general principles.

By way of a heuristic example of the benefit of uncovering foundational principles, a switching network at a microscopic level is first considered to illustrate the foregoing observations. It is known in the art that efficacious control over a packet switching network composed of nodes is effected whenever the switching decision at each node is determined only by information carried in each local input data packet to the node; such a control mechanism is called "self-routing". The concept of "self-routing" was initially disclosed by D. H. Lawrie in an article entitled "Access and alignment of data in an array processor," as published in IEEE Trans. Comp., vol. 24, pp. 1145-1155, 1975. Lawrie postulated the following in-band control mechanism for a specific banyan-type network (called the Omega network) composed of a cascade of stages wherein each stage is further composed of a number of two-input/two-output switching cells: upon entering the network, a data packet composed of a sequence of bits is prepended with its binary destination address in the form $d_1 d_2 \ldots d_n$. The bit $d_j$ indicates the preference between the only two outputs of a stage-j switching cell and is consumed by the stage-j switching control. Thus, the switching state of a cell is determined by just this leading bit of each of the two input packets. The existing self-route mechanism used in this particular banyan-type network considered by Lawrie is ad hoc, that is, determination of the routing tag of a packet is one of trial-and-error. The main reason behind the trial-and-error procedure is that Lawrie has not had the benefit of a fundamental theoretical approach to determine the routing tag for self-routing, as covered in the sequel by the inventive subject matter in accordance with the present invention. The theoretical underpinnings are founded upon the concept of "guide of a bit-permuting network", which is a sequence of numbers, whereby the guide ensures that the routing tag for any given bit-permuting network can be determined once the guide of that network is computed. As will be shown, the guide of the networks studied by Lawrie happens to be a special case wherein the guide is the monotonically increasing $1, 2, \ldots, n$. The destination address can no longer be used as the routing tag for any other banyan-type network whose guide is not monotonically increasing. For this reason, those banyan-type networks whose routing tag "seems not related" to the destination address have not been widely studied. But, ironically, those widely studied networks, including the Omega network studied by Lawrie, are actually the most anti-optimal ones with regard to the layout complexity under the popular "2-layer Manhattan model with reserved layers" among a huge family of equivalent networks.

The issues of equivalence among networks and optimization of layout complexity brings up a second example highlighting the shortcomings of the past methods. If all those widely studied networks are not optimal, then what networks are optimal and can used to replace the widely studied ones or how to construct such optimal networks in a systematic way need to be explored. The present invention addresses these problems.

All banyan-type networks are equivalent in a weak sense, but in some applications only equivalent networks in a stronger sense can be deployed in replacement of each. A related example of the shortcomings of the existing art is the lack of a systematic way for the adaptation of one network into an equivalent of another in strong senses.

A fourth motivating example, which considers a switching network at a macroscopic level, relates to the properties of a switching network itself. The component complexity of an N×N nonblocking network is at least $N^2/4$ (Here the definition of a nonblocking network requires the network to be unique-routing to begin with, because otherwise there are different senses for a network to be "nonblocking".) The quadratic order in this bound indicates the intrinsically high complexity in the nonblocking property of the network. So instead of applying a nonblocking network in switch design, the focus is on uncovering simple networks that preserves "conditionally nonblocking properties" of switches and thereby construct large conditionally nonblocking switches out of small ones in an economical way. Recursive applications of such construction then leads to conditionally nonblocking switches of indefinitely large sizes. Such theoretical recursive property then allows the physical construction of switching fabric at a throughput level much higher than that of existing routers/switches by the contemporary ASIC technology. In the literature, there are individual instances of certain conditionally nonblocking switches constructed by switching networks, such as the one disclosed by A. Huang and S. Knauer in an article entitled "Starlite: a wideband digital switch," as published in Proceedings of Globecom'84, Atlanta, pp. 121-125, 1984. However, these instances of conditionally nonblocking property are not preserved by simple network and hence do not enjoy the advantage of recursive construction.

Banyan-type networks as recursive applications of 2-stage interconnection or, at least, equivalent to such recursive applications. In contrast with 3-stage alternate-routing switching that is popular in telephony, 2-stage switching network is more compact in nature and thereby facilitates the VLSI implementation of massive recursive application. More importantly, the unique-routing nature of 2-stage switching is more compatible with sub-microsecond control inside a broadband switching chip. A fifth example of deficiency of the existing art is in the systematic method of physical implementation of recursive 2-stage interconnection that takes advantage of today's technologies in making switching fabrics at a much higher level of throughput than all largest existent routers.

The critical problem with 2-stage switching is blocking, and one way to alleviate the blocking problem is by "statistical line grouping", which replaces every interconnection line in the network by a bundle of lines and, at the same time, dilates the size of every node proportionally. A critical issue in applying the method of statistical line grouping lies in the choice of the switch to fill the role of a dilated node. The selected switch does not have to be a nonblocking switch but needs some partial nonblocking property that is articulated in the present invention (Partial nonblocking property is more economically achievable than the full nonblocking property of a switch.) Meanwhile, the control over the selected switch must also be compatible with sub-microsecond control inside a broadband switching chip. Ideally, there should be a self-routing mechanism inside the selected switch that can be smoothly blended with the self-routing mechanism over the banyan-type network. A final example highlighting the shortcomings of the past methods is the lack of a clearly superior candidate for this selected switch. The present invention proposes "concentrator" as a perfect candidate. When multicast switching is involved, then a "multicast concentrator" replaces the concentrator.

SUMMARY OF THE INVENTION

The shortcomings of the prior art, as well as other limitations and deficiencies, are obviated in accordance with the present invention by applying algebraic principles to the physical realization of a large switching fabric based upon contemporary technologies.

In accordance with one broad aspect of the present invention, a method for routing packets through a switching network, wherein the switching network includes multiple stages of switching elements, each one of the switching elements receiving packets as local input packets on its input ports and producing packets as local output packets on its output ports, each of the packets having a plurality of in-band control signals where each one of the in-band control signals is utilized in a corresponding one of the switching elements as the local in-band control signal for the corresponding switching element to make switching decisions, includes: (a) coding each one of the in-band control signals of the packets into a plurality of bits based on a predetermined coding algorithm; and (b) generating, with reference to the coding scheme, the output bits of the local output packets at each one of the switching elements based on a subset of the bits in the corresponding one of the in-band control signals for said each one of the switching elements to route the local input packets arriving at the corresponding switching element.

In a preferred embodiment of the aforementioned methodology, (i) each one of the switching elements is a bicast cell, (ii) the local input packets to each one of the switching elements includes idle, 0-bound, 1-bound and bicast packet types wherein each one of the packet types corresponds to a distinct in-band control signal, (iii) the coding includes coding each of the in-band control signals by at least two bits, and (iv) the coding algorithm includes coding the bits such that the first bit of the code for the in-band control signal corresponding to a 0-bound packet type is different from the first bit of the code for the in-band control signal corresponding to a 1-bound packet type.

In yet another preferred embodiment, (i) each one of the switching elements is a routing cell, (ii) the local input packets to each one of the switching elements includes idle, 0-bond, and 1-bound packet types wherein each one of the packet types corresponds to a distinct in-band control signal, (iii) the coding includes coding each of the in-band control signals by at least two bits, and (iv) the coding algorithm includes coding the bits such that the first bit of the code for the in-band control signal corresponding to a 0-bound packet type is different from the first bit of the code for the in-band control signal corresponding to a 1-bound packet type. System aspects of the present invention are commensurate with the method aspects.

BRIEF DESCRIPTION OF THE DRAWING

The teachings of the present invention can be readily understood by considering the following detailed description in conjunction with the accompanying drawings, in which:

FIG. 3A depicts an exemplary interconnection network with three nodes;

FIG. 3B depicts the interconnection network of FIG. 3A wherein the nodes of the network are filled with switching cells to constitute a switch;

Figure 14:
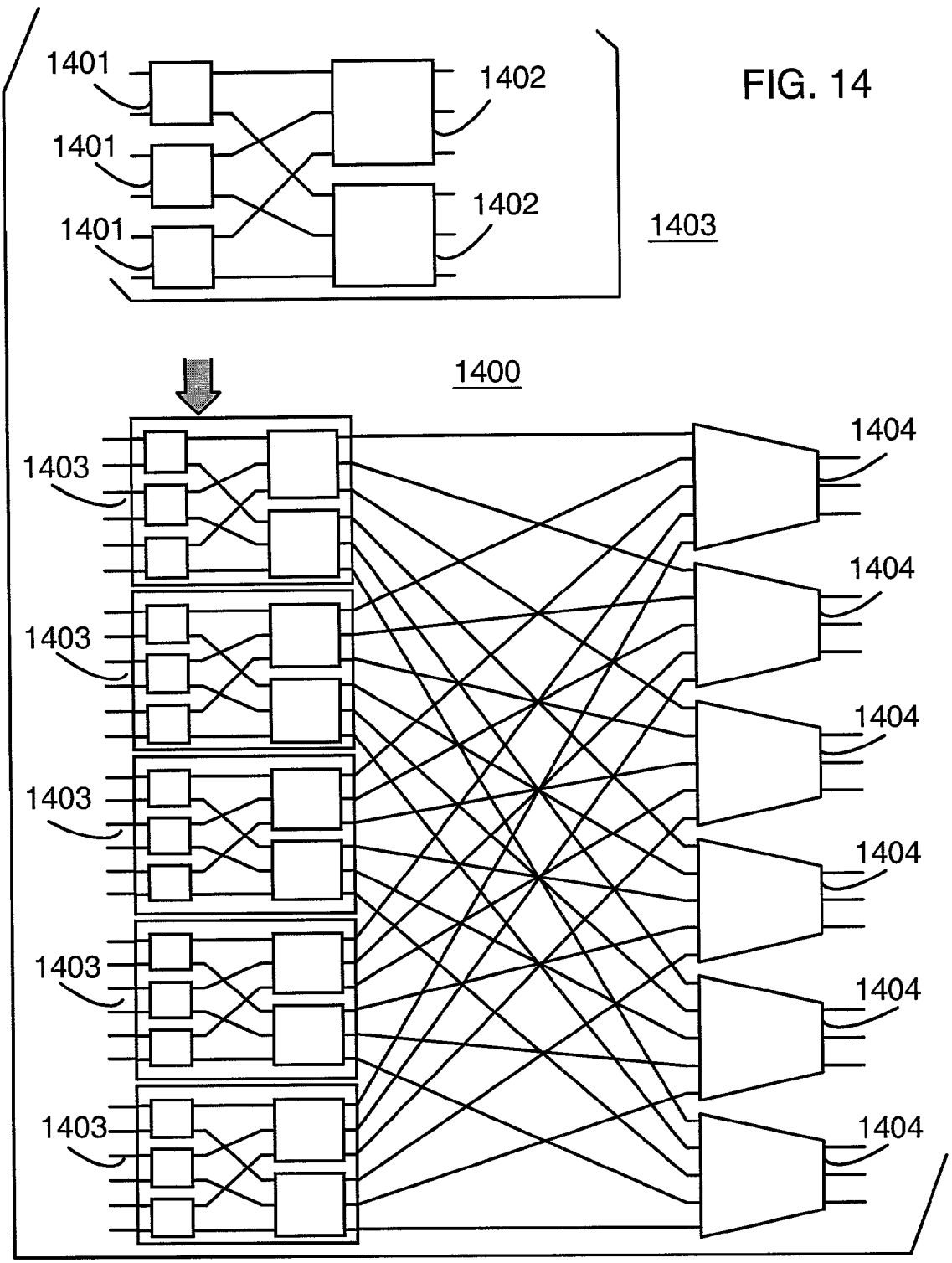
Figure 15:
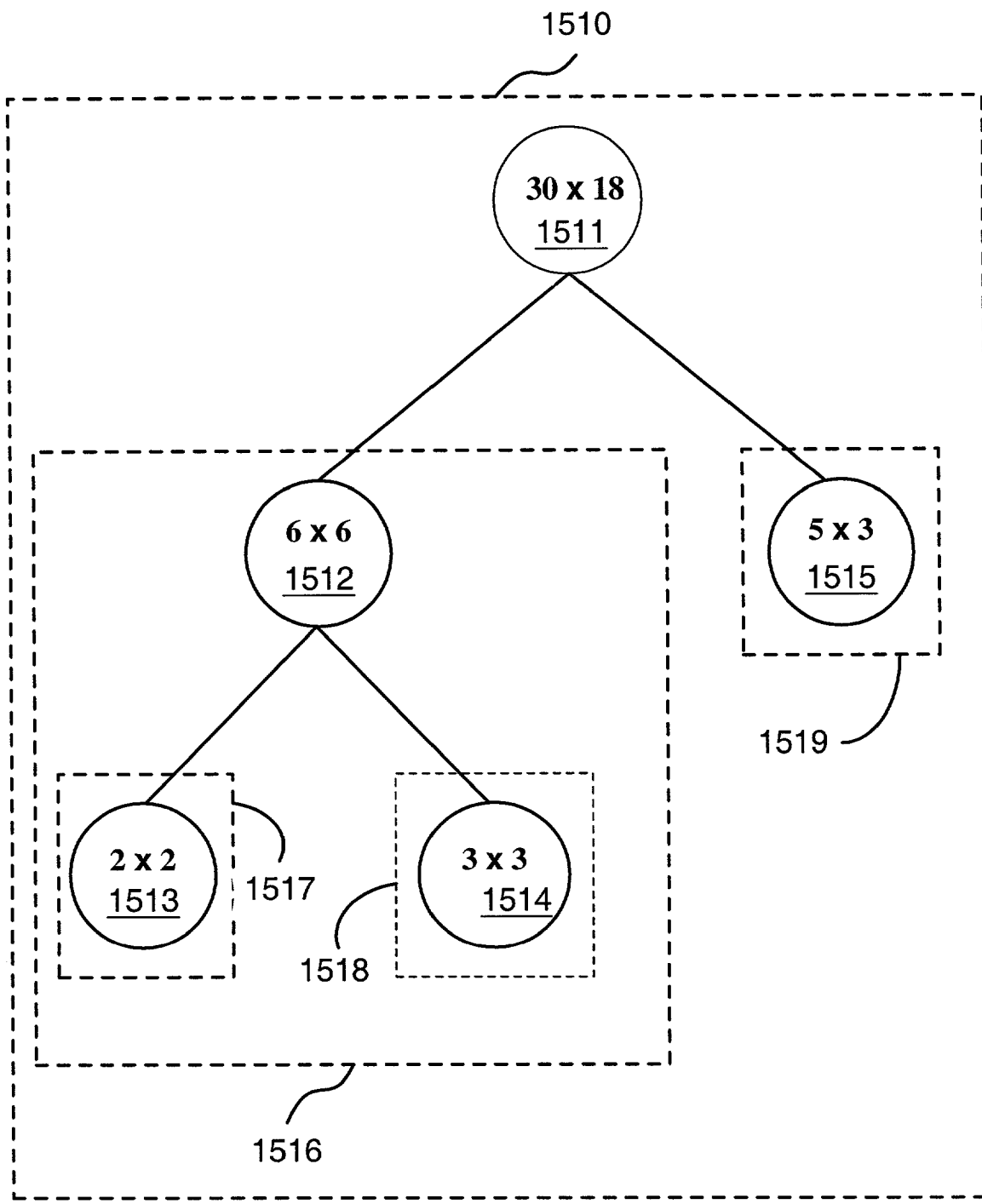
Figure 18:
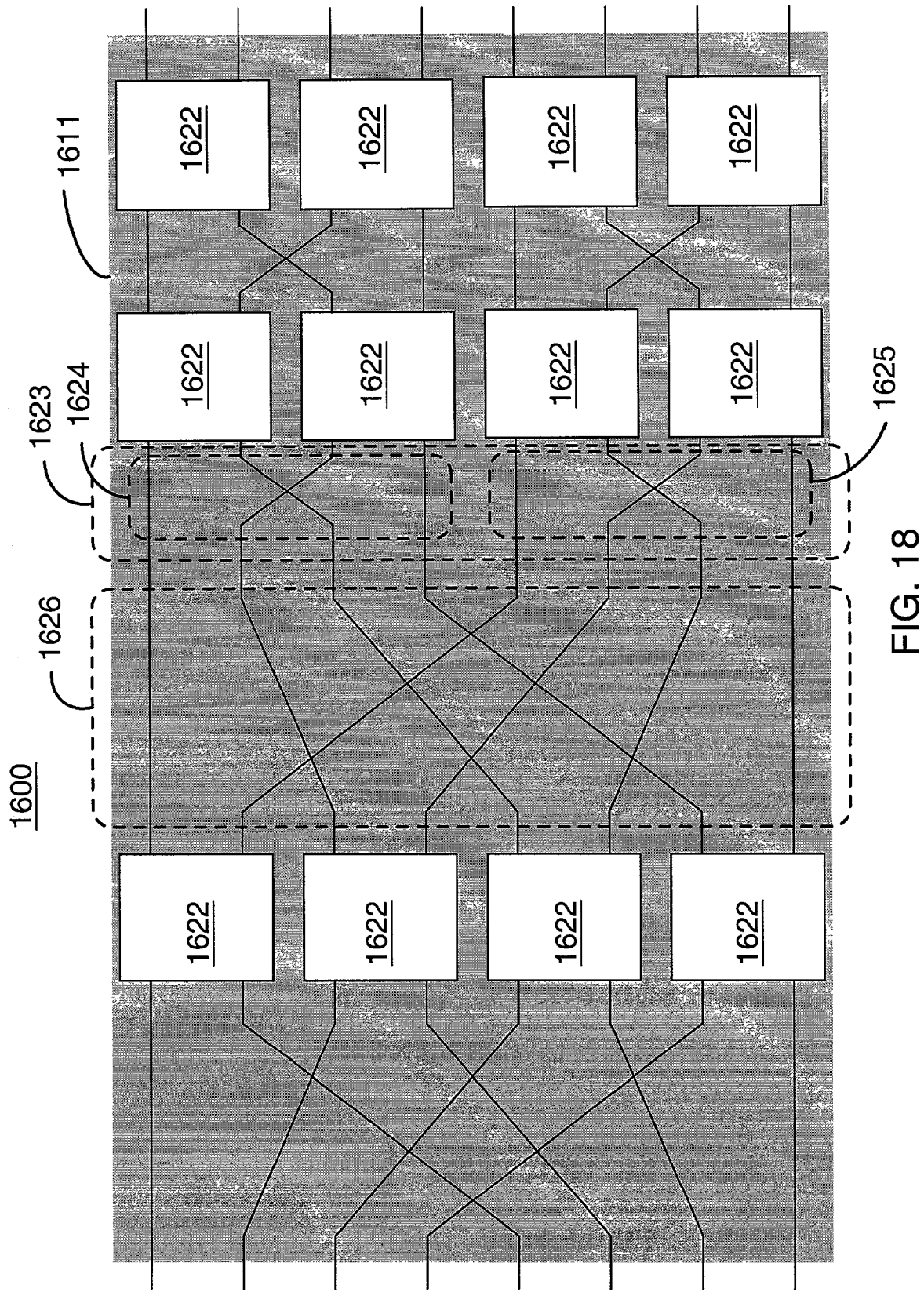
Figure 19:
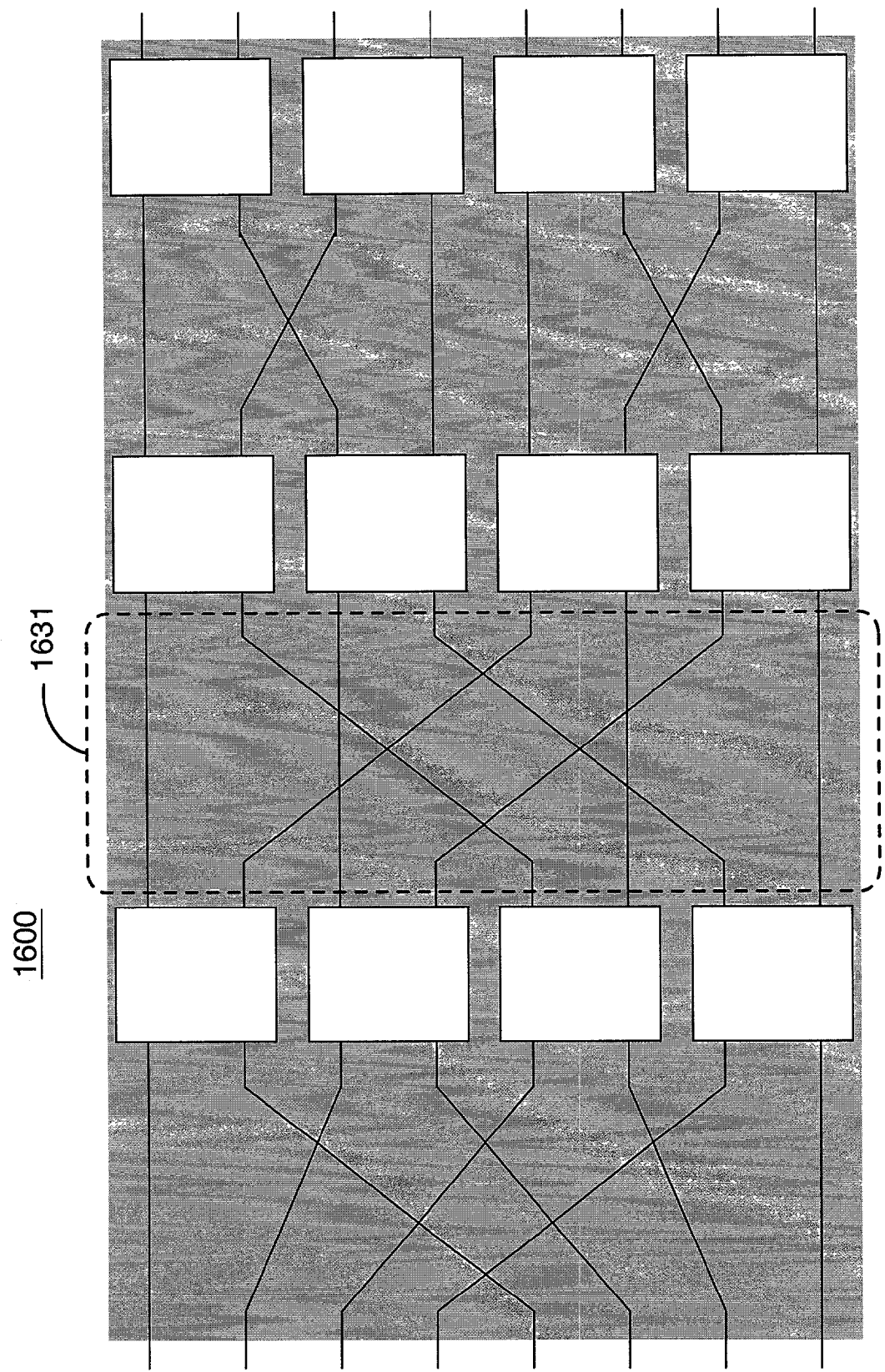
Figure 20:
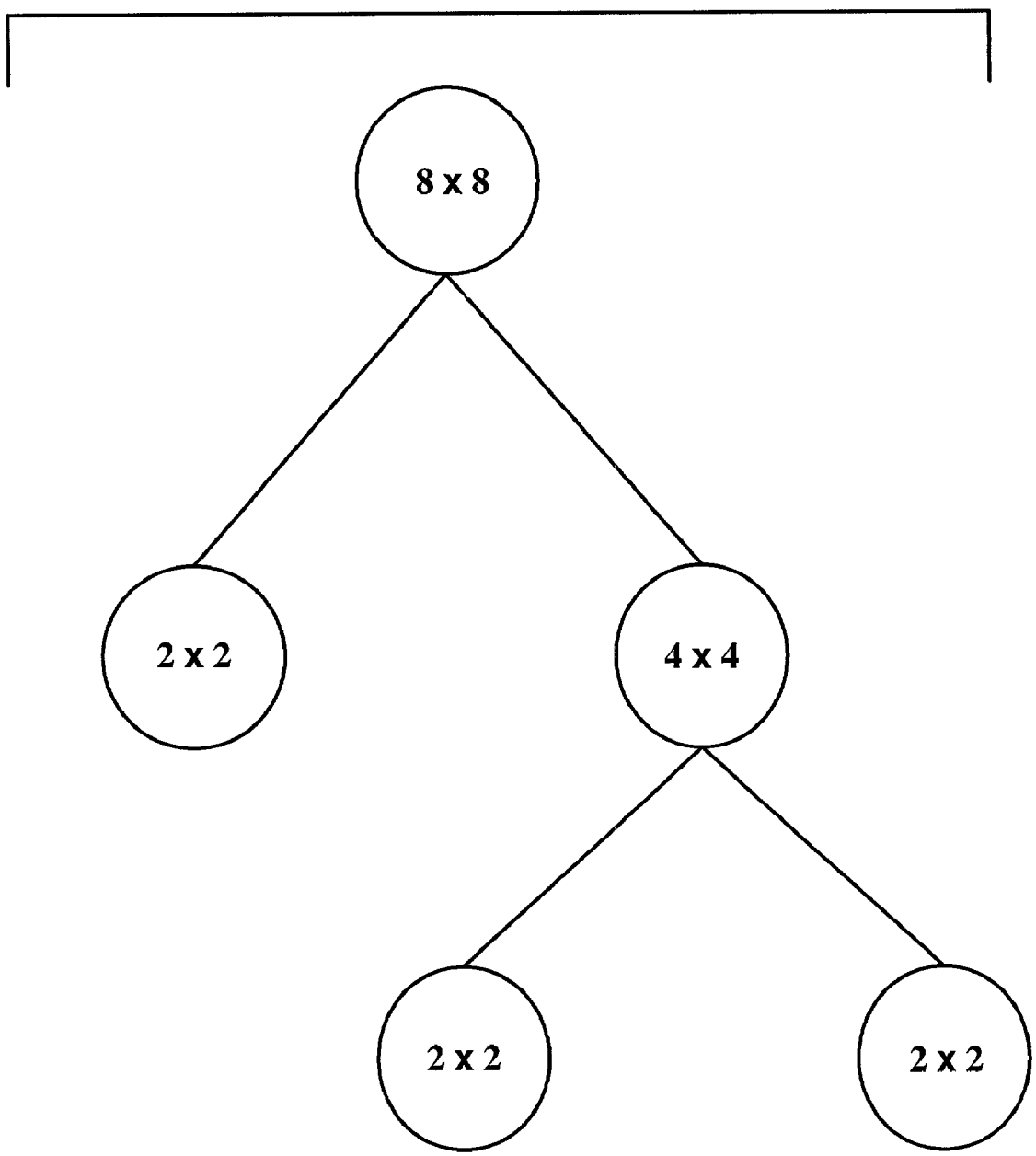
Figure 21A:
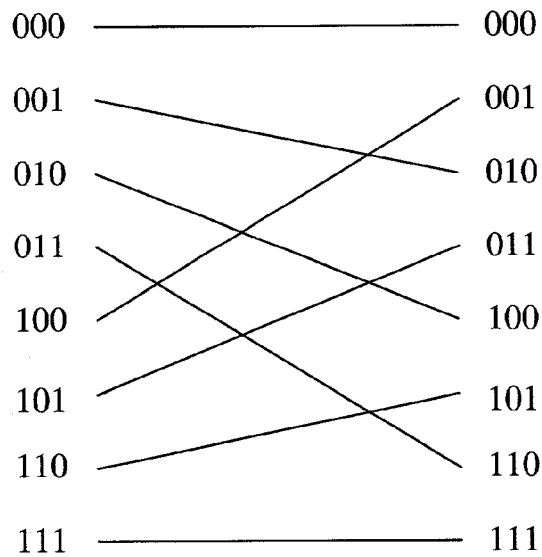
Figure 21B:
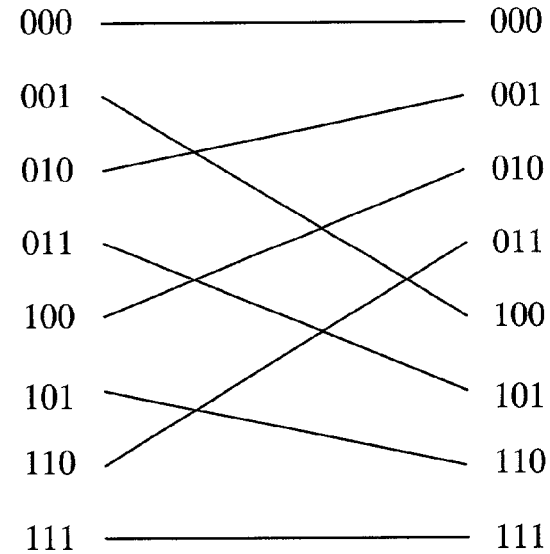
Figure 21C:
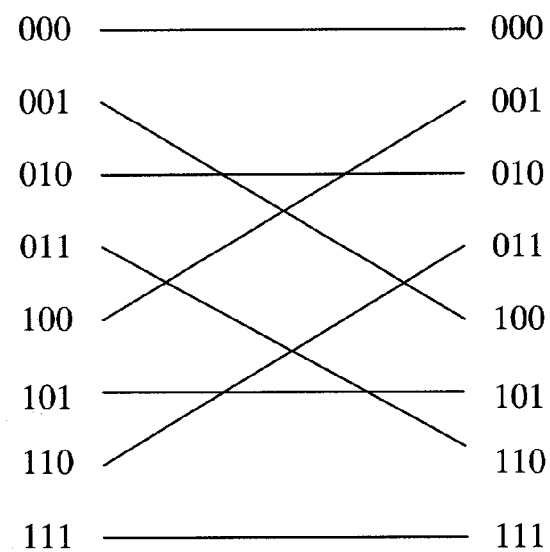
Figure 21D:
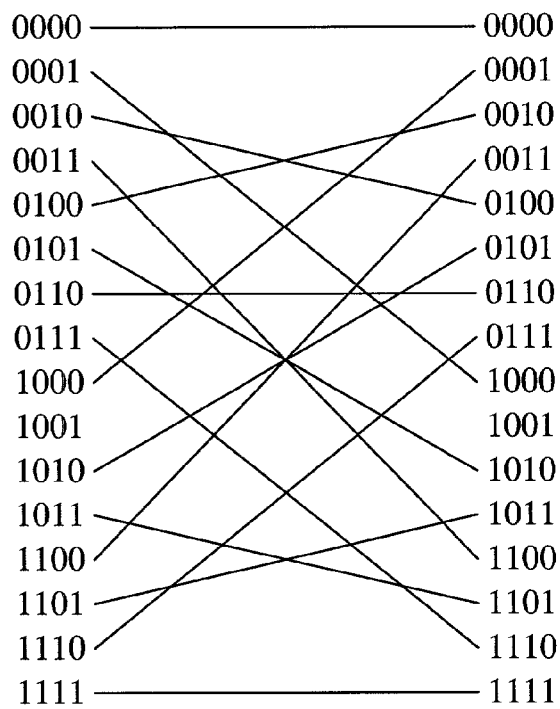
Figure 22:
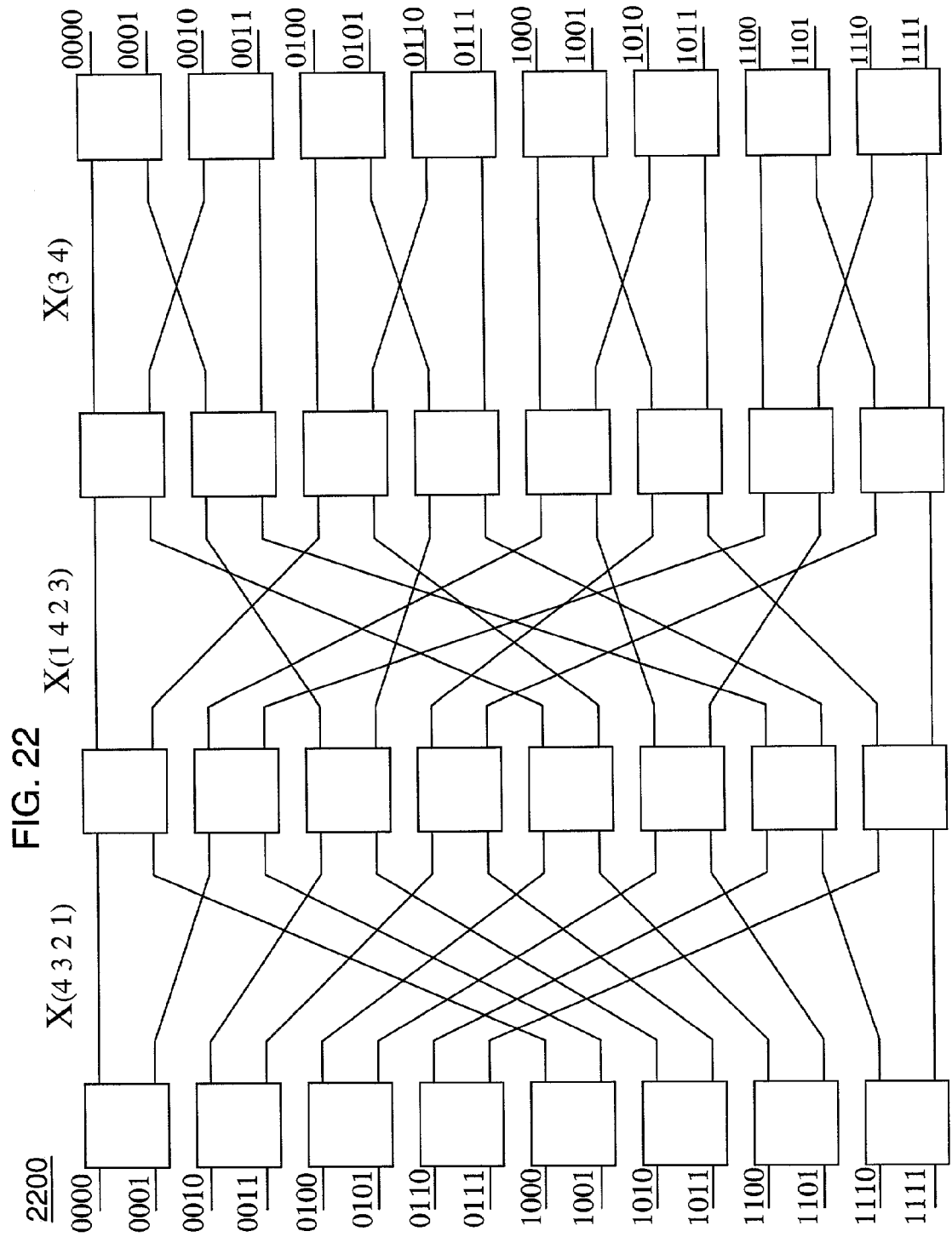
Figure 23:
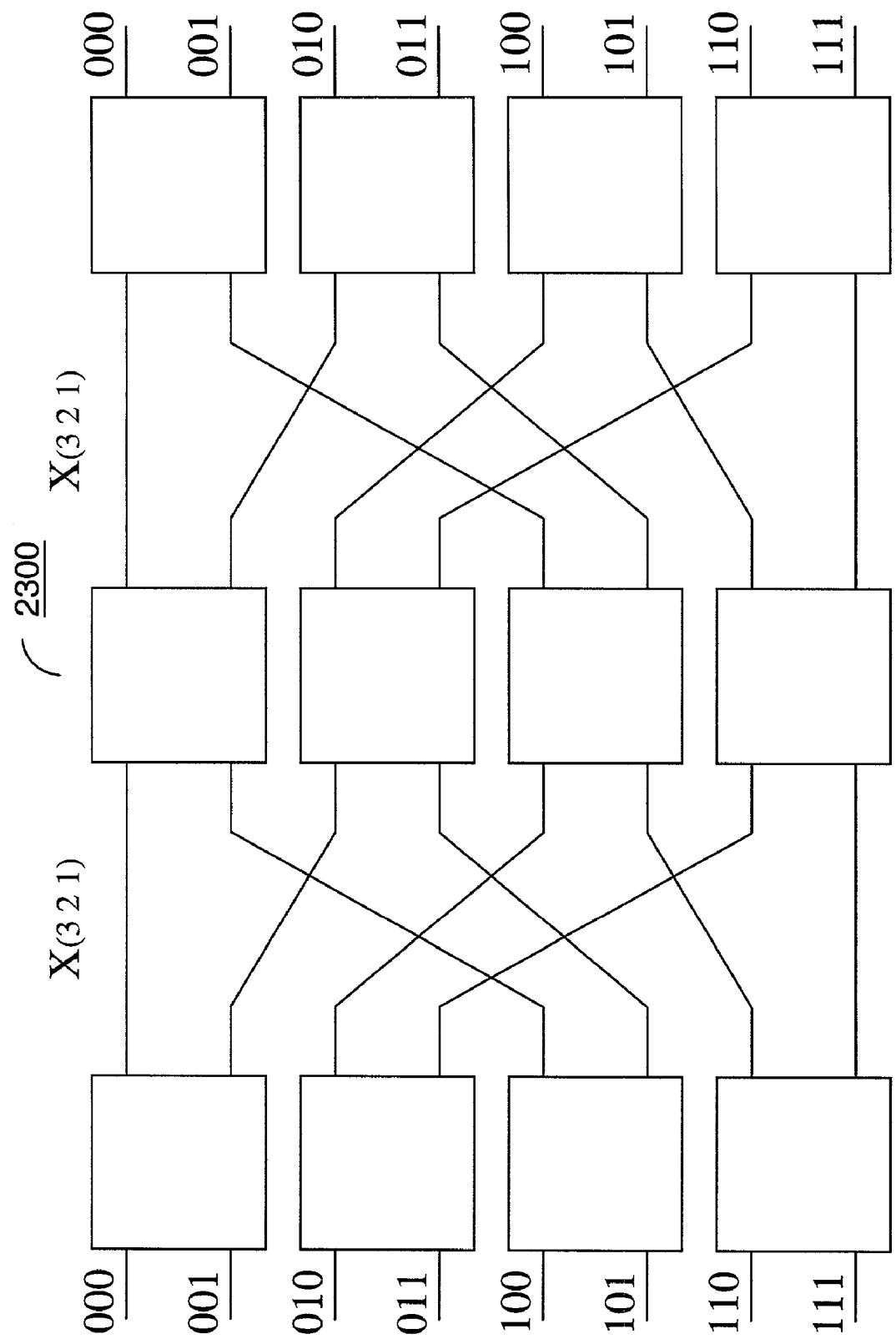
Figure 24:
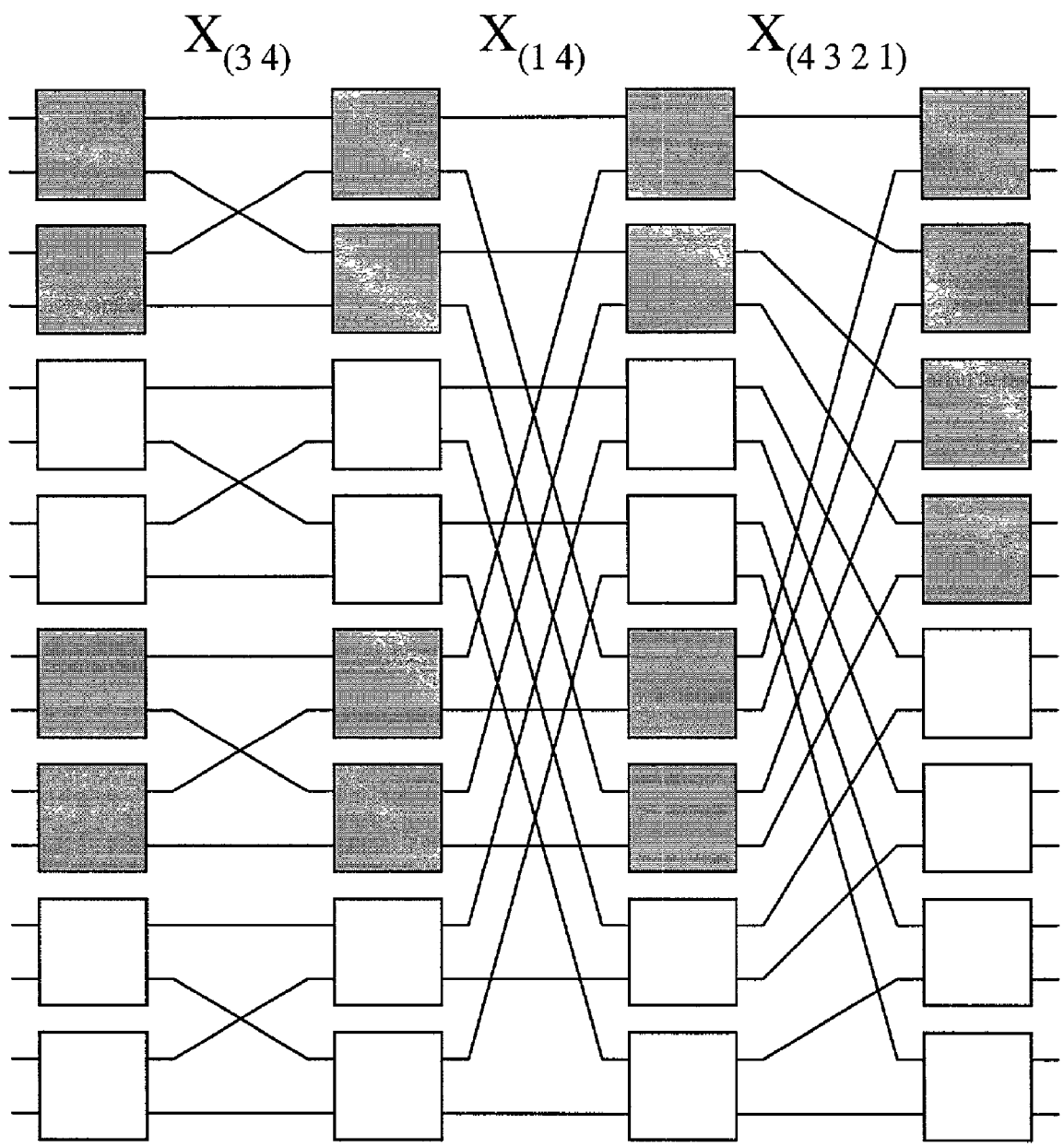
Figure 25:
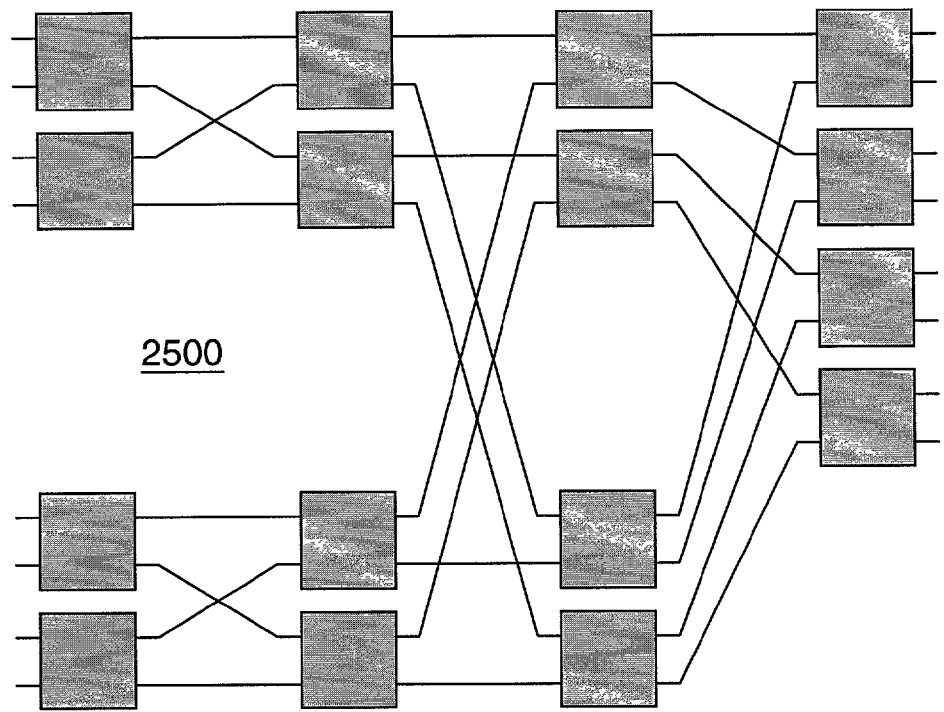
Figure 26:
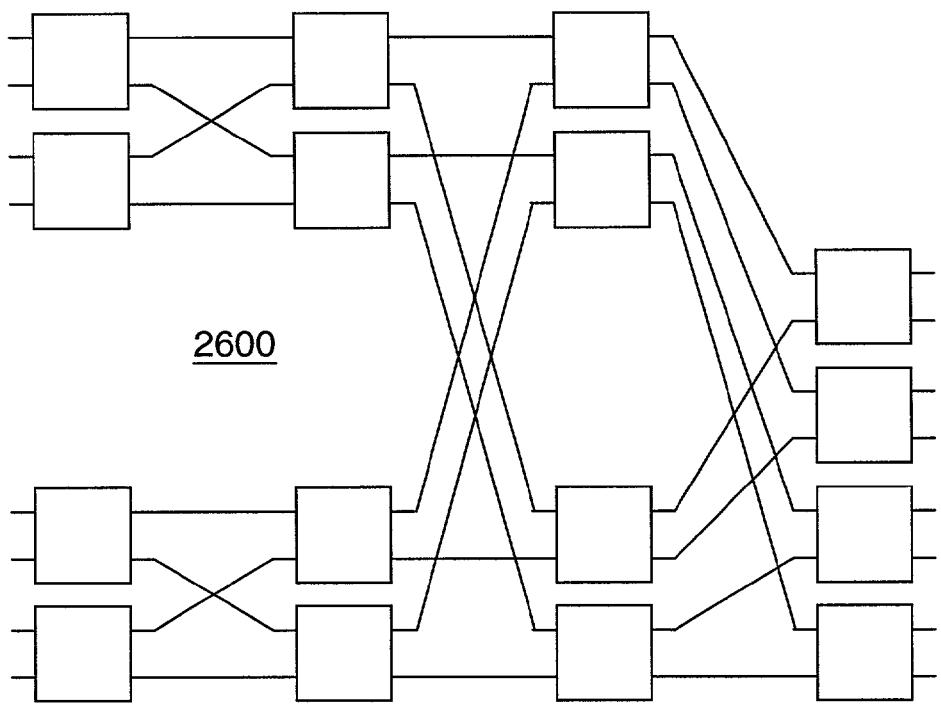
Figure 27:
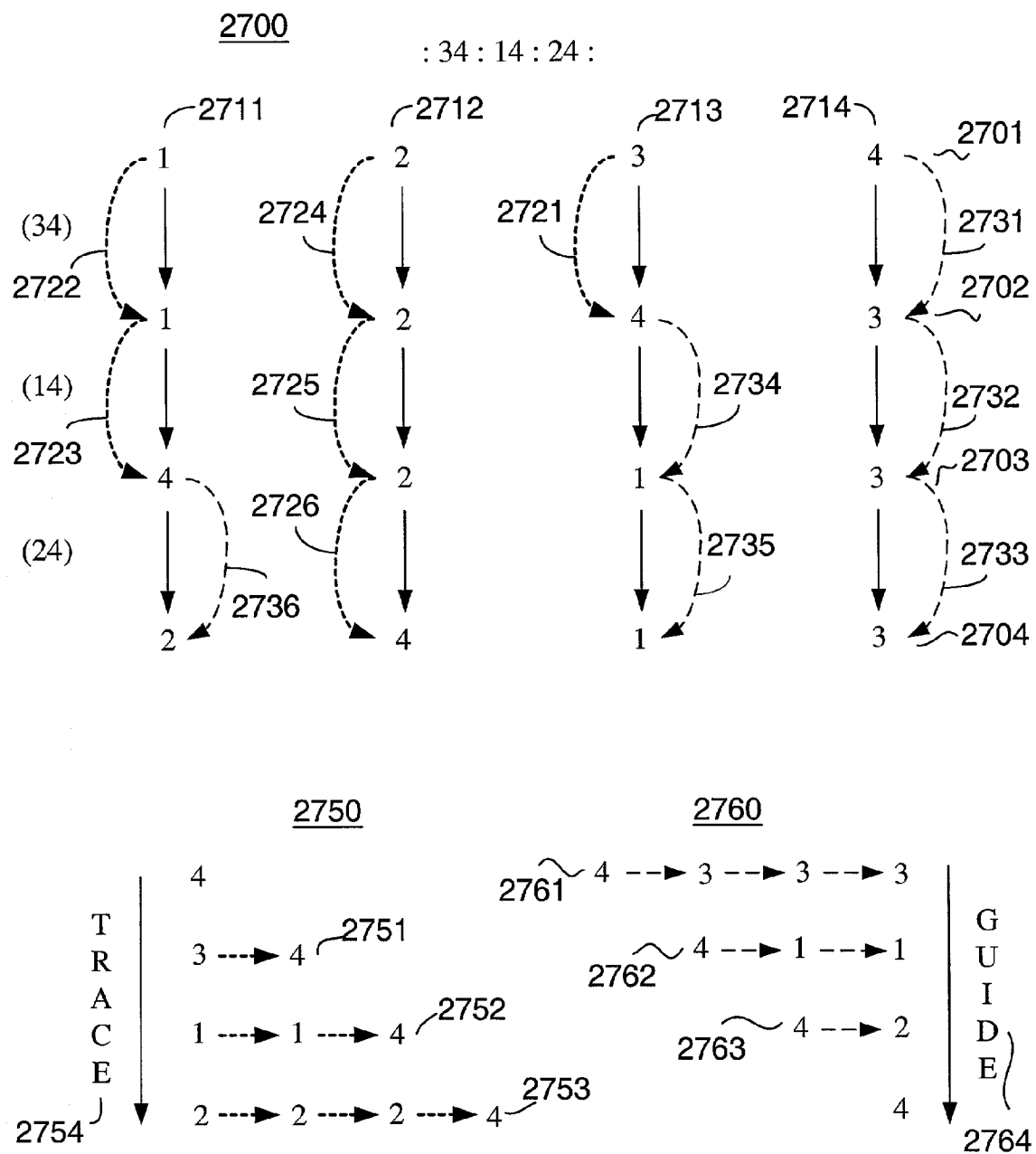
Figure 28A:
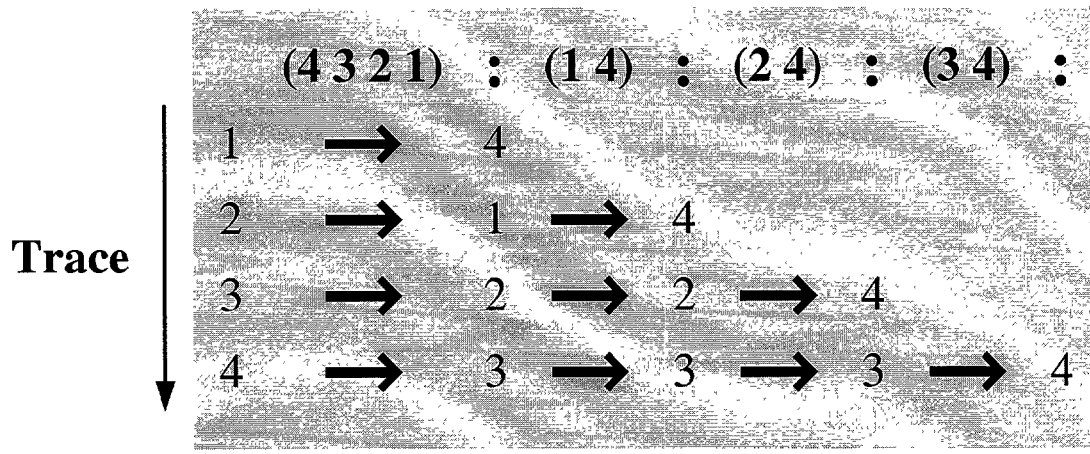
Figure 29:
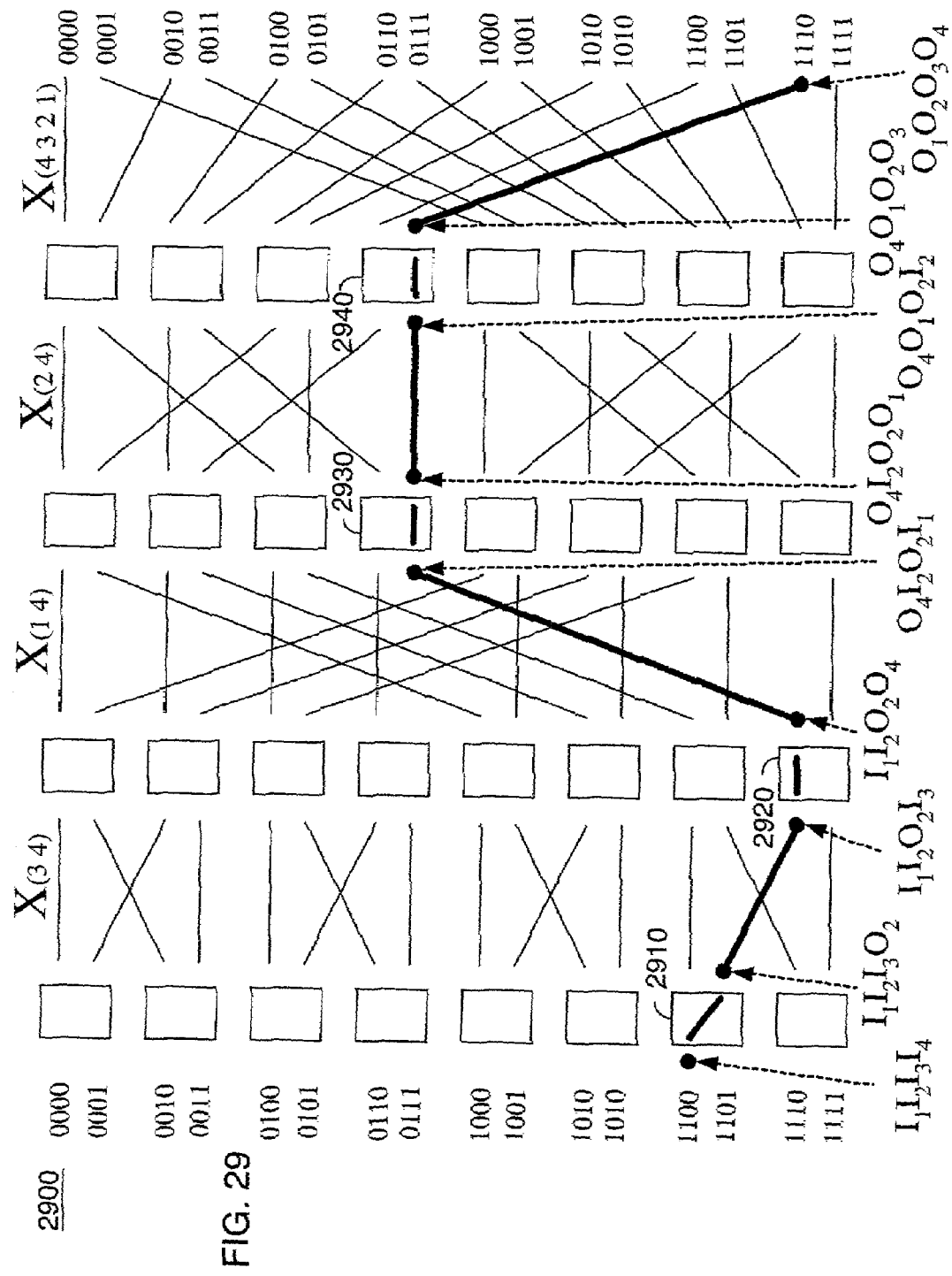
Figure 30A:
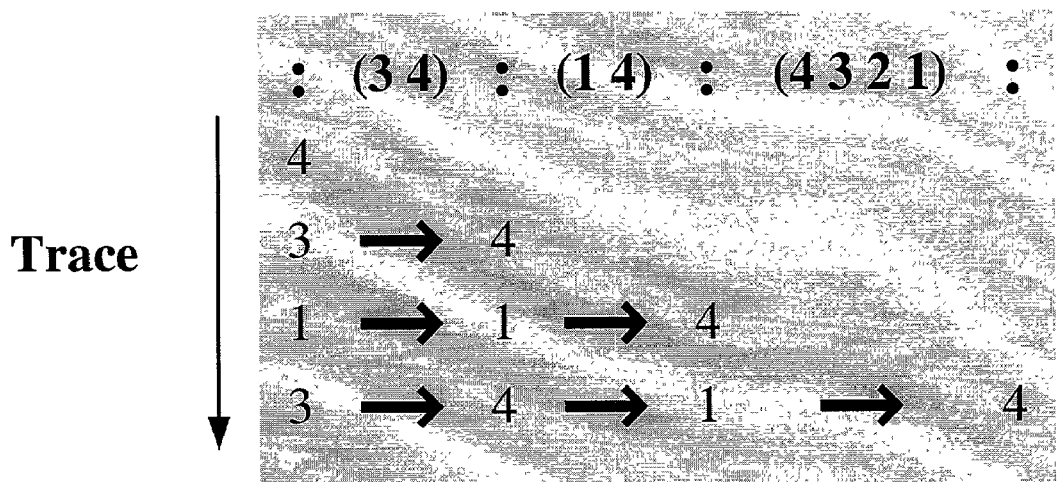
Figure 30B:
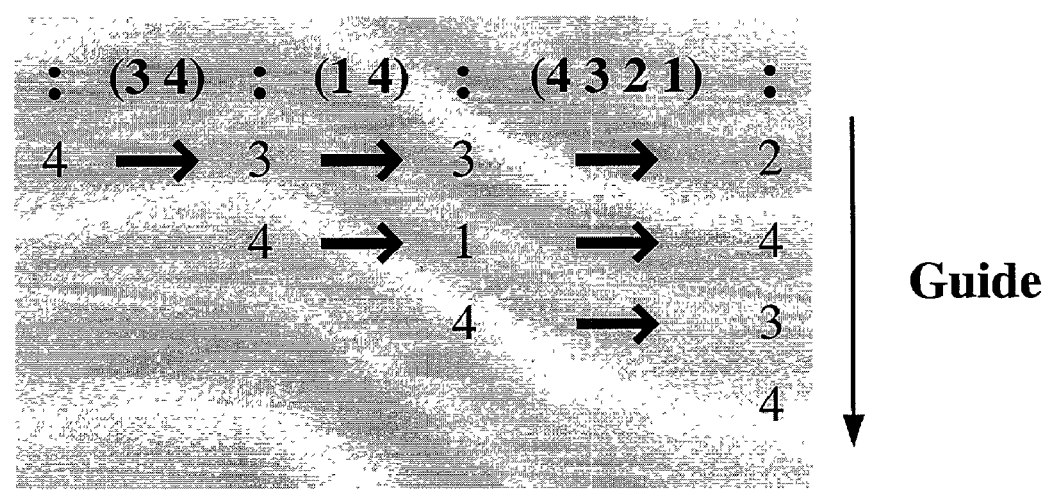

to FIG. 14 depicts the manner in which "basic building block" networks of 2×2, 3×3, and 5×5 are used in an exemplary recursive 2-stage construction;

FIG. 15 depicts the manner of mapping the recursive 2-stage construction exemplified by FIG. 14 into a binary tree diagram;

FIGS. 16-19 depict the manner of building a recursive 2-stage interconnection with an input exchange from cells;

FIG. 20 depicts the binary tree associated with the recursive construction depicted in FIGS. 16-19;

FIG. 21A depicts a (3 2 1) permutation on an 8×8 exchange;

FIG. 21B depicts a (1 2 3) permutation on an 8×8 exchange;

FIG. 21C depicts a (3 1) permutation on an 8×8 exchange;

FIG. 21D depicts a combined (1 4)(2 3) permutation on an 8×8 exchange;

FIG. 22 depicts a network expressed as [id:(4 3 2 1):(1 4 2 3):(3 4):id]$_4$;

FIG. 23 depicts a network expressed as [:(3 2 1):(3 2 1):]$_3$;

FIG. 24 depicts a network expressed as [:(3 4):(1 4):(4 3 2 1):]$_4$ which is not routable;

FIG. 25 depicts a network expressed as [:(2 3):(1 3):(3 2 1):]$_3$ which is one network comprising part of the network of FIG. 24;

FIG. 26 depicts the same network of FIG. 25 comprising another part of the network of FIG. 24;

FIG. 27 depicts a graphical manner for obtaining the trace and the guide of the 16×16 banyan-type network [id:(3 4):(1 4):(2 4):id];

FIG. 28A summarizes the paths of FIG. 27 to generate the trace;

FIG. 28A summarizes the paths of FIG. 27 to generate the guide;

FIG. 29 depicts a route through a 16×16 banyan-type network [id:(3 4):(1 4):(2 4):(4 3 2 1)]$_4$ from the origination address 1100 to the destination address 1110;

FIGS. 30A & 30B summarize the paths of FIG. 24 to generate the guide.

Figure 31:
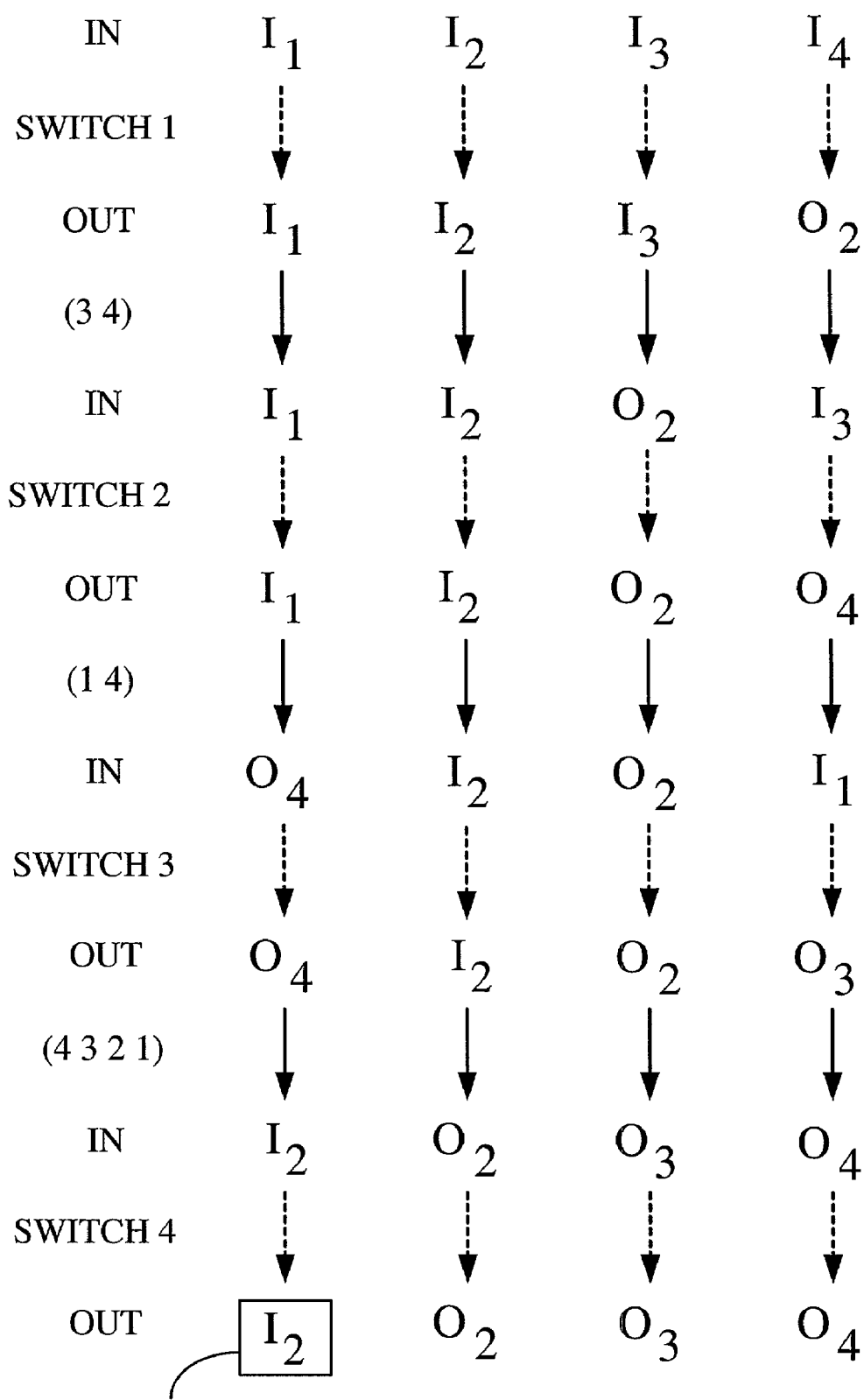
Figure 32B:
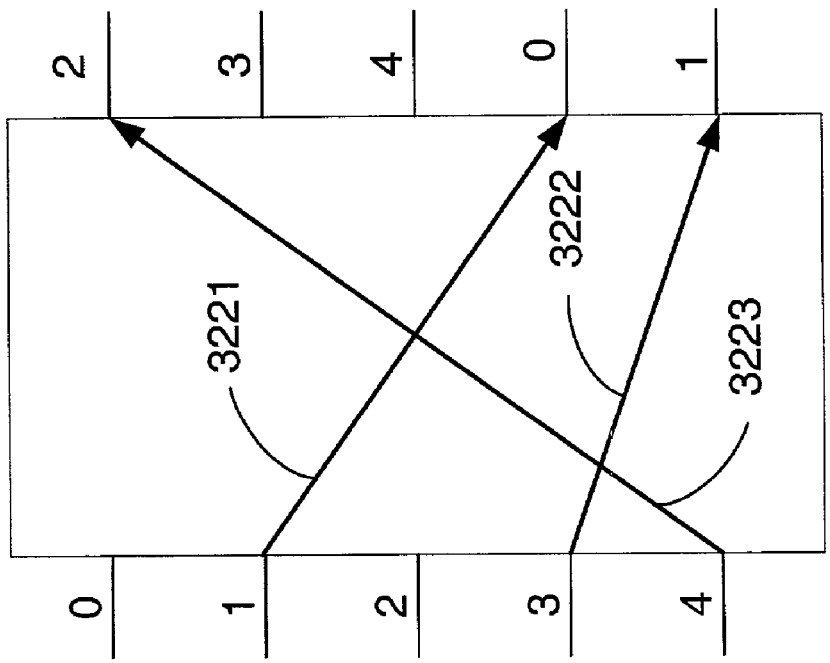
Figure 32A:
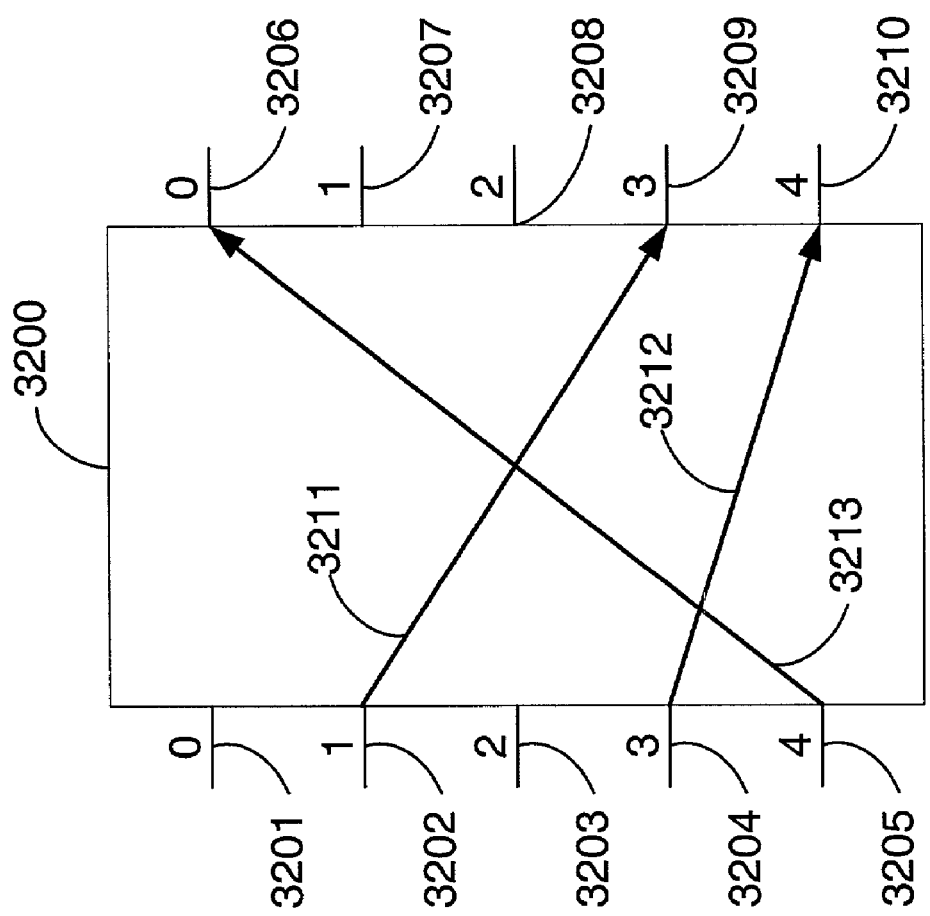
Figure 32D:
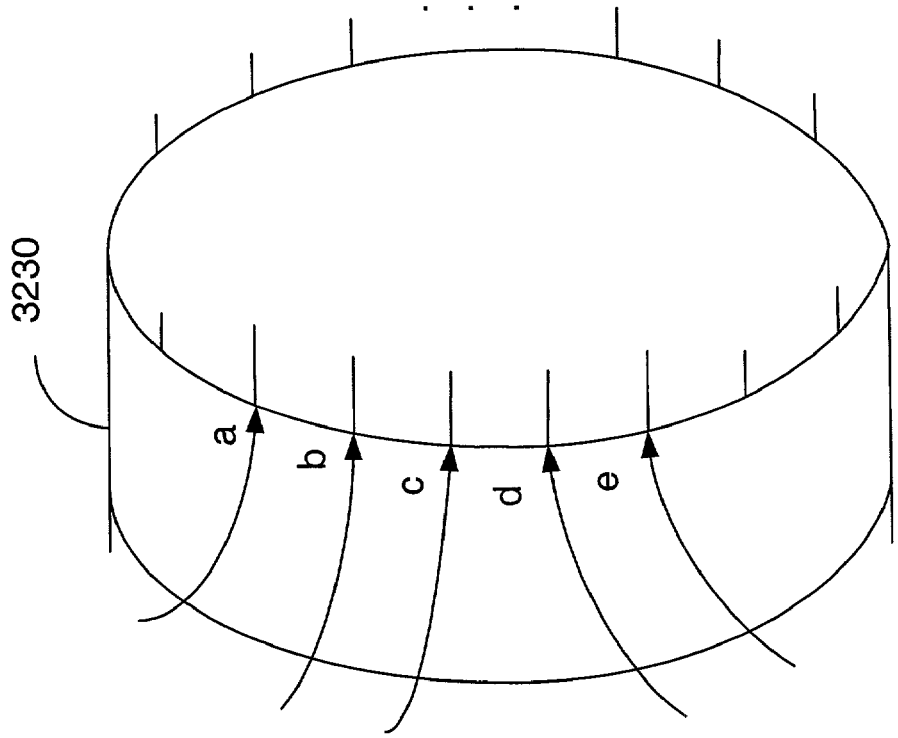
Figure 32C:
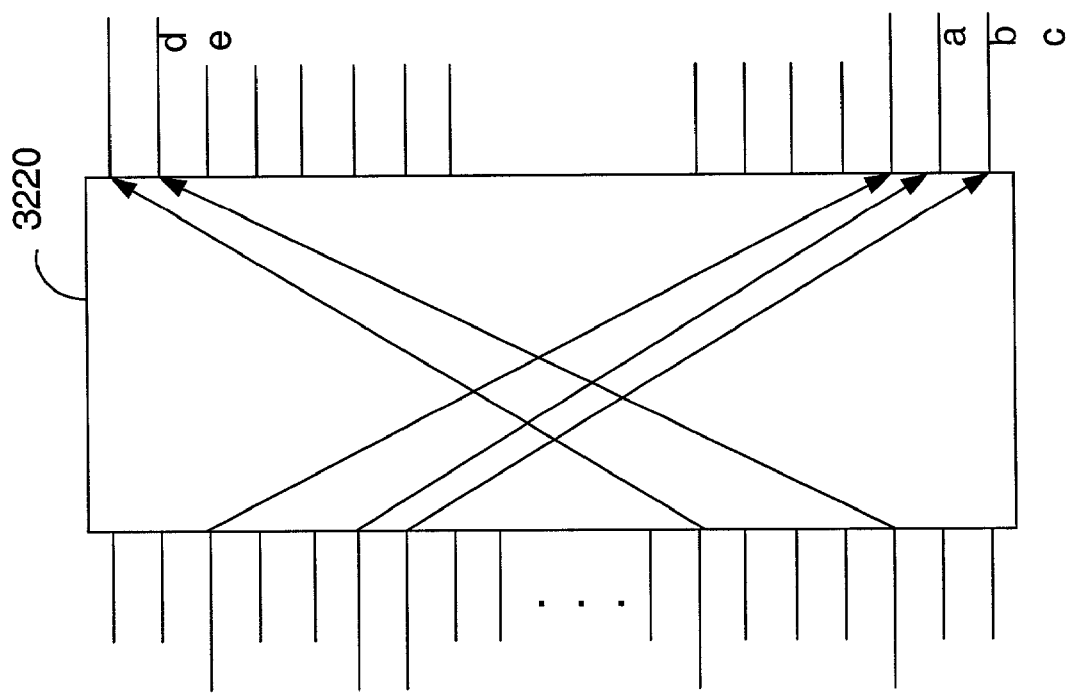
Figure 33A:
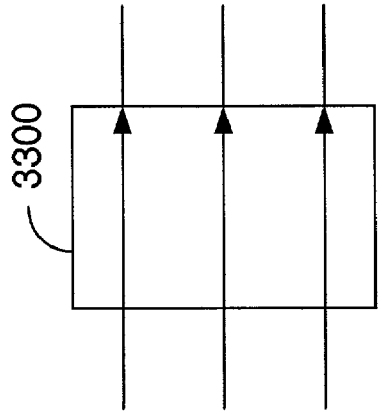
Figure 33B:
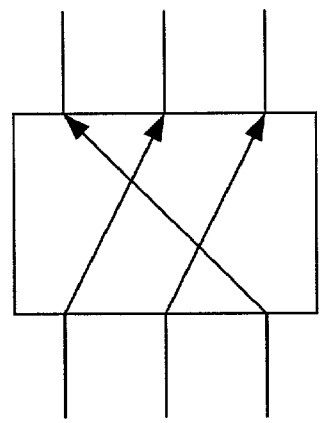
Figure 33C:
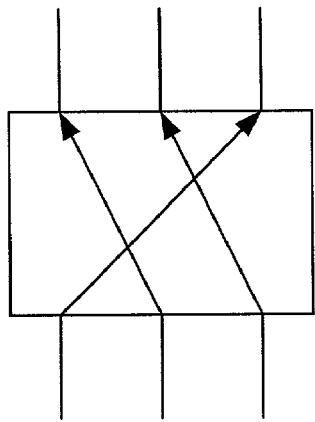
Figure 33D:
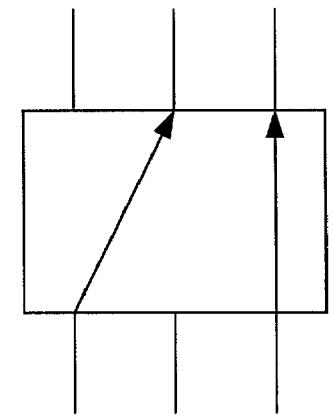
Figure 33E:
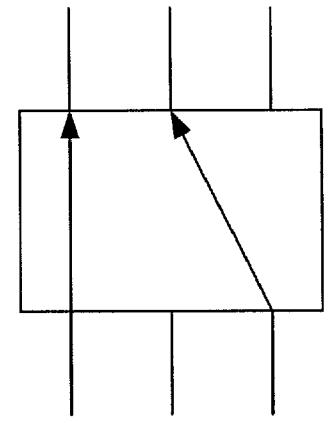
Figure 33F:
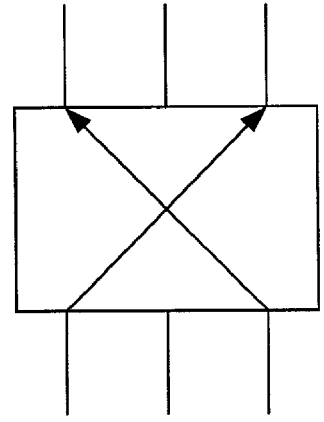
Figure 34:
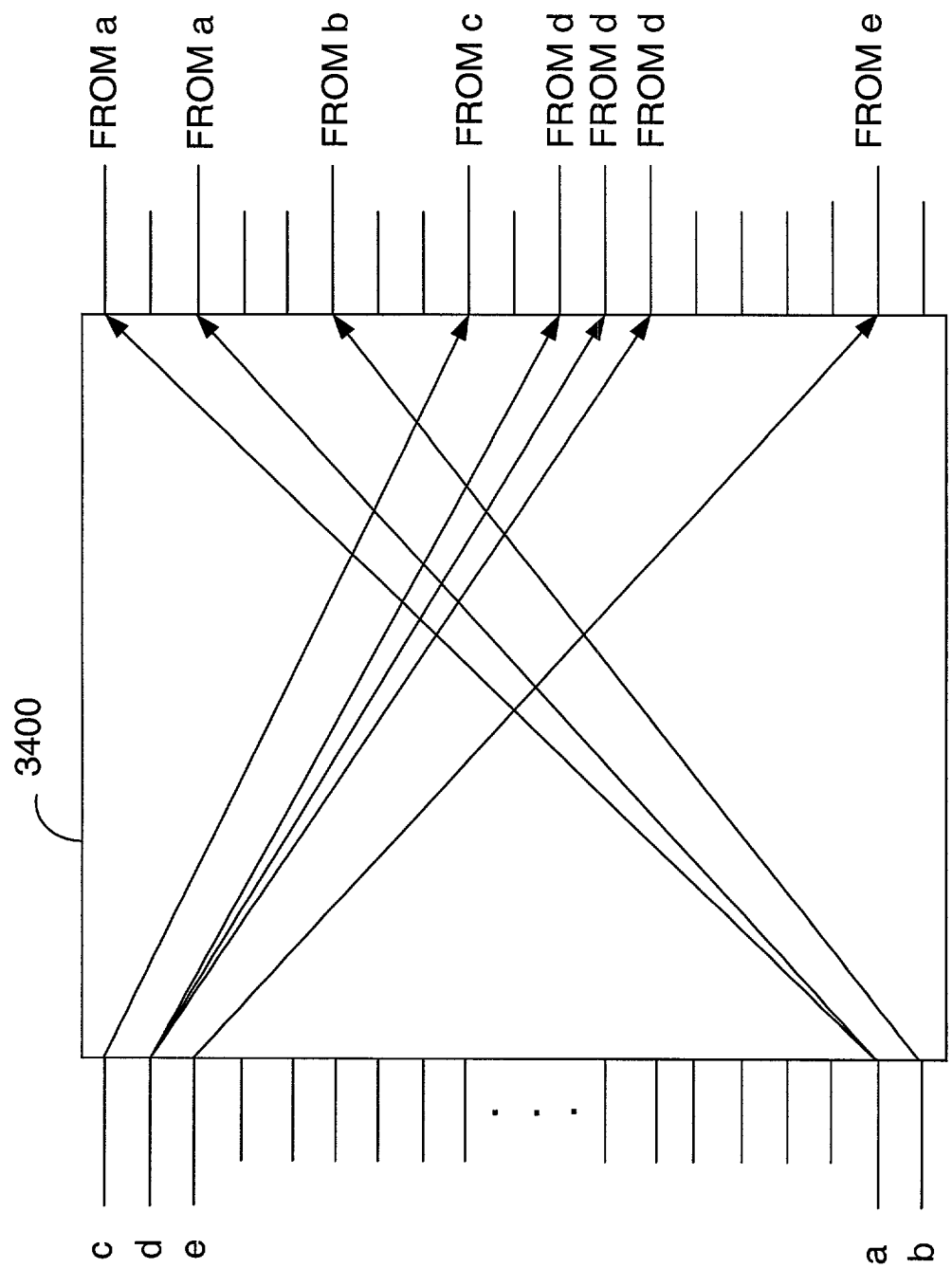
Figure 38A:
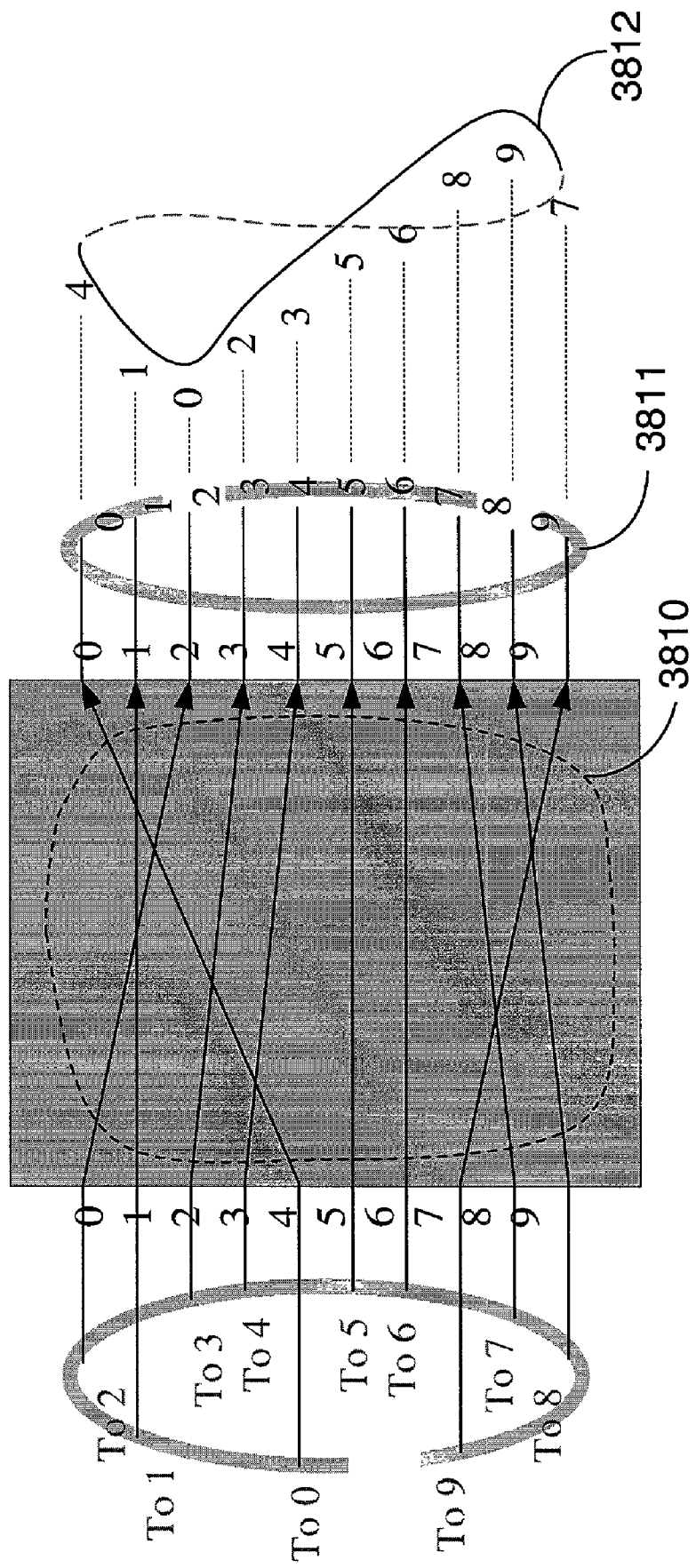
Figure 38B:
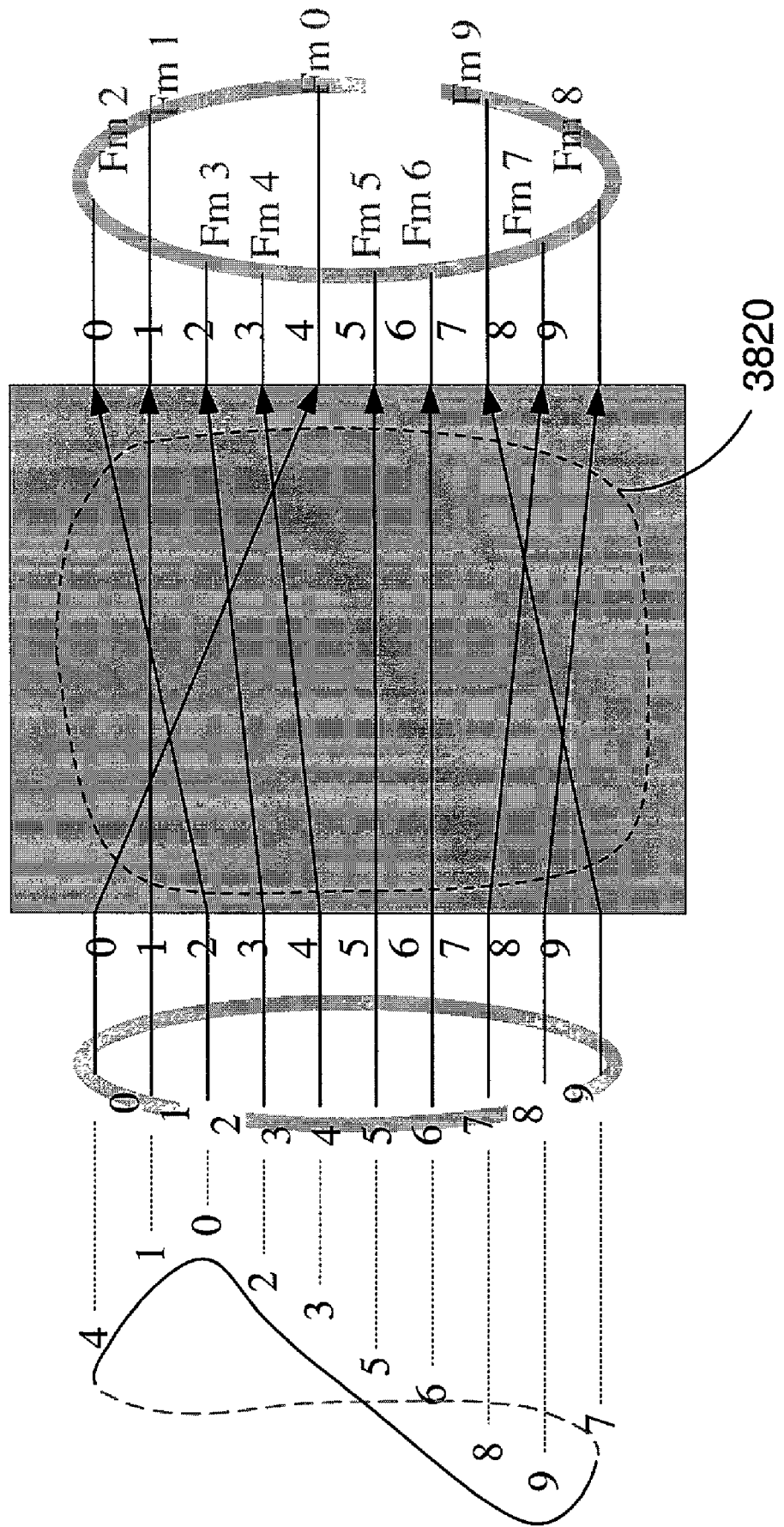
Figure 39:
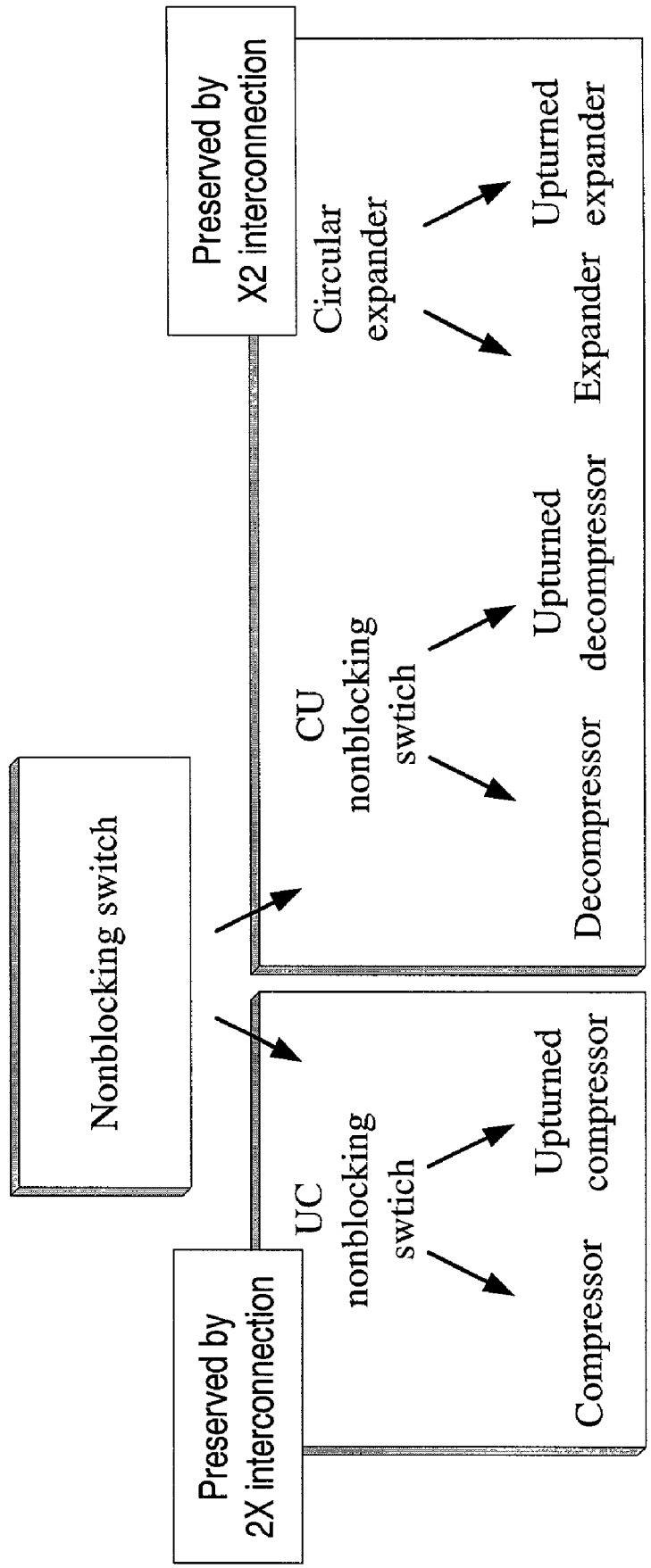
Figure 40:
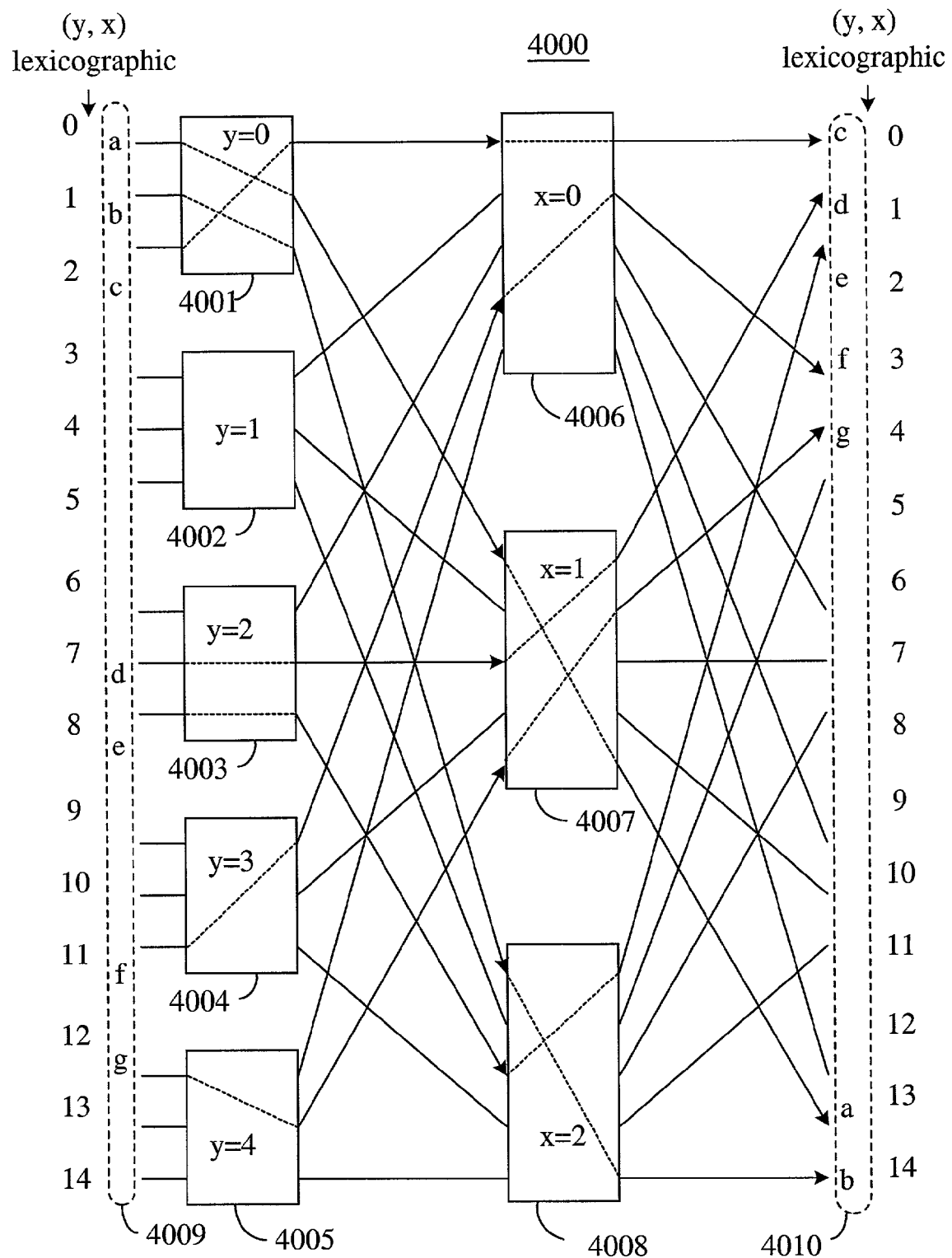
Figure 42:
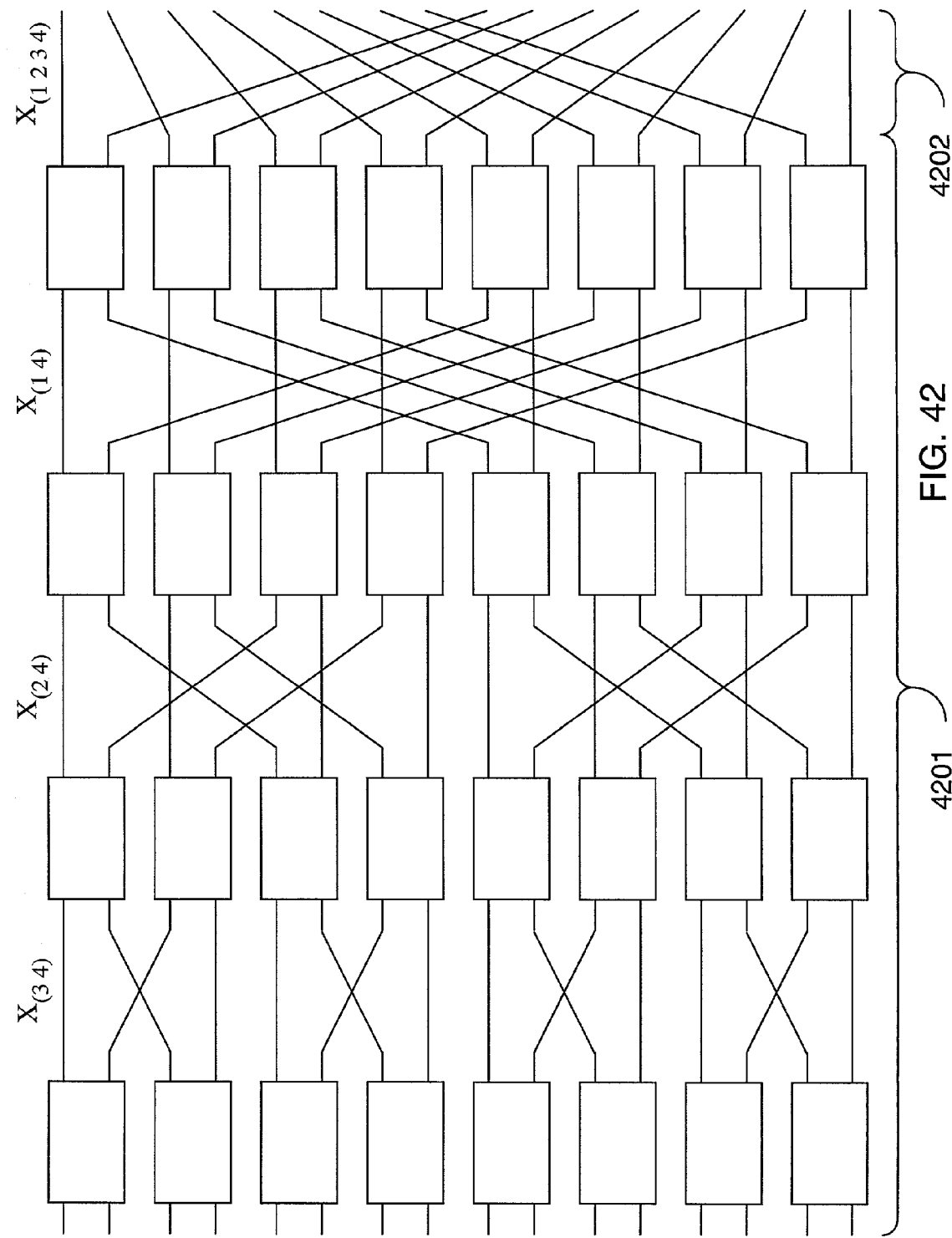
Figure 43:
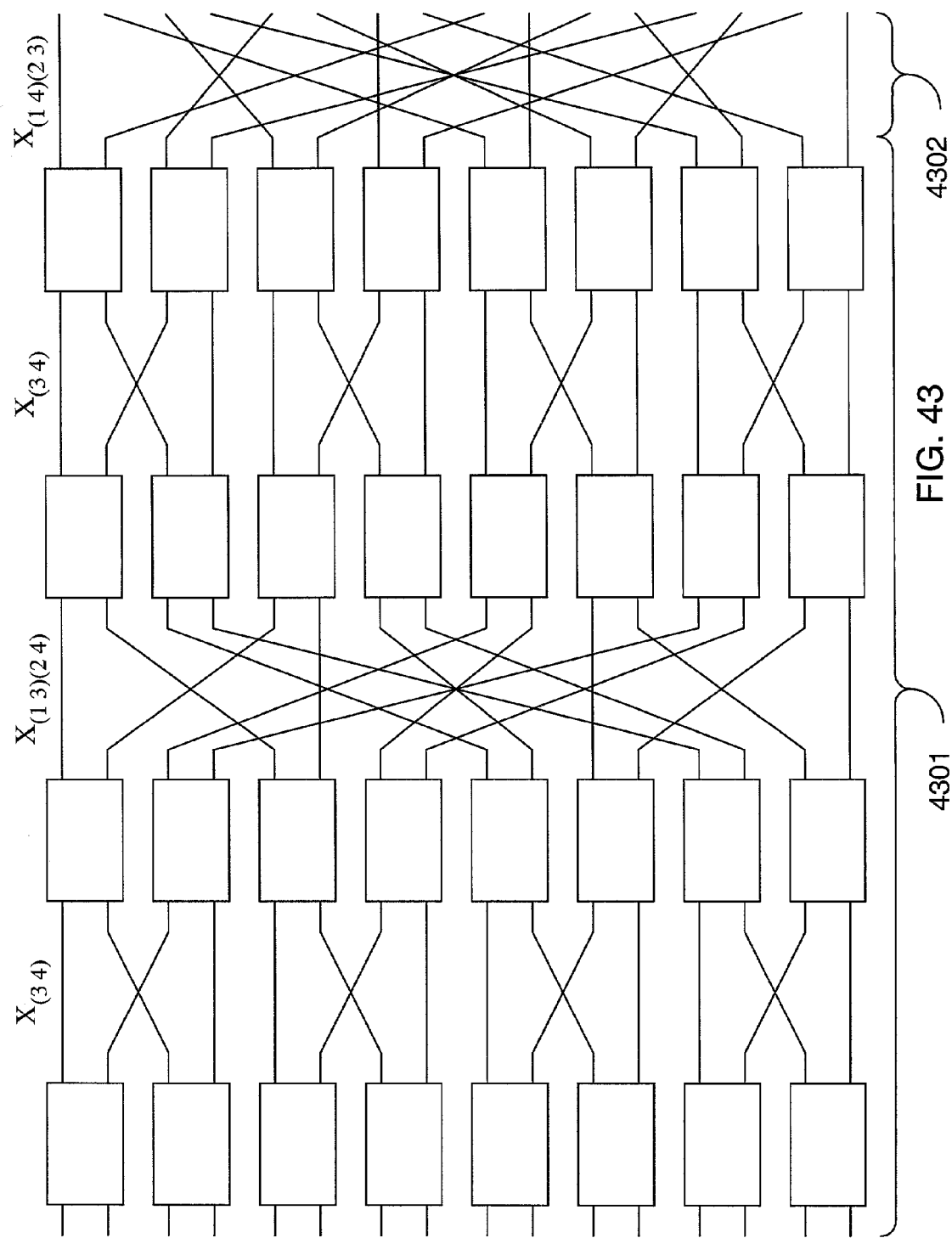
Figure 44A:
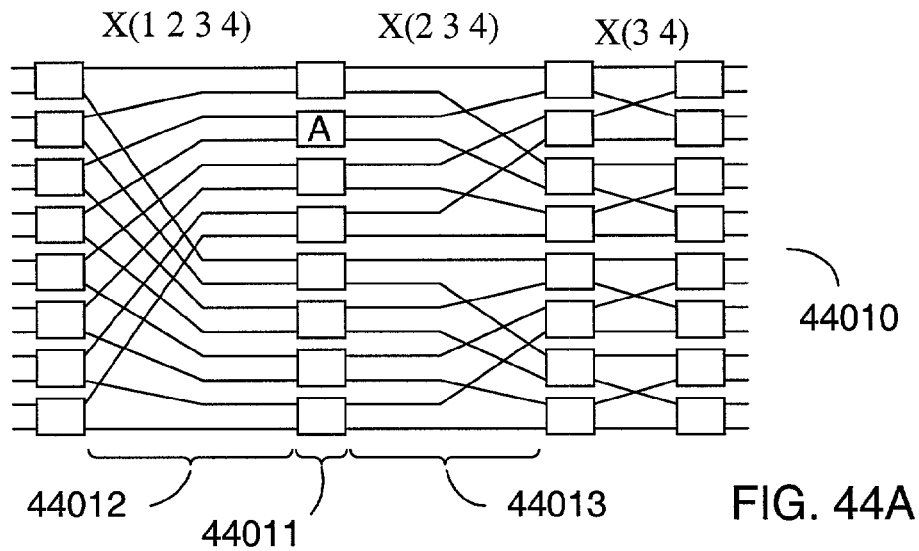
Figure 44B:
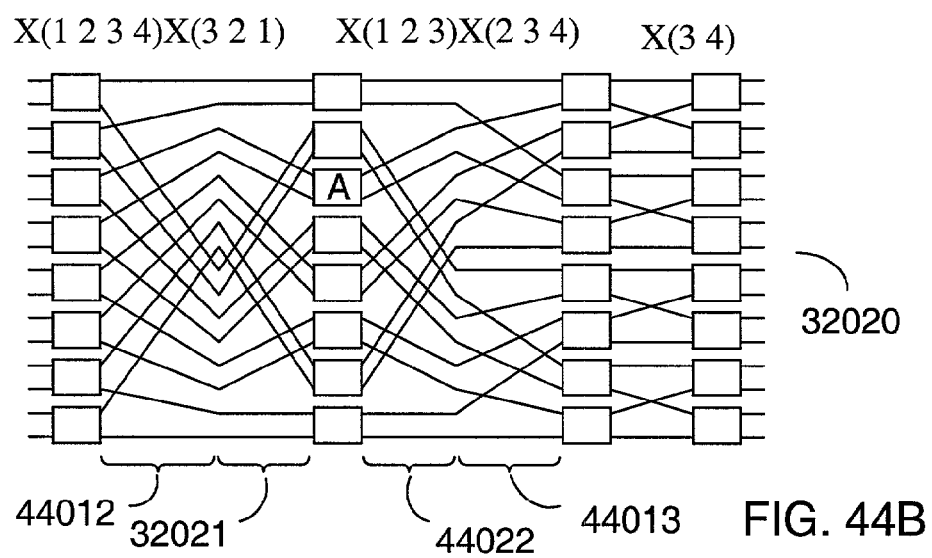
Figure 44C:
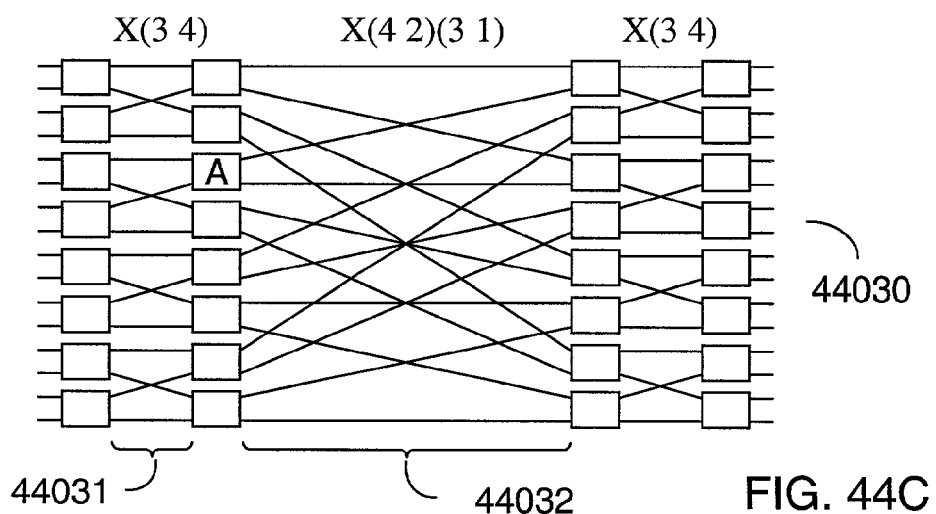
Figure 46:
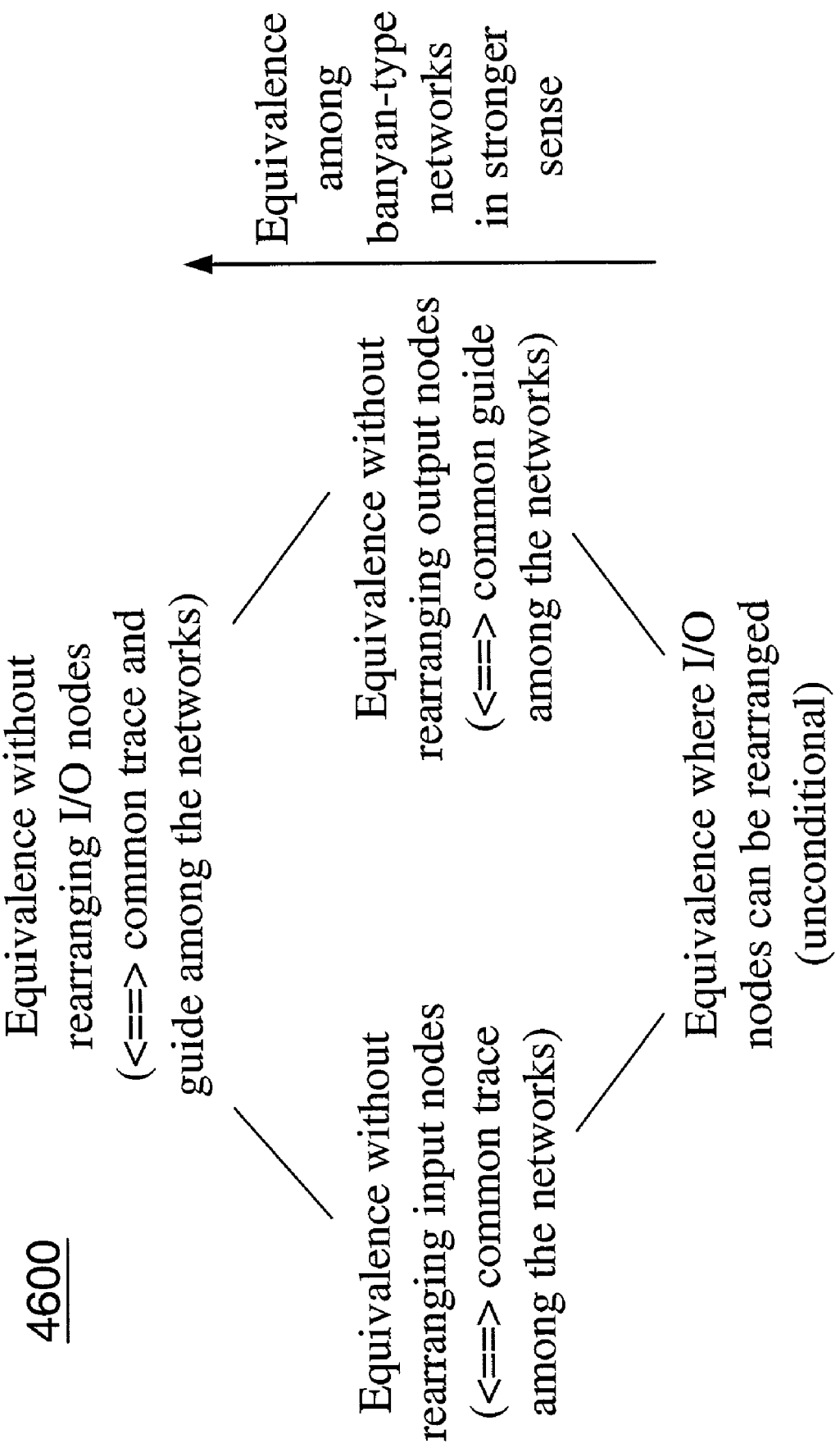
Figure 47:
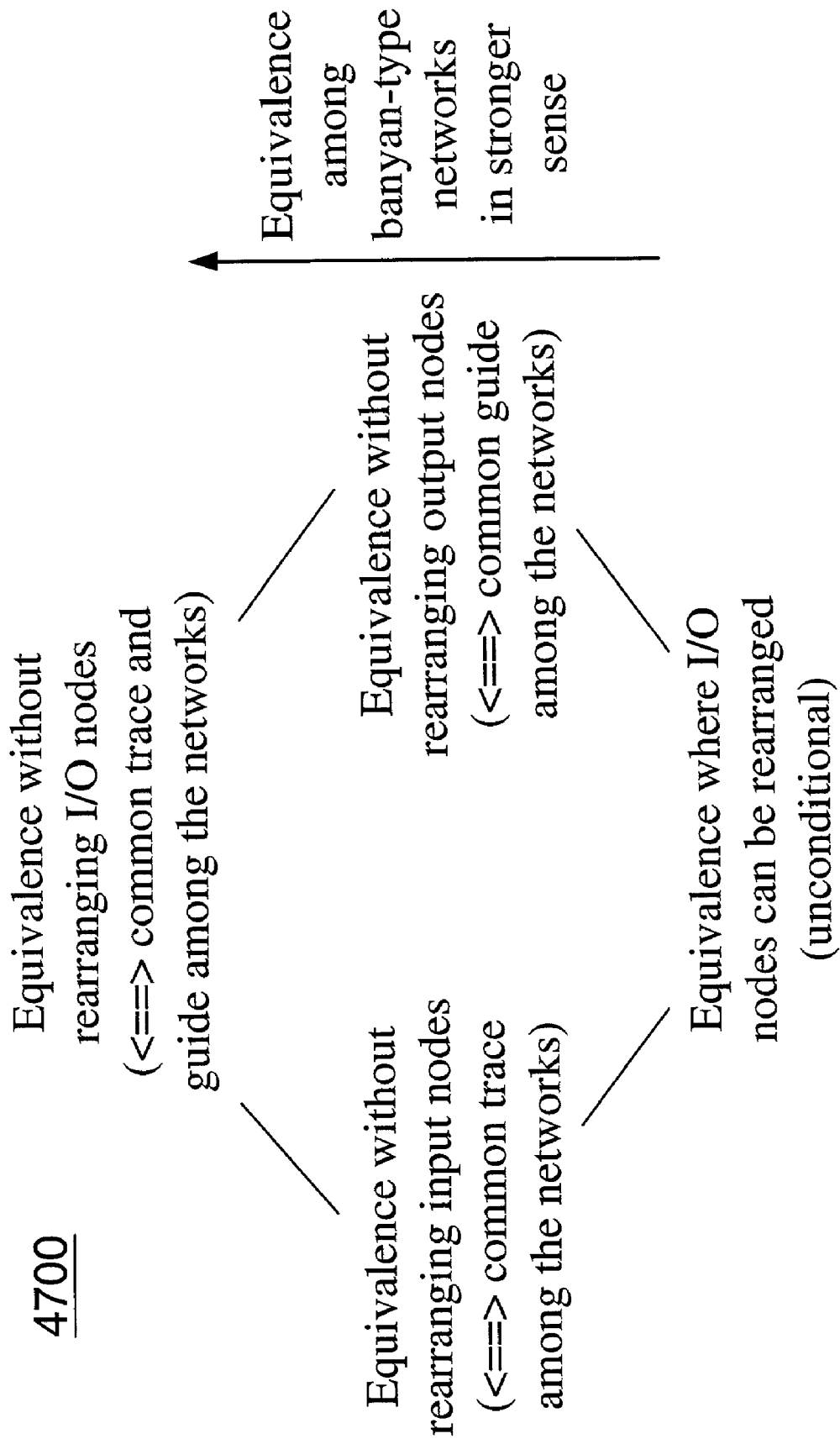
Figure 48:
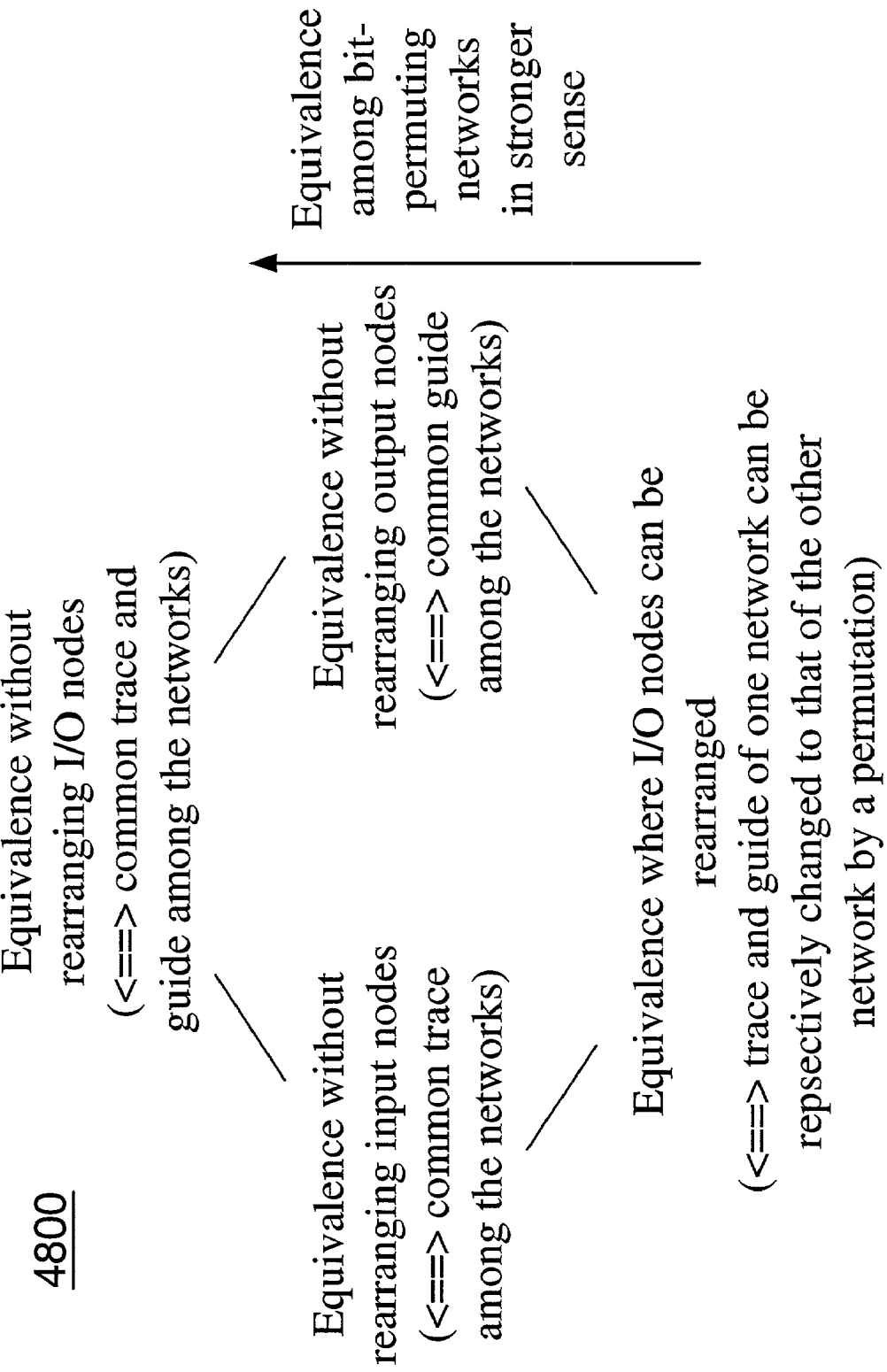
Figure 49A:
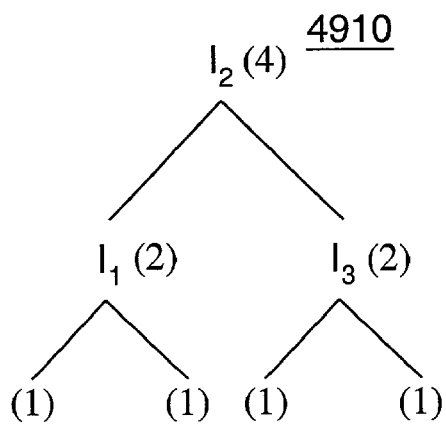
Figure 49B:
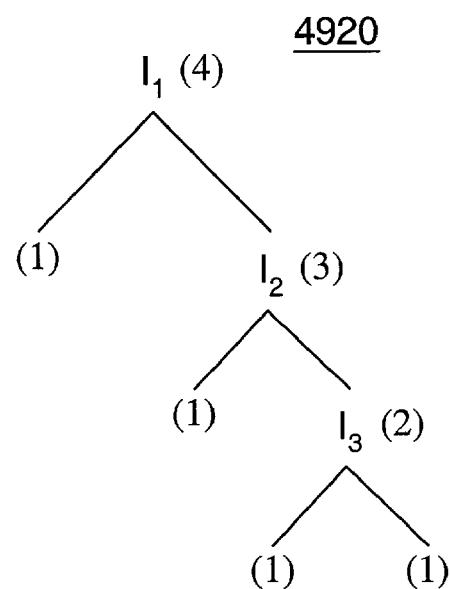
Figure 49C:
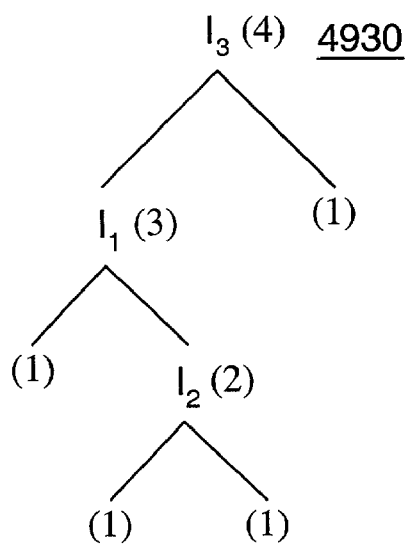
Figure 49D:
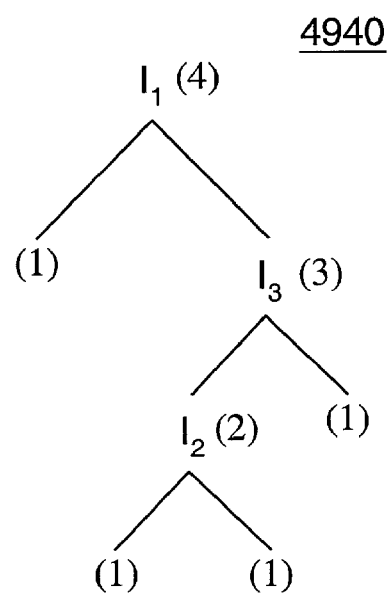
Figure 49E:
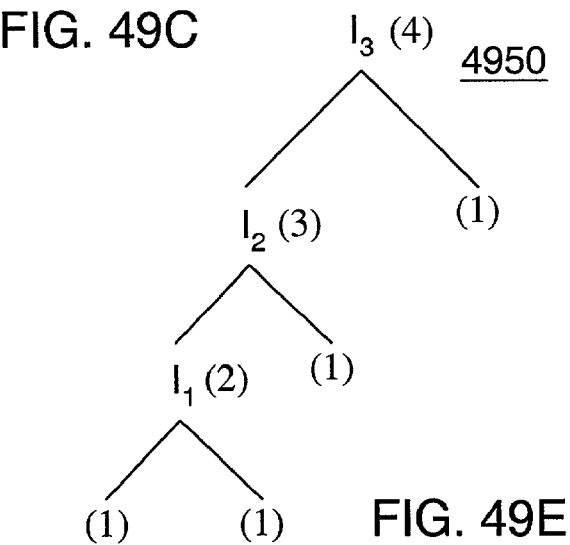
Figure 51:
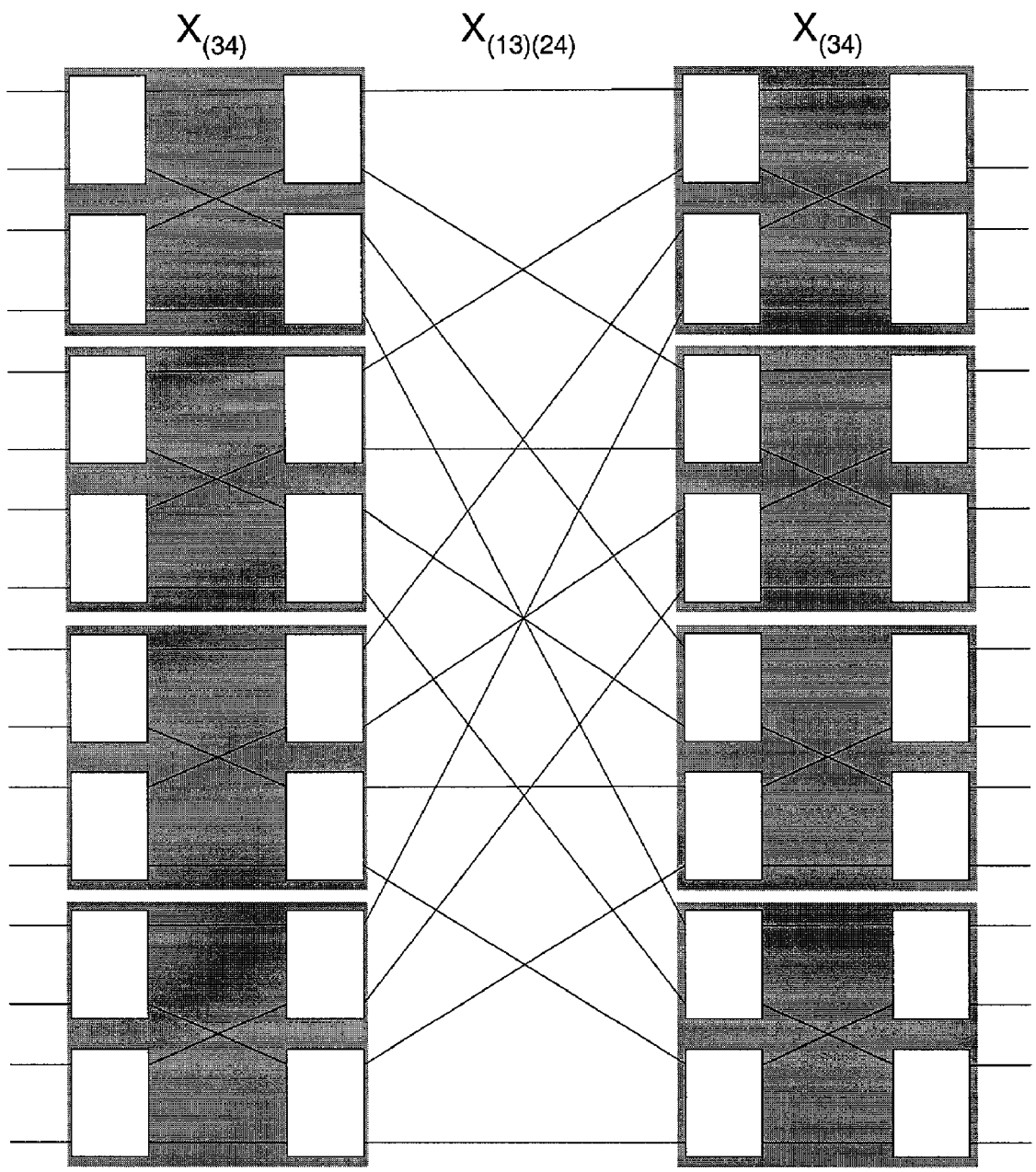
Figure 52:
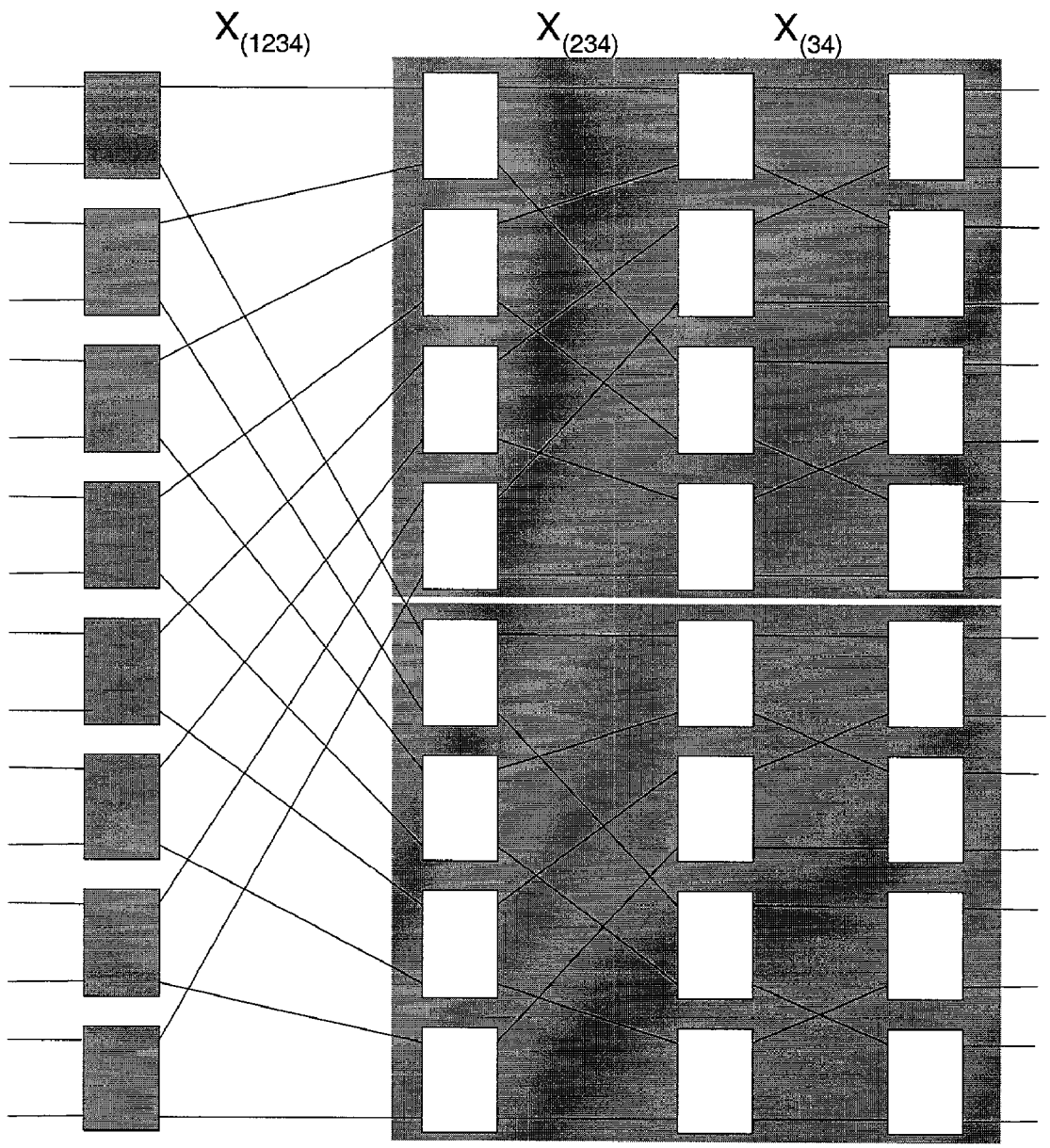
Figure 54:
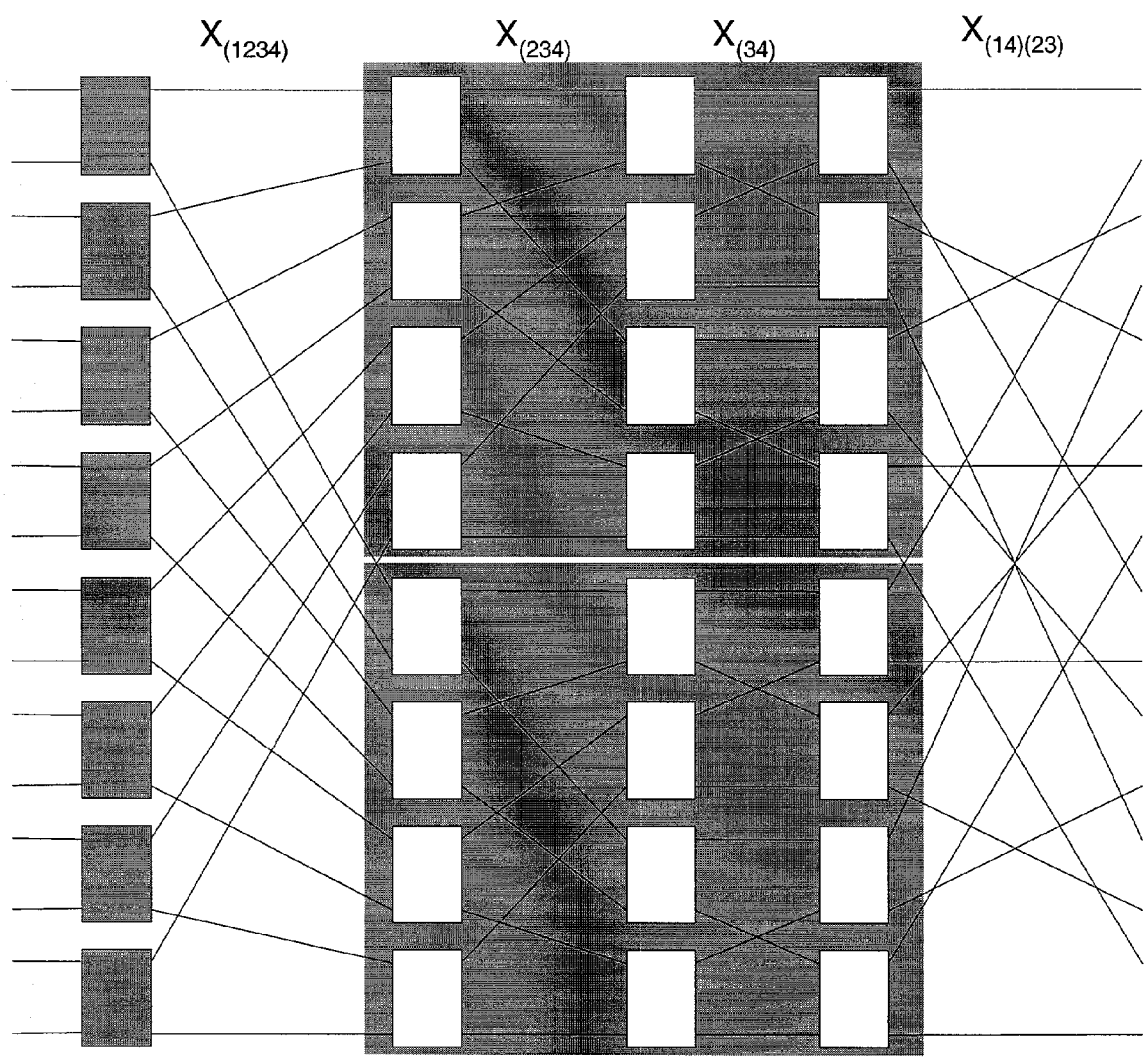
Figure 55:
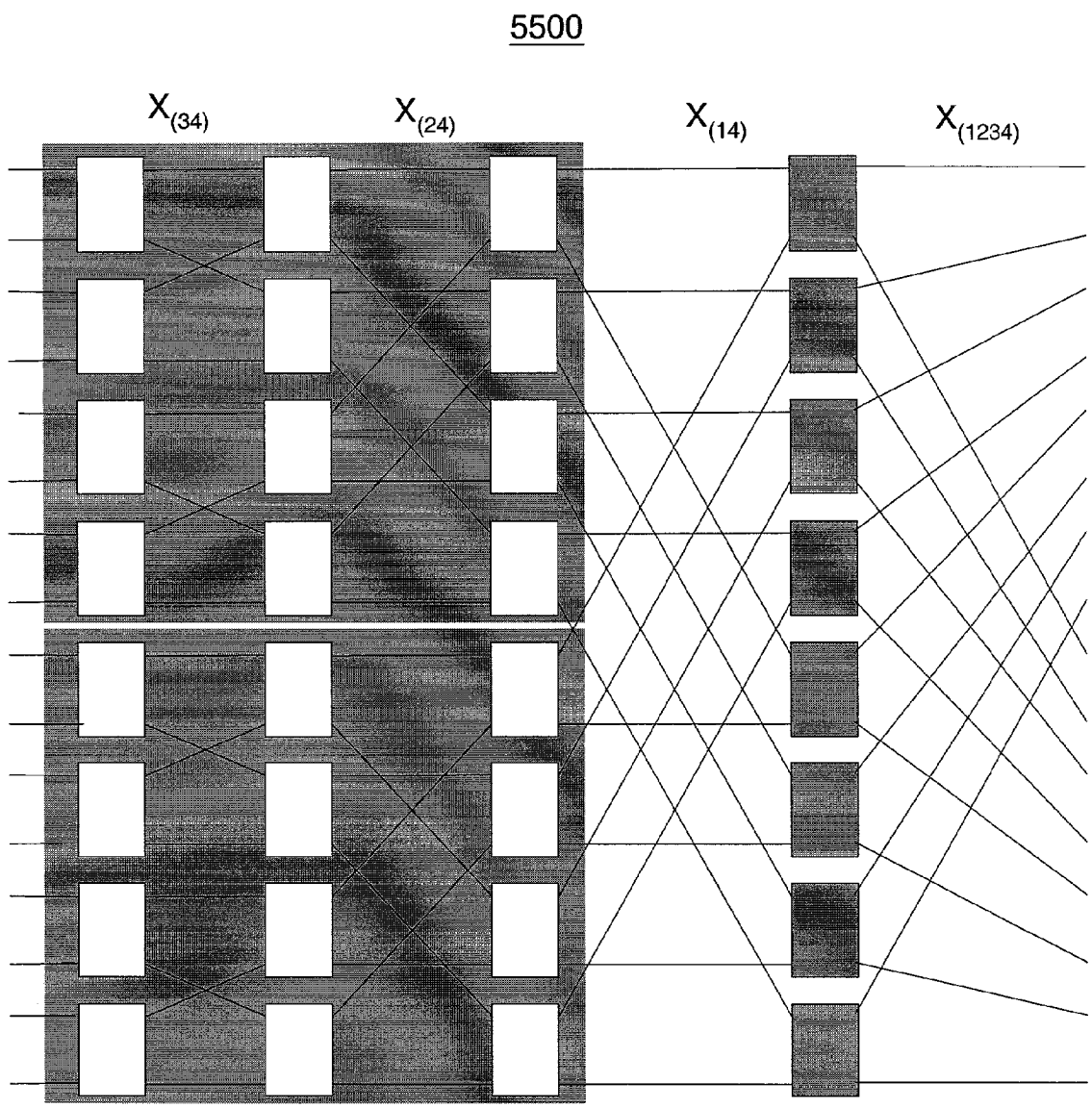
Figure 57:
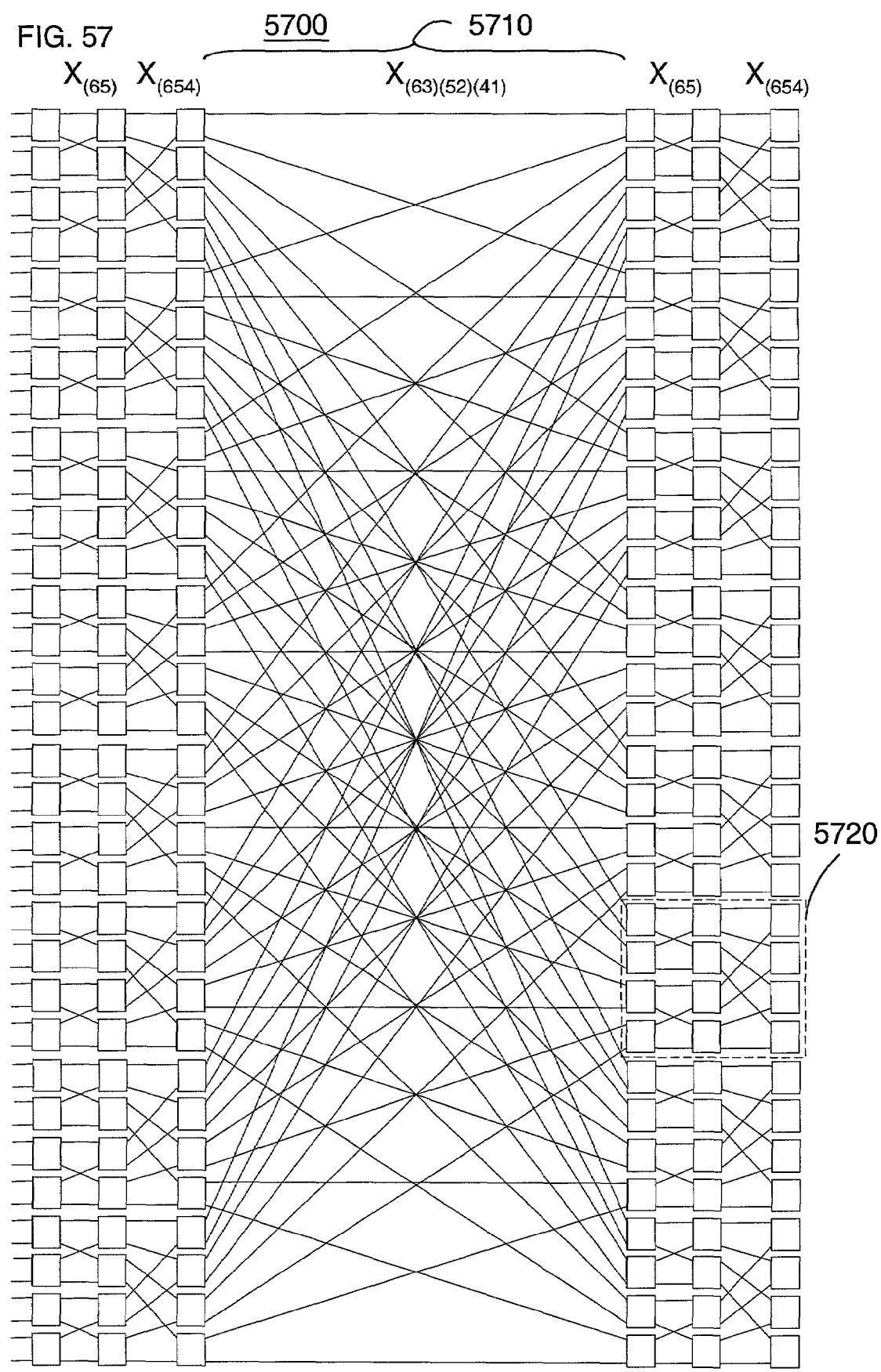
Figure 58:
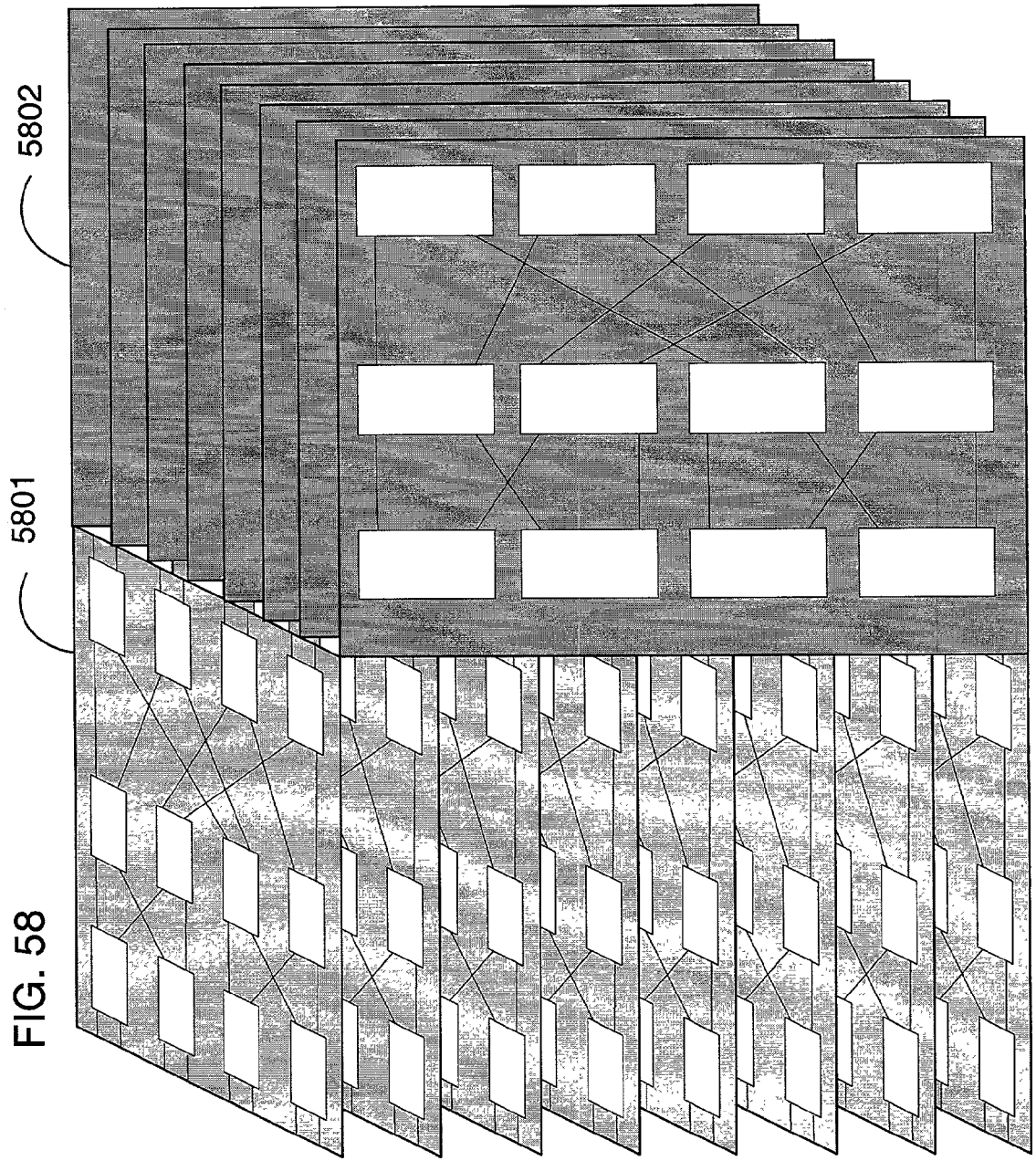
Figure 59:
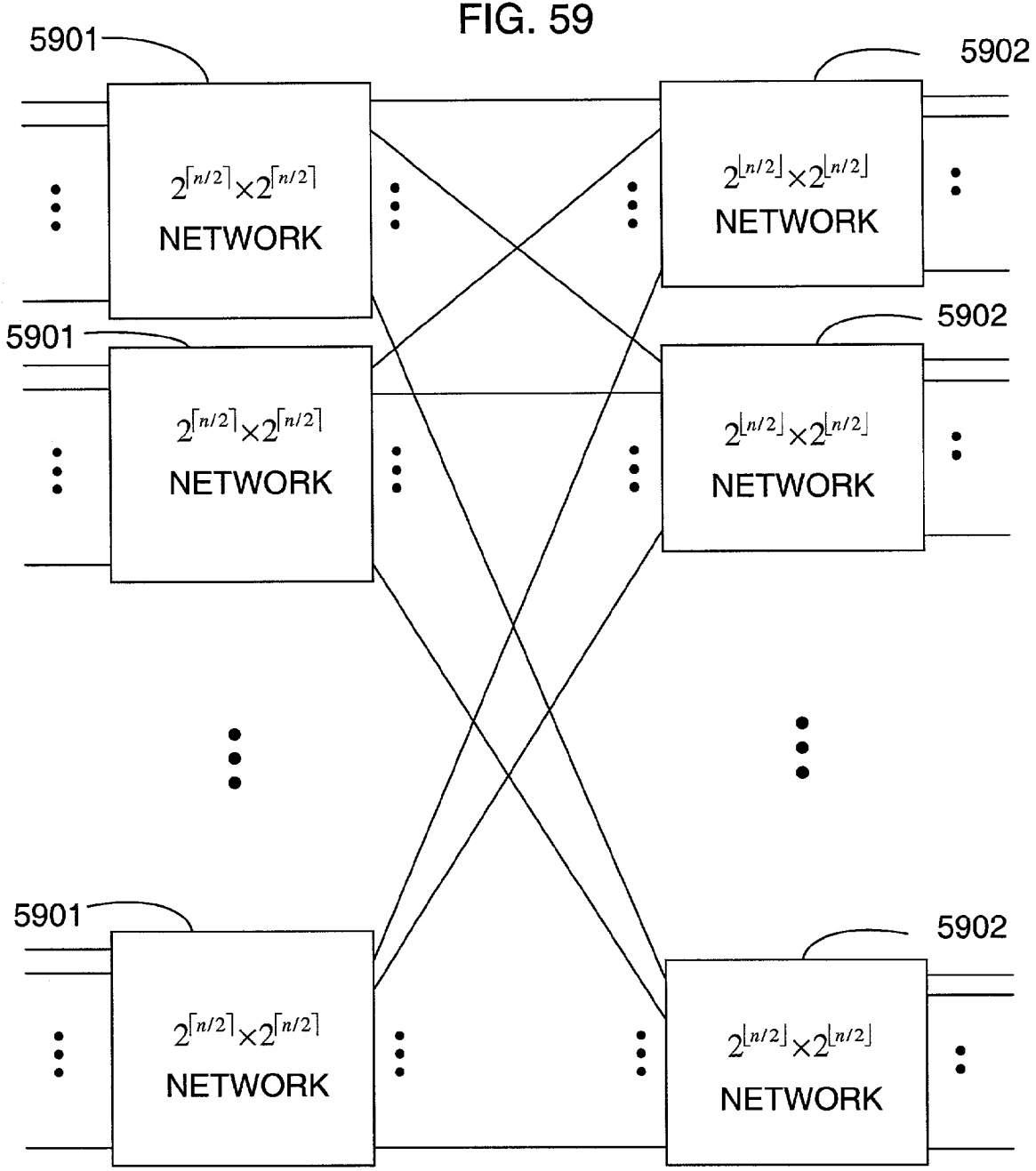
Figure 60:
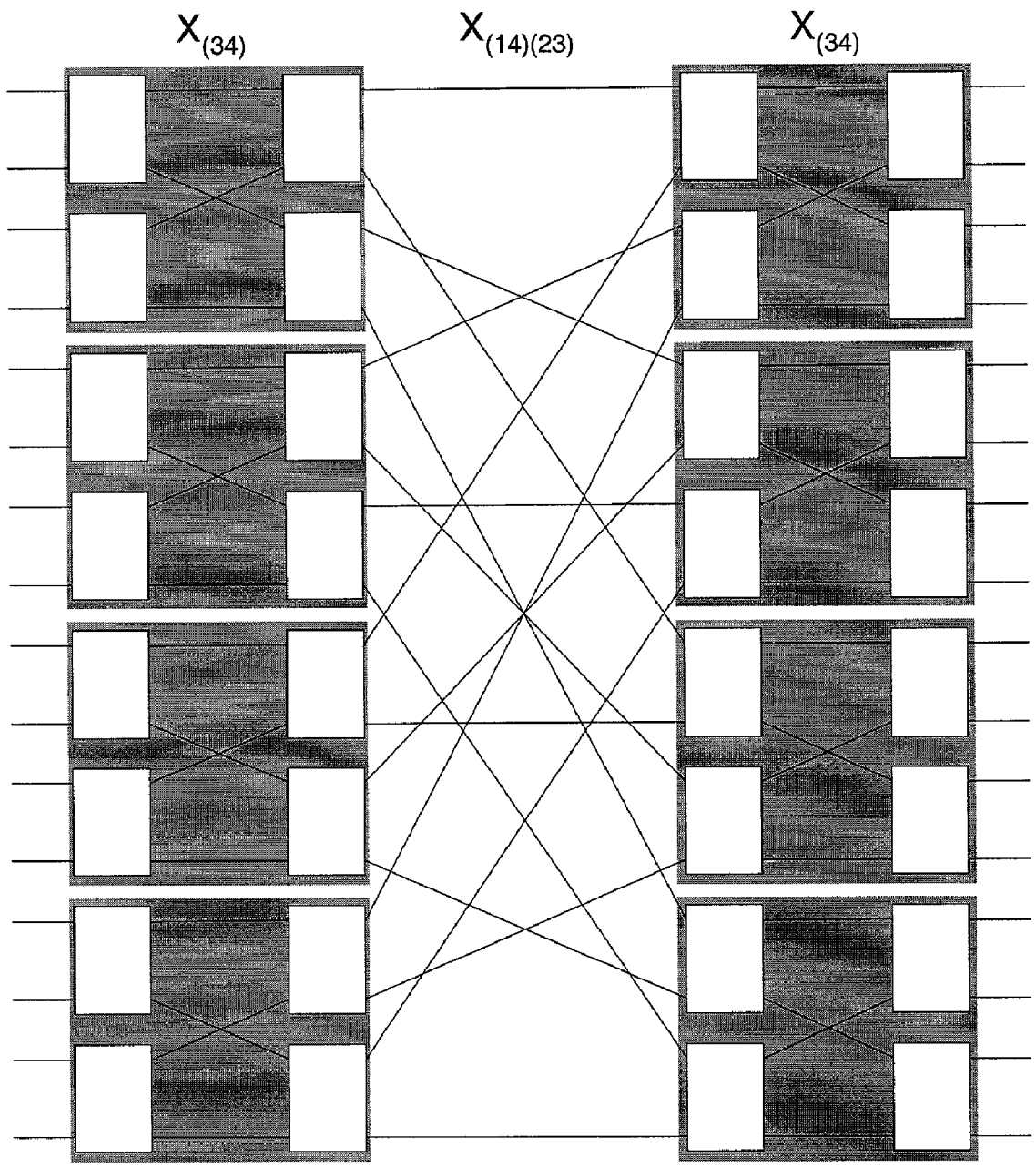
Figure 61:
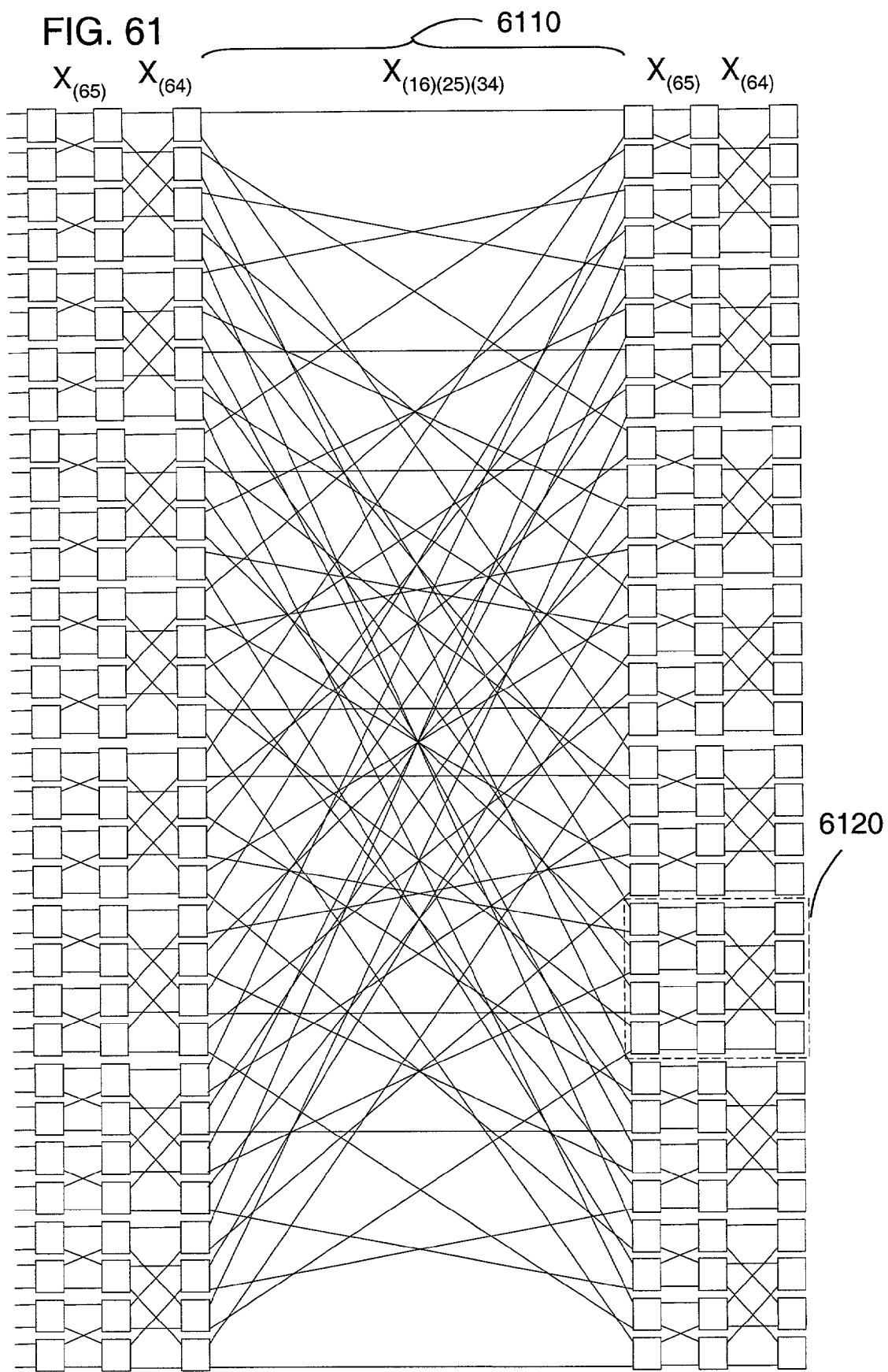
Figure 62A:
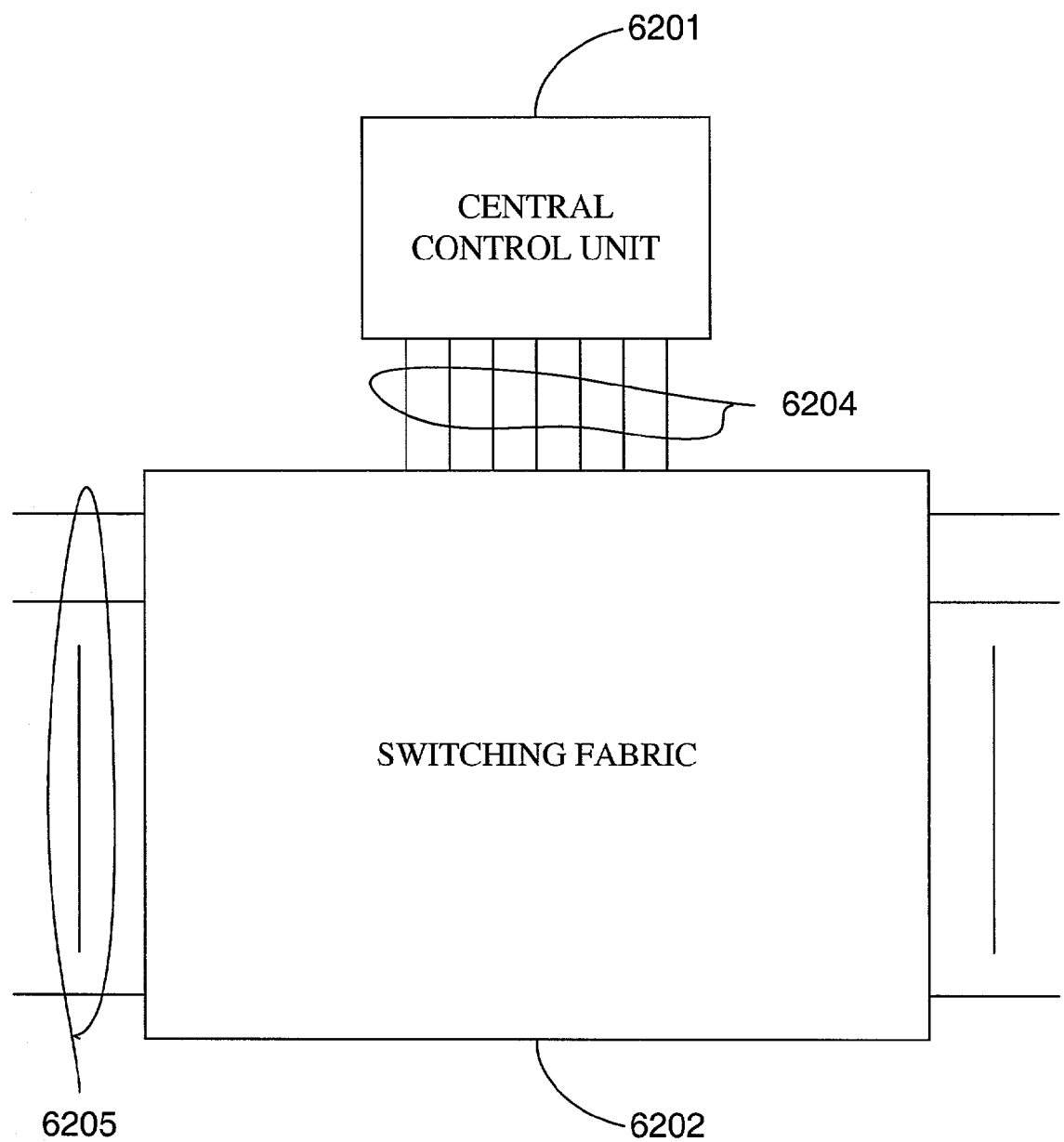
Figure 62B:
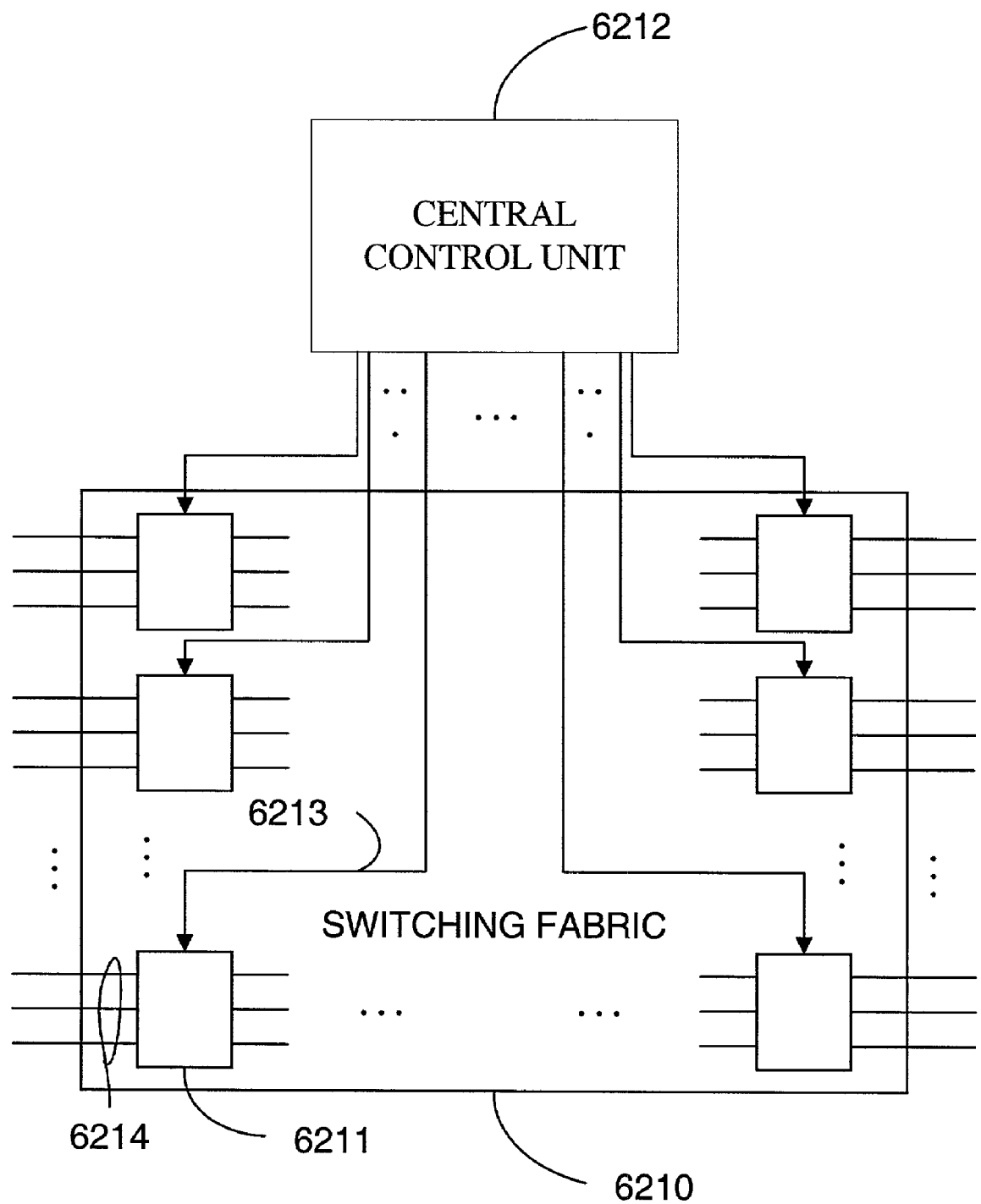
Figure 63A:
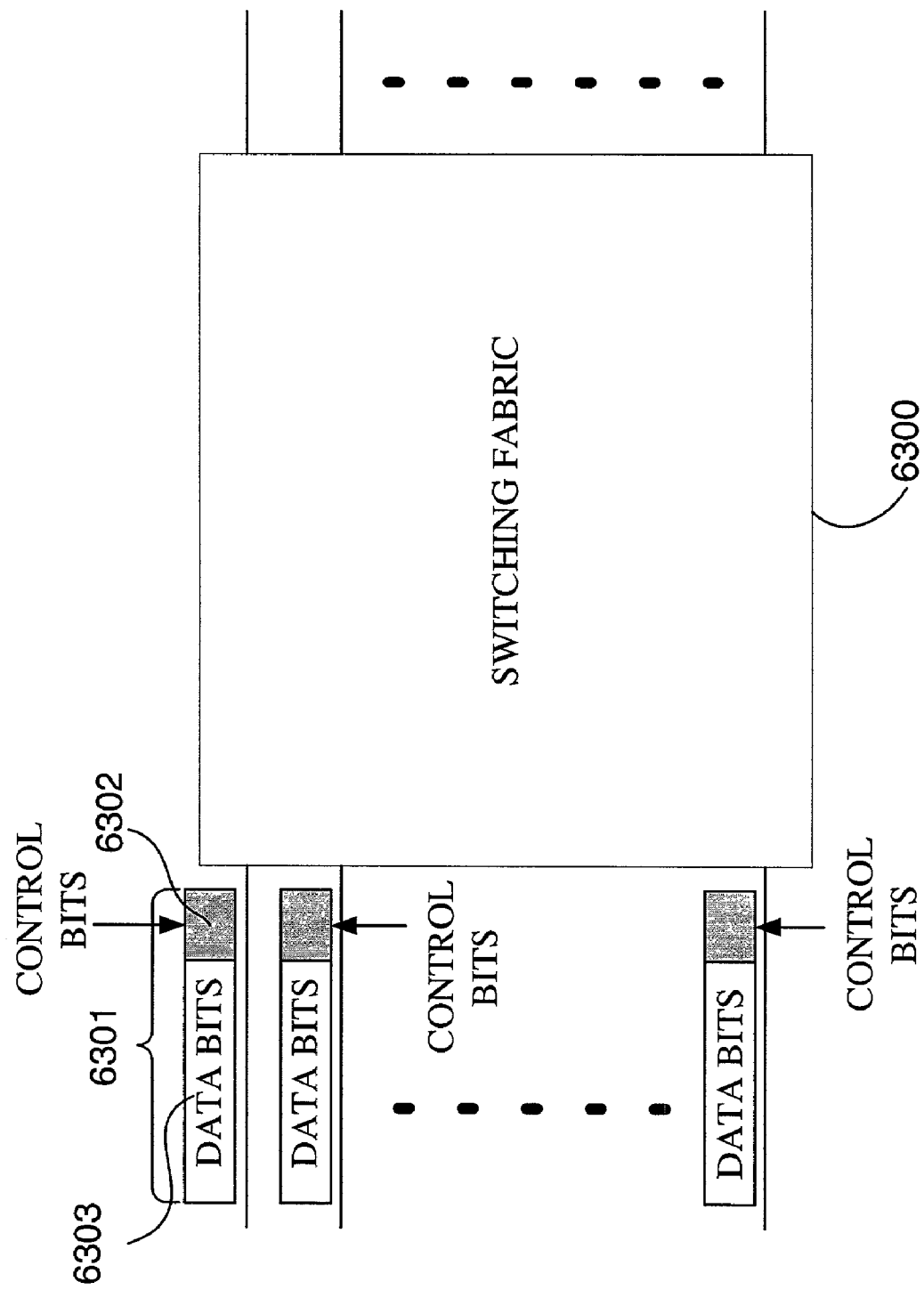
Figure 63B:
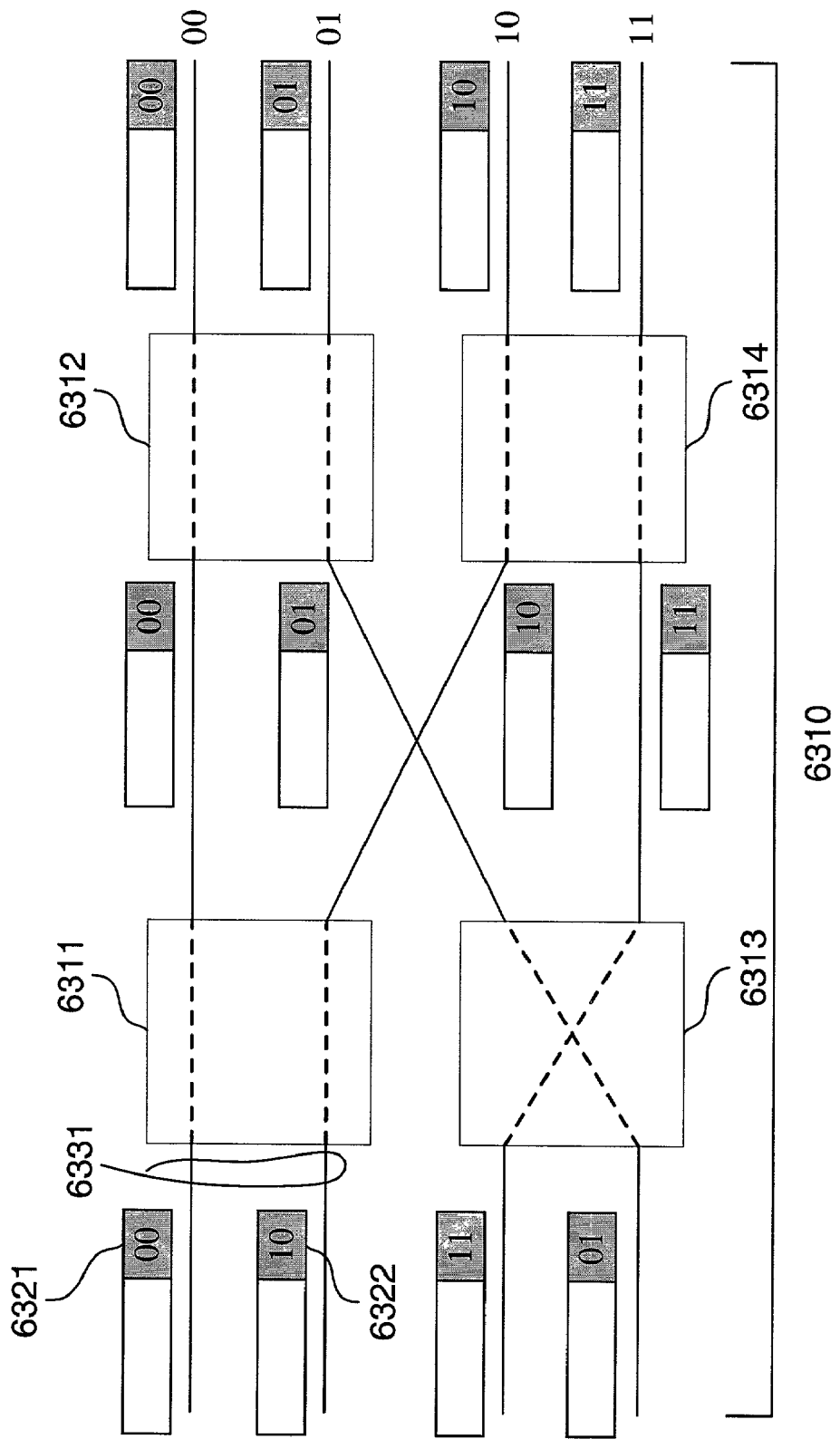
Figures 64A, 64B:
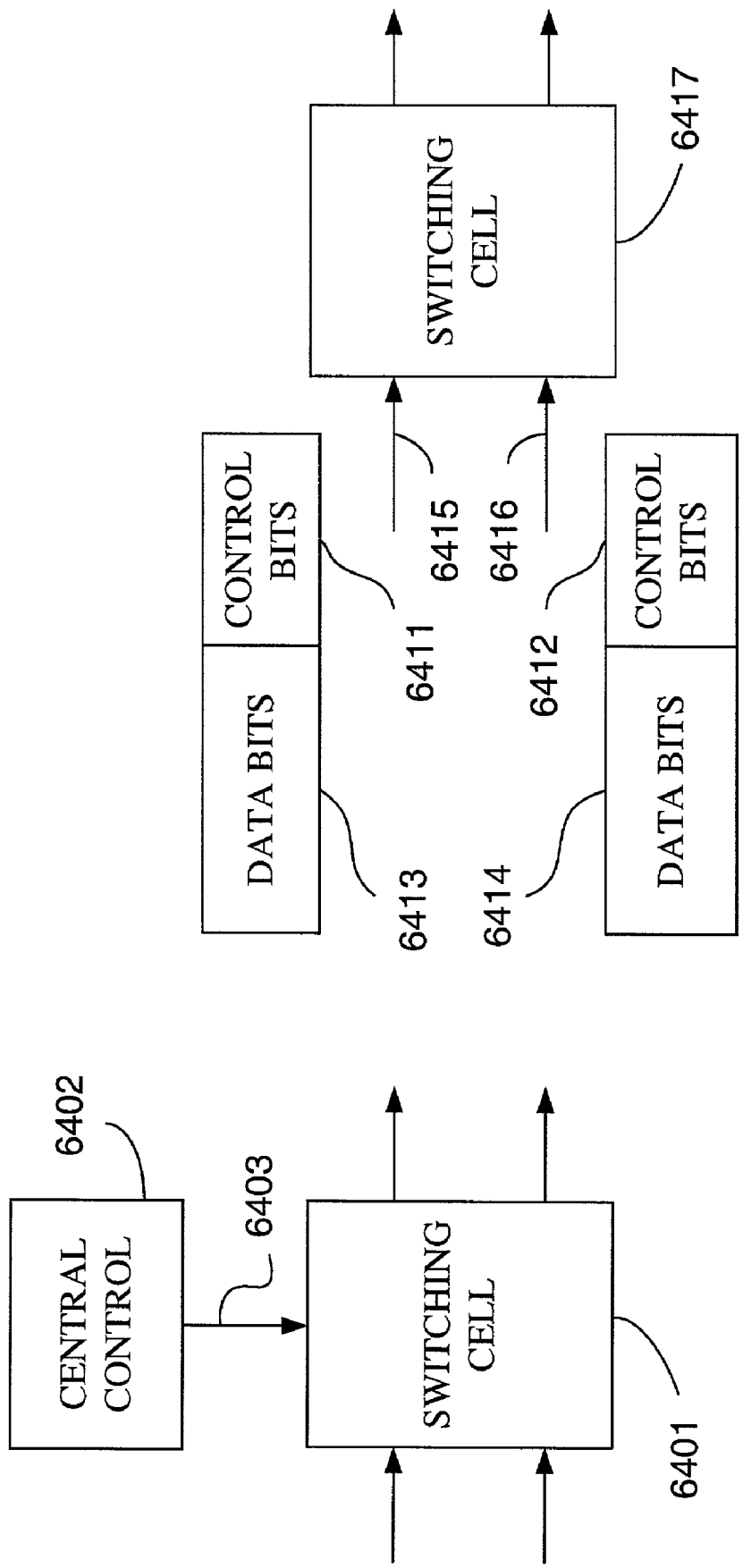
Figure 65A:
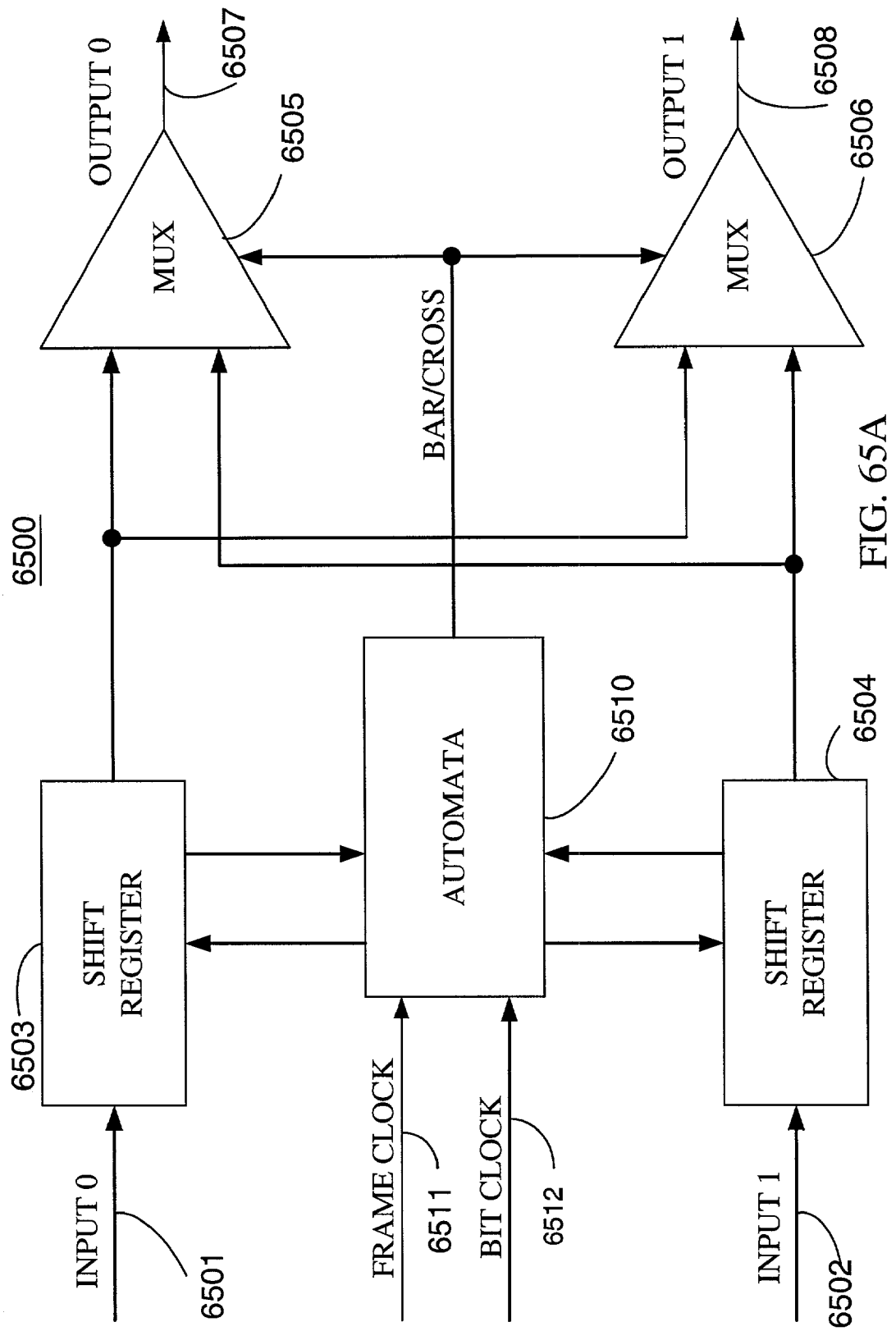
Figure 65B:
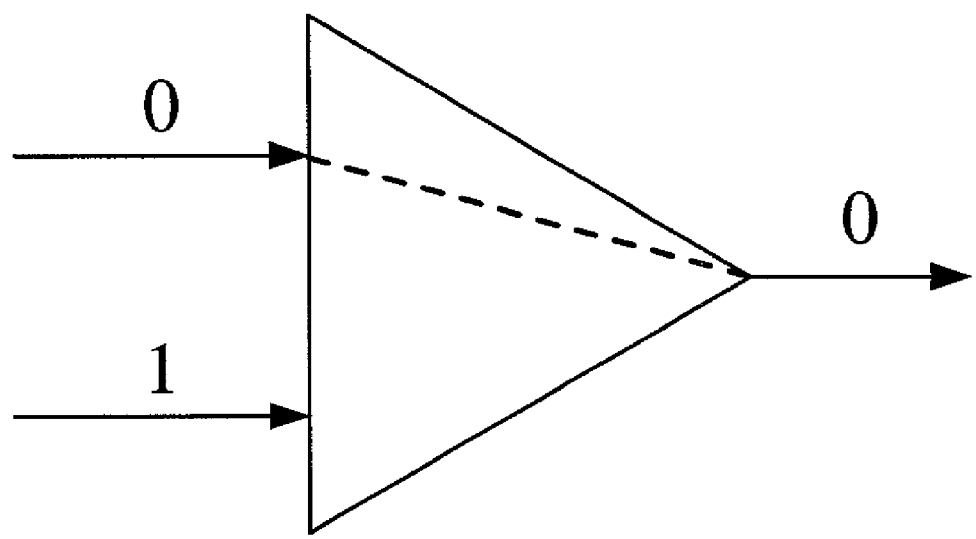
Figure 65C:
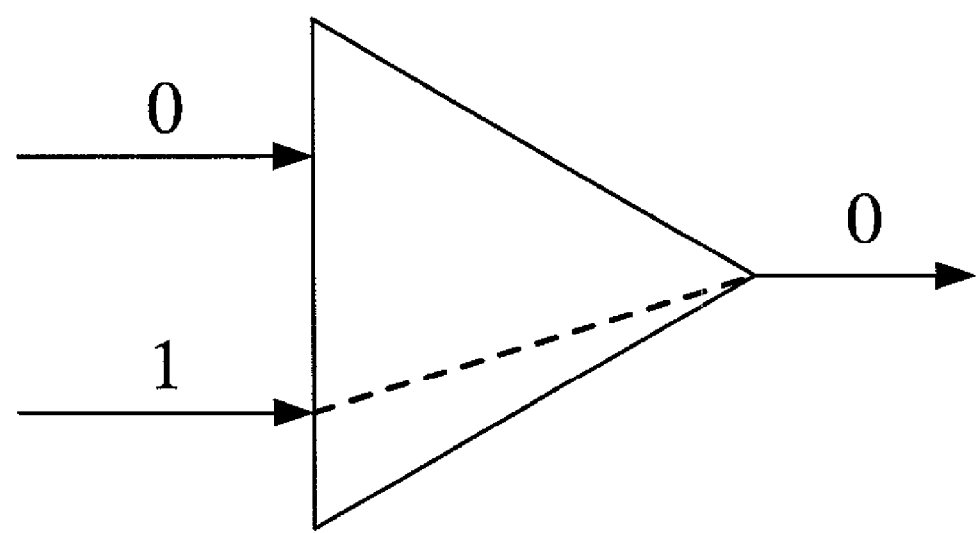
Figure 65D:
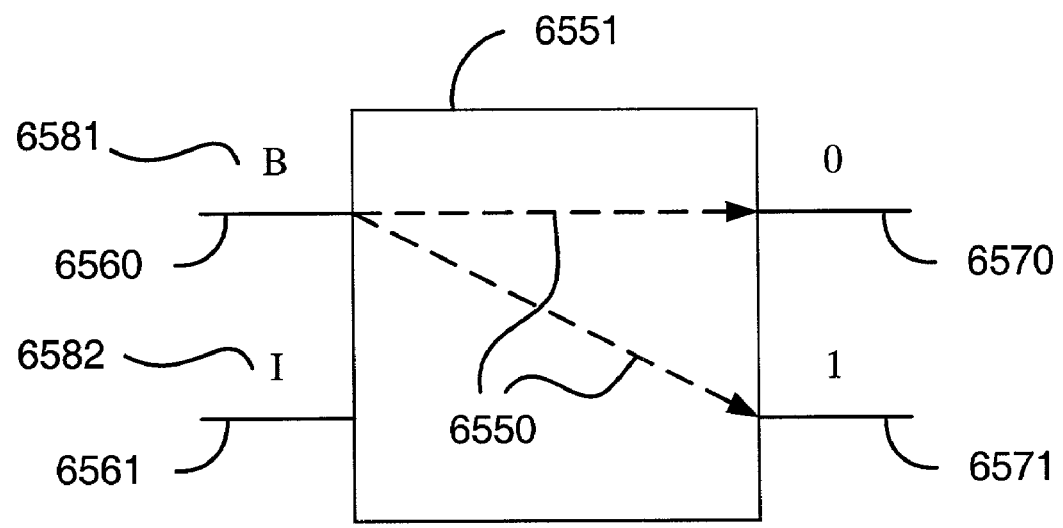
Figure 65E:
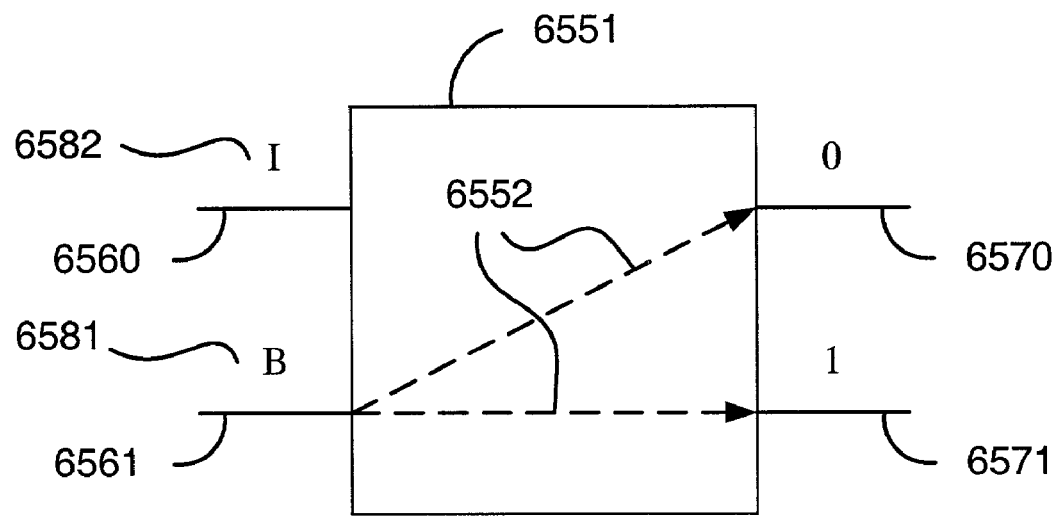
Figure 66A:
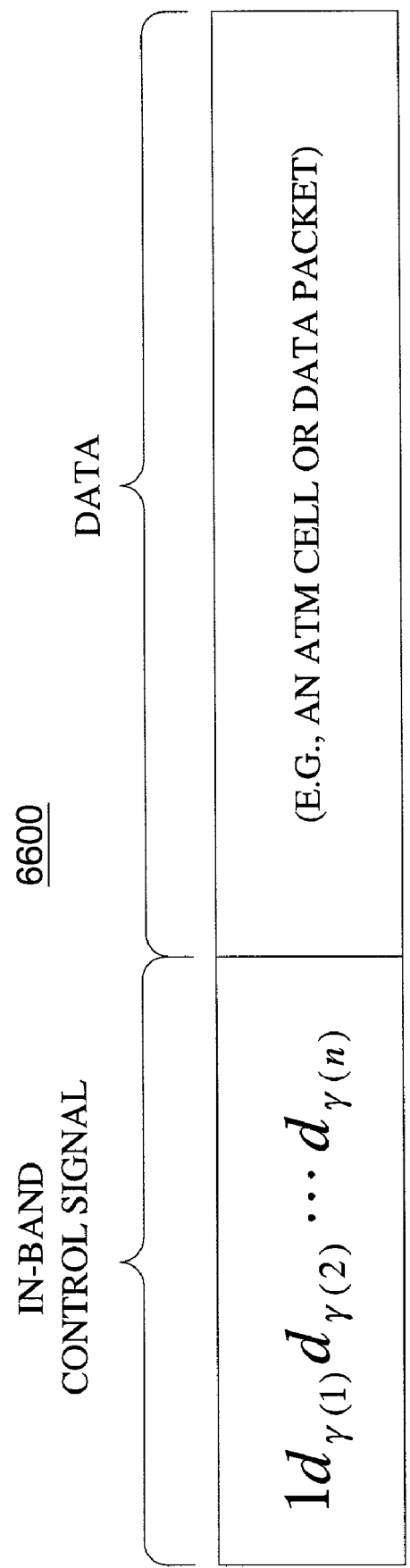
Figure 66B:
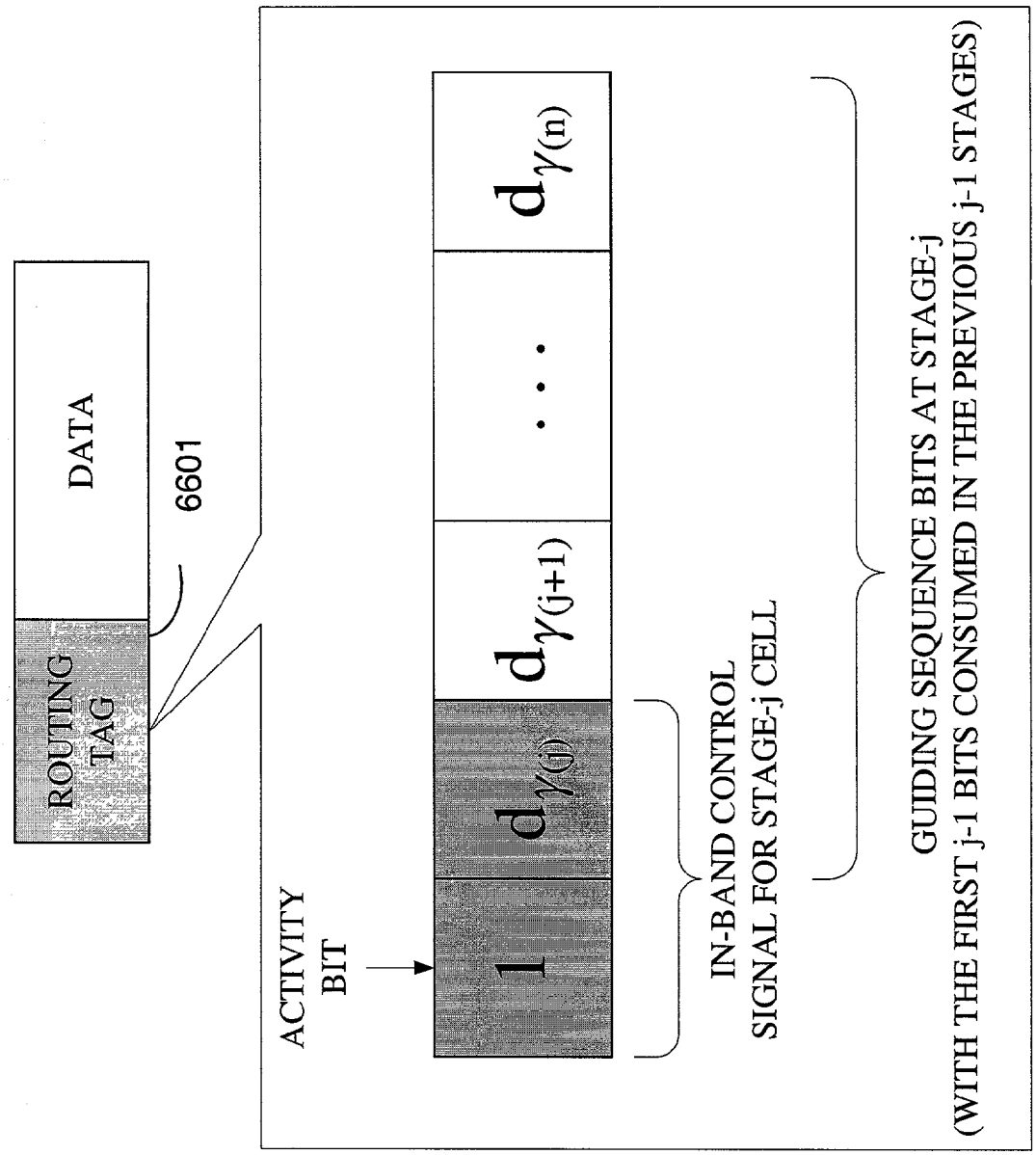
Figure 66C:
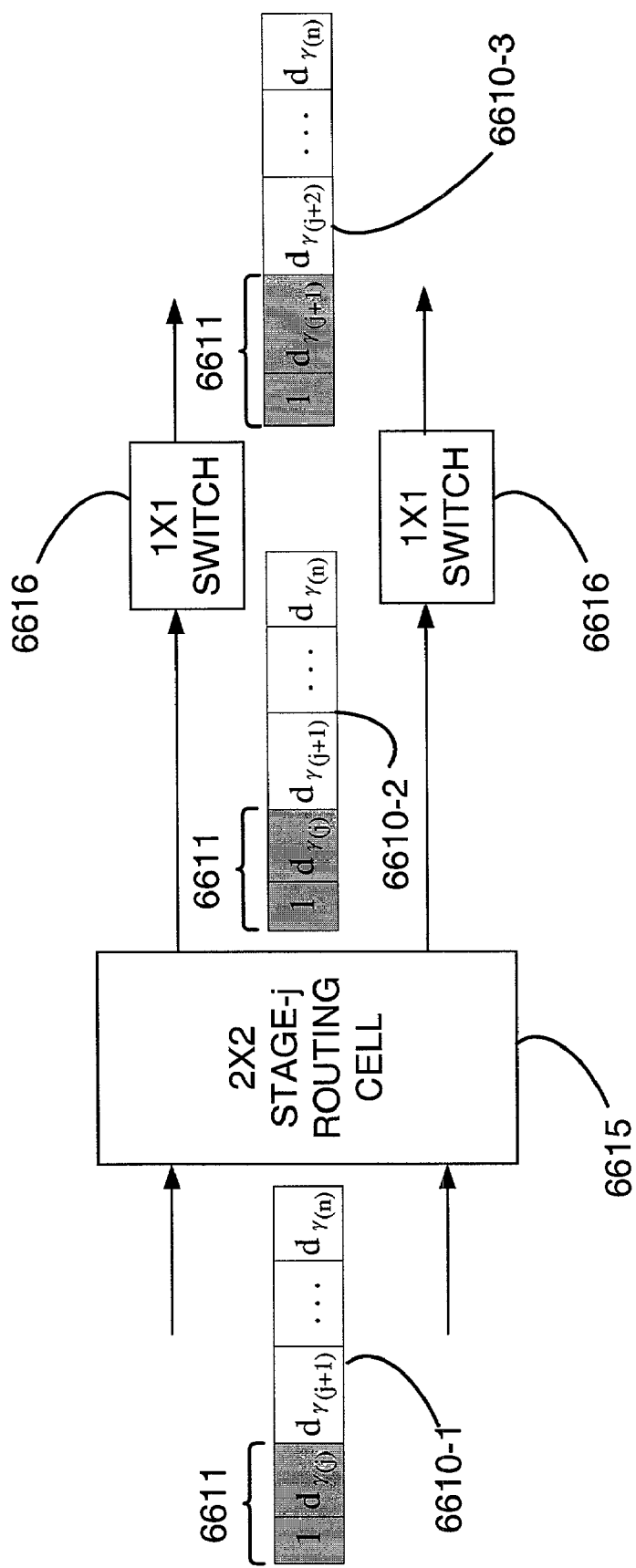
Figure 66D:
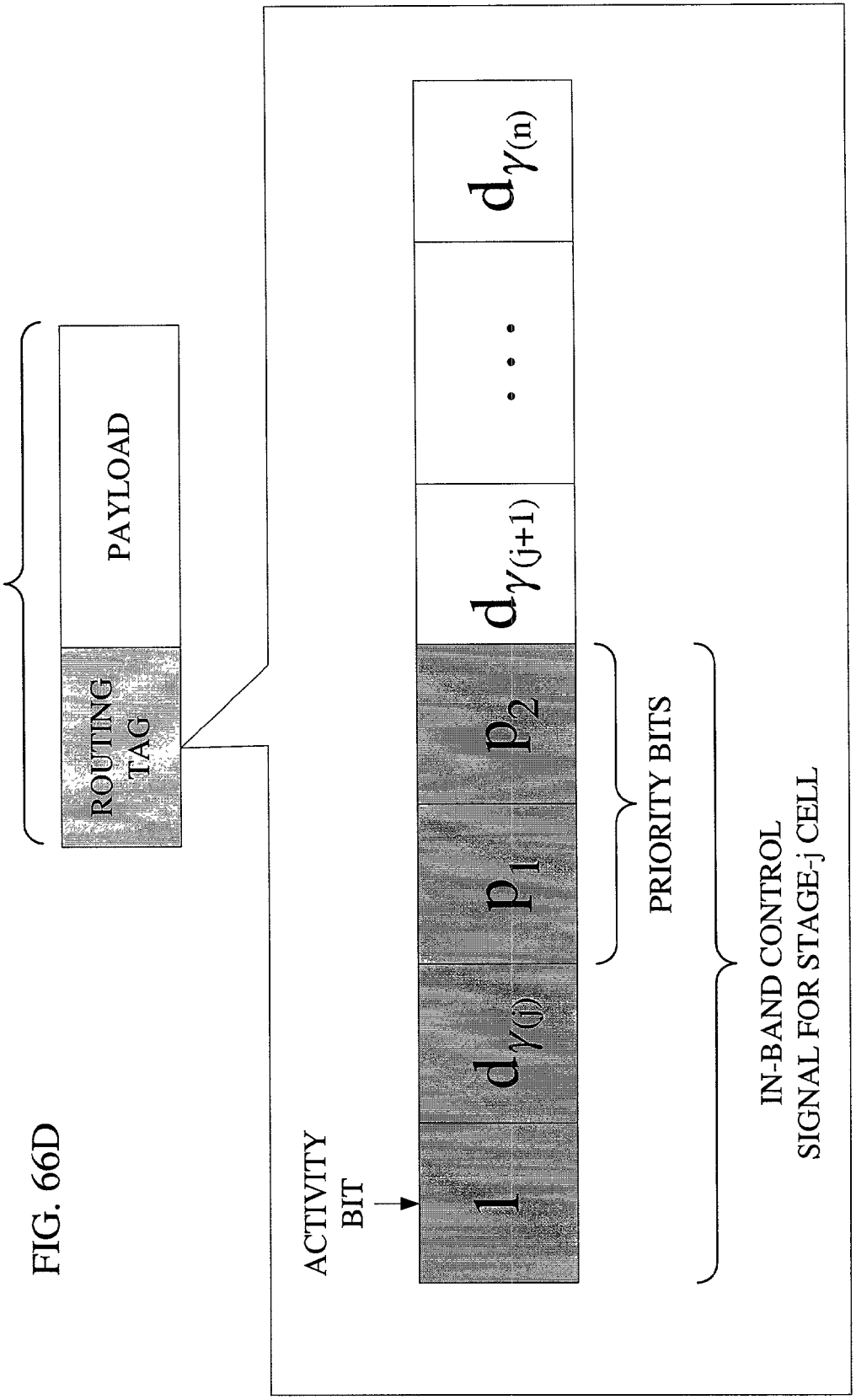
Figure 68:
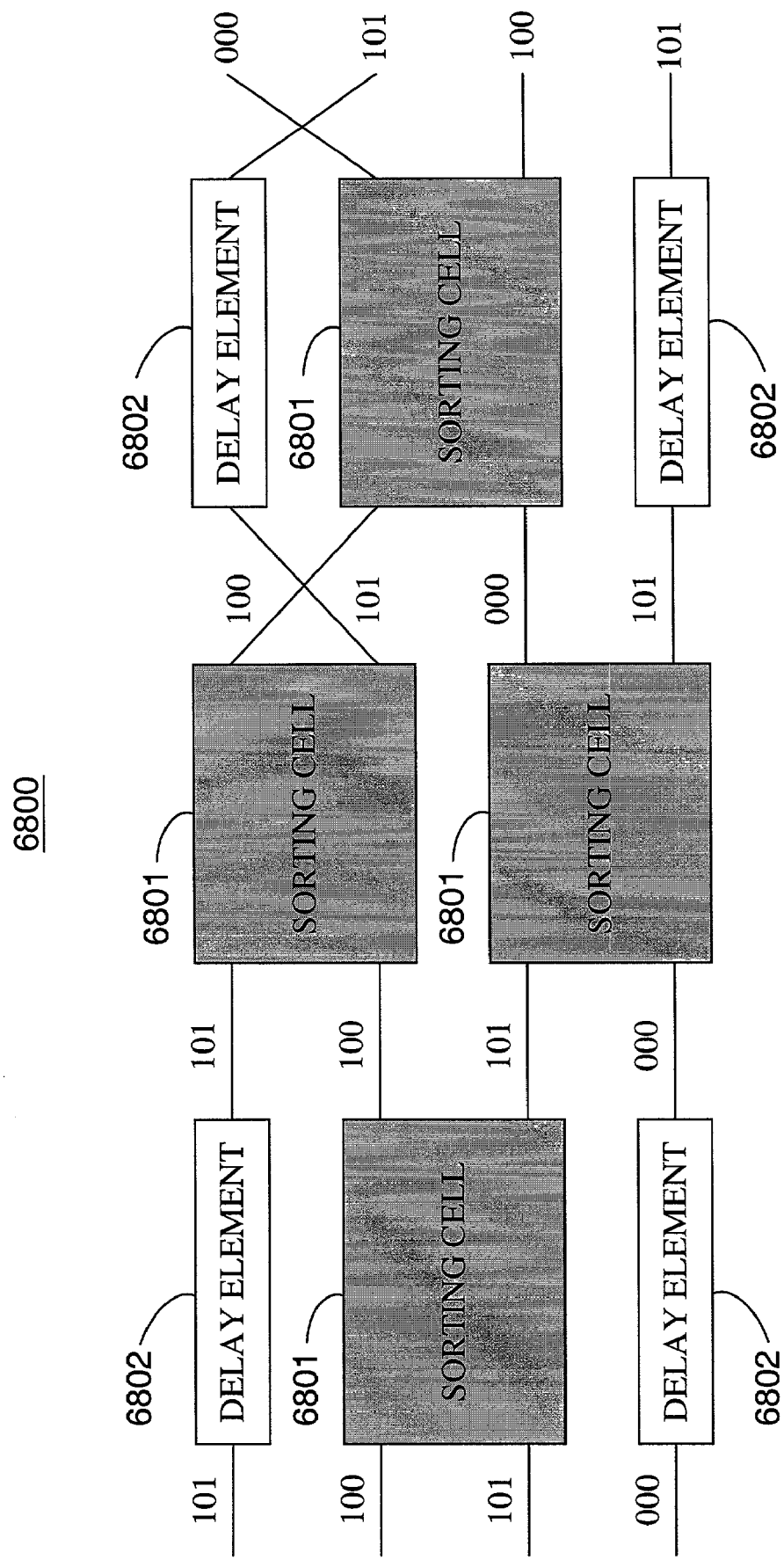
Figure 69:
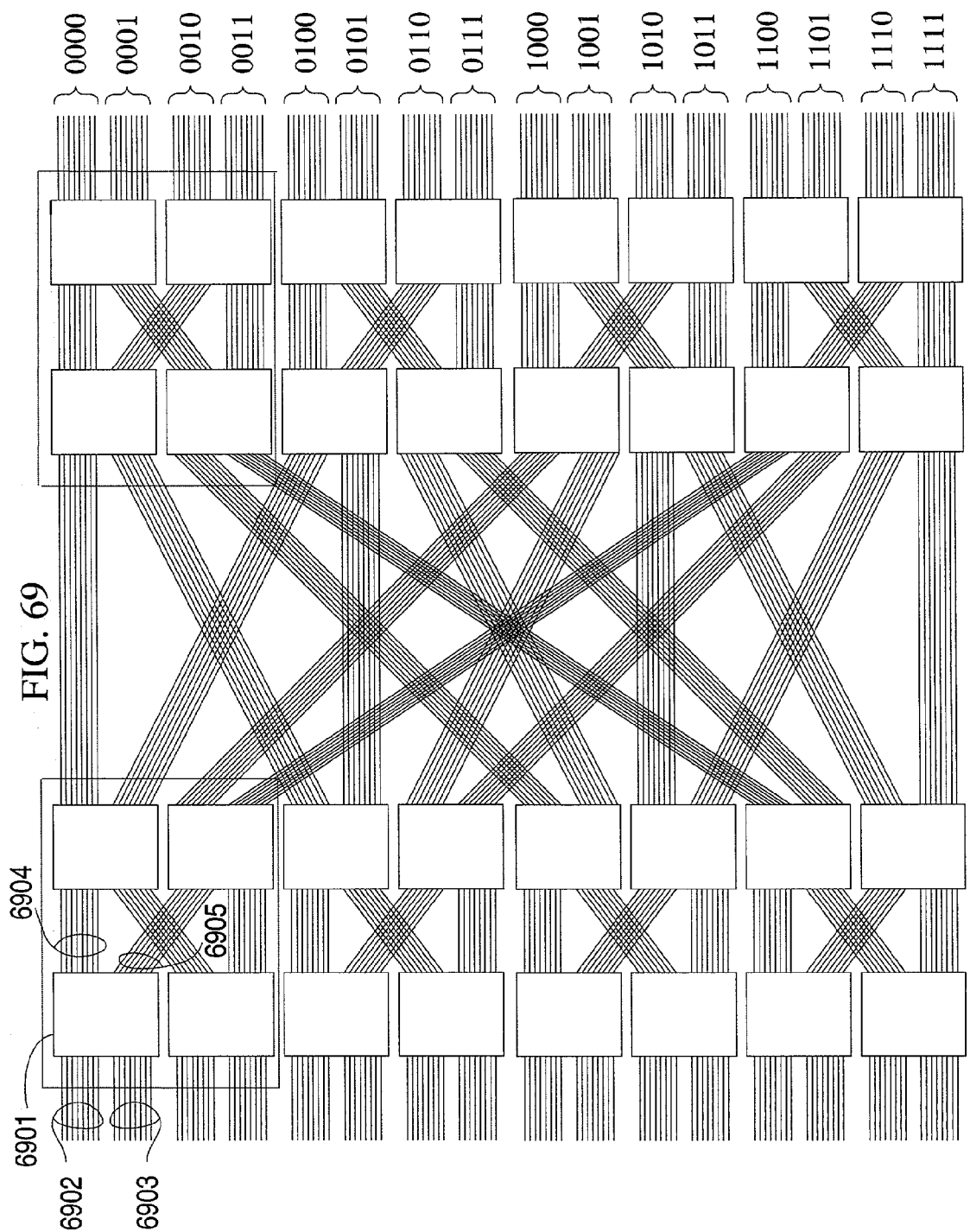
Figure 70A:
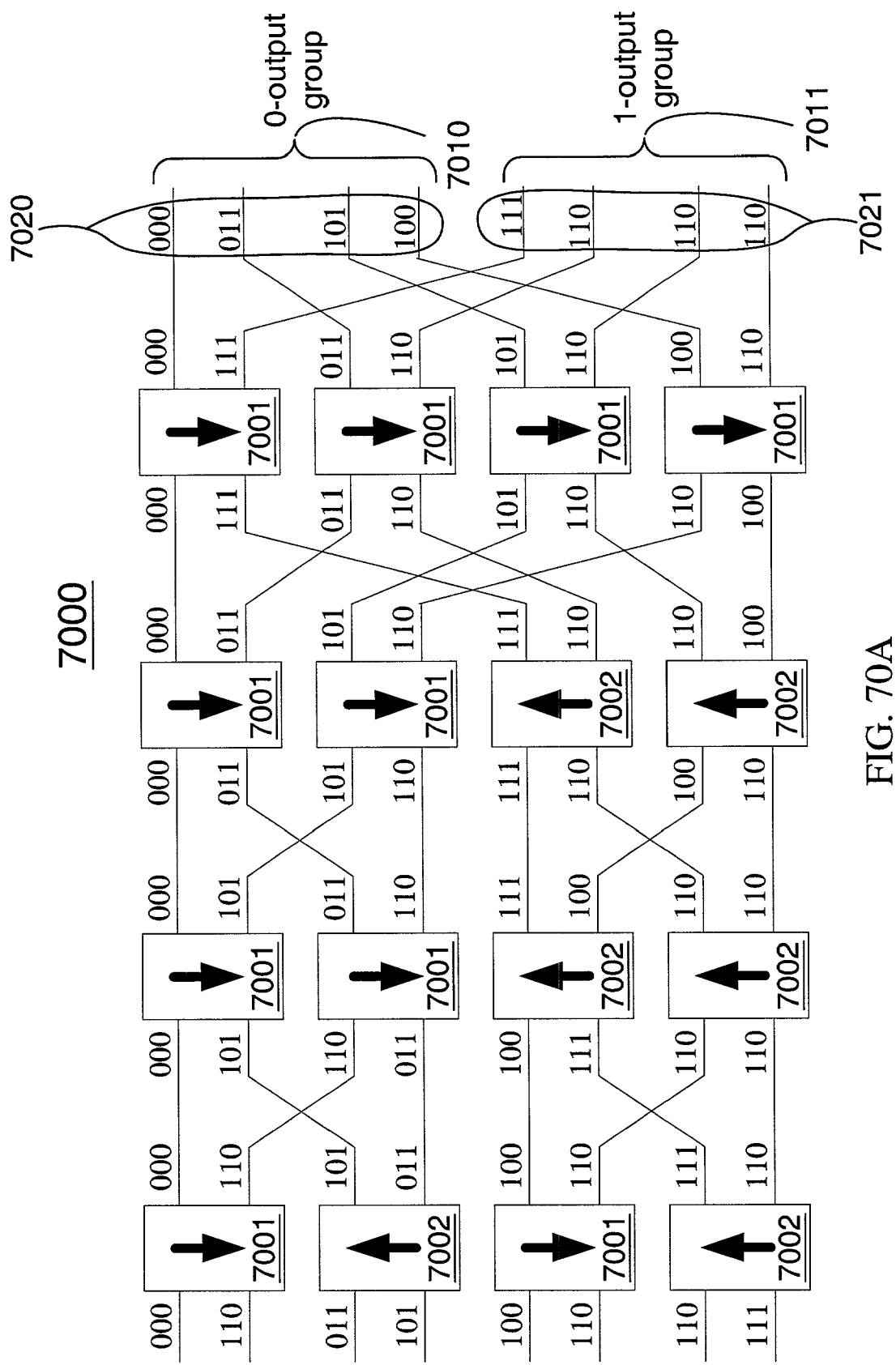
Figure 70B:
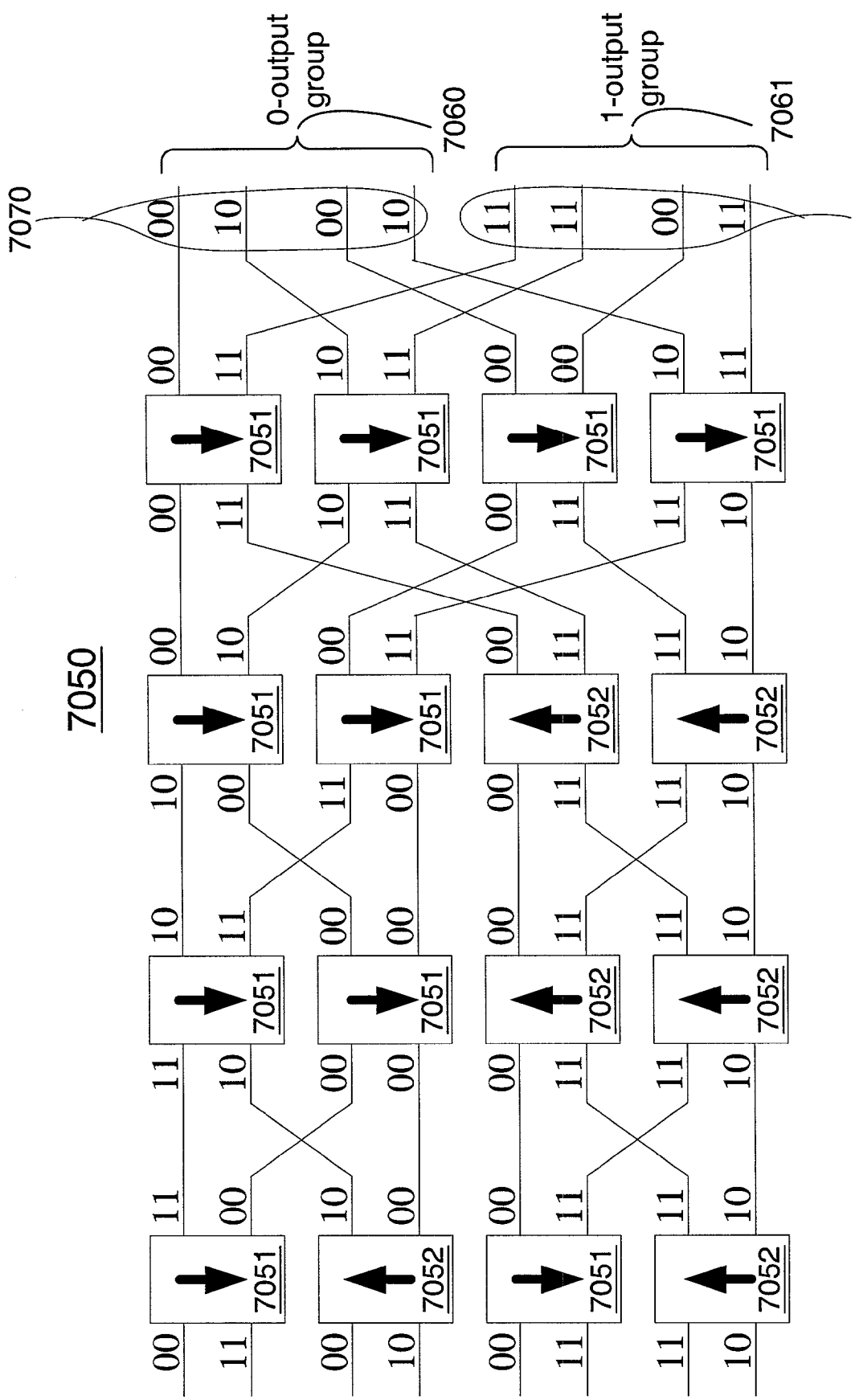
Figure 71A:
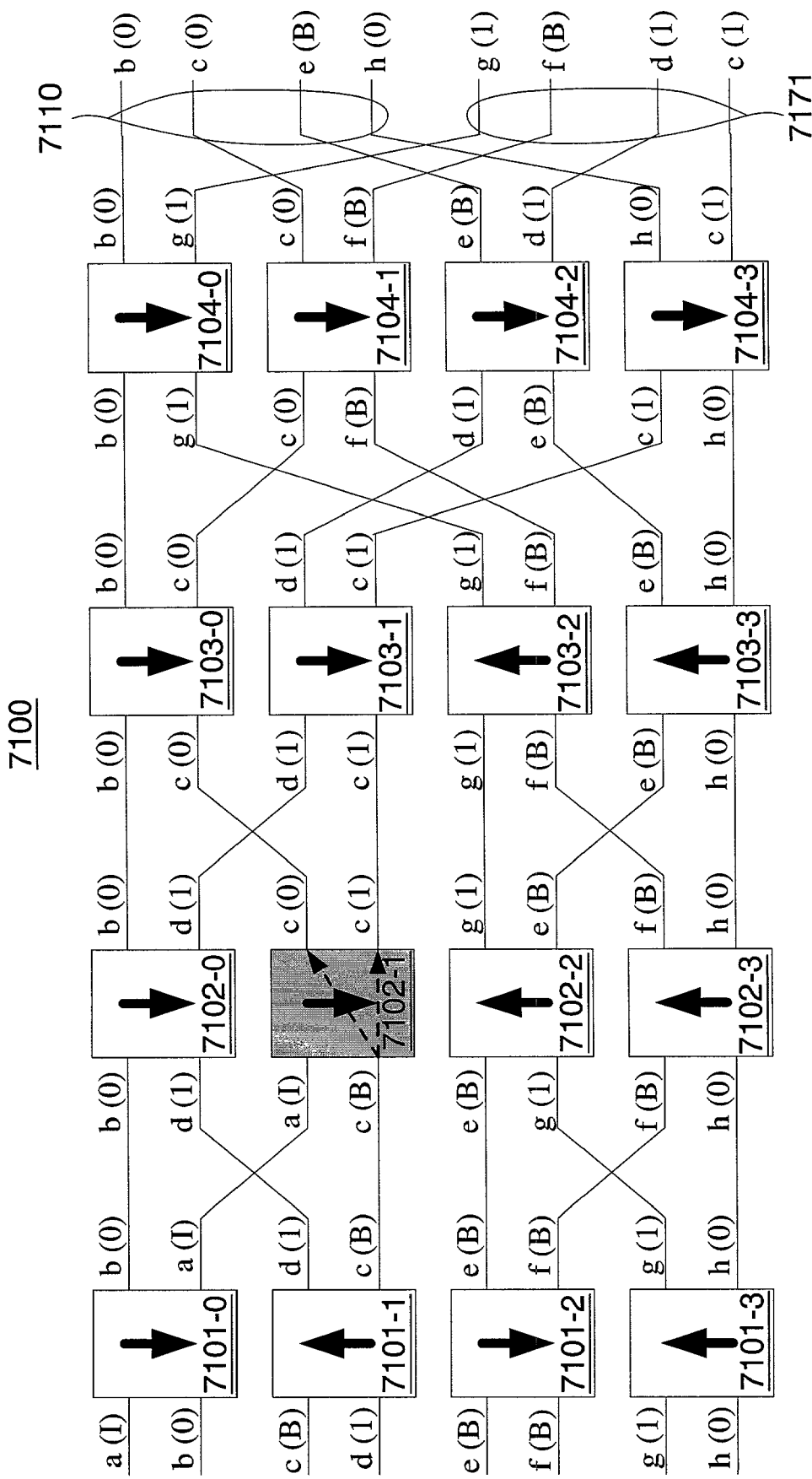
Figure 71B:
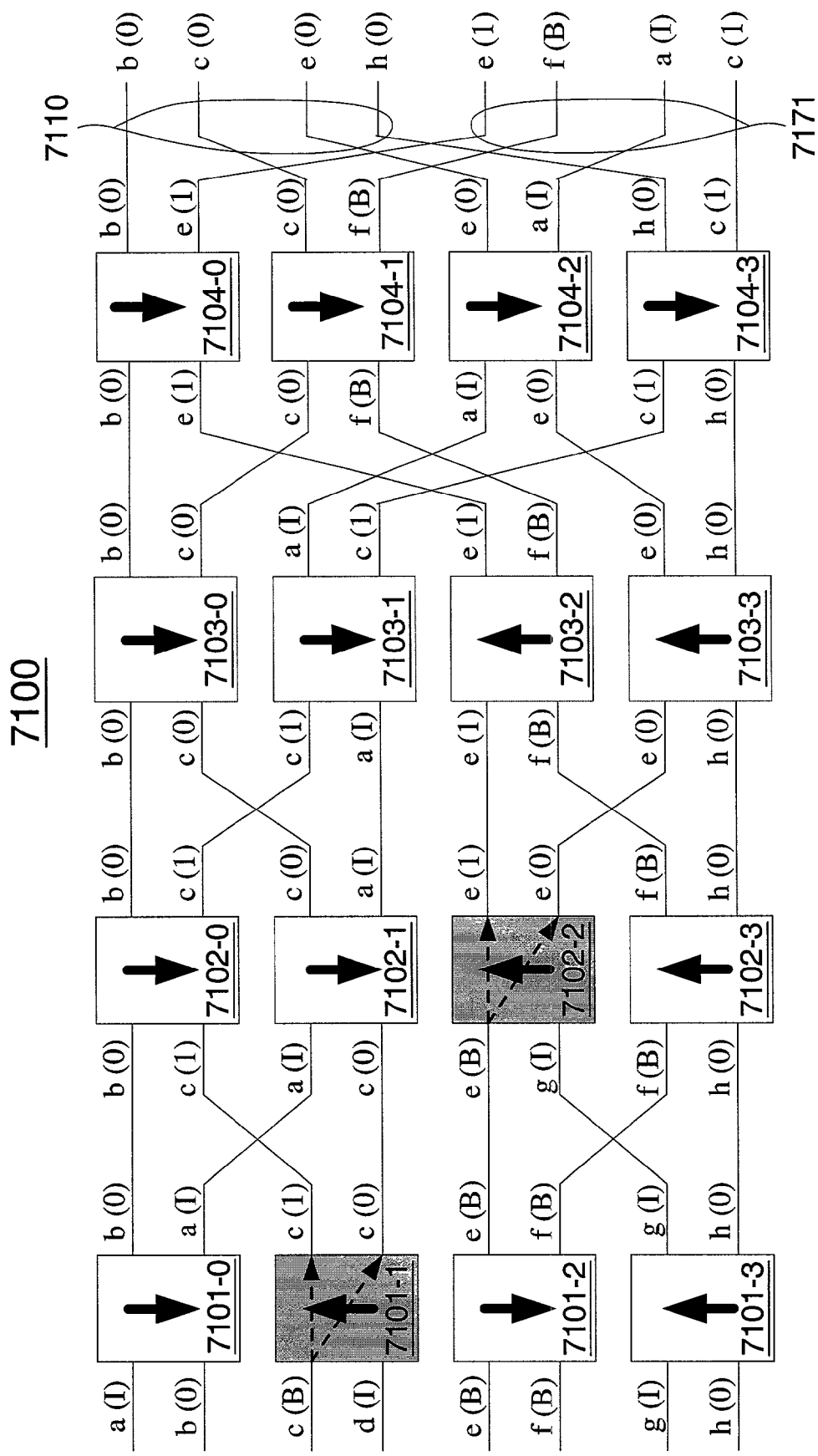
Figure 72A:
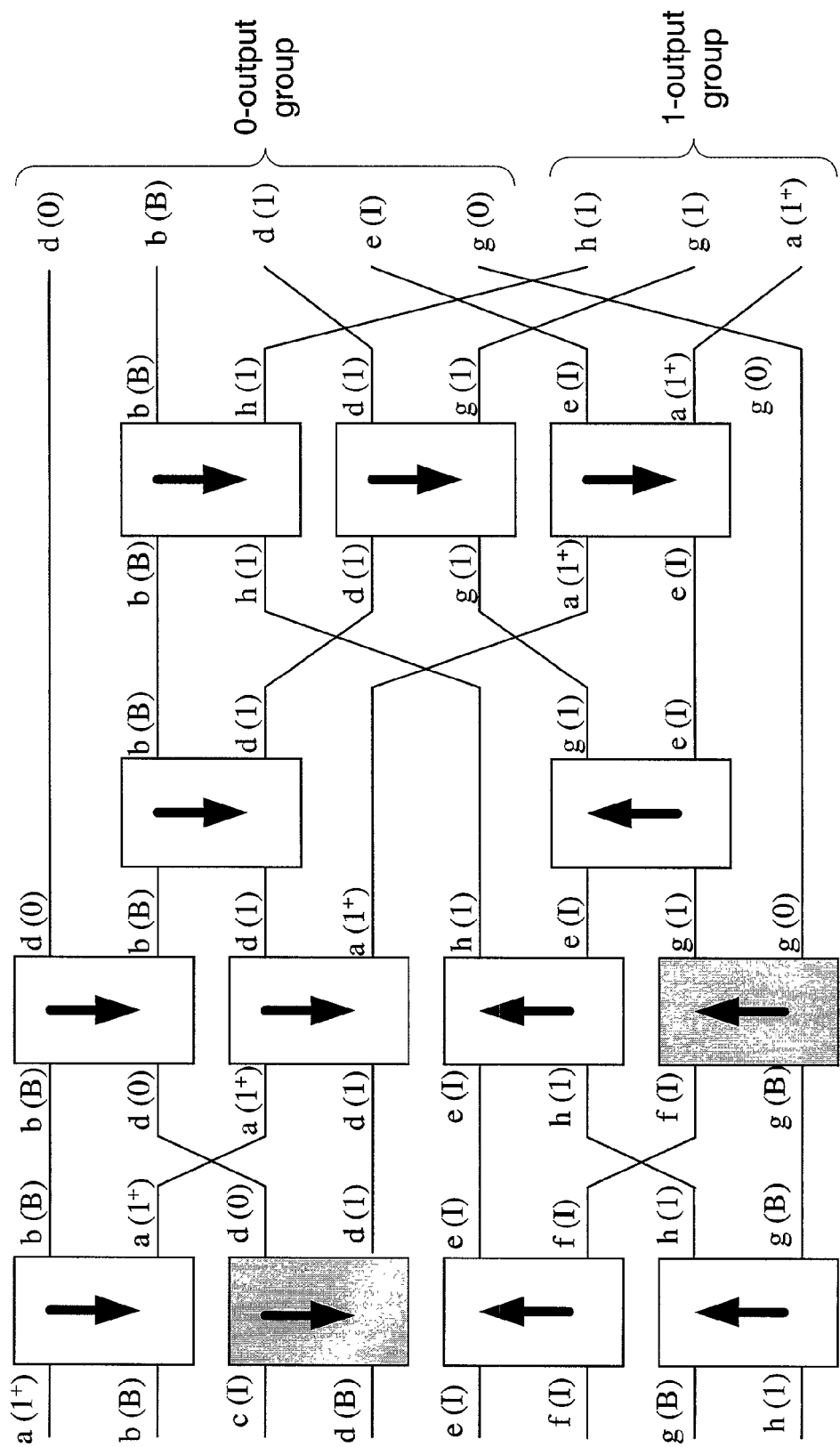
Figure 73A:
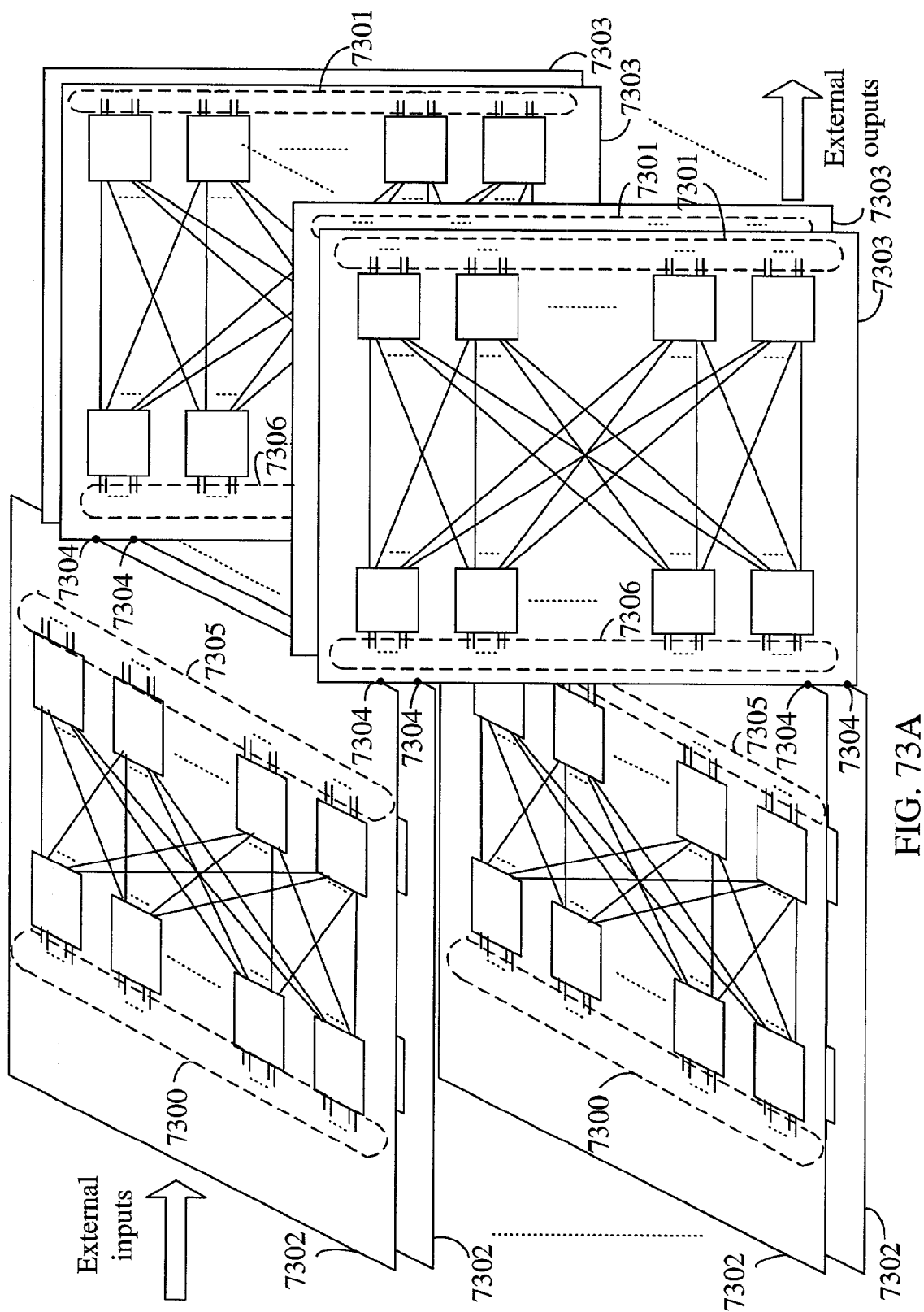
Figure 73B:
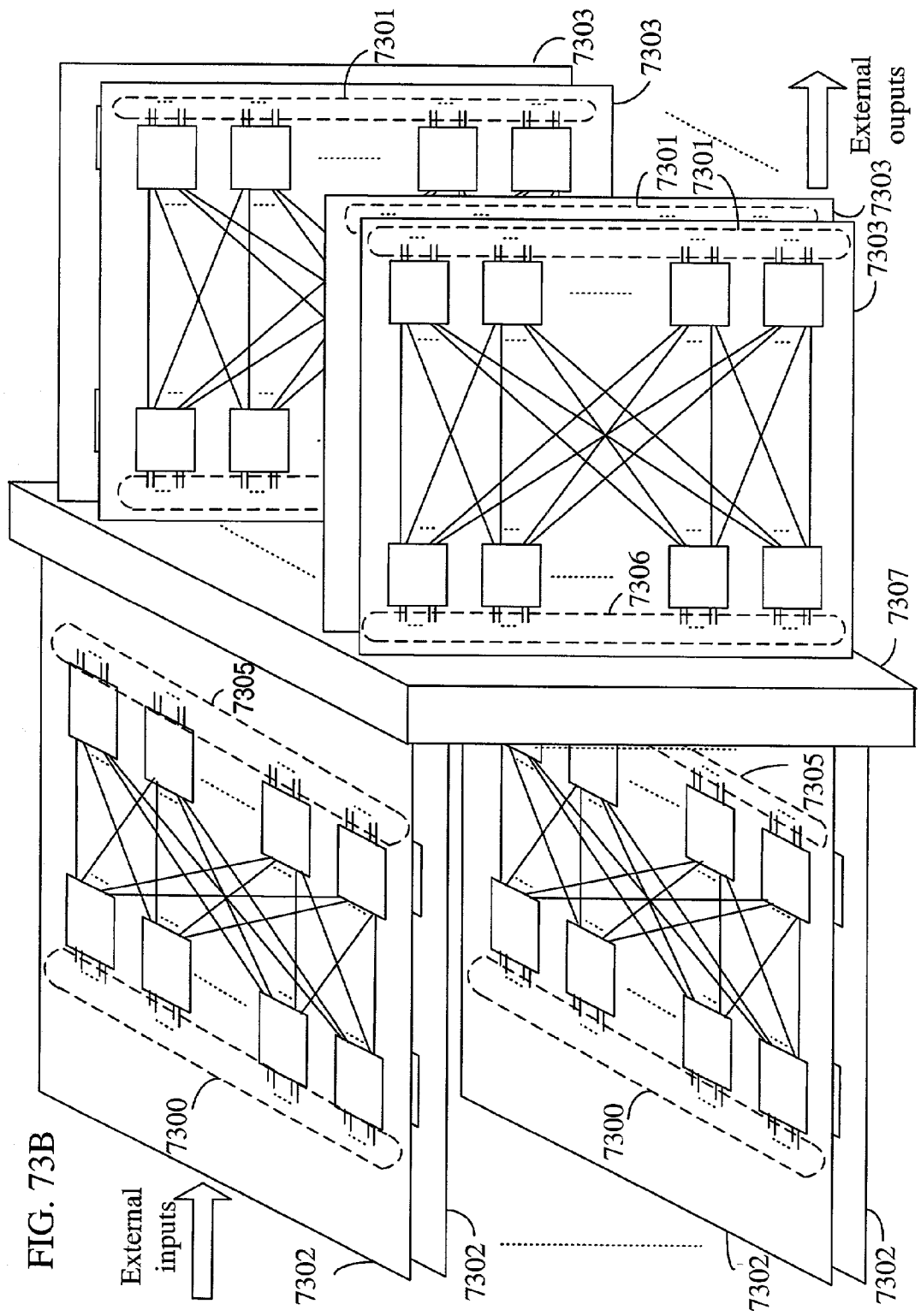
Figure 74:
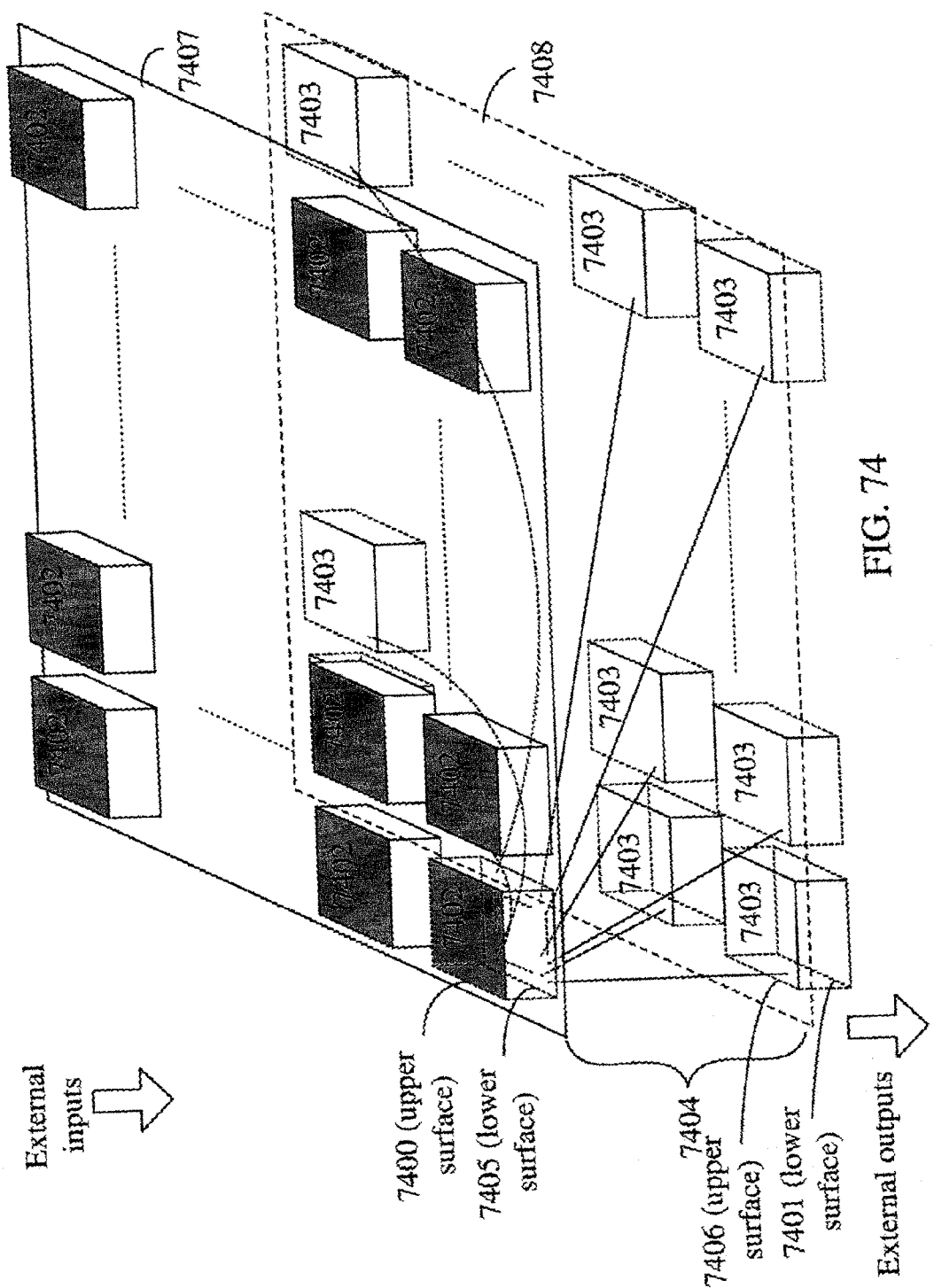
Figure 75A:
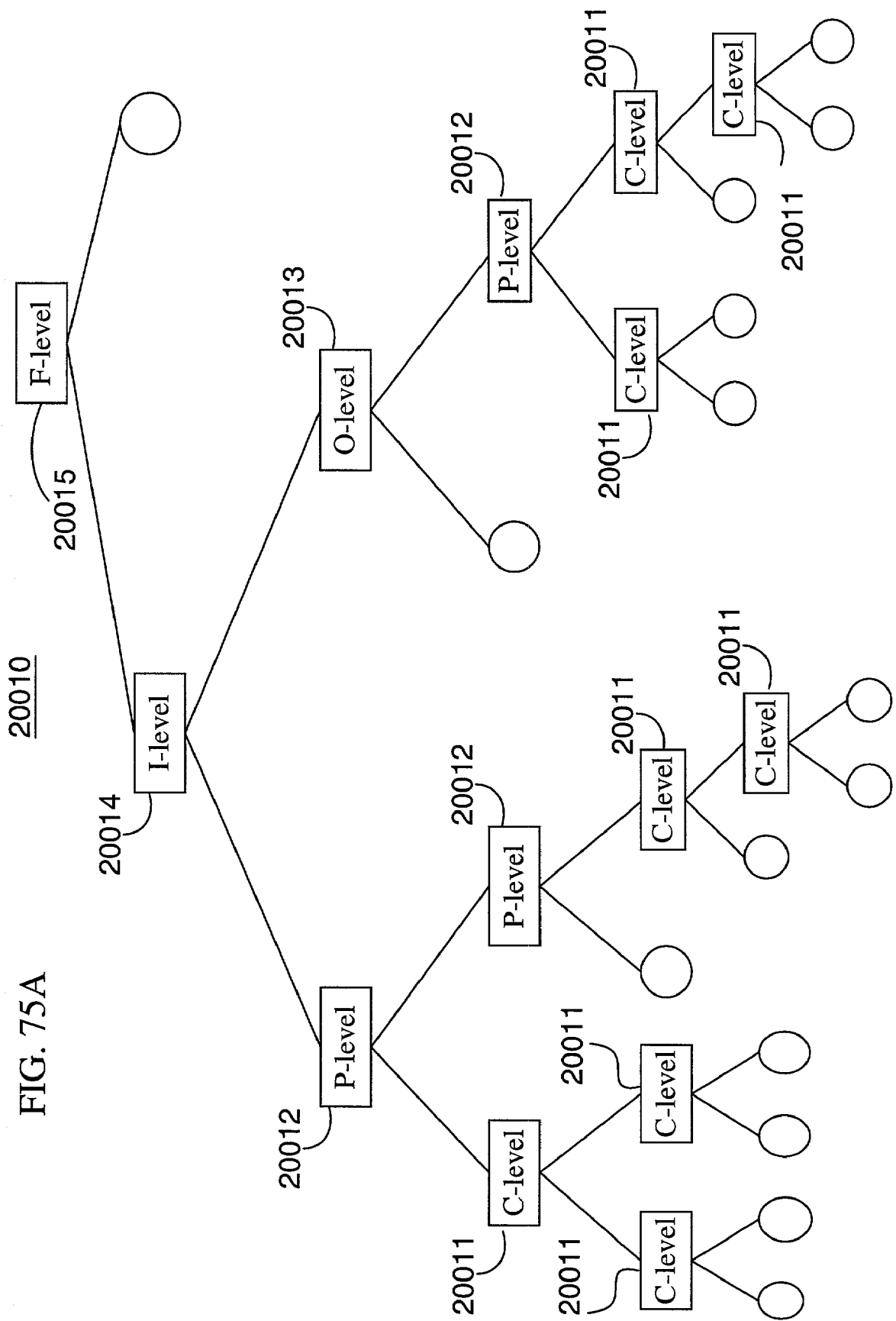
Figure 75B:
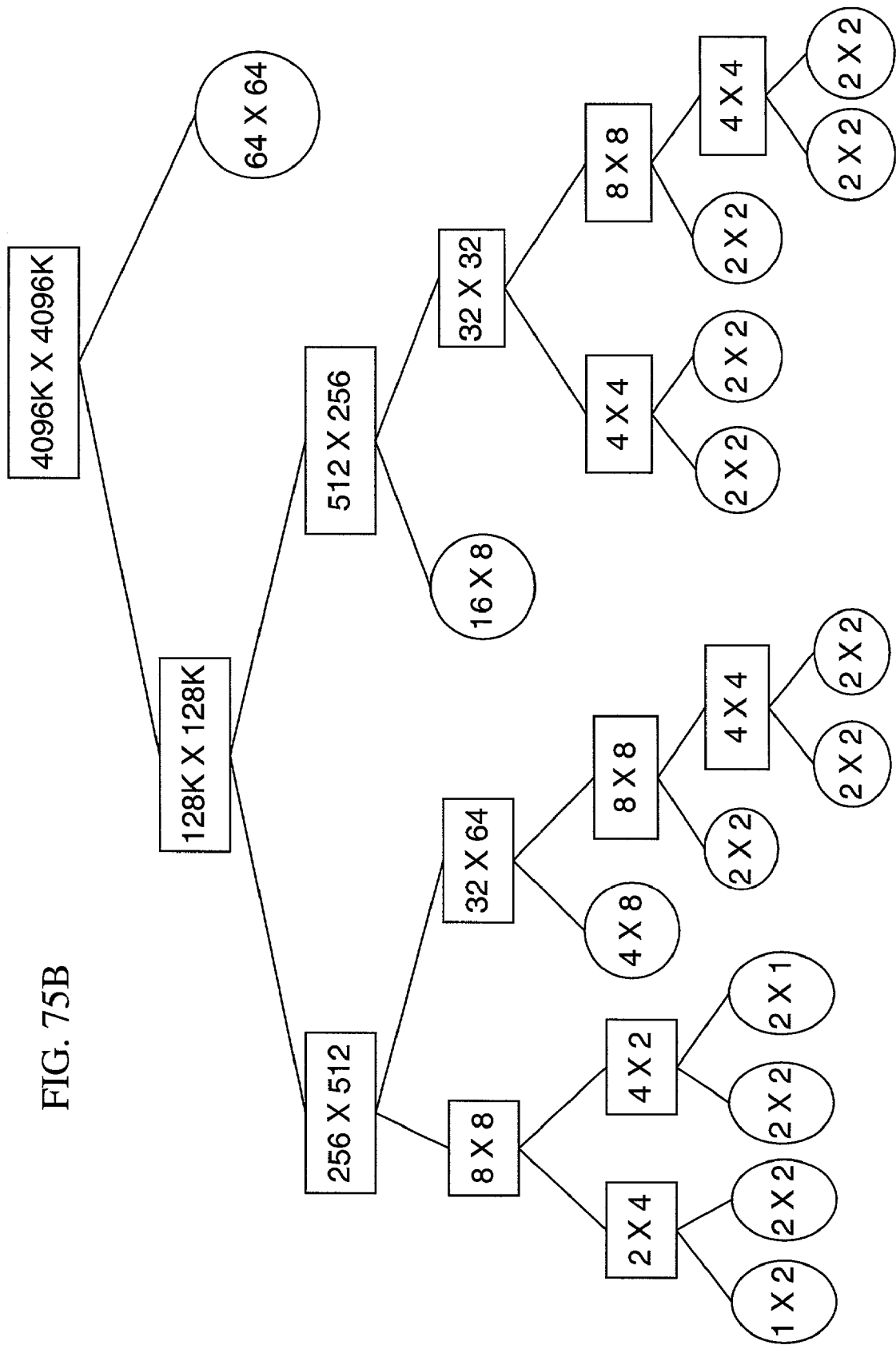
Figure 75C:
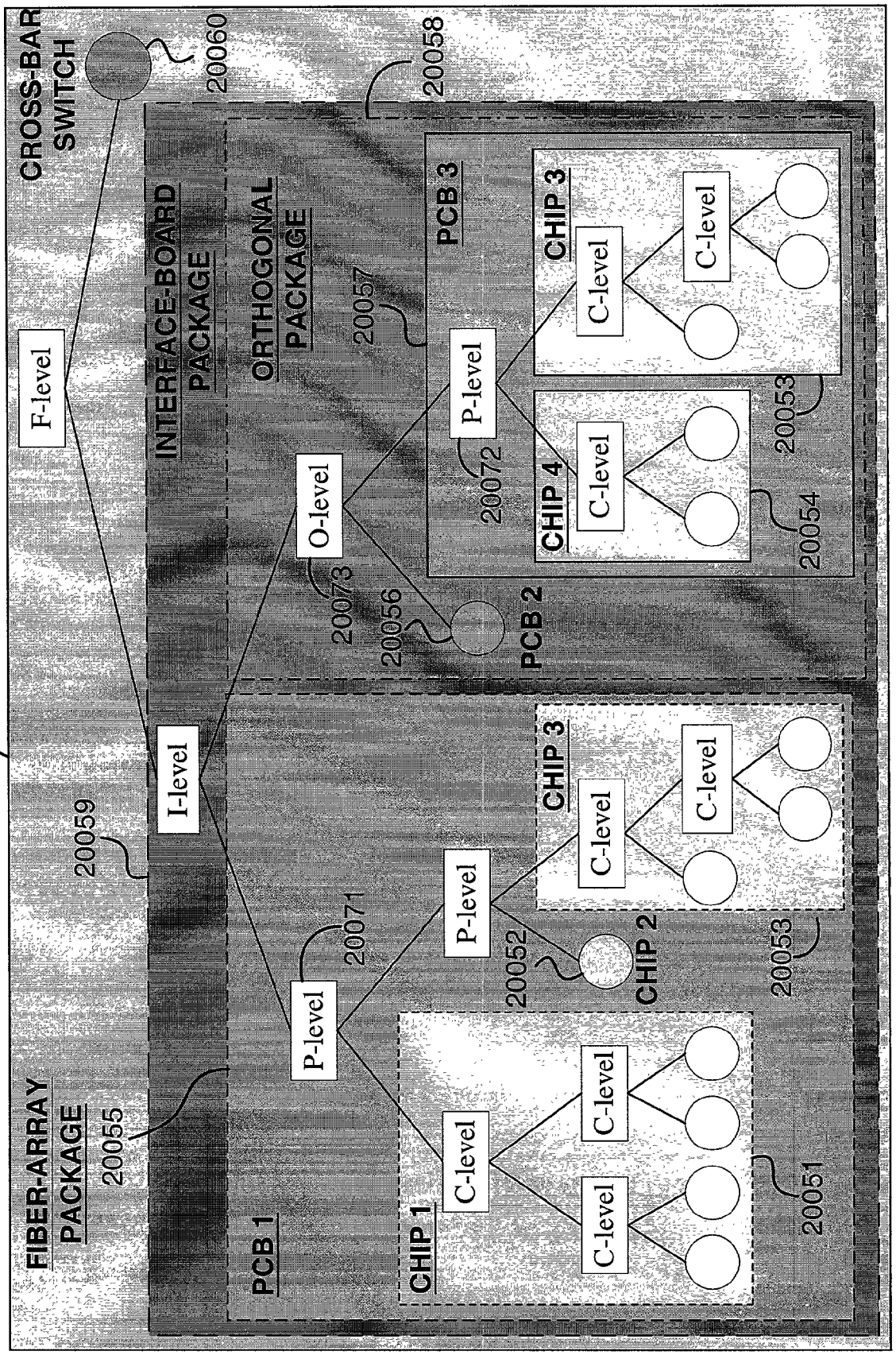
Figure 76:
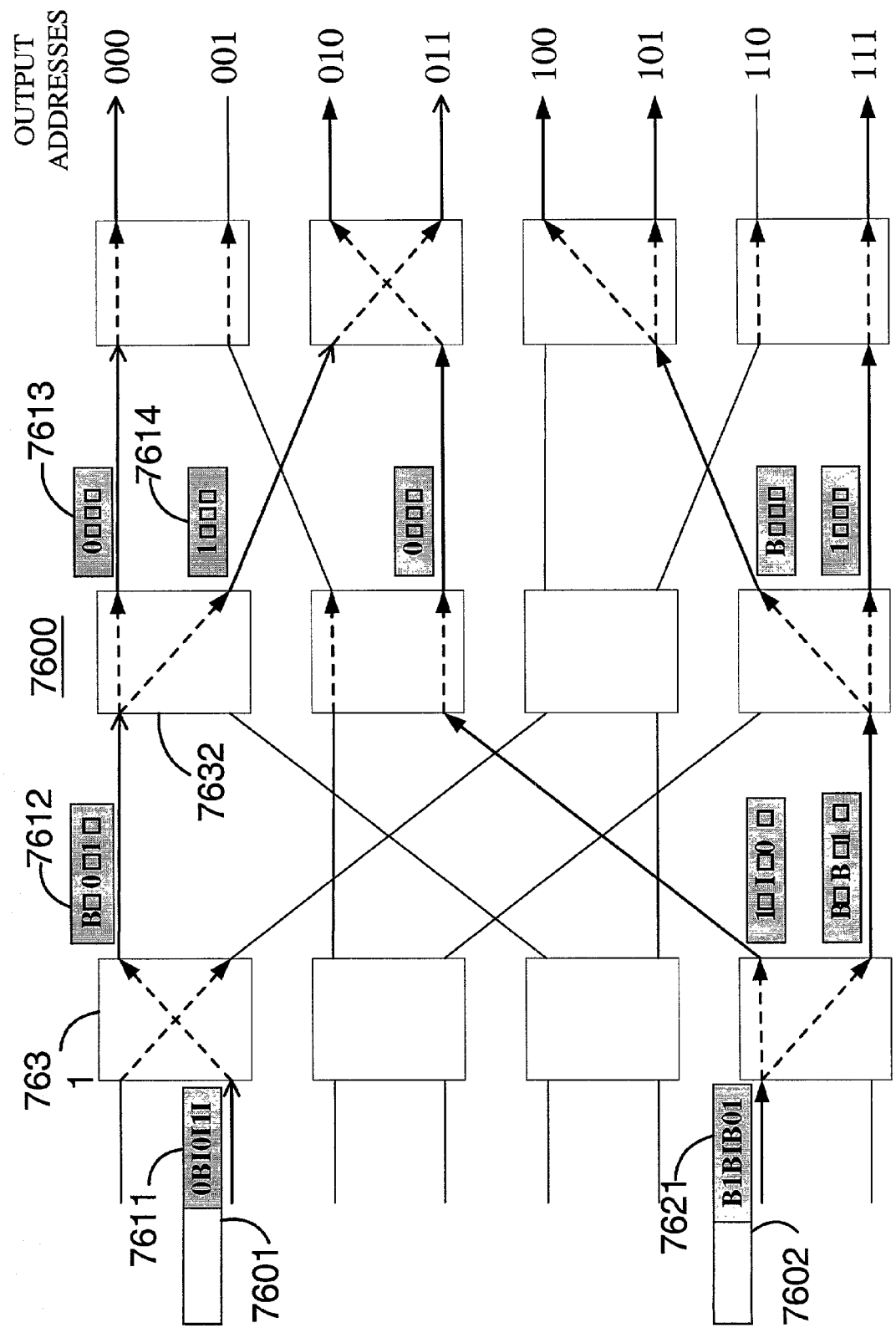
Figure 77C:
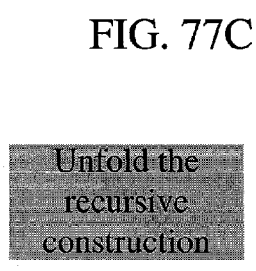
Figure 78:
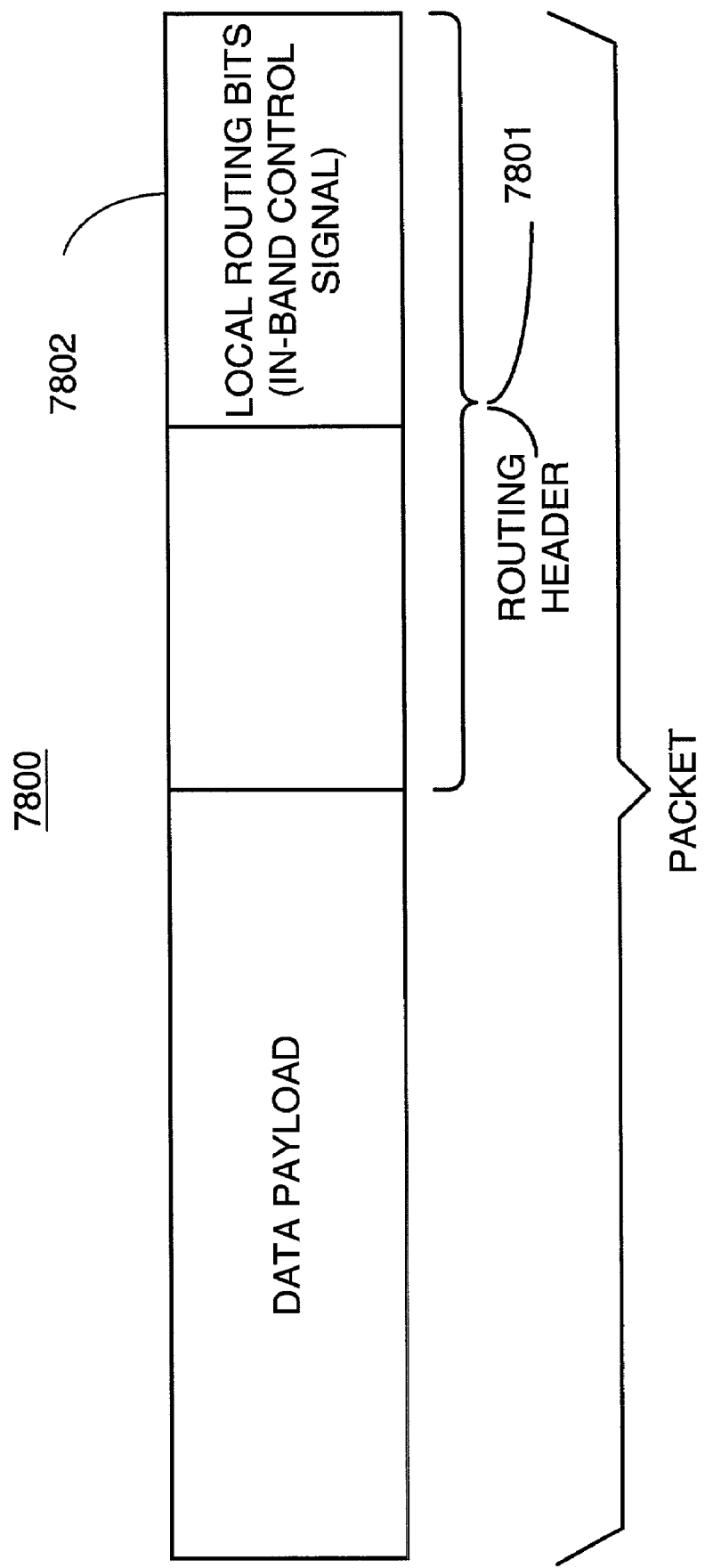

FIG. 31 depicts the progression of input/output addresses through the network of FIG. 24;

FIG. 32A depicts an exemplary connection request constraint compliant with the compressor constraint for a 5×5 switch;

FIG. 32B depicts are ordering of output addresses of the switch of FIG. 32A which is order preserving;

FIG. 32C depicts five concurrent connections over a compressor implemented from a generic switch;

FIG. 32D is a representation whereby the compressor of FIG. 32C is bent into a cylinder to visualize the order-preservation of the compressor;

FIGS. 33A-F show the six combinations of concurrent connections required for a 3×3 switch to qualify as a compressor;

FIG. 34 depicts, for a generic switch, multicast connections from five input ports to nine output ports that can be concurrently accommodated by an expander which are compliant with the expander constraint;

FIGS. 35A-P depict a 4×4 switch which qualifies as a compressor if and only if it accommodates at least the sixteen combinations of concurrent point-to-point connections shown;

FIGS. 36A-P depict a 4×4 switch which qualifies as a upturned compressor if and only if it accommodates at least the sixteen combinations of concurrent point-to-point connections shown;

FIGS. 37A-P depict a 4×4 switch which qualifies as a UC nonblocking switch if and only if it accommodates at least the sixteen combinations of concurrent point-to-point connections shown;

FIG. 38A depicts an I/O matching from 10 input ports to 10 output ports which is compliant with the UC-nonblocking constraint and thus can be accommodated by a 10×10 UC nonblocking switch;

FIG. 38B depicts an I/O matching from 10 input ports to 10 output ports which is compliant with the CU-nonblocking constraint and thus can be accommodated by a 10×10 CU nonblocking switch;

FIG. 39 depicts the relationship among switch attributes that are preserved under 2X or X2 interconnection;

FIG. 40 depicts a 15×15 compressor constructed from the 2X version of a 2Stg(3,5) network by filling in the nodes with any compressors of appropriate sizes;

FIG. 41 depicts the manner in which nine conditionally nonblocking properties of a switch are preserved by two families of networks;

FIG. 42 depicts a recursive 2X construction from cells which is the 16×16 reverse banyan network appended with the inverse shuffle exchange;

FIG. 43 depicts a 16×16 divide-and-conquer network appended with the swap exchange;

FIG. 44A depicts an exemplary network wherein stage 2 is to be "scrambled";

FIG. 44B depicts the results of scrambling stage 2 of the network of FIG. 44A;

FIG. 44C depicts the exchange immediately after stage 2 of the network of FIG. 44A resulting from cell rearrangement;

FIG. 45 depicts the four senses of equivalence among banyan-type networks arranged into a hierarchical diagram;

FIG. 46 depicts the four senses of equivalence among banyan-type networks without I/O exchanges arranged into a hierarchical diagram;

FIG. 47 depicts the four senses of equivalence among banyan-type networks extending to all bit-permuting networks;

FIG. 48 depicts the four senses of equivalence among bit-permuting networks without I/O exchanges;

FIGS. 49A-E depict all five 4-leaf binary trees;

FIGS. 50A-E depict the corresponding dimensions of each node corresponding to FIGS. 49A-E, respectively, for 2×2 building blocks;

FIG. 51 depicts the recursive plain 2-stage interconnection network associated with the balanced tree as the 16×16 network [:(3 4):(1 3)(2 4):(3 4):];

FIG. 52 depicts the recursive plain 2-stage interconnection network associated with the rightist tree as the 16×16 baseline network [:(1 2 3 4):(2 3 4):(3 4):];

FIG. 53 depicts the recursive 2X interconnection network associated with the balanced tree as the 16×16 network [:(3 4):(1 3 2 4):(3 4):(1 3 2 4)];

FIG. 54 depicts the recursive 2X interconnection network associated with the rightist tree as the 16×16 baseline network appended with the swap exchange [:(1 2 3 4):(2 3 4):(3 4):(1 4)(2 3)];

FIG. 55 depicts the recursive 2X interconnection network associated with the leftist tree as the 16×16 reverse banyan network appended with the inverse shuffle exchange [:(3 4):(2 4):(1 4):(1 2 3 4)];

FIGS. 56A-56D depict four binary leaf trees according to an exemplary embodiment of the invention;

FIG. 57 depicts a 64×64 divide-and-conquer network;

FIG. 58 depicts the middle exchange $X_{(6\ 3)(5\ 2)(4\ 1)}$ in the 64×64 network of FIG. 57 is equivalent to the array of contact points between two perpendicular stacks of planes wherein each plane carries an 8×8 reverse baseline network;

FIG. 59 depicts a $2^n \times 2^n$ divide-and-conquer network recursively constructed as the plain 2-stage tensor product between a $2^{\lceil n/2 \rceil} \times 2^{\lceil n/2 \rceil}$ divide-and-conquer network and a $2^{\lfloor n/2 \rfloor} \times 2^{\lfloor n/2 \rfloor}$ divide-and-conquer network;

FIG. 60 depicts the 16×16 divide-swap-conquer network [:(3 4):(1 4)(2 3):(3 4):];

FIG. 61 depicts the 64×64 divide-swap-conquer network associated with the 6-leaf balanced binary tree of FIG. 56C as [:(5 6):(4 6)(1 6)(2 5)(3 4):(5 6):(4 6):];

FIG. 62A depicts a switch employing out-of-band control;

FIG. 62B depicts that, for an interconnection network of switching elements forming the switching fabric, each switching element is controlled by a control signal from the central control unit through a control input port;

FIG. 63A depicts the in-band control signal composed of at least one bit prefixing a packet;

FIG. 63B depicts the in-band control signal for a representative switching fabric wherein each switching element determines its own connection state according to the control signals of the local input packets;

FIG. 64A depicts a switching cell in a switching network employing out-of-band control;

FIG. 64B depicts a switching cell in a switching network when the control is by in-band signaling;

FIG. 65A depicts a high-level block diagram of a generic switching cell under in-band control;

FIG. 65B depicts the connection state ({0}, null) for a 2×1 multiplexer;

FIG. 65C depicts the connection state (null, {0}) for a 2×1 multiplexer;

FIG. 65D depicts the connection state when the two input packets at input-0 and input-1 of a bicast cell are a bicast packet and an idle packet, respectively;

FIG. 65E depicts the connection state with an idle packet at 0-input and a bicast packet at 1-input of the bicast cell;

FIG. 66A depicts a packet entering the switching network illustrating the presence of an activity bit;

FIG. 66B depicts the format of a generic routing tag of a data packet entering stage j;

FIG. 66C depicts 1×1 switching circuitry implemented as a separate device appended to the main switching cell and illustrating how the routing tag is changed at various locations in a generic stage j;

FIG. 66D depicts a packet with the destination address $d_1 d_2 \ldots d_n$ is preceded by the bit pattern $1 d_{\gamma(j)} p_1 p_2 d_{\gamma(j+1)} \ldots d_{\gamma(n)}$;

FIGS. 67A-F depicts the adoption of the block diagram of FIG. 65A for the inclusion of bit consumption and rotation as the bit consumption proceeds;

FIG. 68 depicts a partial sorting network;

FIG. 69 depicts the application of statistical line grouping with a line-bundle size 8 to the 16×16 divide-and conquer network results in a 128×128 network comprising 16×16 nodes;

FIG. 70A depicts an 8-to-4 concentrator constructed by an 8×8 partial sorting network which is a 4-stage interconnection network of sorting cells;

FIG. 70B depicts a test run of 2-bit signals through another 8-to-4 concentrator which shares the same underlying 8×8 partial sorting network shown in FIG. 70A;

FIG. 71A depicts a 8-to-4 concentrator depicted in FIG. 70A as adapted into an 8-to-4 multicast concentrator;

FIG. 71B depicts a test run with the same input packets as in FIG. 71A except for certain idle packets;

FIG. 72A depicts the operation of a multicast concentrator with priority treatment;

FIG: 72B depicts the bicasting of packets in accordance with a given priority scheme;

FIG. 73A depicts the construction by an orthogonal package;

FIG. 73B depicts the construction by an interface-board package where all input and output switching elements are Printed Circuit Boards;

FIG. 74 depicts the construction at the interface-board package level where all input and output switching elements, represented by blocks, are orthogonal packages;

FIG. 75A depicts a binary tree associated with illustrative construction of a switching fabric from the recursive applications of 2-stage interconnection involving the five levels of physical implementation, where each internal node of the tree is mapped to one of the levels of implementation;

FIG. 75B shows the same binary tree in FIG. 75A but with its nodes showing exemplifying dimensions of the building blocks as well as the networks constructed at different steps of 2-stage interconnection in the recursion;

FIG. 75C shows the same binary tree in FIG. 75A but with its nodes showing exemplifying generic components in the physical structure of the switching fabric;

FIG. 76 illustrates the multicasting of a first packet toward two outputs and a second packet toward four outputs;

FIG. 77A depicts a 2-stage interconnection network with parameters 2 and $2^{n-1}$, which is the final recursive step in the construction of the $2^n \times 2^n$ baseline network as a recursive 2-stage interconnection network associated with the n-leaf rightist tree;

FIG. 77B depicts a 2-stage network with a $2^n \times 2^n$ input node and two $2^{n-1} \times 2^{n-1}$ output nodes, which can be used as the generic step in the recursive construction of a nonblocking network from cells;

FIG. 77C unfolds the recursive construction with the generic recursive step based on the 2-stage networking shown in FIG. 77B;

FIG. 78 depicts the layout of the routing header and the local routing bits inside a packet as inputted to a switching element; and FIGS. 79-82 show all of the possible cases for the input packets that the bicast cell encounters.

DETAILED DESCRIPTION

To fully appreciate the import of the switching circuitry of the present invention, as well as to gain an appreciation for the underlying operational principles of the present invention, it is instructive to first discuss in overview fashion foundational principles pertinent to the present invention. This overview also serves to introduce terminology so as to facilitate the more detailed description of illustrative embodiments in accordance with the present invention.

A. Switch and Network

1. Switch and its Properties

Definition A1: "connection state". Let Inputs denote an array (that is, an ordered set) of m elements and Outputs an array of n elements. A "connection state" from the m-element Inputs array to the n-element Outputs array is a sequence ($T_0$, $T_1, T_2, \ldots, T_{m-1}$) of m pairwise disjoint subsets of the Outputs array. Elements in the array Inputs and the array Outputs are respectively called "inputs" and "outputs" in the connection state. When $k \in T_j$, the input j is said to be connected to output k in the connection state.

The connection state ($T_0, T_1, T_2, \ldots, T_{m-1}$) means the configuration where each input j is connected to all outputs in $T_j$; the set $T_j$ may be null. The disjointness among $T_0, T_1, T_2, \ldots, T_{m-1}$ prevents collision of different inputs at an output. The total number of connection states from an array of m-elements to an array of n-elements is $(m+1)^n$.

EXAMPLE 1

Consider the case of m=2 and n=3. There are a total of 27 connection states Further, for the sake of concreteness but without loss of generality, consider that the Inputs array represents the inputs to a circuit element and the Outputs array represents the outputs from the circuit element. The two inputs to the circuit element are 0 and 1, that is, Inputs={0,1}; the three outputs from the circuit are 0, 1, and 2 or Outputs={0, 1, 2}. Referring now to FIGS. 1A-1H, eight of the possible 27 connection states for the circuit element are depicted both for illustrative purposes and for eventual use to exemplify later definitions. In particular, for FIG 1A, the connection state engendered by connecting input 0 to output 0 and input 1 to output 1 (shown by the dashed lines internal to circuit element 100) is as follows: ({0}, {1}), that is, $T_0$={0} and $T_1$={1}. This connection state is referred to as $C_0$. This connection state as well as the remaining seven connection states of FIGS. 1B-1H are tabulated as follows:

$C_0$=({0}, {1}),
$C_1$=({0}, {2}),
$C_2$=({1}, {0}),
$C_3$=({1}, {2}),
$C_4$=({2}, {0}),
$C_5$=({2}, {1}),
$C_6$=({0, 1, 2}, null), and
$C_7$=(null, {0, 1, 2}).

Definition A2: "point-to-point connection state" and "multicast connection state". A connection state $T_0, T_1, T_2, \ldots T_{m-1}$ from the array Inputs to the array Outputs is said to be a "point-to-point connection state" if every set $T_j$ contains at most one element; otherwise, the connection state is called a "multicast connection state".

EXAMPLE 2

Using the connection states of Example 1, connection states $C_0, C_1, \ldots, C_5$ are point-to-point since every set $T_j$ contains at most one element, whereas connection states $C_6$ and $C_7$ are multicast.

For the case of m=2 and n=3, there are a total of twelve point-to-point connection states.

EXAMPLE 3

Figures 1A, 1B, 1C, 1D:
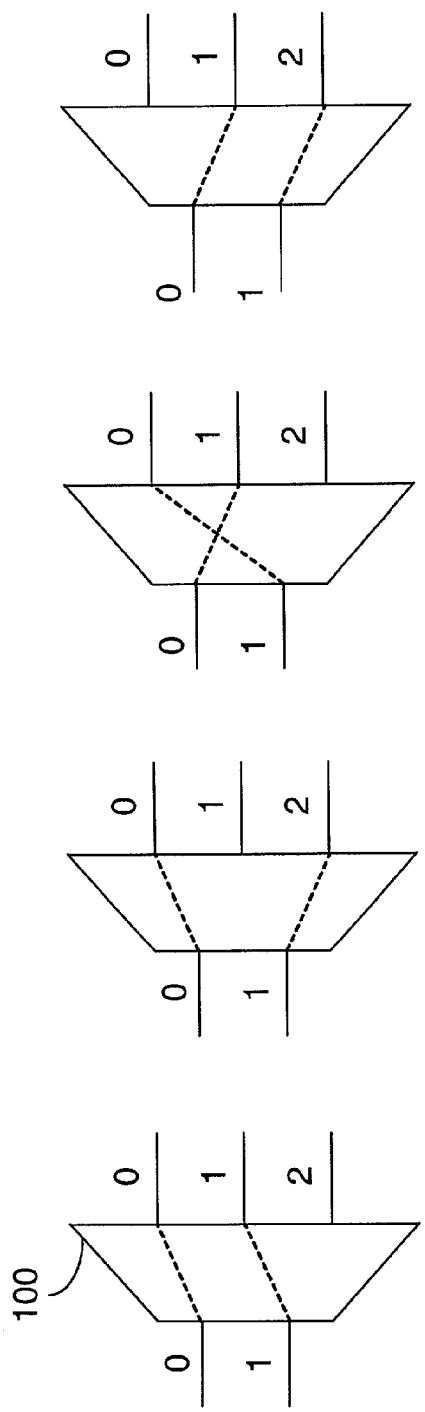
FIGS. 1A-1H depict eight of the twenty-seven connection states of a 2×3 circuit element.
Figures 1E, 1F, 1G, 1H:
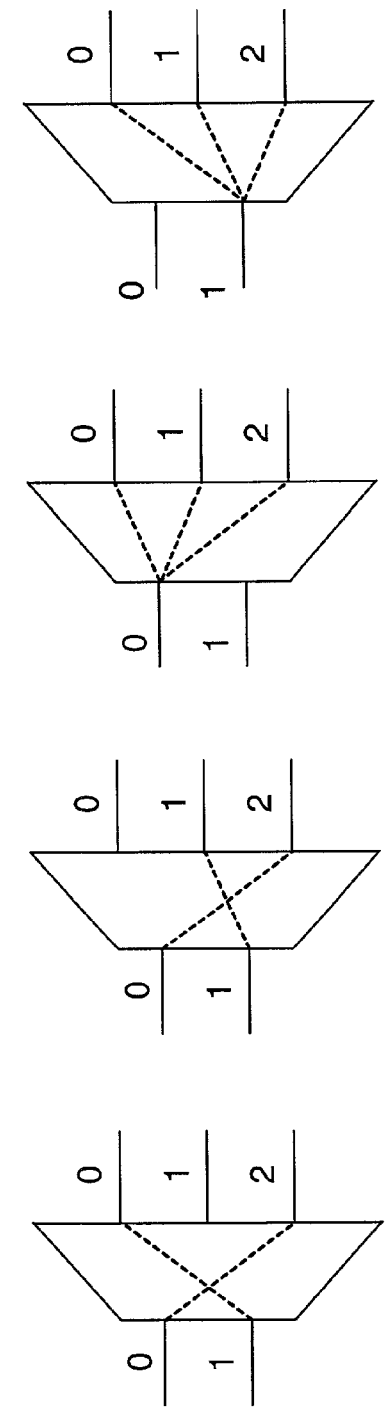

Besides the six connection states $C_0, \ldots, C_5$, the remaining six point-to-point connections states for element 100 in FIG. 1A having 2 inputs and 3 outputs are as follows:

$C_8$=({0}, null),
$C_9$=({1}, null),
$C_{10}$=({2}, null),
$C_{11}$=(null, {0}),
$C_{12}$=(null, {1}), and
$C_{13}$=(null, {2}).

Definition A3: "switch". A collection of at least two different connection states from the input array to the output array is called a "switch" if it has the routing property of a switch—the routing property states that for every element j in the array Inputs and every element k in the array Outputs, there is a connection state ($T_0, T_1, T_2, \ldots, T_{m-1}$) such that k is in the subset $T_j$.

Elements of Inputs and Outputs are respectively called the "input ports" and "output ports" of the switch, or simply "inputs" and "outputs" of the switch when there is no ambiguity. The switch is called an "m×n" switch when there are m inputs and n outputs.

It takes at least two different connection states to qualify for a switch because a single connection state can be realized by fixed or hard wiring. The routing property of a switch ensures the connectivity from every input to every output.

The abstract notion of a switch actually refers to a "switching fabric or device in unidirectional transmission" and is independent of the notion of switching control, which will be discussed in the sequel. Moreover, the connection states in the definition map into connection configurations realizable by the switching fabric. Thus, whereas the notion of connection states may be abstract, the connection states are physically manifested by actual connection configurations of the switching fabric.

EXAMPLE 4

Using the connection states of Example 1, it is possible to configure a number of different switches.

(a) For example, consider the collection of connection states, denoted $C_A$, where $C_A$=($C_1, C_2, C_5, C_{12}$), and place the connection states of $C_A$ in the tabular form:

| Connection State | $T_0$ | $T_1$ |
|---|---|---|
| $C_1$ | {0} | {2} |
| $C_2$ | {1} | {0} |
| $C_5$ | {2} | {1} |
| $C_{12}$ | null | {1} |

It is clear that each output is present in the column under $T_0$, and similarly each output is present in column $T_1$, so the collection of connection states in $C_A$ define a switch.

(b) Consider now the collection of states $C_B$=($C_0, C_3, C_4$), as follows:

| Connection State | $T_0$ | $T_1$ |
|---|---|---|
| $C_0$ | {0} | {1} |
| $C_3$ | {1} | {2} |
| $C_4$ | {2} | {0} |

Once again each output is present in both columns, so $C_B$ is another switch.

(c) Consider now the collection of states $C_C$=($C_0, C_3, C_5$), as follows:

| Connection State | $T_0$ | $T_1$ |
|---|---|---|
| $C_0$ | {0} | {1} |
| $C_3$ | {1} | {2} |
| $C_5$ | {2} | {1} |

Now, whereas the $T_0$ has all outputs represented, column $T_1$ does not, so $C_C$ is not a switch.

(d) Consider now the collection of states $C_D = (C_6, C_7)$, as follows:

| Connection State | $T_0$ | $T_1$ |
|---|---|---|
| $C_6$ | {0, 1, 2} | null |
| $C_7$ | null | {0, 1, 2} |

Once again each output is present in both columns, so $C_D$ is yet another switch.

Definition A4: "point-to-point switch" and "multicast switch". A switch is a "point-to-point switch" if every connection state composing the switch is a point-to-point connection state; otherwise, the switch is a "multicast switch".

EXAMPLE 5

Switches defined by collections $C_A$ and $C_B$ of Example 4 are point-to-point whereas $C_D$ defines a multicast switch.

Figure 2A:
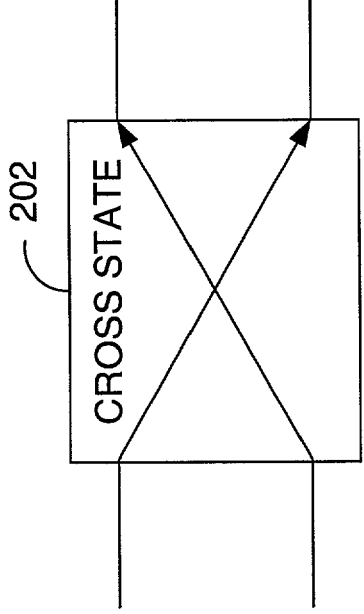
FIGS. 2A-B depict the "bar state" and the "cross state" connection states of a switching cell.
Figure 2B:
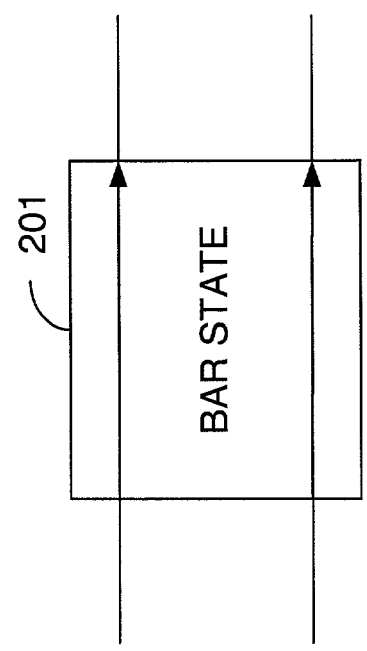

Definition A5: "switching cell". A "switching cell" is a 2-state point-to-point switch, with the connection states, as shown in FIGS. 2A and 2B, being called the bar state (201) and cross state (202), respectively. In particular, the bar connection state is ({0},{1}), and the cross connection state is ({1},{0}).

Figure 2C:
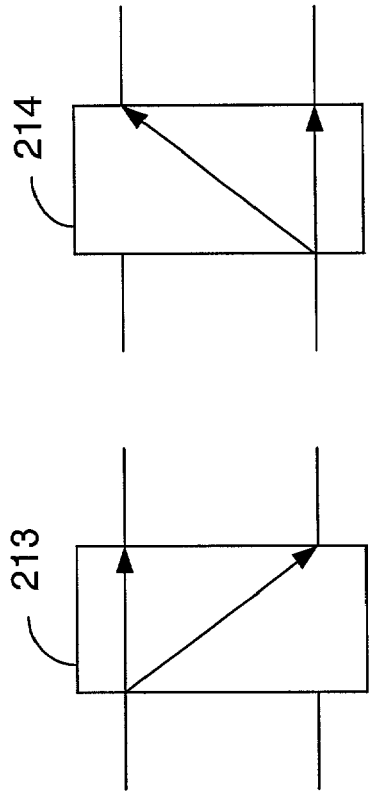
FIGS. 2C-F depict the four connection states of an expander cell.
Figure 2D:
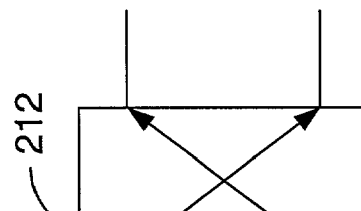
Figure 2E:
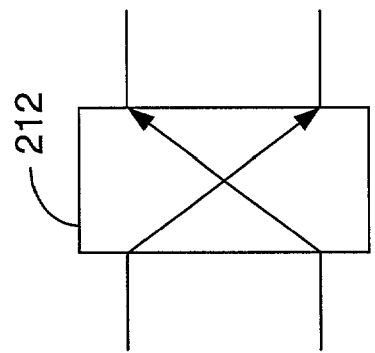
Figure 2F:
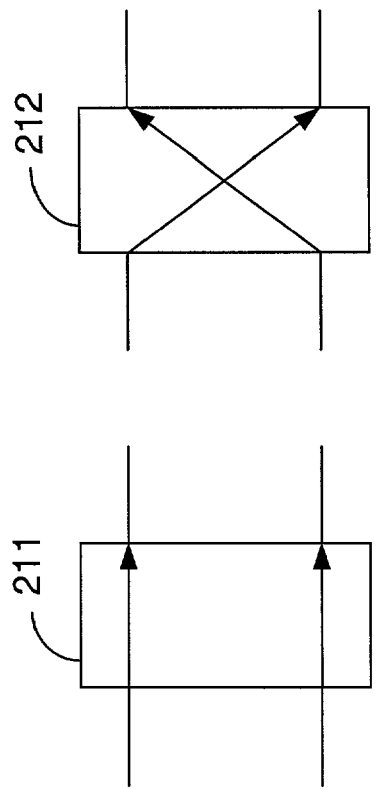

Definition A6: "expander cell". An "expander cell" is a multicast switch with the four connection states (211, 212, 213, 214) as in shown in FIGS. 2C-2F, respectively, which includes the bar state (211) and cross state (212) of the switching cell. In particular, the connection states are: ({0},{1}); ({1},{0}); ({0,1}, null); and (null, {0,1}). In tabular form, the connection states are:

| Connection State | $T_0$ | $T_1$ |
|---|---|---|
| FIG. 2C | {0} | {1} |
| FIG. 2D | {1} | {0} |
| FIG. 2E | {0, 1} | null |
| FIG. 2F | null | {0, 1} |

Notice that the expander cell conforms, to the definition of switch because each output is present in $T_0$ and in $T_1$. Of the four connection states, only the bar and cross states are point-to-point. Therefore the expander cell is a multicast switch.

Switching cells and expander cells are extensively used in the recursive construction of networks, as discussed later.

Definition A7: "accommodation of a combination of concurrent I/O connections by a switch". A connection state $(T_0, T_1, T_2, \ldots, T_{m-1})$ of an m×n switch is said to "achieve" the I/O connection from input i to output k if $k \in T_i$. Consider the combination of concurrent I/O connections from inputs $I_1, I_2, I_3, \ldots$ to distinct outputs $O_1, O_2, O_3, \ldots$, respectively. A switch is said to "accommodate" this combination of concurrent I/O connections if there exists a connection state of the switch that achieves every I/O connection in the combination, i.e., the connection from input $I_j$ to output $O_j$ for every index j.

EXAMPLE 6

The combination of concurrent I/O connections for a 3×3 switch can be input 0 connected to output 2 and input 1 connected to output 0. Then, if the switch has any connection state that can achieve each of the two connections concurrently, then the switch is said to "accommodate" this combination. One qualified connection state can be ({2},{0}, Null); another qualified connection state is ({1,2},{0}, Null).

Note that a connection state is an intrinsic characteristic of a switch, which is a legitimate connection configuration of the switch, while a combination of I/O connections in the above definition can be regarded as an arbitrary request made on a switch, which can be from any particular set of inputs to any set of distinct outputs. So being a request, a combination of I/O connections may not always be accommodated by the switch. For example, the connection from an input to more than one output, that is, a multicast connection request, can never be accommodated by a point-to-point switch.

On the other hand, when a combination of concurrent connections is accommodated by a switch, the I/O connections in the qualified connection state covers, but is not limited to, the combination that is being accommodated.

Definition A8: "nonblocking property of a switch". An m×n switch is said to be "nonblocking" if, for every sequence of distinct inputs $I_0, I_1, \ldots, I_{k-1}$ and every sequence of distinct outputs $O_0, O_1, \ldots, I_{k-1}$, where k min{m, n)}, there exists a connection state that concurrently connects each $I_j$ to $O_j$ for all j, $0 \leq j \leq k-1$.

In effect, a nonblocking switch can accommodate every combination of point-to-point connections between inputs and outputs as one would intuitively expect. This definition is an extension of the routing property. Notice, too, that this definition does not preclude multicast connection states from the switch, despite the apparent point-to-point nature of the definition.

In the above definition A8, the sequence of distinct inputs $I_0, I_1, \ldots, I_{k-1}$ may be restricted to be in the increasing order without loss of generality. In the following example we shall impose this restriction so as to avoid unnecessary duplications in I/O pairings.

EXAMPLE 7

Again, consider the example of circuit element 100 having 2 inputs and 3 outputs. It is known that there are twelve possible point-to-point connections states, namely, $C_0, \ldots, C_5$, and $C_8, \ldots, C_{13}$ in the notation of previous examples. Using the parameters of the definition for nonblocking property of a switch, min{m, n}=2, so k=2. For k=2, there is only one sequence of two distinct inputs arranged in the increasing order, that is, $(I_0, I_1) = (0, 1)$. On the other hand, there are six sequences of two distinct outputs out of totally three outputs, namely, (0, 1), (0, 2), (1, 0), (1, 2), (2, 0), (2, 1).

Consider the following tabular form:

| Input Sequence $(I_0, I_1)$ | Output Sequence $(O_0, O_1)$ | Connection State |
|---|---|---|
| (0, 1) | (0, 1) | $C_0$ |
| (0, 1) | (0, 2) | $C_1$ |

-continued

| Input Sequence $(I_0, I_1)$ | Output Sequence $(O_0, O_1)$ | Connection State |
|---|---|---|
| (0, 1) | (1, 0) | $C_2$ |
| (0, 1) | (1, 2) | $C_3$ |
| (0, 1) | (2, 0) | $C_4$ |
| (0, 1) | (2, 1) | $C_5$ |

It is clear from this tabular information that for, every sequence $I_0$, $I_1$ of distinct inputs and every sequence $O_0$, $O_1$ of distinct outputs, there exists a connection state that concurrently connects each $I_j$ to $O_j$ for all j. The connection states for this illustrative example used the six point-to-point connection states $C_0, \ldots, C_5$.

A major objective of switching theory is to construct sizable switching fabrics that route data signals from inputs to outputs concurrently. If the bit rate at every input is $\lambda$, then ideally no single device in an n-input switching fabric needs to operate at a speed proportional to $n\lambda$. In that way the total throughput is not bounded by the economical feasibility of any single device. The nonblocking property of a switch is hence a key issue in point-to-point communications. Ideally no single component of the switching control, including the processor, operates at a speed proportional to $n\lambda$ either. Even in the presence of a nonblocking switch, it only promises the existence of a connection state that accommodates a given combination of point-to-point connections. The switching control identifies and activates the appropriate connection state. This requires proper control signaling to all switching elements on the connection path of every data signal. The switching control also prevents the collision of data signals from multiple inputs at any point in the switch; switching control will be discussed in detail in the sequel.

As discussed in more detail later, but worthwhile to highlight at this point, is the notion of a "conditionally nonblocking switch"—a conditionally nonblocking switch of any kind may serve as a nonblocking switch when the input traffic has been preprocessed so as to meet the specified condition. A "compressor", a "decompressor", an "expander", a "UC nonblocking switch", etc., as to be defined in the sequel, are conditionally nonblocking switches in a form that enables such elements to accommodate every combination of concurrent I/O connections subject to a certain correlation among I/O addresses inside the combination.

2. Multi-stage Interconnection Network and its Properties

A "switching network" composed of nodes involves two independent concepts. One is the switching at individual nodes; the other is the interconnection of the nodes. In line with these concepts, it is helpful to first discuss an "interconnection network" in which every node is a simple box with an array of input terminals (or "input ports" or simply "inputs" when there is no ambiguity) and an array of output terminals (or "output ports" or simply "outputs") without any concern for connection states of the box. Then a switching network is formulated as an interconnection network whereby every node is filled by an appropriate switch. In this way, the interconnection of smaller switches creates a larger switch, whose characteristics depend on both the type of interconnection of nodes and the attributes of the individual switches composing the nodes. Thus, there must be a clear conceptual separation between the attributes of a switch and the type of networking.

Definition A9: "interconnection network". An "interconnection network" is a finite collection of nodes together with a collection of unidirectional interconnection lines such that:

(a) every node is an object with an array of inputs and an array of outputs;
(b) an interconnection line leads from an output of one node to the input of another node; and
(c) every input/output (I/O) of a node is incident with at most one interconnection line.

A node with m inputs and n outputs is called an m×n node or a node with "size" m×n. In particular, a 2×2 node is called a cell.

Since a node in an interconnection network is characterized by an input array and an output array, a node can qualify to be a switch through the proper specification of connection states between its I/O arrays.

Definition A10: "external I/O" "input node" and "output node". An I/O of a node in an interconnection network is called an "external I/O" if it is not incident with any interconnection line. A node containing an external input of the interconnection network is called an "input node"; similarly, a node containing an external output of the interconnection network is called an "output node". An interconnection network with M external inputs and N external outputs is called an M×N interconnection network or a network with a "size" of M×N.

EXAMPLE 1

FIG. 3A depicts an 3×3 interconnection network 300 with three nodes designated S, T, and U. Nodes S and U are input nodes while nodes T and U are output nodes.

Definition A11: "route". A "route" from an external input A of an interconnection network to an external output B means a chain $(a_0, b_0, a_1, b_1, \ldots, a_k, b_k)$, $k \geq 0$, with the following characteristics:

(a) for $0 \leq j \leq k$, there is a node $Z_j$ on which $a_j$ is an input and $b_j$ is an output;
(b) $a_0, a_1, \ldots, a_k$ are distinct from one another;
(c) $b_0, b_1, \ldots, b_k$ are distinct from one another;
(d) for $0 < j \leq k$, $b_{j-1}$ is interconnected to $a_j$; and
(e) $A = a_0$ and $B = b_k$.

It should be noted that this definition allows for the traversing of nodes more than once.

EXAMPLE 2

Figure 4:
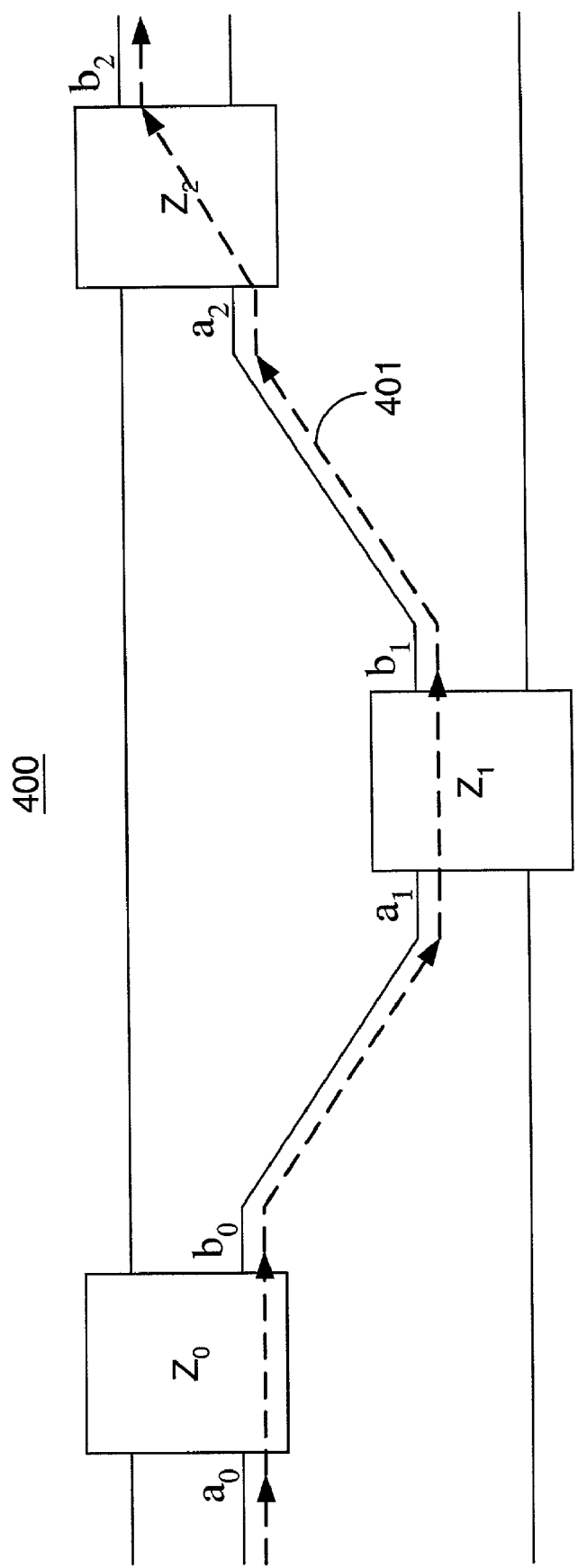
FIG. 4 depicts a route through an interconnection network.

Interconnection network 400 in FIG. 4 depicts an example for k 2 of route 401 from $A = a_0$ and B $b_2$, which are the only input and output, respectively, for network 400.

Definition A12: "routable". An interconnection network is "routable" if there is a route from every external input to every external output. For instance, if there are two external inputs $A_0$ and $A_1$ and there external outputs $B_0$, $B_1$, and $B_2$, then the network is routable if there are routes $A_0 \rightarrow B_0$, $A_0 \rightarrow B_1$, $A_0 \rightarrow B_2$, $A_1 \rightarrow B_0$, $A_1 \rightarrow B_1$, and $A_1 \rightarrow B_2$, where $A \rightarrow B$ is read as "there is a route from A to B.

EXAMPLE 3

Figure 5A:
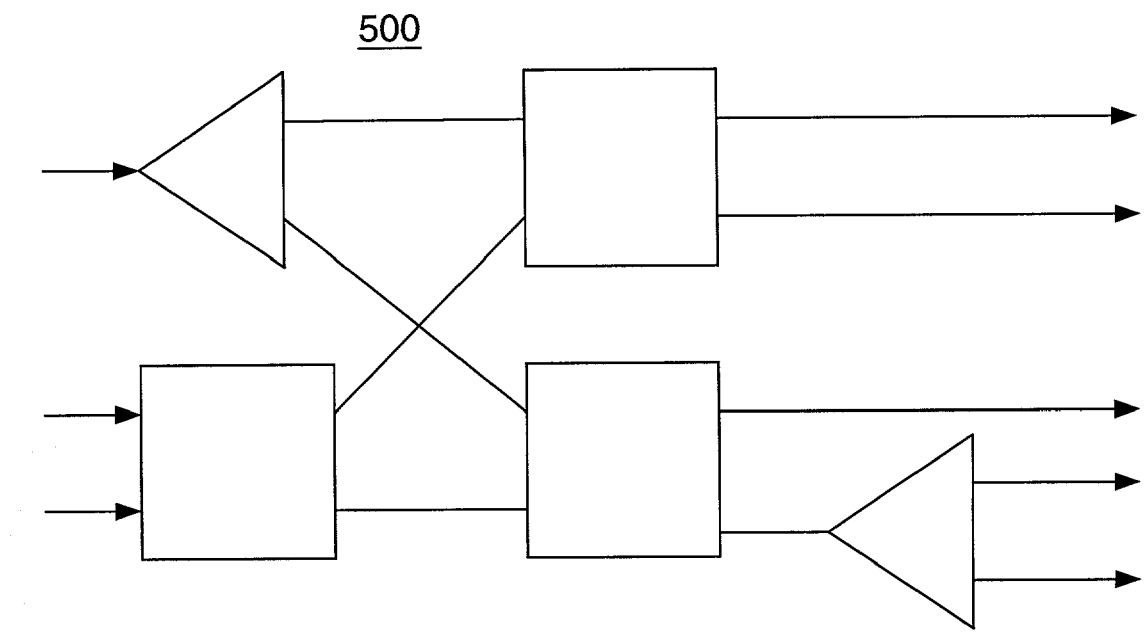
FIG. 5A depicts an exemplary routable interconnection network.

Consider the 3×5 interconnection network 500 of FIG. 5A. It is routable interconnection network. In fact, it is easily discernible by following interconnection lines from each external input to each external output.

Definition A13: "unique-routing network" and "alternate-routing network". Recall the definition of a route from an external input of an interconnection network to an external output from Definition A11. Two routes $(a_0, b_0, a_1, b_1, \ldots, a_k, b_k)$ and $(a_0, b_0', a_1', b_1', \ldots, a_k', b_k)$ in a network are said to be "parallel" if $a_j$ and $a_j'$ reside on the same node for $0<j\leq k$ and both $b_j$ and $b_j'$ reside on the same node for $0\leq j<k$.

A routable interconnection network is said to be "unique routing" if all routes from any given external input to any given external output are parallel. Otherwise, it is said to be "alternate routing".

Note that it is possible for two nonparallel routes to go through a common interconnection line. In the definition of a unique-routing network parallel routes are indistinguishable. This is only practical in terms of routing control. Thus even a unique-routing network allows a bit of parallelism. The parallelism in a unique-routing network can be seen in, for example, the application of the technique of statistical line grouping to a network, which will be described in the sequel.

EXAMPLE 4

The interconnection network 300 in FIG. 3A is an alternate-routing network because, beside the direct access from the node S to the node T, there is indirect access through the node U. An example of a unique-routing network is the network 500 as shown in FIG. 5A. There are no parallel routes in this network. The numerous banyan-type networks and all networks constructed from the recursive 2-stage construction including generalized version, as will be described in the sequel, are all of the unique-routing type.

Definition A14: "external input order", "external output order", and "external I/O order". An "external input order" of an interconnection network means an ordering on the external inputs of the interconnection network; similarly, an "external output order" of an interconnection network means an ordering on the external outputs of the interconnection network. An "external I/O order" means a combination of an external input order and an external output order.

3. Switching Network

Definition A15: "switching network". An interconnection network is called a "switching network" if
 (a) every node qualifies as a switch through proper specification of connection states;
 (b) the network is routable; and
 (c) an external I/O order of the network is specified.

EXAMPLE 1

Figure 5B:
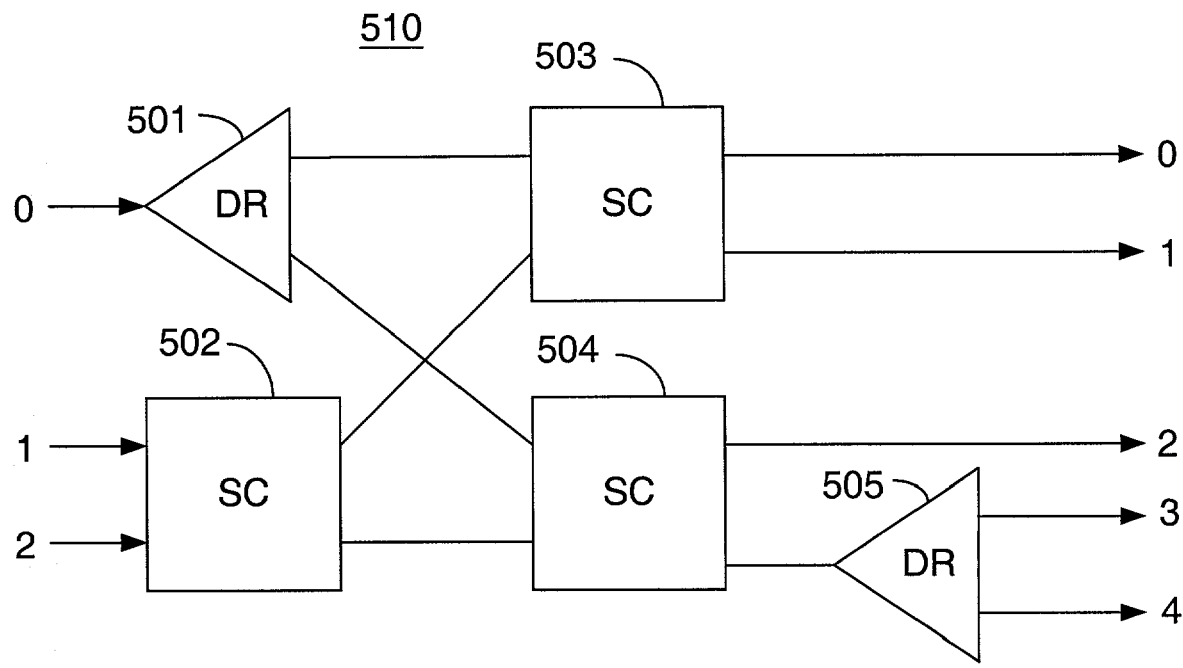
FIG. 5B depicts an exemplary switching network wherein the nodes of the network of FIG. 5A are filled with switches, including switching cells and distributors.

Consider again 3×5 interconnection network 500 of FIG. 5A now recast as network 510 in FIG. 5B. Suppose that every node in network 510 attains the status of a switch upon the proper specification of connection states. For instance, configure nodes 502, 503, and 504 as switching cells (SC), and nodes 501 and 505 as distributors (DR). (A distributor is a 1×2 switch defined by the two connection states ({0}) and ({1}). With the specification of an external I/O order (e.g., the natural order (0, 1, 2, . . . ) in the top-down manner for the external inputs and outputs), network 510 qualifies as a switching network.

Definition A16: "connection state from external inputs to external outputs". Consider a switching network with the array ExtInputs (respectively or resp. ExtOutputs) of external inputs (resp. external outputs). Given a connection state on every node, there corresponds a "connection state from the array of ExtInputs to the array of ExtOutputs" as follows: an external input $a_0$ is connected to an external output $b_k$ in the connection state from the array ExtInputs to the array ExtOutputs if there exists a route $(a_0, b_0, a_1, b_1, \ldots, a_k, b_k)$ in the network such that, for $0\leq j\leq k$, $a_j$ is connected to $b_j$ by the given connection state in the node that $a_j$ and $b_j$ reside on.

Accordingly, every combination of a connection state on every node in a switching network corresponds to a connection state between the array of external inputs and the array of external outputs; however, this correspondence is not necessarily one-to-one.

EXAMPLE 2

Suppose each of the nodes S, T, and U in the interconnection network of FIG. 3A are filled with a switching cell. Also, label the external inputs/outputs as 0, 1, and 2 from top down. Such an arrangement is shown as network 310 in FIG. 3B. A total of eight combinations can be formed by a bar/cross state on each of the three nodes. These eight combinations correspond to six distinct connection states between arrays of external I/O, as tabulated below (including two duplicate pairs indicated by asterisks):

| State of S | State of T | State of U | Corresponding Connection State between External I/O |
|---|---|---|---|
| Bar | Bar | Bar | ({0}, {1}, {2})* |
| Bar | Bar | Cross | ({0}, {2}, {1}) |
| Bar | Cross | Bar | ({1}, {0}, {2})** |
| Bar | Cross | Cross | ({1}, {2}, {0}) |
| Cross | Bar | Bar | ({1}, {0}, {2})** |
| Cross | Bar | Cross | ({2}, {0}, {1}) |
| Cross | Cross | Bar | ({0}, {1}, {2})* |
| Cross | Cross | Cross | ({2}, {1}, {0}) |

Theorem: "switch". As stated in the above Definition A15, every combination of a connection state on every node in a switching network corresponds to a connection state between the array of external inputs and the array of external outputs. The collection of all connection states from the array of external inputs of a switching network to the array of external outputs involved in such correspondence constitutes a switch between arrays of external I/O, that is, the collection satisfies the routing property of a switch.

Definition A17: "switch realization of a switching network". The switch between arrays of external IO described in the preceding Theorem, is called the "switch realization of the switching network" or the "switch constructed from the switching network".

The switch constructed from a switching network can be deployed as a node in another network; such recursive construction yields indefinitely large switches.

4. Switch Properties vs. Network Properties

It is important to differentiate the properties of a switch and from those of a network. A switch has various attributes like "point-to-point switch" and "multicast switch", and "non-blocking switch". These attributes are referred to as switch properties as their definition only depends on the connection states of a switch.

On the other hand, some concepts are related to a network only. The following items (a)-(f) are related to the inventive subject matter; they will be discussed in detail in the sequel.
 (a) multi-stage network:
 (b) exchanges in multi-stage network;
 (c) plain 2-stage, 2X and X2 interconnection and recursive plain 2-stage, 2X and X2 construction;
 (d) bit-permuting exchange, bit-permuting network and banyan-type network;
 (e) trace and guide of a bit-permuting network; and (f) equivalence among banyan-type network under cell rearrangement.

Since a switching network is a routable interconnection network in which every node is filled by a switch, the nature of a switch constructed from a switching network is determined by the attributes of both the interconnection network and the individual switching nodes.

Definition A18: "Preservation of a switch property by a network". Certain types of interconnection of the network nodes may preserve certain switch properties. A switch property is said to be "preserved" by a routable interconnection network if, when each node of the interconnection network is filled by a switch having this certain switch property, the overall realized switch also has this same switch property. Recursive application of this type of interconnection then leads to indefinitely large switches with the same property. Therefore, when a large switch with some desirable properties is to be built, if there exists certain types of interconnection which can preserve the said switch properties, then, instead of constructing it in one step, which is usually impractical, it can be constructed in recursive steps wherein each step is the proper interconnection of smaller switches having the same desirable properties such that these properties are always preserved in the recursion.

5. Multi-stage Interconnection Network

Definition A19: "multi-stage interconnection network". A "multi-stage interconnection network" (abbreviated "multi-stage network") is an interconnection network whose nodes are grouped into "stages" such that (a) every interconnection line is between two consecutive stages;
(b) every external input is on a first-stage node;
(c) every external output is on a final-stage node; and
(d) nodes within each stage are linearly ordered, starting from 0, as node 0, 1, 2, . . . .

When the number of stages is k, the multi-stage network is called a "k-stage network". A node in the $j^{th}$ stage is called a "stage-j node". An I/O of a stage-j node is called a "stage-j I/O".

Figure 6A:
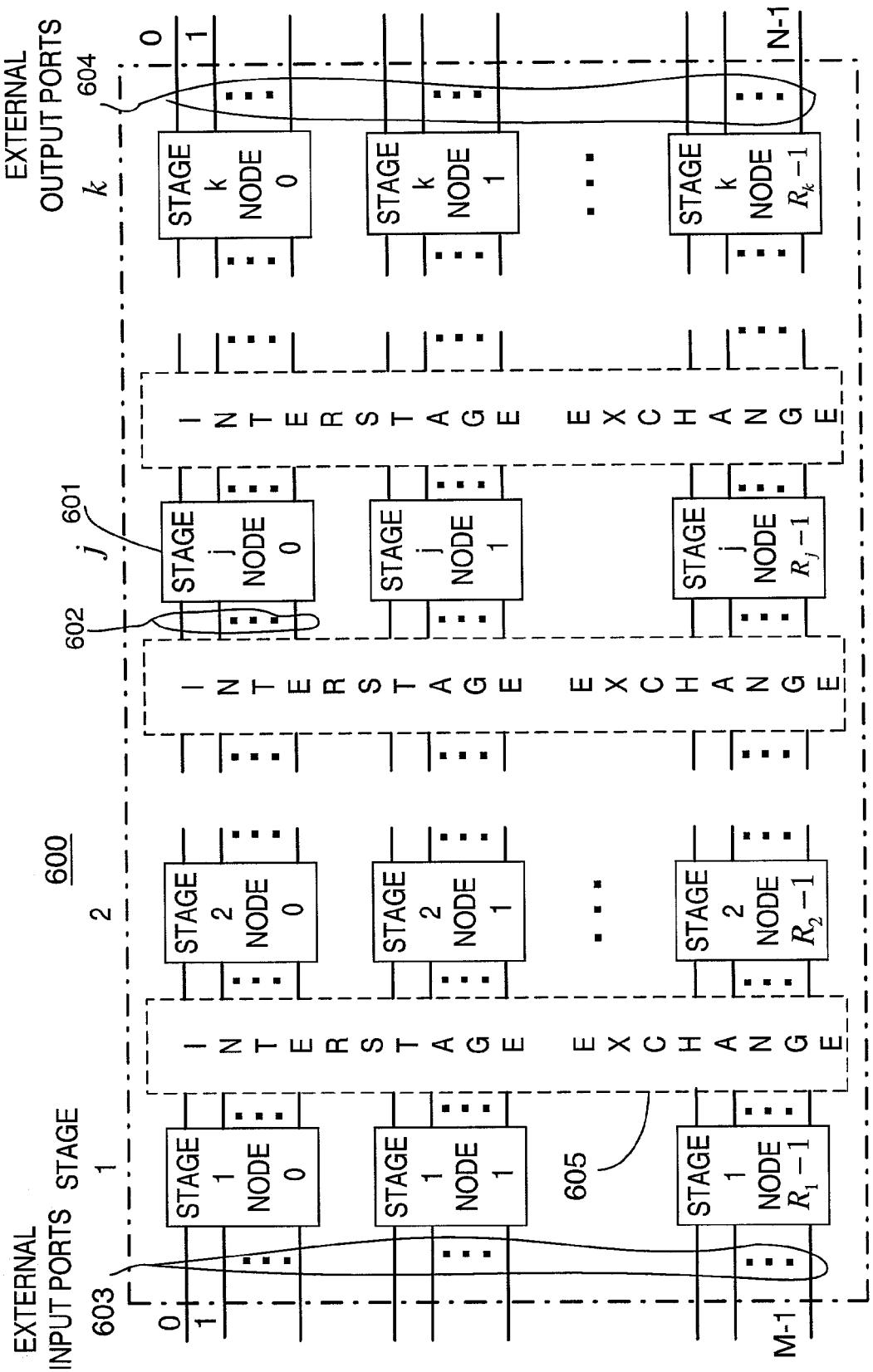
FIG. 6A depicts a generic M×N k-stage interconnection network illustrating the layout of such a network.
Figure 6B:
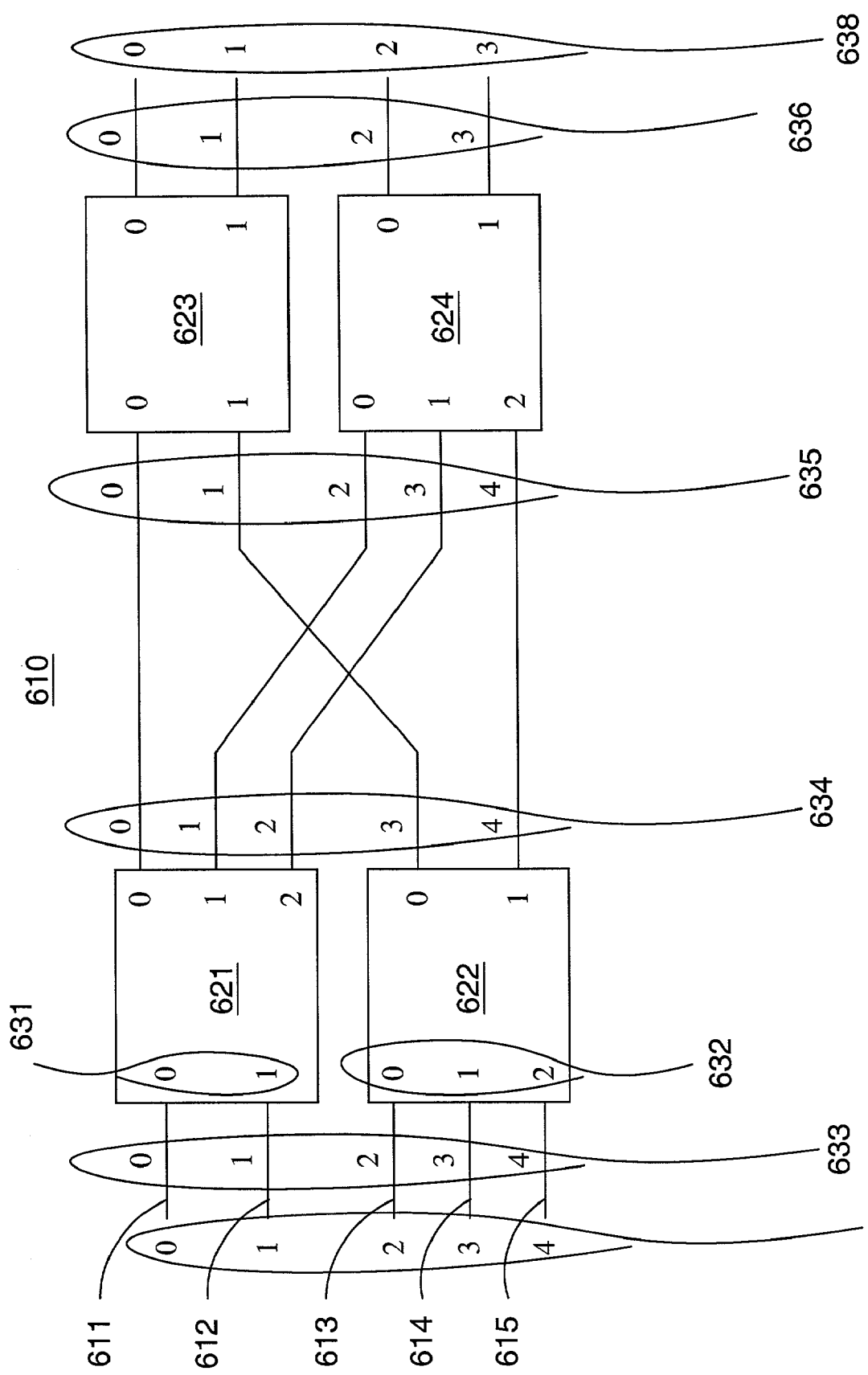
FIG. 6B depicts an exemplary 5×4 2-stage interconnection network conforming to the layout of FIG. 6A.

The graph representation of a multi-stage network is as follows, with the help of FIG. 6A and FIG. 6B. FIG. 6A shows a generic M×N k-stage network 600 while FIG. 6B shows a 5×4 2-stage network 610 as an example. As shown in FIG. 6A, the stages of a k-stage network 600 are arranged sequentially in a left-to-right manner by convention and linearly labeled as stage 1, 2, . . . , j, . . . , and k. All nodes in each stage are arranged sequentially in a top-to-bottom manner by convention and linearly labeled as node 0, 1, 2, . . . . For example, let $R_j$ be the number of nodes in stage j, then the nodes in stage j are linearly labeled as node 0, 1, 2, . . . , $R_{j-1}$. According to the "left-in-right-out" convention, all ports on the left-hand-side of a node are the input ports of that node, and all ports on the right-hand-side of a node are the output ports of that node.

Definition A20: "induced I/O order at each stage". The I/O ports on each node (e.g., 602) are also arranged sequentially in a top-to-bottom manner by convention and linearly labeled as I/O port 0, 1, 2, . . . , of that node. In the scope of a stage, all stage-j I/O ports are sequentially arranged by concatenating the IUO ports of all stage-j nodes according to the linear order of the node within the stage so as to form a single array and linearly labeled from top to bottom as I/O port 0, 1, 2, . . . , of stage j. In other words, the linear order among stage-j nodes induces a linear order among stage-j I/O by concatenating the I/O arrays of all stage-j nodes into a single array. This is called the "induced order" on stage-j I/O. The label of an I/O port in a stage is also called the "address of the I/O port" in that stage.

For example, as shown in FIG. 6B, the two inputs (611, 612) on stage-1 node 0 (621) are locally labeled as input 0 and 1 (631), and the three inputs (613, 614, 615) on stage-1 node 1 (622) are locally labeled as input 0, 1 and 2 (632). Then the induced order on these five stage-1 inputs are 0, 1, 2, 3 and 4 (633) as in the scope of the stage. Similarly, the induced orders on the five stage-1 outputs, the five stage-2 inputs and the four stage-2 outputs are 0, 1, 2, 3, 4 (634), 0, 1, 2, 3, 4 (635) and 0, 1, 2, 3 (636), respectively. Note that in graph representation, the labels for the local I/O orders and the induced I/O orders are usually not shown unless they need to be explicitly referred to. The external inputs of a multi-stage network are the same as stage-1 inputs, and external outputs are the same as final-stage outputs.

Definition A21: "default external I/O order". The induced order of stage-1 inputs and of final-stage outputs of a multi-stage network is called the "default system" of an external I/O order, or simply the "default external I/O order". In other words, in a conventional graph representation, the default external input order and the default external output order of a M×N multi-stage network, are 0, 1, . . . , M−1 and 0, 1, . . . , N−1, respectively, in the top-down manner. For example, as shown in FIG. 6B, the default external input order 0, 1, 2, 3, 4 (637) is the same as the induced order of stage-1 inputs (633) and, similarly, the default external output order 0, 1, 2, 3 (638) is the same as the induced order of stage-2 (final-stage) outputs (636).

Figure 6C:
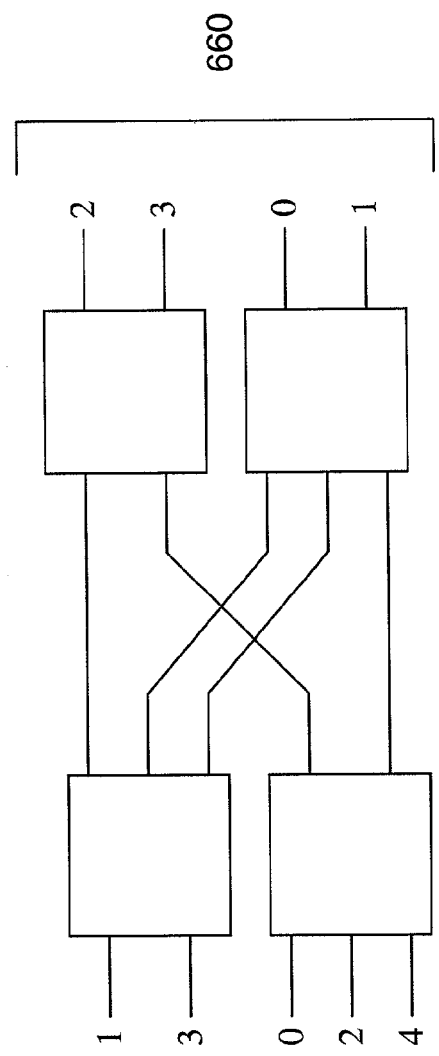
FIG. 6C depicts one illustrative manner of prescribing an external input/output order on a multi-stage network.

When an external I/O order on a multi-stage network is prescribed, it may or may not coincide with the default system. In the graph representation, one way to indicate a prescribed external I/O order is by numerical addresses starting from 0 on both sides of the multi-stage network. This is illustrated by the drawing 660 in FIG. 6C. The numerical labeling, however, does not work well in the graph representation when the multi-stage network is to be linked to other networks. The preferred representation of external I/O order is to split the double identities between an external input and a stage-1 input and also between an external output and a final-stage output; the split identities are then indicated by two separate points interconnected with a straight line. In the conventional graph representation, the stage-1 inputs remain attached to stage-1 nodes. Meanwhile, points representing external inputs are lined up vertically and placed to the left ,of the stage-1 nodes. Symmetric arrangement applies to the output side as well. This graph representation of the prescribed external I/O order is illustrated as the network 670 in FIG. 6D as depicted by reference numerals 681 and 683. Reference numeral 682 shows the interconnection between stage 1 and stage 2.

6. Exchanges in the Multi-stage Network

For a k-stage network, it is said to be interconnected in the sense that each stage-j output port is connected to a distinct stage-(j+1) input port, for 1≦j<k, by one and only one interconnection line in a one-to-one manner. This implies that, for any k-stage network, the number of stage-j output ports, for 1≦j<k, must be the same as that of stage-(j+1) input ports.

Definition A22: "interstage exchange", "input exchange", and "output exchange". The pattern defined by the interconnection lines between two consecutive stages of a multi-stage network is called the "interstage exchange" which defines a one-to-one correspondence from outputs of the front stage to inputs of the hind stage. For example, in FIG. 6A, the interconnection lines in each column (not specifically drawn) between any two neighboring stages define an interstage exchange (e.g., 605). Recall that when the prescribed external I/O order of a multi-stage network does not coincide with the default external I/O order, the double identities between an external input and a stage-1 input and between an external output and a final-stage output are split into two separate points which are joined by a straight line. The straight lines representing the prescribed external input order form a pattern which called the "input exchange". Similarly, the pattern formed by the straight lines representing the prescribed external output order is called the "output exchange". The input and output exchanges are abbreviated as the "I/O exchanges". Therefore, the input exchange and output exchange of a multi-stage network can be regarded as the address conversions from the prescribed input order to the default external input order, and from the prescribed output order to the default external output order, respectively. Note that in a graph representation of a multi-stage network, there is no difference between the interstage exchanges and I/O exchanges. In the real implementations, however, the interstage exchanges are realized by the physical wirings while the I/O exchanges may or may not be. Recall that the I/O exchanges represent the address conversions, so they can be virtually implemented by explicitly labeling each individual I/O port with an address according to the prescribed order or physically implemented by wirings, depending on the situation.

Figure 6D:
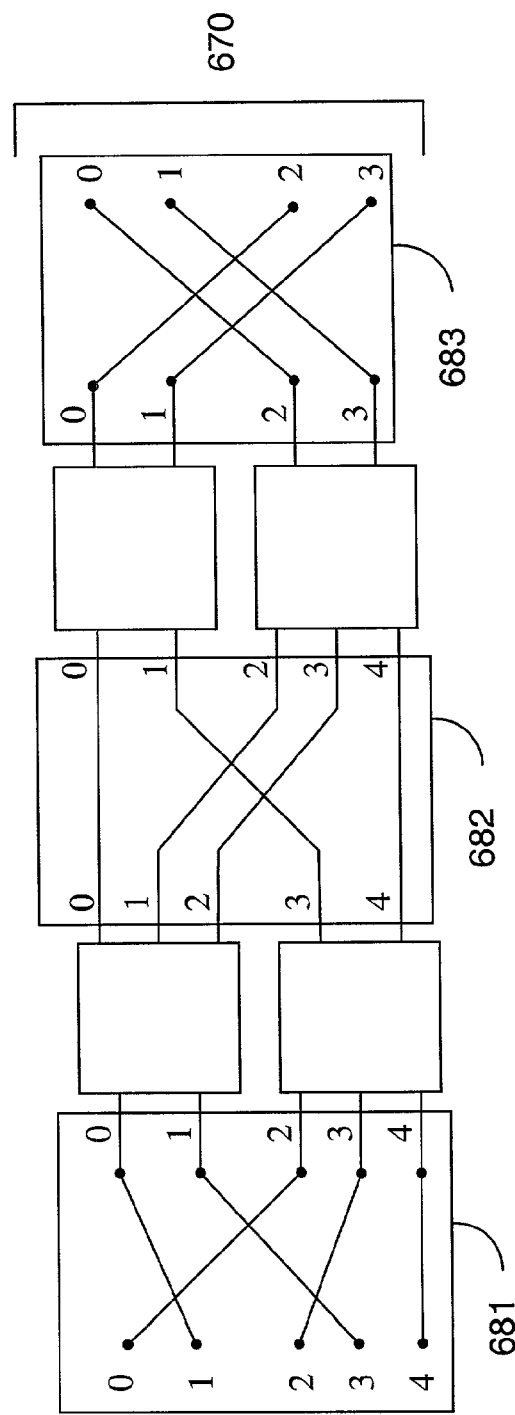
FIG. 6D depicts one illustrative manner of splitting the prescribed external input/output order for purposes of linking one multi-stage network to another multi-stage network.

Definition A23: "K×K exchange". Any exchange defines a one-to-one correspondence from the points on its left-hand-side to the points on its right-hand-side. When the exchange is connecting K pairs of points, it is called a "K×K exchange". Since the K points on each of the two sides of the K×K exchange are labeled with the addresses from 0 to K−1, each interconnection line in the exchange maps (or more formally, permutes) an address in the range from 0 to K−1 to another address also in the range from 0 to K−1. Thus the K×K exchange can be defined as a permutation of addresses from 0 to K−1. For example, the 2-stage network shown in FIG. 6D is equipped with the input exchange 681, $0 \mapsto 2$, $1 \mapsto 0$, $2 \mapsto 3$, $3 \mapsto 1$, $4 \mapsto 4$, and the output exchange 683, $0 \mapsto 2$, $1 \mapsto 3$, $2 \mapsto 0$, $3 \mapsto 1$. Meanwhile the interstage exchange 682 is $0 \mapsto 0$, $1 \mapsto 2$, $2 \mapsto 3$, $3 \mapsto 1$, $4 \mapsto 4$.

Figure 6E:
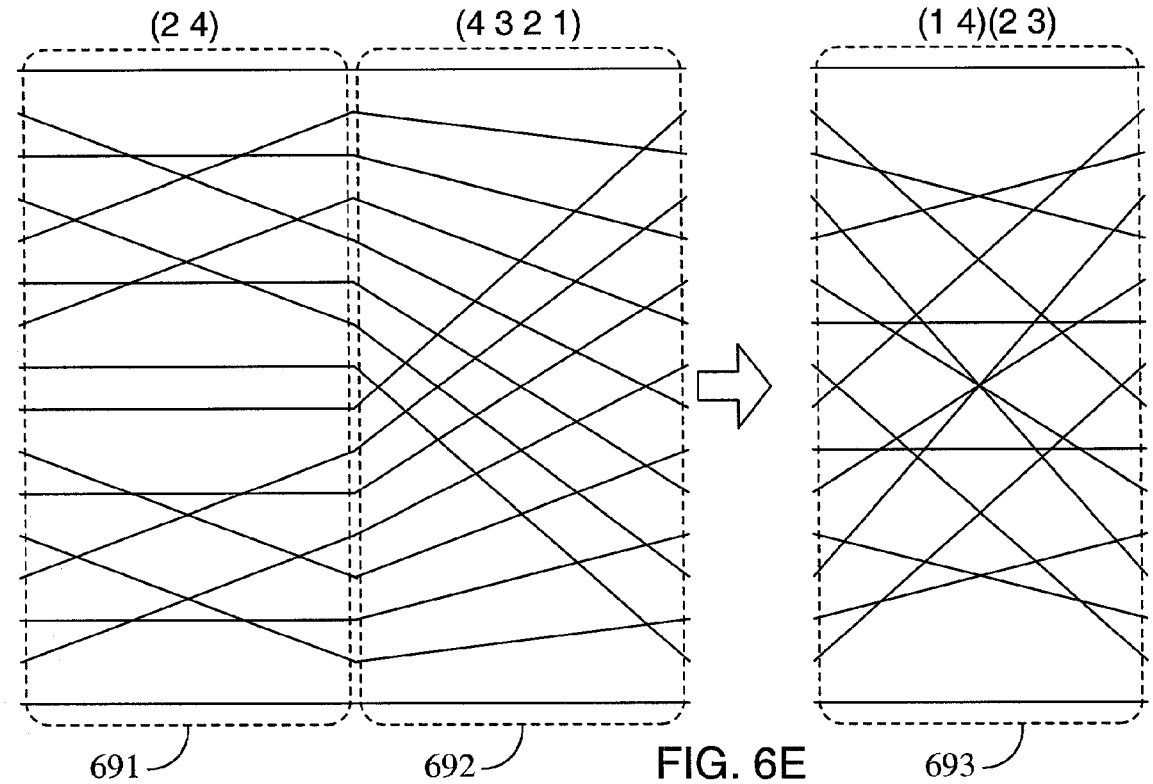
FIG. 6E depicts the results of the product of two 16×16 exchanges in one order.
Figure 6F:
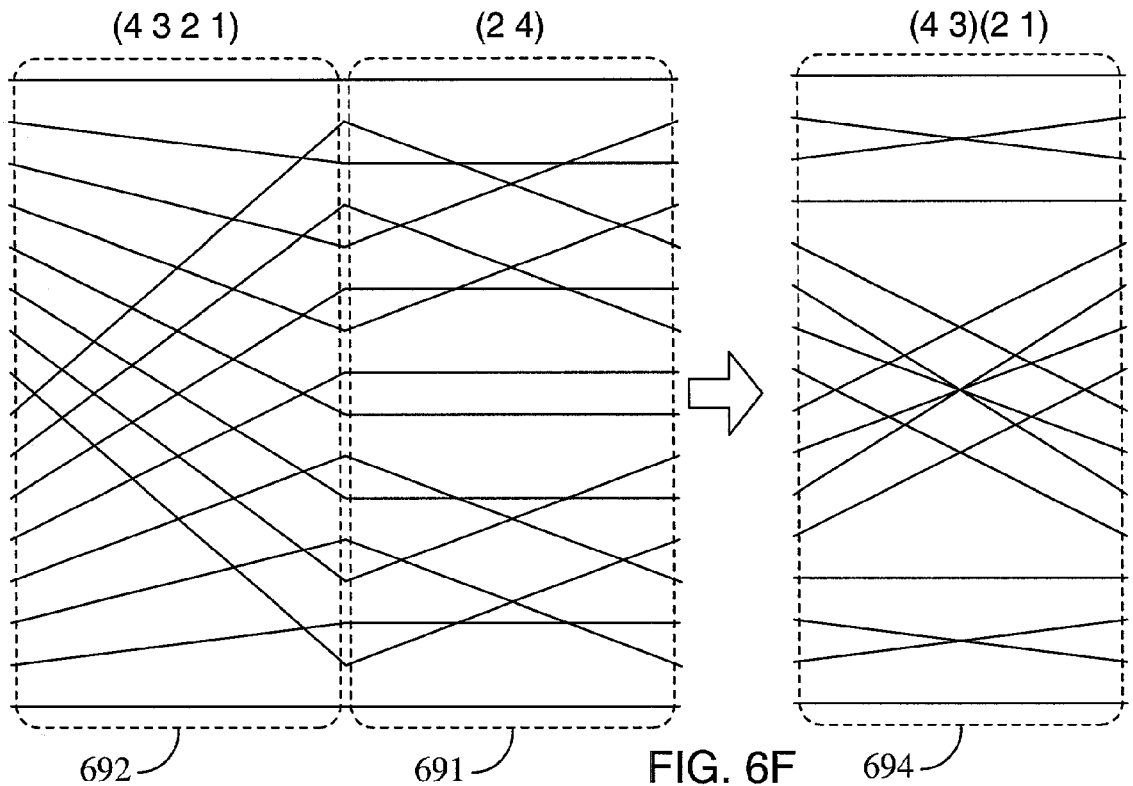
FIG. 6F depicts the results of the product of the same two exchanges in FIG. 6E but in reverse order.

Definition A24: "product of two exchanges". An K×K exchange $X_3$ is said to be the product of two K×K exchanges $X_1$ and $X_2$, which is written as $X_3 = X_1 X_2$, when the permutation due to the exchange $X_3$ is equivalent to the combined effect of the sequential application of the permutations due to $X_1$ and then $X_2$. Note that $X_1 X_2 \neq X_2 X_1$ in general. In graph representation, the product of two exchanges can easily be obtained from the two exchanges by replacing each pair of two connected line segments, each from one exchange, with a single straight line. For example, as shown in FIG. 6B, the product of two 16×16 exchanges 691 and 692 is the 16×16 exchange 693. The product of the same two exchanges, but in reversed order, that is, the exchange 692 is now in front of 691, as shown in FIG. 6F, results in a different exchange 694.

The I/O exchanges, together with the interstage exchanges, are called the "exchanges in the multi-stage network". Therefore, there are four versions of a multi-stage network: with and without an input exchange and with and without an output exchange. The default version, as shown in FIG. 6A, is without the I/O exchanges. Note that the routability of a multi-stage network relies only on the interstage exchanges, not the I/O exchanges, since the I/O exchanges do not alter the intrinsic connectivity of the network.

Figure 7:
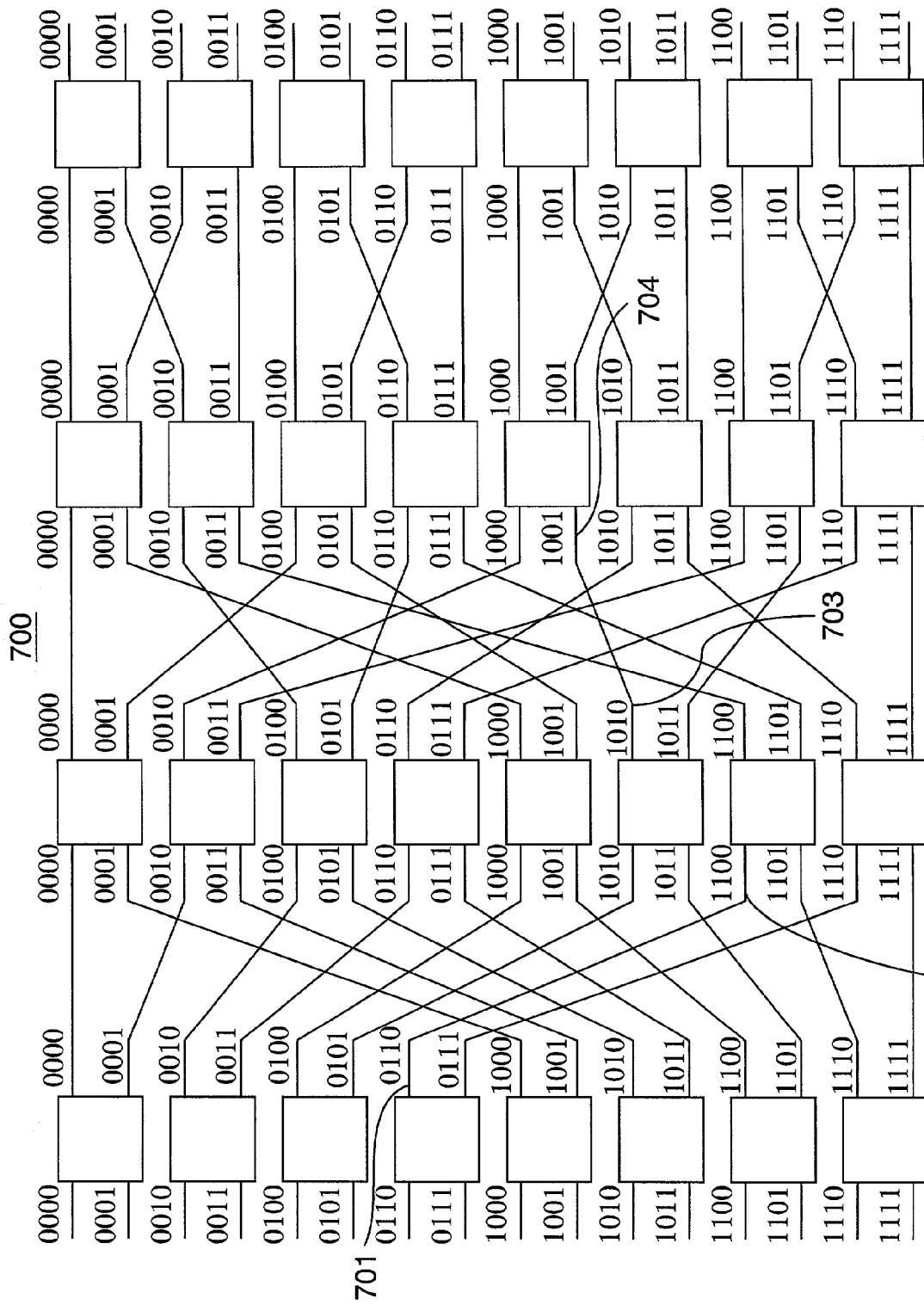
FIG. 7 depicts a 16×16 4-stage network as an example of a $2''\times2''$ multi-stage network where n=4.

For a $2^n \times 2^n$ multi-stage interconnection network, the addresses of I/O ports can be expressed as n-bit binary numbers. For example, FIG. 7 shows a 16×16 4-stage network 700 as an example of $2^n \times 2^n$ multi-stage network where n=4. All of the I/O ports of the 16×16 4-stage interconnection network 700 are linearly ordered in a top-to-bottom manner with each labeled with a 4-bit binary number.

A special kind of $2^n \times 2^n$ exchange is called a "bit-permuting exchange" when each of the $2^n$ interconnection lines in the exchange maps a binary address $O_1 O_2 \ldots O_n$ of an output port in a stage to a binary address $I_1 I_2 \ldots I_n$ of an input port in the next succeeding stage in such a way that each mapping is restricted to be a "bit-permutation" by which $O_1 O_2 \ldots O_n$ and $I_1 I_2 \ldots I_n$ can be transformed to each other by only permuting the positions of the bits, that is, in other words, the numbers of 0's and 1's will not be altered.

For example, as shown in FIG. 7, the line connecting from the output port 701 labeled with the address 0110 to the input port 702 in the next stage labeled with the address 1100 corresponds to a bit-permutation which, in particular, is an 1-bit left-rotation (or equivalently 3-bit right-rotation) of the address 0110 to give the address 1100. For another example, the line connecting from the output port 703 labeled with the address 11010 to the input port 704 in the next stage labeled with the address 1001 can be regarded as a bit permutation of the binary address defined as: the $1^{st}$ bit is shifted to the $4^{th}$ place, the $4^{th}$ bit to $2^{nd}$ place, the $2^{nd}$ bit to $3^{rd}$ place, and the $3^{rd}$ bit to $1^{st}$ place.

Among infinitely many multi-stage networks with different sizes, a class of $2^n \times 2^n$ network is of particular interest when all nodes in the network are 2×2 and every exchange in it is bit-permuting. Such kind of $2^n \times 2^n$ multi-stage networks are called the "bit-permuting networks". Since a bit-permuting network can be completely determined by specifying each exchange in it, and each exchange corresponds to a particular bit permutation on the binary addresses, a bit-permuting network can thus be simply defined by a sequence of bit-permutations, which is particularly useful when analyzing its network properties, Further details about the bit-permuting network will be given in the sequel.

B. 2-stage Interconnection

1. Plain 2-stage Interconnection Network

Definition B 1: "plain 2-stage interconnection network". The "plain 2-stage interconnection network with parameter m and n", denoted as 2Stg(m, n), is composed of n m×m input nodes and m n×n output nodes such that, for $0 \leq x < m$ and $0 \leq y < n$, there is a interconnection line from the $x^{th}$ output of the $y^{th}$ input node to the $y^{th}$ input of the $x^{th}$ output node. This type of construction procedure is referred to as the "plain 2-stage interconnection". The interconnection lines form the interstage exchange. There are no I/O exchanges in this construction.

The input and output nodes are called the "stage-1 node" and "stage-2 node", respectively, and the I/O of a stage-1 node (resp. stage-2 node) are called "stage-1 I/O" (resp. "stage-2 I/O"). When every node in 2Stg(m, n) is replaced by a switch, the result is an nm×nm switching network.

EXAMPLE 1

Figure 8:
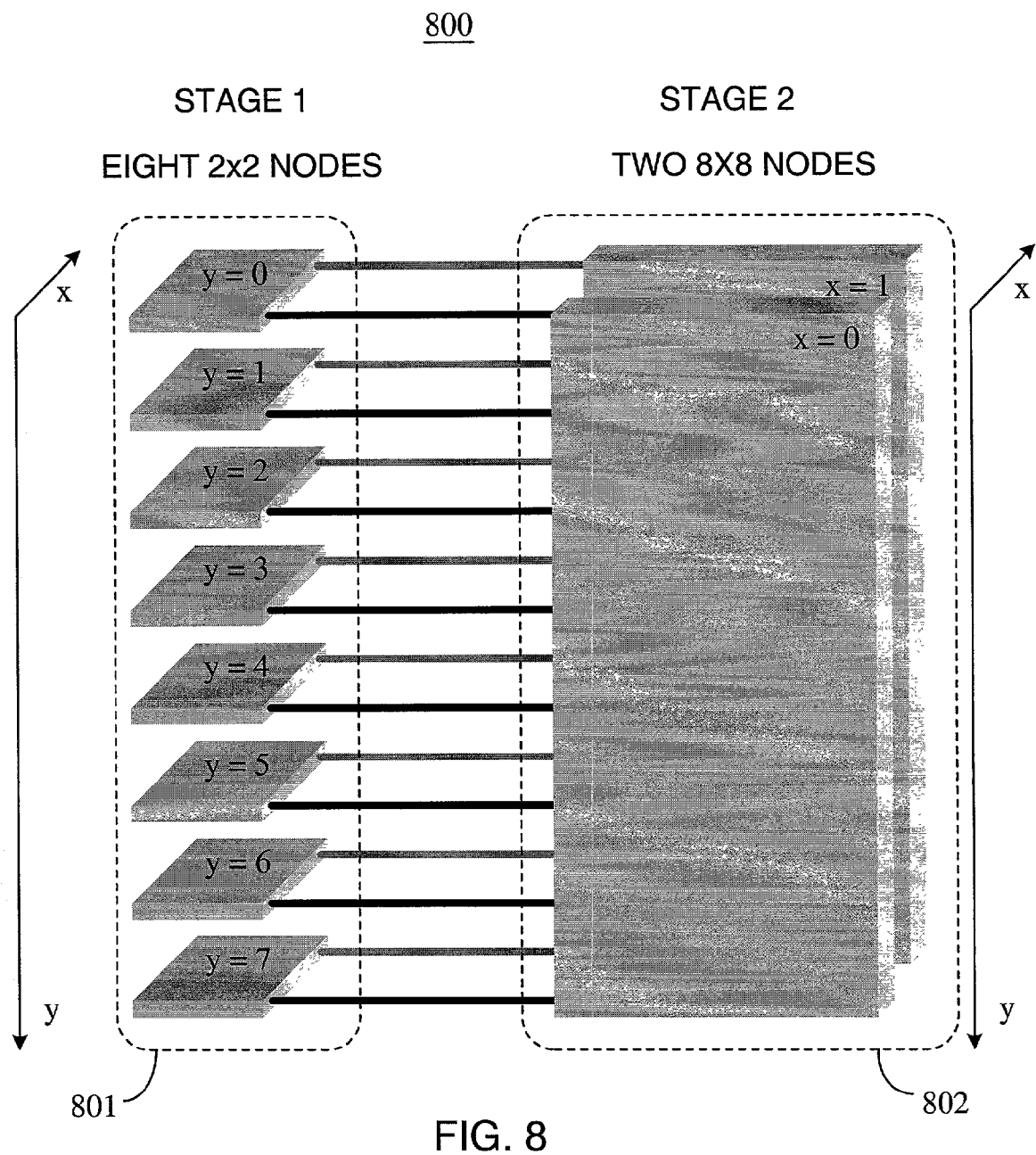
FIG. 8 depicts an exemplary plain 2-stage interconnection network with parameters m=2 and n=8.

As illustrated in FIG. 8, an interconnection line connects every node in the horizontal plane to every node in the perpendicular plane, respectively. By convention, it can be assumed that signals enter the network from the left. Thus, the eight nodes (801) in the horizontal plane are called the stage-1 nodes, and the two nodes (802) in the perpendicular plane are called the stage-2 nodes, resulting in 2Stg(2, 8) (800). When every node is replaced by a switch, the result is a 16×16 switching network.

2. Addressing Schemes and Coordinate Interchange

By convention, the input nodes of a 2Stg(m, n) are labeled by y=0, 1,, ..., n−1 and output nodes by x=0, 1, ..., m−1, as the same manner employed in FIG. 8. Recall from the Definitions A20, the node ordering at each of the two stages naturally induces an ordering on the I/O at that stage, which appears as an array of addresses 0, 1, 2, ..., arranged in the top-down manner in the conventional graph representation. Therefore, under the "linear addressing scheme" of 2Stg(m, n), the $x^{th}$ I/O of the $y^{th}$ input node, $0 \leq x < m$ and $0 \leq y < n$, is at address my+x, and the $y^{th}$ I/O of the $x^{th}$ output node is at address nx+y. The range is from 0 to mn−1. The interstage exchange is the mapping: my+x→nx+y.

Under the "vector addressing scheme" of 2Stg(m, n), the $x^{th}$ I/O of the $y^{th}$ input node is at the vector address (y, x), and the $y^{th}$ I/O of the $x^{th}$ output node is at the vector address (x, y), for $0 \leq x < m$ and $0 \leq y < n$. The aforementioned linear address follows the lexicographic order of the vector address. In particular, the linear addresses of stage-1 I/O follows the (y, x) lexicographic order of stage-1 I/O, and the linear addresses of stage-2 I/O follows the (x, y) lexicographic order of stage-2 I/O. The interstage exchange, in terms of the vector address, is simply the interchange between the x and y components of the vector address: (y, x)→(x, y).

For this reason, the interstage exchange inside the 2-stage interconnection network is also referred as the "coordinate interchange", even when no particular addressing scheme is specified.

EXAMPLE 2

Figure 9:
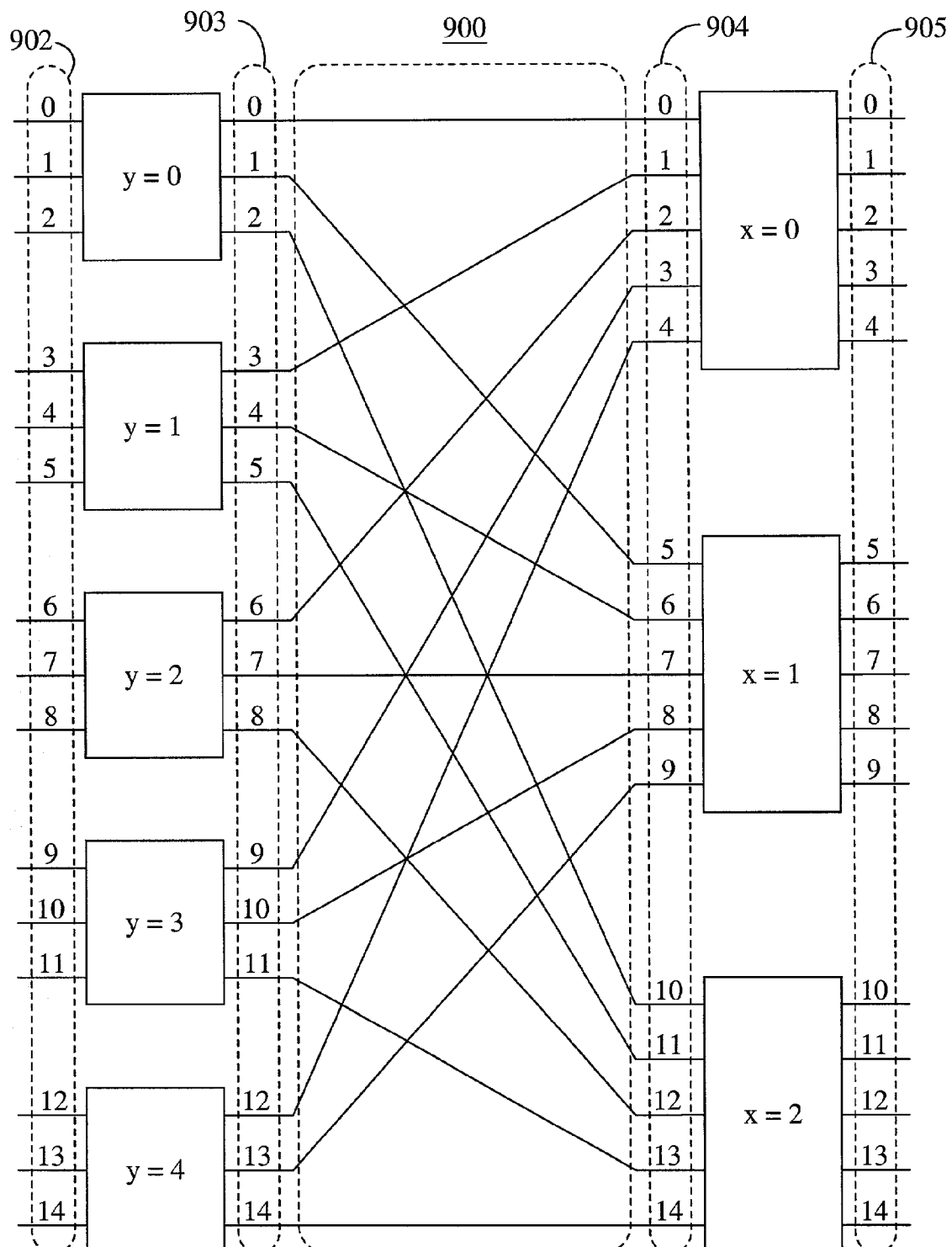
FIG. 9 depicts the linear addressing scheme on an exemplary 2-stage interconnection network.

A 2Stg(m, n) with m=3 and n=5 can be represented by each of the aforementioned addressing schemes. FIG. 9 shows the network 900 under the linear addressing scheme, in which the stage-1 I/O (902, 903) and stage-2 I/O (904, 905) are addressed in the naturally induced I/O order. The element 901 is the interstage exchange which connects each stage-1 output port with the address in the form 3y+x, e.g. 11=3×3+2, to the stage-2 input port with the address 5x+y, e.g. 5×2+3=13, for x=0, 1, 2 and y=0, 1, 2, 3, 4. When represented under the vector addressing scheme as in FIG. 10, in which the addresses of the stage-1 (1002, 1003) and stage-2 (1004, 1005) nodes of the network 1000 are shown in 2-dimensional vector form, one can readily see that the interstage exchange 1001, also named as coordinate interchange, maps each stage-1 output address in the form (y, x) to the corresponding stage-2 input address (x, y), thus the interchange of the coordinates in the vector addresses is clear.

3. 2X and X2 Interconnection Networks

For the plain 2-stage interconnection network, the default external I/O order (Definition A21) follows the (y, x) lexicographic order of stage-1 input addresses and the (x, y) lexicographic order of stage-2 output addresses. Two other systems of external I/O order for the 2-stage interconnection network are described as follows.

Definition B2: "2X interconnection network". The "(y, x) system" of external I/O order of the 2Stg(m, n) follows the (y, x) lexicographic order of both stage-1 input addresses and stage-2 output addresses. This system differs from the default system only in the external output order. Recall from the Definition A22, the external output order in the (y, x) system, since being different from the default external output order, induces an output exchange. This output exchange converts from the (x, y) lexicographic order on stage-2 outputs to the (y, x) lexicographic order on external outputs; thus it is the inverse coordinate interchange, that is, an mirror image of the interstage exchange. The same construction procedure as the plain 2-stage interconnection, but with the inverse coordinate interchange appended as the output exchange, is referred to as the 2-stage interconnection with an output exchange, or simply as the "2X interconnection". A network so constructed is called a "2X interconnection network". The 2X version of a 2Stg(m, n), that is, the 2X interconnection network with parameter m and n, is denoted as 2X(m, n). Data signal progresses through a generic 2X interconnection network along the path specified by path diagram 1100 in FIG. 1A.

EXAMPLE 3

Figure 12:
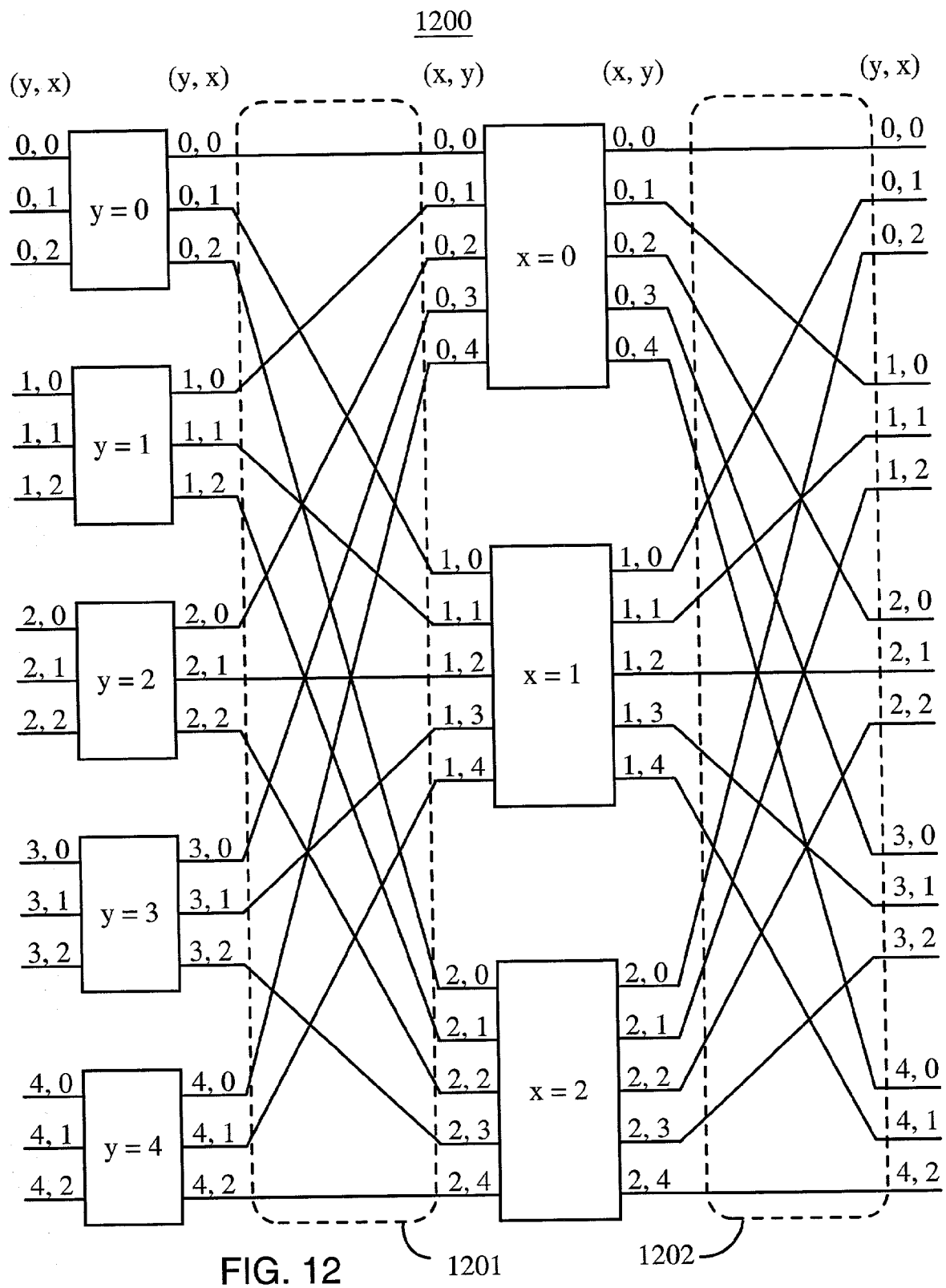
FIG. 12 depicts an exemplary 2-stage interconnection with an output exchange for a 3×5 2-stage interconnection network.

A 2X version of 2Stg(3,5) is the network 1200 as shown in FIG. 12. The output exchange 1202, which is the inverse of the coordinate interchange 1201, is appended to the 2Stg(3,5) (1000) in FIG. 10.

Definition B3: "X2 interconnection network". The "(x, y) system" of external I/O order of the 2Stg(m, n) follows the (x, y) lexicographic order of both stage-1 input addresses and stage-2 output addresses. This system differs from the default system only in the external input order. The external input order in the (x, y) system, since being different from the default external input order, induces an input exchange. This input exchange converts from the (y, x) lexicographic order on stage-1 inputs to the (x, y) lexicographic order on external inputs, thus it is again the inverse coordinate interchange, that is, an mirror image of the interstage exchange. The same construction procedure as the plain 2-stage interconnection, but with the inverse coordinate interchange prepended as the input exchange, is referred to as the 2-stage interconnection with an input exchange, or simply as the "X2 interconnection". A network so constructed is called an "X2 interconnection network". The X2 version of a 2Stg(m, n), that is, the X2 interconnection network with parameter m and n, is denoted as X2(m, n). Data signal progresses through a generic X2 interconnection network along the path specified by path diagram 1110 in FIG. 1B.

EXAMPLE 4

Figure 13:
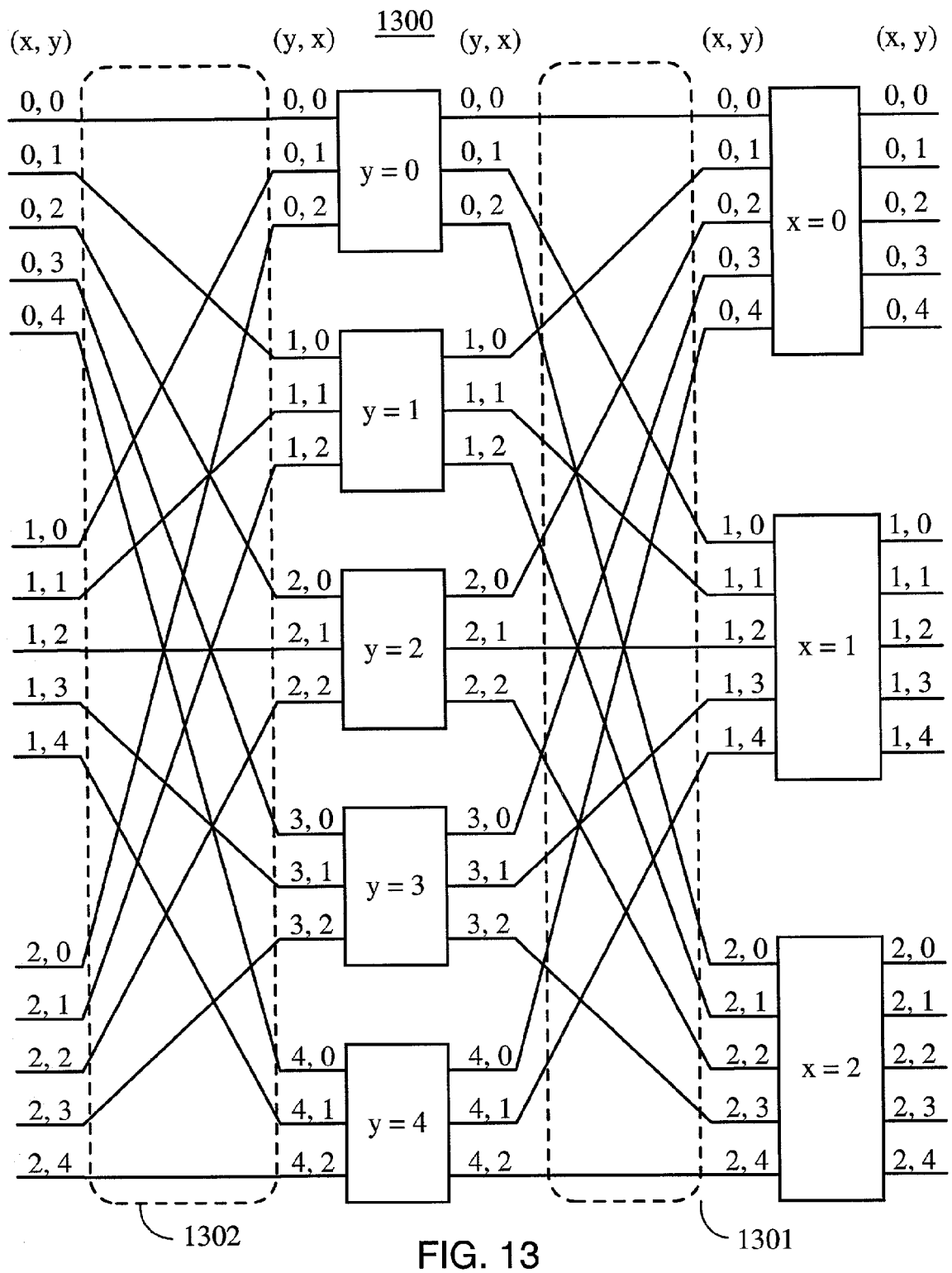
FIG. 13 depicts an exemplary 2-stage interconnection with an input exchange for a 3×5 2-stage interconnection network.

An X version of 2Stg(3,5) is the network 1300 as shown in FIG. 13. The input exchange (1302), which is the inverse of the coordinate interchange (1301), is prepended to the 2Stg (3,5) (1000) in FIG. 10.

The above three types of networks and the corresponding construction procedures will be regarded as three versions of "2-stage interconnection network" and "2-stage interconnection", respectively.

Figure 11A:
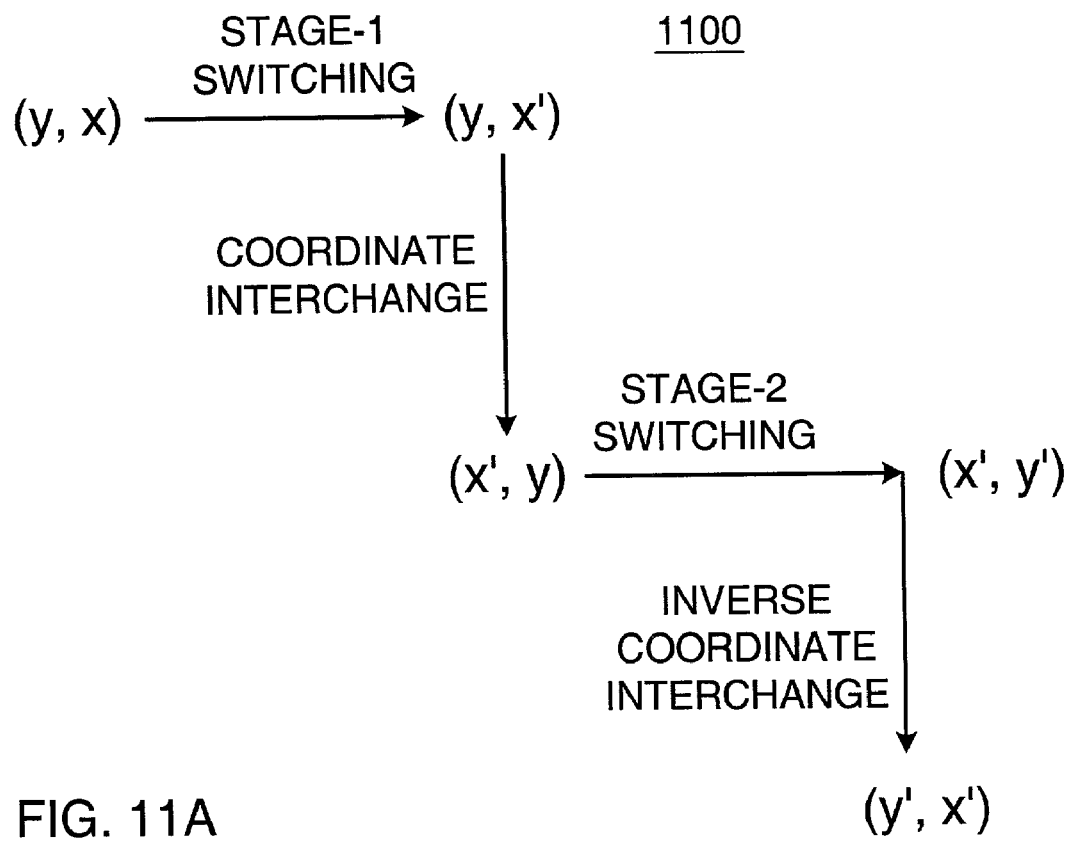
FIG. 11A depicts the manner in which a data signal progresses through a generic 2-stage interconnection network with an output exchange.
Figure 11B:
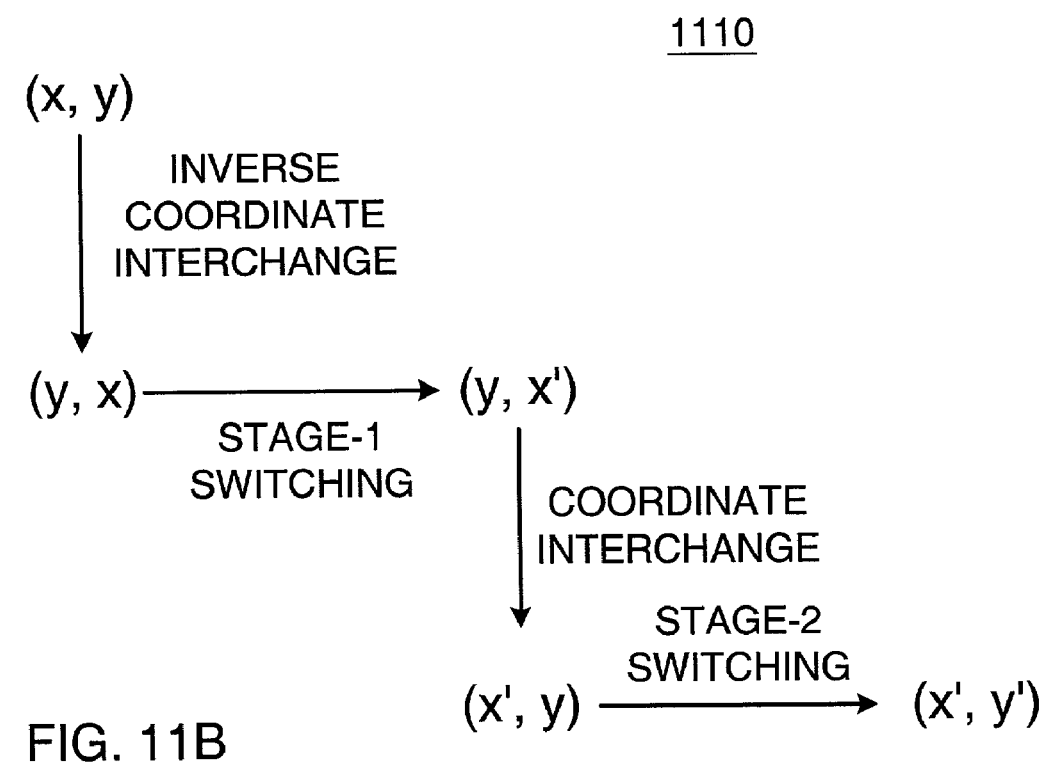
FIG. 11B depicts the manner in which a data signal progresses through a generic 2-stage interconnection network with an input exchange.

Since the existence of the input exchange or output exchange in a 2-stage interconnection network is basically due to the different ordering systems adopted by the network, the I/O exchanges can be implemented, as alluded to in the Definition A22, either in virtual by address labeling or in real by physical wiring. In graph representation, however, the I/O exchanges are always explicitly drawn in the manner shown in FIGS. 11 and 12.

4. Generalization of 2-stage Interconnection

Recall that the routability of an interconnection network only depends on the intrinsic internal connectivity of the network; thus for any multi-stage network, the routability depends on its interstage exchanges only, and for a 2-stage network, in particular, depends only on its single interstage exchange. Specifically, the necessary condition for ensuring the routability of any 2-stage interconnection network is the existence of an interconnection line from every input node to every output node, or equivalently, the condition is that the output ports of each input node are linked with distinct output nodes, and the input ports of each output node are linked with distinct input nodes. Recall that the interstage exchange of a 2Stg(m, n) is the coordinate interchange, which requires the existence of an interconnection line from the x-th output port of the y-th input node to the y-th input port of the x-th output node for $0 \leq x < m$ and $0 \leq y < n$, and the routability is thus guaranteed. It is clear that the coordinate interchange is just a special case of those interstage exchanges preserving the routability of a 2-stage interconnection network. The reason for adopting the coordinate interchange as the interstage exchange is the translation from the 3-dimensional representation of two orthogonal stacks of planes to the planar graph representation. This reason alone of course does not preclude alternative interstage exchanges, as long as they also guarantee the routability. Therefore, a "generalized 2-stage interconnection network" is a 2-stage network interconnected in such a way that its interstage exchange fulfils the aforementioned necessary condition for routability, and such kind of interconnection is called the "generalized 2-stage interconnection". In short, a generalized 2-stage interconnection network is just a routable 2-stage network.

Note that the 2-stage interconnection network of any version can even be generalized in such a way that the input node can be of size p×m and the output node can be of size n×q, where p may or may not be equal to m, and q may or may not be equal to n. Then the overall network would be of size pn×mq, and is said to be with parameter m, n, p, and q. When every node is replaced by a switch, the result is a pn×mq switching network. For simplicity, the 2-stage interconnection networks of any version appearing in the context are of the type with parameter m and n only.

5. Recursive 2-stage Construction

Definition B4. "plain 2-stage tensor product, 2X tensor product, and X2 tensor product between two multi-stage networks". Let $\Phi$ be an M×M i-stage network and $\Psi$ an N×N j-stage network. Fill the role of each input node in a plain 2-stage interconnection network with parameter M and N (2Stg(M, N)) with a copy of $\Phi$ and each output node with $\Psi$. Ungroup nodes and lines inside every node so that they become elements directly belonging to the whole construction. The result is a MN×MN (i+j)-stage network, which is called the "plain 2-stage tensor product of $\Phi$ and $\Psi$".

If the plain 2-stage interconnection network (2Stg(M, N)) in this definition is replaced by the 2X interconnection network with parameter M and N (2X(M, N)), then the resulting MN×MN (i+j)-stage network is called the "2X tensor product of $\Phi$ and $\Psi$".

If the 2Stg(M, N) in the definition is replaced by X2(M, N), then the resulting MN×MN (i+j)-stage network is called the "X2 tensor product of $\Phi$ and $\Psi$".

The above three types of tensor products will be regarded as three versions of "2-stage tensor product".

Similar to the 2-stage interconnection networks, 2-stage tensor product of any version can also be generalized to be the tensor product of a P×M network and a N×Q network, resulting a PN×MQ network, but the immediate focus is still on the type with parameter M and N only.

Figure 10:
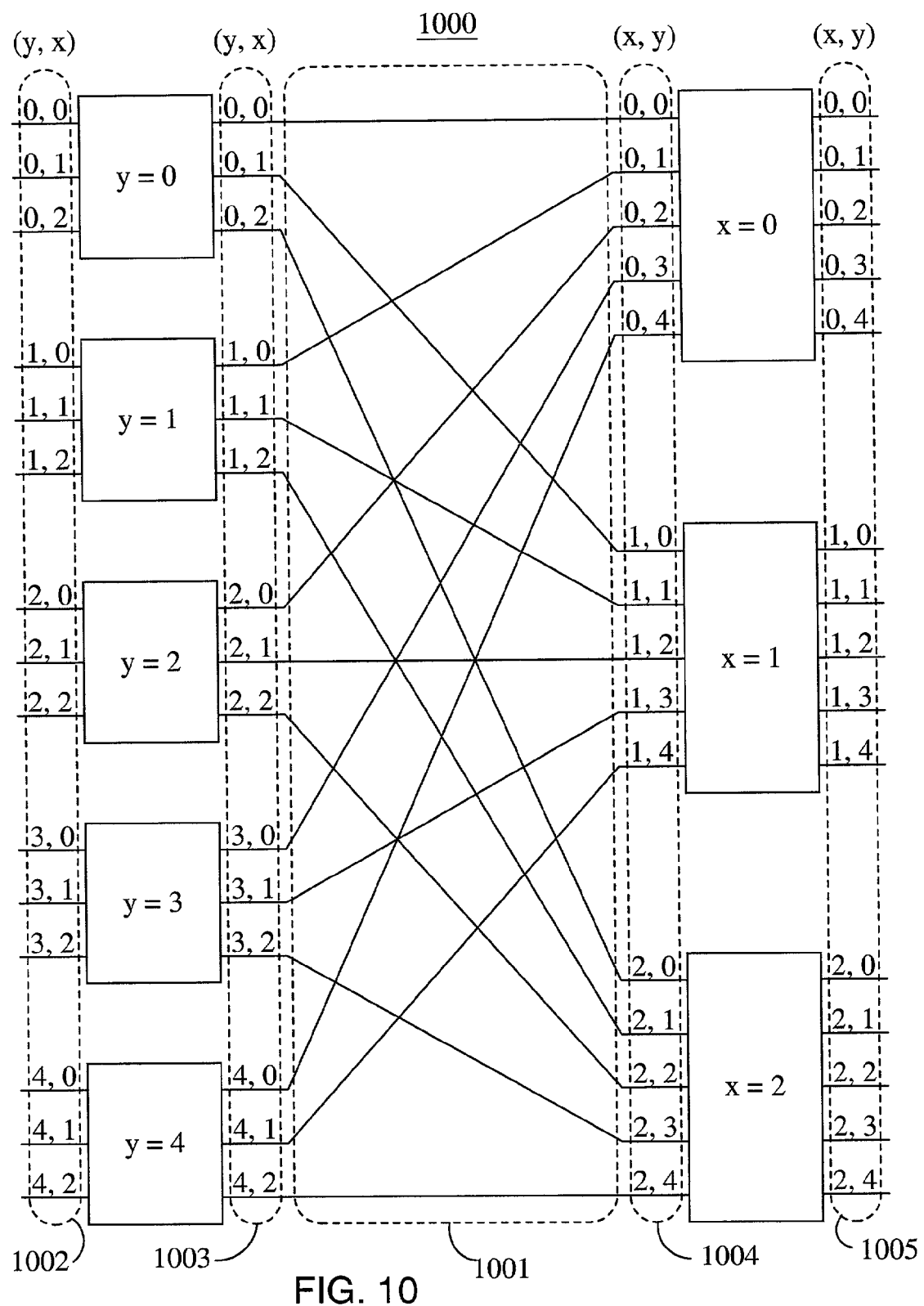
FIG. 10 depicts the vector addressing scheme on the same exemplary 2-stage interconnection network as in FIG. 9.

For example, if we let $\Phi$ be a 3×3 single node network and $\Psi$ be a 5×5 single node network, then the plain 2-stage tensor product of $\Phi$ and $\Psi$ would be the 15×15 2-stage network 1000 shown in FIG. 10, the 2X tensor product of $\Phi$ and $\Psi$ would be the 15×15 2-stage network 1200 shown in FIG. 12, and the X2 tensor product of $\Phi$ and $\Psi$ would be the 15×15 2-stage network 1300 shown in FIG. 13.

In the above definition, the network $\Phi$ may be by itself a tensor product of two smaller networks and so may be $\Psi$. Thus the mechanism of forming tensor products can be recursively invoked. Through a recursive procedure in forming tensor products, a large multi-stage network can be constructed from smaller multi-stage networks and ultimately from single-node networks. The following terminology is employed throughout the context. The recursive procedure in forming tensor products to construct a large multi-stage network is referred to as the "recursive applications of 2-stage interconnection" or "recursive 2-stage construction", or even simply "recursive construction" when 2-stage construction is understood in the context; the network so constructed from single-node networks is referred to as the "recursive 2-stage interconnection network". When referring to a particular one of the three types of the formation of tensor products, the terms "recursive plain 2-stage construction" ("recursive plain 2-stage interconnection network"), "recursive 2X construction" ("recursive 2X interconnection network"), and "recursive X2 construction" ("recursive X2 interconnection network") are correspondingly used. The single-node networks in the recursive construction are referred to as the "basic building blocks" or simply "building blocks" of the recursive construction. In general, the basic building blocks may include nodes of any size, as shown in FIG. 14, which includes 2×2, 3×3 and 5×3 nodes as basic building blocks. A special case of particular interest is when all basic building blocks are 2×2 nodes; the recursive construction then leads to a $2^k \times 2^k$ k-stage network for some k.

EXAMPLE 5

FIG. 14 shows how a 30×18 network is constructed from the recursive 2-stage construction with basic building blocks being 2×2, 3×3 and 5×3 nodes in two steps. Step 1: from the plain 2-stage tensor product of 2×2 single node network 1401 and 3×3 single node network 1402, a 6×6 network 1403 is resulted. Step 2: the plain 2-stage tensor product of the 6×6 network 1403 resulted in step 1 and 5×3 single node network 1404 gives the desired 30×18 network 1400.

The procedures in this recursive 2-stage construction can be logged by a binary tree diagram as shown in FIG. 15. "Binary tree" is a fundamental concept in computer science and can be found in any standard textbooks in computer science, especially those on data structures. The standard terms concomitant to this concept include "node of a tree", "root", "leaf", "internal node", "sub-tree", "left son", and "right son". The meanings of the terms adopted in this context are given as follows:

Every binary tree is rooted. The "root" is the unique node in the tree without a "father" (parent node). Every node (including the root) of a binary tree has either 0 or 2 "sons" (child nodes) and is accordingly called a "leaf" (with 0 sons) or an "internal node" (with 2 sons). A binary tree can be as small as a single-node tree, that is, it contains the "root" only. A node J is called a "descendant" of a node K if either J=K or, recursively, J is a descendant of a son of K. In a binary tree, a sub-tree rooted at a node J is the part of the binary tree spanning all of the descendants of J. A legitimate sub-tree of a binary tree can be as small as a leaf or as large as the entire tree. Every sub-tree of a binary tree is a binary tree. A binary tree can be represented by a planar graph with the root at the top level and every other node at one level lower than its father. In such a representation, the two sons of an internal node are called the "left-son" and the "right-son" according to their positions in the graph representation.

On the tree 1510 in FIG. 15 are a root 1511, an internal node 1512, and three leaves 1513, 1514, and 1515. The three leaves 1513, 1514, and 1515 correspond, respectively, to the three basic building blocks, that is, the 2×2 network 1401, the 3×3 network 1402, and the 5×3 network 1404 in FIG. 14. The sub-tree 1516 rooted at the internal node 1512 corresponds to the intermediate 6×6 network 1403, and the entire binary tree 1510 corresponds to the overall 30×18 network 1400. From the construction point of view, the internal node 1512 represents the first step in the above recursive 2-stage construction, that is, the step of constructing the 6×6 sub-network 1403 from the tensor product (plain 2-stage tensor product here) of the 2×2 network 1401 and the 3×3 network 1402, wherein the 2×2 network 1401 corresponds to the sub-tree 1517 rooted at the node 1513, and the 3×3 network 1402 corresponds to the sub-tree 1518 rooted at the node 1514. The root node 1511 represents the second and final step of the recursive construction. This step constructs the final 30×18 network 1400 from the plain 2-stage tensor product of the 6×6 network 1403 (corresponding to the sub-tree 1516 rooted at 1512) and the 5×3 network 1404 (corresponding to the sub-tree 1519 rooted at 1515). As a whole, the tree 1510 logs the overall procedure of the above recursive 2-stage construction.

A recursive 2-stage construction logged by a binary tree yields a recursive 2-stage interconnection network, provided a network is prescribed corresponding to each leaf in a binary tree. The binary tree is then said to be "associated with" the recursive 2-stage interconnection network so constructed with the prescribed networks as "building blocks" of the construction. The correspondence between a recursive 2-stage construction and its associated binary tree can be best elucidated and concretized by the illustration of FIG. 14 and FIG. 15 in Example 5 as above. Note that the binary tree is used here only to log the precedence among the recursive steps of the construction and does not explicitly require the tensor product employed at each recursive step to be plain 2-stage tensor product. In other word, 2X or X2 tensor product applies as well.

Recall that a special case of particular interest is when all building blocks in the recursive 2-stage construction are single cells (2×2 nodes). Then, the result is a $2^k \times 2^k$ k-stage network, where k is the number of leaves in the associated binary tree. This special case leads to the definition below.

Definition B5. "recursive plain 2-stage interconnection network of cells", "recursive 2X interconnection network of cells" and "recursive X2 interconnection network of cells". A $2^k \times 2^k$ k-stage network constructed from recursively forming plain 2-stage tensor products using single cells as building blocks is called a "recursive plain 2-stage interconnection network of cells", and the corresponding recursive procedure is called the "recursive plain 2-stage construction from cells". A $2^k \times 2^k$ k-stage networks constructed from recursive 2X tensor products using single cells as building blocks is called a "recursive 2X interconnection network of cells", and the corresponding recursive procedure is called the "recursive 2X construction from cells". A $2^k \times 2^k$ k-stage networks constructed from recursive X2 tensor products using single cells as building blocks is called a "recursive X2 interconnection network of cells", and the corresponding recursive procedure is called the "recursive X2 construction from cells". Note that when there is no need to specify the type of tensor products in the recursion, the terms "recursive 2-stage interconnection network of cells" and "recursive 2-stage construction from cells" are used collectively.

EXAMPLE 6

Figure 16:
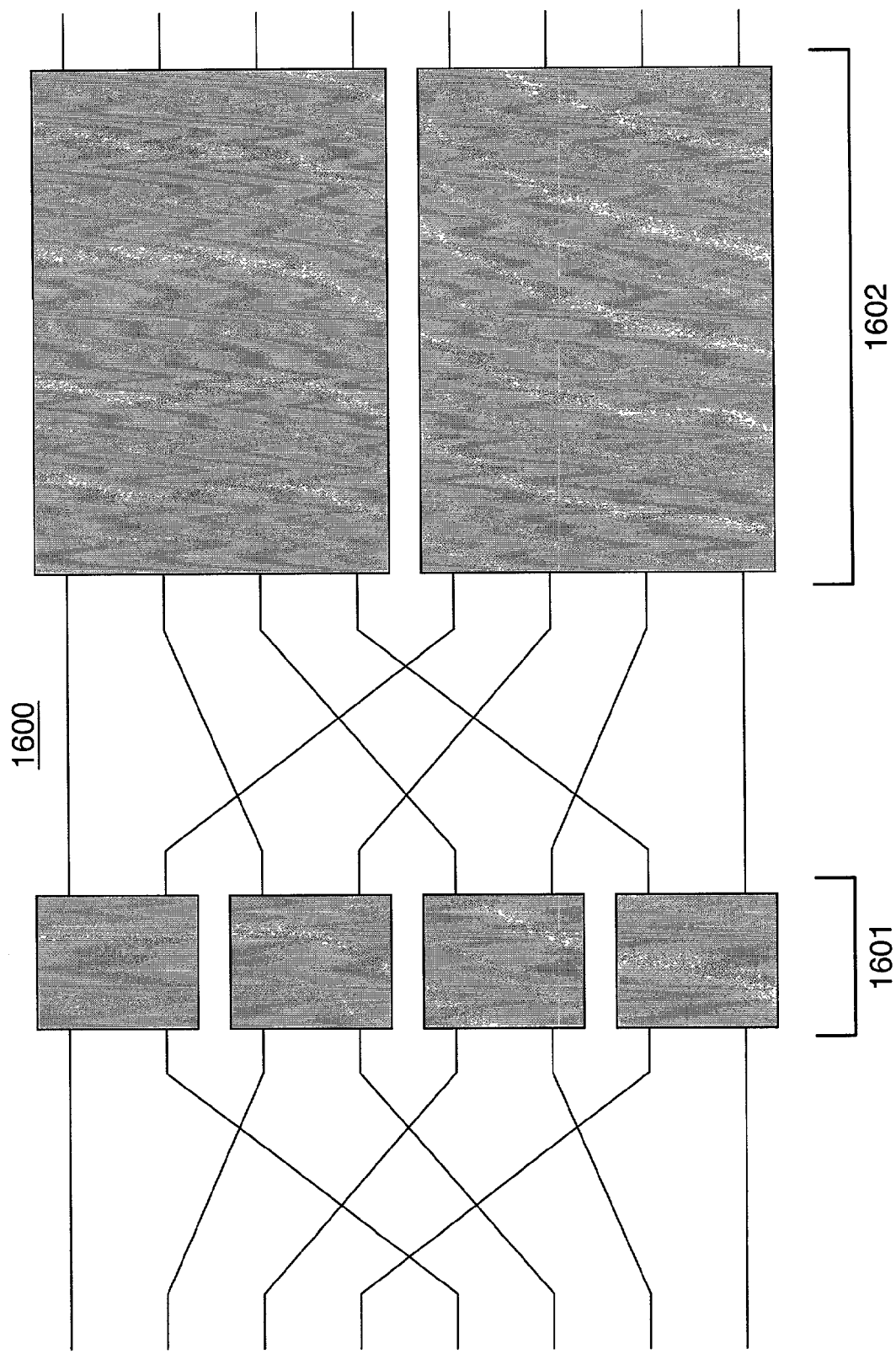
Figure 17:
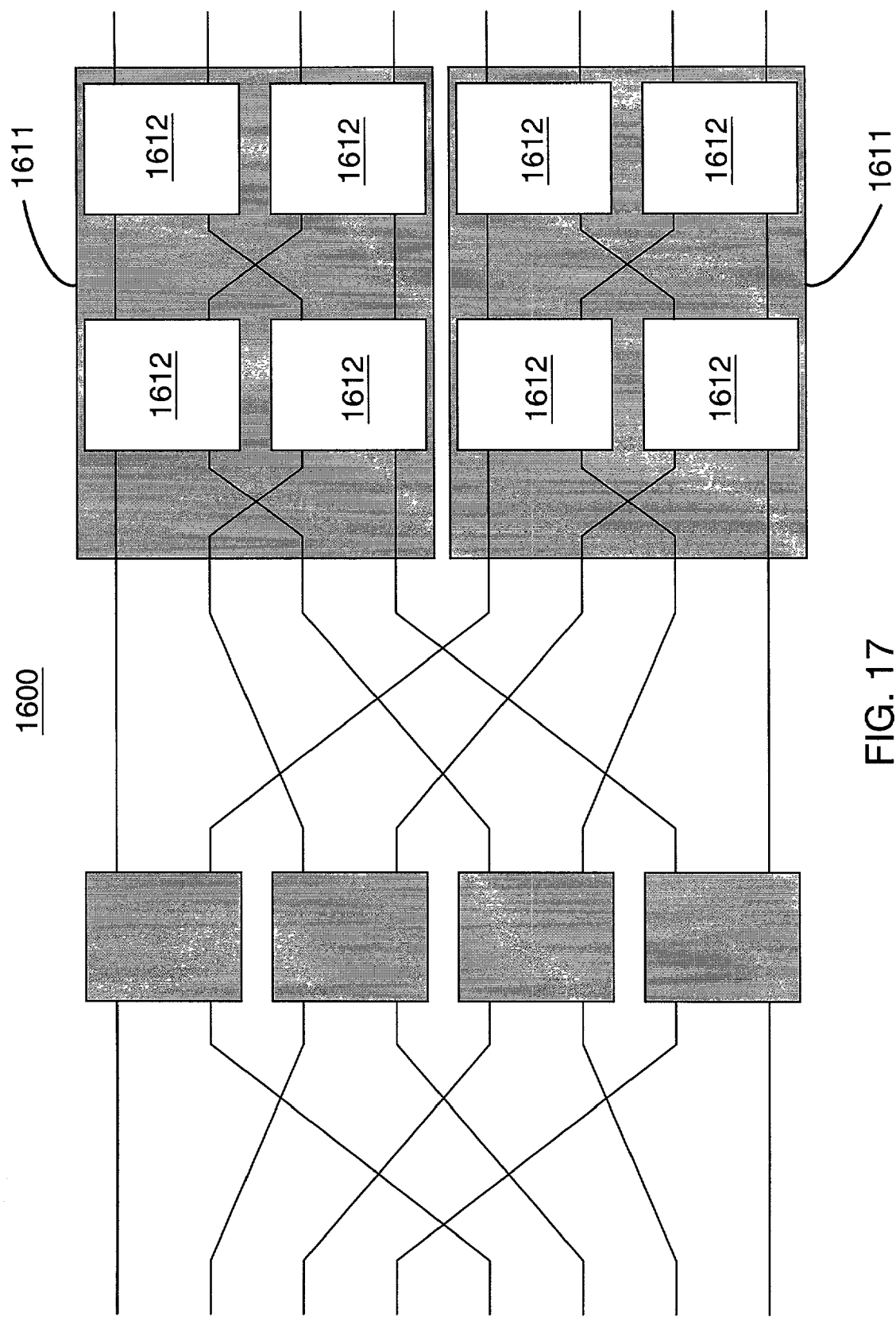

FIGS. 16-19 show how 8×8 3-stage network 1600 is built as a recursive X2 interconnection network of cells. While Example 5 shows the recursion from bottom to top, that is, from building smaller network then larger network, this example shows the reverse way. So starting from building larger network, the 8×8 network 1600 can be constructed as an X2 tensor product of 2×2 network 1601 and 4×4 network 1602 as shown in FIG. 16. Then, as shown in FIG. 17, each 4×4 network 1611 can recursively be an X2 tensor product of 2×2 networks (or cells) 1612. Then ungrouping the nodes and lines inside every 4×4 node 1611 so that they become elements directly belonging to the whole construction 1621 as shown in FIG. 18. Now each node 1622 in the construction is a cell so the resulting 8×8 network 1600 is a recursive X2 interconnection network of cells. Usually, it will be redrawn into an equivalent version with better appearance, as the network 1600 shown in FIG. 19. The reason is that, unlike recursive plain 2-stage construction, in a recursive 2X or X2 construction, the stack of either the input exchanges or the output exchanges of the smaller networks will concatenated with the large exchange in the tensor product. As a common practice, the successive exchanges will be replaced by the single exchange which is the product of these exchanges, that is, graphically, each zigzag line is straightened into a straight line. Therefore, in this example, the resulting 8×8 exchange 1631 in FIG. 19 is the product of the 8×8 exchange 1623 of FIG. 18, which results from stacking the 4×4 input exchange 1624 from the upper 4×4 network and the 4×4 input exchange 1625 from the lower 4×4 network, and the 8×8 interstage exchange 1626. The binary tree associated with this recursive X2 interconnection network of cells are shown as the tree 2000 in FIG. 20.

C. Banyan-Type Networks and Trace and Guide of a Bit-Permuting Network

1. Permutation on Integers

Definition C1: "permutation". A "permutation" σ on integers from 1 to n is a one-to-one function from the set {1, 2, . . . , n} to itself. The "image" of a number k under the permutation σ is denoted as σ(k). For example, consider the permutation σ on the integers 1, 2, 3, and 4 such that σ(1)=4, σ(2)=3, σ(3)=1, and σ(4)=2. This permutation σ can be expressed as 1↦4↦2↦3↦1, wherein the notation "a↦b" means that a is mapped to b under σ. The "cycle representation" simplifies the notation as σ=(1 4 2 3). Note that by "cycle representation", the expression σ=(1 4 2 3) is totally equivalent with σ=(4 2 3 1) or σ=(2 3 1 4) or σ=(3 1 4 2). Multiplication of two permutations σ and π is customarily defined as the functional composition from left-to-right: (σπ)(k)=π(σ(k)). For example, if σ=(1 4 2 3) and π=(2 3), then (σπ)(4)=π(σ(4))=π(2)=3.

There are altogether n! permutations on integers from 1 to n. In the terminology of modern algebra, they form a "group" under multiplication. The identity mapping, denoted as "id", is regarded as one of the permutations. Every permutation is invertible, that is, for every permutation σ, there exists a unique permutation τ such στ=id=τσ. In that case, τ is called the inverse of σ and is written as $\tau = \sigma^{-1}$. For example, given the permutation σ=(1 4 2 3) as above, then $\sigma^{-1}(k)$ means whichever number mapped to k under the permutation σ, for every k, and $\sigma^{-1}$=(3 4 2 1).

2. Bit-permuting Exchange

A permutation σ on integers from 1 to n "induces" a $2^n \times 2^n$ exchange $X_\sigma$ via $$X_\sigma : b_{\sigma(1)} b_{\sigma(2)} \ldots b_{\sigma(n)} \mapsto b_1 b_2 \ldots b_n$$

wherein the notation "a ↦ b" immediately above means that a is mapped to b by the exchange. The mnemonic interpretation of $X_\sigma$ is as follows: the value of the $j^{th}$ bit of the binary string before the exchange $X_\sigma$ gives the value of the $\sigma(j)^{th}$ bit of the corresponding binary string afterwards.

An equivalent formula for $X_\sigma$ is $$X_\sigma : b_1 b_2 \ldots b_n \mapsto b_{\sigma^{-1}(1)} b_{\sigma^{-1}(2)} \ldots b_{\sigma^{-1}(n)}.$$

EXAMPLE 1

Take the permutation (n n−1 . . . 1) as an example. It maps n to n−1, n−1 to n−2, . . . , 2 to 1, and 1 to n. Thus it induces the following $2^n \times 2^n$ exchange:

$$X_{(n\ n-1\ \ldots\ 1)} : b_1 b_2 \ldots b_n \mapsto b_2 \ldots b_{n-1} b_n b_1$$

This is called the $2^n \times 2^n$ "shuffle exchange", which means the left-rotation of every n-bit number by one bit. The 8×8 exchange 2101 shown in FIG. 21A is the exchange $X_{(3\ 2\ 1)}$, or the 8×8 shuffle exchange.

Another example is one wherein the permutation (3 1) induces 8×8 exchange 2103 shown in FIG. 21C. Under this exchange, the value of the $1^{st}$, $2^{nd}$ and $3^{rd}$ bit of the bit pattern before the exchange gives the value of the $3^{rd}$, $2^{nd}$ and $1^{st}$ bit of the bit pattern after the exchange, respectively.

Definition C2: "bit-permuting exchange". A $2^n \times 2^n$ "bit-permuting exchange" is an exchange induced by a permutation on integers from 1 to n.

The "rank" of a nonidentity permutation a on integers from 1 to n means the smallest number d such that $\sigma(d) \neq d$.

For $1 \leq d < n$, the exchange $X_{(n\ n-1\ \ldots\ d)}$ is called the $2^n \times 2^n$ "shuffle exchange of rank d" and denoted as $SHUF^{(n)}_d$. In particular, the $2^n \times 2^n$ shuffle exchange of rank 1 is simply the $2^n \times 2^n$ shuffle exchange $SHUF^{(n)}$. Similarly, for $1 \leq d < n$, the exchange $X_{(d\ d+1\ \ldots\ n)}$ is called the $2^n \times 2^n$ "inverse shuffle exchange of rank d" and denoted by $(SHUF^{(n)}_d)^{-1}$.

For $1 \leq d < n$, the $2^n \times 2^n$ exchange $X_{(n\ d)}$ is called the $2^n \times 2^n$ "banyan exchange of rank d" and denoted as $BANY^{(n)}_d$. In particular, the $2^n \times 2^n$ banyan exchange of rank 1 is simply called the $2^n \times 2^n$ banyan exchange and denoted as $BANY^{(n)}$.

Denote by $\sigma_\leftrightarrows^{(n)}$ the permutation that performs the end-to-end swap on the sequence 1, 2, . . . , n, that is, $\sigma_\leftrightarrows^{(n)}(j) = n+1-j$ for all j. In the cycle notation, $\sigma_\leftrightarrows^{(n)} = (1\ n)(2\ n-1) \ldots (\lfloor n/2 \rfloor \lceil n/2 \rceil)$ (where $\lfloor \cdot \rfloor$ is the "floor" and $\lceil \cdot \rceil$ is the "ceiling"). The exchange induced by this permutation is called the $2^n \times 2^n$ "swap exchange" and denoted as $SWAP^{(n)}$.

For example, the 8×8 exchanges 2101 as in FIG. 21A, 2102 as in FIG. 21B, 2103 as in FIG. 21C, and the 16×16 exchanges 2104 as in FIG. 21D show the graph representations of $SHUF^{(3)}(=X_{(3\ 2\ 1)})$, $(SHUF^{(3)})^{-1}(=X_{(1\ 2\ 3)})$, $BANY^{(3)}(=X_{(1\ 3)})$, and $SWAP^{(4)}(=X_{(1\ 4)(2\ 3)})$, respectively. Note that $SWAP^{(3)}(=X_{(1\ 3)})$ happens to be identical with $BANY^{(3)}$. Therefore, the 8×8 exchange 2103 in FIG. 21C also represents $SWAP^{(3)}$.

The product between two exchanges each induced by a permutation is the exchange induced by the product between the two permutations. Thus let $\sigma$ and $\pi$ be permutations, then $X_\sigma X_\pi = X_{\sigma\pi}$. This is illustrated in FIG. 6E, where the product between the 16×16 exchanges $X_{(2\ 4)}$ (691) and $X_{(4\ 3\ 2\ 1)}$ (692) yields the 16×16 exchange $X_{(1\ 4)(2\ 3)}$ (693). The product of the same two exchange but in reversed order, that is, the exchange $X_{(4\ 3\ 2\ 1)}$ (692) is now in front of the exchange $X_{(2\ 4)}$ (691), as shown in FIG. 6F, results in a different exchange exchanges $X_{(4\ 3)(2\ 1)}$ (694).

3. Bit-permuting Network

Definition C3: "bit-permuting network". A $2^n \times 2^n$ multi-stage interconnection network is called a "bit-permuting network" if every stage consists of $2^{n-1}$ 2×2 nodes and every exchange in the network is bit-permuting.

For example, the 16×16 11-stage network with eight 2×2 nodes in each stage and a shuffle exchange between every two consecutive stages is a bit-permuting network.

A $2^n \times 2^n$ k-stage bit-permuting network can be completely determined by specifying all the inducing permutations of the exchanges of the network. Thus a $2^n \times 2^n$ k-stage bit-permuting network is denoted as $[\sigma_0 : \sigma_1 : \sigma_2 : \ldots : \sigma_{k-1} : \sigma_k]_n$, where the permutation $\sigma_j, 1 \leq j < k$, induces the exchange between the $j^{th}$ and $(j+1)^{th}$ stages, the permutation $\sigma_0$ induces the input exchange, and permutation $\sigma_k$ induces the output exchange. A colon in this notation symbolizes a stage of 2×2 nodes. When there is no ambiguity, the subscript n in the notation can be omitted.

For example, network 2200 shown in FIG. 22 (which is also the structure of FIG. 7) is denoted as $[id : (4\ 3\ 2\ 1) : (1\ 4\ 2\ 3) : (3\ 4) : id]_4$. When the input exchange or the output exchange is induced by permutation "id", i.e., when the exchange is absent, it may be omitted in the notation. So $[id : (4\ 3\ 2\ 1) : (1\ 4\ 2\ 3) : (3\ 4) : id]_4$ may be written simply as $[: (4\ 3\ 2\ 1) : (1\ 4\ 2\ 3) : (3\ 4) :]_4$. Meanwhile, the network $[:]_1$ is a single 2×2 node without I/O exchanges.

The two bit-permuting networks $[\sigma_0 : \sigma_1 : \ldots : \sigma_{k-1} : \sigma_k]_n$ and $[\sigma_k^{-1} : \sigma_{k-1}^{-1} : \ldots \sigma_1^{-1} : \sigma_0^{-1}]_n$ are "mirror images" of each other.

4. Banyan-type Network

Definition C4: "banyan-type network". A $2^n \times 2^n$ n-stage, routable, bit-permuting network is called a "banyan-type network".

For instance, a special case of a banyan-type network called the $2^n \times 2^n$ "banyan network" is the $2^n \times 2^n$ n-stage network without I/O exchanges such that the sequential interstage exchanges are $2^n \times 2^n$ banyan exchanges of increasing ranks:

$$[:(n\ 1):(n2): \ldots :(n\ n-2):(n\ n-1):]_n$$

The $2^n \times 2^n$ "baseline network" is the $2^n \times 2^n$ n-stage network without I/O exchanges such that the sequential interstage exchanges are $2^n \times 2^n$ inverse shuffle exchanges of increasing ranks:

$$[:(1\ 2\ \ldots\ n-1\ n):(2\ 3\ \ldots\ n-1\ n): \ldots :(n-2\ n-1\ n):(n-1\ n):]_n$$

The $2^n \times 2^n$ "Omega network" or "shuffle-exchange network" is the $2^n \times 2^n$ n-stage network without I/O exchanges such that every interstage exchange is the shuffle exchange:

$$[:(n\ n-1\ \ldots\ 2\ 1):(n\ n-1\ \ldots\ 2\ 1): \ldots :(n\ n-1\ \ldots\ 2\ 1):]$$

The mirror images of the banyan, baseline, and Omega networks are the "reverse banyan", "reverse baseline", and "reverse Omega" networks, respectively. Thus the interstage exchanges in the $2^n \times 2^n$ reverse banyan network are $2^n \times 2^n$ banyan exchanges of decreasing ranks; those in the reverse baseline network are $2^n \times 2^n$ shuffle exchanges of decreasing ranks; and those in the reverse Omega network are all $2^n \times 2^n$ inverse shuffle exchanges.

For example, the network 2300 of FIG. 23 illustrates a $[:(3\ 2\ 1):(3\ 2\ 1):]$ which is a 8×8 shuffle exchange network which belongs to the family of 8×8 banyan-type networks.

The following two points highlight the extra qualification of a banyan-type network over the qualification of a bit-permuting network:

(1) A $2^n \times 2^n$ banyan-type network must be in exactly n stages, while a $2^n \times 2^n$ bit-permuting network can be in an arbitrary number of stages.

(2) A banyan-type network must be routable, while a bit-permuting network may possibly be non-routable, as illustrated by the following example.

EXAMPLE 2

Despite its appearance, the 16×16 4-stage network 2400 in FIG. 24, denoted as $[:(3\ 4):(1\ 4):(4\ 3\ 2\ 1):]_4$, is not routable. Every external input in it can access only half of the external outputs. In fact, the network 2400 is the overlay of two logically disjoint copies of the 8×8 4-stage network $[:(2\ 3):(1\ 3):(3\ 2\ 1):]_3$. Cells in the network 2500 in FIG. 25 constitute one copy of $[:(2\ 3):(1\ 3):(3\ 2\ 1):]_3$, and cells in the network 2600 in FIG. 26 constitute the other copy.

Bit-permuting 2-stage Interconnection

The coordinate interchange of a 2Stg(m, n) can be expressed as a bit-permuting exchange if both m and n are power of 2. In particular, if $m=2^{k-r}$, and $n=2^r$, that is, a 2-stage interconnection network composed of $2^r 2^{k-r} \times 2^{k-r}$ input nodes and $2^{k-r} 2^r \times 2^r$ output nodes, the coordinate interchange is the $r^{th}$ power of $SHUF^{(k)}$. For example, as shown in FIG. 16, the interstage exchange 1603 of the network 1600, which is the X2 version of a 2-stage interconnection network with parameter $m=2=2^{3-2}$ and $n=4=2^2$, is $X_{(1\ 2\ 3)}$, wherein the inducing permutation is (1 2 3) which is the $2^{nd}$ power of $SHUF^{(3)}$, i.e. $(3\ 2\ 1)^2 = (3\ 2\ 1)(3\ 2\ 1) = (1\ 2\ 3)$.

Recall from the section B4 that a generalized 2-stage interconnection network with parameter m and n is just a routable 2-stage network whose interstage exchange can be in any form as long as it connects each of the m output ports on each input node to a distinct one of the m output node and each of the n input ports on each output node to a distinct one of the n input node. Similar to above, the interstage exchange of a generalized 2-stage interconnection network with parameter m and n can be expressed as a bit-permuting exchange if both m and n are power of 2. When the interstage exchange of a generalized 2-stage interconnection network is a bit-permuting exchange, the network is called a "bit-permuting 2-stage interconnection network". In particular, for a bit-permuting 2-stage interconnection network with parameter $2^{k-r}$ and $2^r$, the interstage exchange is induced by a permutation σ on integers from 1 to k such that σ maps the numbers r+1, r+2, . . . , k into the set {1, 2, . . . , k-r}, or equivalently, σ maps the numbers 1, 2, . . . , r into the set {k-r+1, k-r+2, . . . , k}.

Note that by recursive application of bit-permuting 2-stage interconnections, the resulting network is a banyan-type network.

5. Trace and Guide of a Bit-permuting Network

Many attributes of a bit-permuting network are more conveniently rendered in the "trace" and/or "guide". These attributes include: (a) routability; (b) routing control; (c) network equivalence under intra-stage cell rearrangement; and (d) various conditional non-blocking properties of switch realization.

The $2^{n-1}$ cells at each stage of the multi-stage network $[\sigma_0:\sigma_1:\sigma_2: \ldots :\sigma_{k-1}:\sigma_k]_n$ are linearly ordered. The address labels are integers from 0 to $2^{n-1}-1$ 1or, equivalently, the (n-1)-bit numbers. On the cell at the address $b_1 b_2 \ldots b_{n-1}$, the two inputs are at the n-bit addresses $b_1 b_2 \ldots b_{n-1} 0$ and $b_1 b_2 \ldots b_{n-1} 1$ and so are the two outputs.

Definition C5: "trace and guide". For a k-stage $2^n \times 2^n$ bit-permuting network, the trace and the guide of the bit-permuting network $[\sigma_0:\sigma_1: \ldots :\sigma_{k-1}:\sigma_k]_n$ are both sequences of k numbers wherein each number is an integer from 1 to n via the following formulas:

The "trace" is the sequence $\sigma_0^{-1}(n), (\sigma_0\sigma_1)^{-1}(n), \ldots, (\sigma_0\sigma_1 \ldots \sigma_{k-2})^{-1}(n),$
$(\sigma_0\sigma_1 \ldots \sigma_{k-1})^{-1}(n).$ The "guide" is the sequence $(\sigma_1\sigma_2 \ldots \sigma_k)(n), (\sigma_2\sigma_3 \ldots \sigma_k)(n), \ldots, (\sigma_{k-1}\sigma_k)(n),$
$\sigma_k(n).$ In general, for $1 \leq j \leq k$, the $j^{th}$ term of the trace is $(\sigma_0\sigma_1 \ldots \sigma_{j-1})^{-1}(n)$ and the $j^{th}$ term of the guide is $(\sigma_j\sigma_{j+1} \ldots \sigma_k)(n)$.

The two sequences are very closely related. For a bit-permuting network $[\sigma_0:\sigma_1: \ldots :\sigma_{k-1}:\sigma k]_n$, when the permutation $\sigma_0\sigma_1\sigma_2 \ldots \sigma_k$ is applied to the trace term by term, the guide results. Conversely, when the permutation $(\sigma 0\sigma_1\sigma_2 \ldots \sigma_k)^{-1}$ is applied to the guide term by term, the trace results.

Note that the reversed sequence of the trace of the network $[\sigma_0:\sigma_1: \ldots :\sigma_{k'1}:\sigma_k]_n$ is the guide of the network $[\sigma_k^{-1}:\sigma_{k-1}^{-1}: \ldots :\sigma_1^{-1}:\sigma_0^{-1}]_n$, which is the mirror-image network.

EXAMPLE 3

Let the trace and the guide of the 16×16 banyan-type network [id:(3 4):(1 4):(2 4):id] be the sequences $t_1, t_2, t_3, t_4$ and $g_1, g_2, g_3, g_4$, respectively. Thus $t_1 = \sigma_0^{-1}(4) = 4$ since $\sigma_0^{-1} = id^{-1} = id$ and every number is mapped to itself by id, $t_2 = (\sigma_0\sigma_1)^{-1}(4) = 3$ since $(\sigma_0\sigma_1)^{-1} = (id(3\ 4))^{-1} = (3\ 4)^{-1} = (4\ 3)$ and 4 is permuted to 3 by (4 3); $t_3 = (\sigma_0\sigma_1\sigma_2)^{-1}(4) = 1$ since $(\sigma_0\sigma_1\sigma_2)^{-1} = (id(3\ 4)(1\ 4))^{-1} = (3\ 1\ 4)^{-1} = (4\ 1\ 3)$, and 4 is permuted to 1 by (4 1 3); and $t_4 = (\sigma_0\sigma_1\sigma_2\sigma_3)^{-1}(4) = 2$ since $(\sigma_0\sigma_1\sigma_2\sigma_3)^{-1} = (id(3\ 4)(1\ 4)(2\ 4))^{-1} = (3\ 1\ 2\ 4)^{-1} = (4\ 2\ 1\ 3)$ and 4 is permuted to 2 by (4 2 1 3). As a whole, the trace is the sequence 4, 3, 1, 2. Similarly, $g_1 = (\sigma_0\sigma_1\sigma_2\sigma_3\sigma_4)(4) = ((3\ 4)(1\ 4)(2\ 4)id)(4) = (3\ 1\ 2\ 4)(4) = 3$; $g_2 = (\sigma_2\sigma_3\sigma_4)(4) = ((1\ 4)(2\ 4)id)(4) = (1\ 2\ 4)(4) = 1$; $g_3 = (\sigma_3\sigma_4)(4) = ((2\ 4)id)(4) = (2\ 4)(4) = 2$; and $g_4 = (\sigma_4)(4) = (id)(4) = 4$. As a whole, the guide is the sequence 3, 1, 2, 4. Alternatively, the guide can be calculated from the trace by applying the permutation $\sigma_0\sigma_1\sigma_2\sigma_3\sigma_4$ to the trace term by term. Here $\sigma_0\sigma_1\sigma_2\sigma_3\sigma_4 = id(3\ 4)(1\ 4)(2\ 4)id = (3\ 1\ 2\ 4)$. Thus $g_1 = (3\ 1\ 2\ 4)(t_1) = (3\ 1\ 2\ 4)(4) = 3$, $g_2 = (3\ 1\ 2\ 4)(t_2) = (3\ 1\ 2\ 4)(3) = 1$, $g_3 = (3\ 1\ 2\ 4)(t_3) = (3\ 1\ 2\ 4)(1) = 2$, and $g_4 = (3\ 1\ 2\ 4)(t_4) = (3\ 1\ 2\ 4)(2) = 4$. This agrees with the calculation of the first time.

Alternatively, a graphical manner for determining the trace and guide is now described with reference to line diagram 2700 in FIG. 27.

TRACE: The sequence of the original set of n 4 integers in this banyan-type network appears in the first row 2701 in order 1, 2, 3, 4 (thus n=4 appears automatically at the top of the last column). Second row 2702 is obtained by applying the cycle (3 4) to the integers in row 2701; the cycle (3 4) appears on the left-hand side between rows 2701 and 2702 for reference. Next, third row 2703 is produced by applying the cycle (1 4) to the integers of row 2702; the cycle (1 4) appears between rows 2702 and 2703 on the left-hand side for reference. Finally, fourth row 2704 is generated by applying the cycle (2 4) to the integers of row 2703; the cycle (2 4) appears between rows 2703 and 2704 on the left-hand side for reference.

To determine the trace:
(a) in the second row, locate the column of where the integer n=4 appears, which is the third column labeled 2713 From the top of column 2713, note the sequence of numbers in going from the top to the location of integer 4. In this case, the sequence is 3-to-4 or 3, 4. The path in this sequence is shown by dashed line 2721.
(b) in the third row, locate the column of where the integer n=4 appears, which is the first column labeled 2711 From the top of column 2711, note the sequence of numbers in going from the top to the location of integer 4. In this case, the sequence is 1-to-1-to-4 or 1, 1, 4. The path in this sequence is shown by dashed lines 2722 and 2723.
(c) in the fourth row, locate the column of where the integer n=4 appears, which is the second column labeled 2712 From the top of column 2712, note the sequence of numbers in going from the top to the location of integer 4. In this case, the sequence is 2-to-2-to-2-to-4 or 2, 2, 2, 4. The path in this sequence is shown by dashed lines 2724, 2725, and 2726.
(d) construct "triangle-like" diagram 2750 in the lower left-hand side of FIG. 27, as follows:
  (i) first place the integer n=4 on the diagonal at four locations;
  (ii) list the sequence from step (a) horizontally, that is, 3-to-4, on the second row 2751;
  (iii) list the sequence from step (b) horizontally on third row 2752; and
  (iv) list the sequence from step (c) horizontally on fourth row 2753; and
(e) trace 2754 is read as the sequence from top-to-bottom on the left-hand side of diagram 2750, namely, 4, 3, 1, 2.

GUIDE: The sequence of the original set of n=4 integers in this banyan-type network appears in the first row 2701 in order 1, 2, 3, 4. Second row 2702 is obtained by applying the cycle (3 4) to the integers in row 2701; the cycle (3 4) appears on the left-hand side between rows 2701 and 2702 for reference. Next, third row 2703 is produced by applying the cycle (1 4) to the integers of row 2702; the cycle (1 4) appears between rows 2702 and 2703 on the left-hand side for reference. Finally, fourth row 2704 is generated by applying the cycle (2 4) to the integers of row 2703; the cycle (2 4) appears between rows 2703 and 2704 on the left-hand side for reference.

To determine the guide:
(a) in the first row, locate the column of where the integer n=4 appears, which is the fourth column labeled 2714 From the place of appearance of n=4, note the sequence of numbers in going from n=4 to the bottom of the column. In this case, the sequence is 4-to-3-to-3-to-3 or 4, 3, 3, 3. The path in this sequence is shown by dashed lines 2731, 2732, and 2733.
(b) in the second row, locate the column of where the integer n=4 appears, which is the third column labeled 2713 From the location of n=4 in column 2713, note the sequence of numbers in going from n=4 to the bottom of the column. In this case, the sequence is 4-to-1-to-1 or 4, 1, 1. The path in this sequence is shown by dashed lines 2734 and 2735.
(c) in the third row, locate the column of where the integer n=4 appears, which is the first column labeled 2711 From the location of n=4 in column 2711, note the sequence of numbers in going from n=4 to the bottom of the column. In this case, the sequence is 4-to-2 or 4, 2. The path in this sequence is shown by dashed line 2736.
(d) construct "triangle-like" diagram 2760 in the lower right-hand side of FIG. 27, as follows:
  (i) first place the integer n=4 on the diagonal at four locations;
  (ii) list the sequence from step (a) horizontally, that is, 4-to-3-to-3-to-3, on the first row 2761;
  (iii) list the sequence from step (b) horizontally on second row 2762; and
  (iv) list the sequence from step (c) horizontally on third row 2763; and
(e) guide 2764 is read as the sequence from top-to-bottom on the right-hand side of diagram 2760, namely, 3, 1, 2, 4.

EXAMPLE 4

Figure 28B:
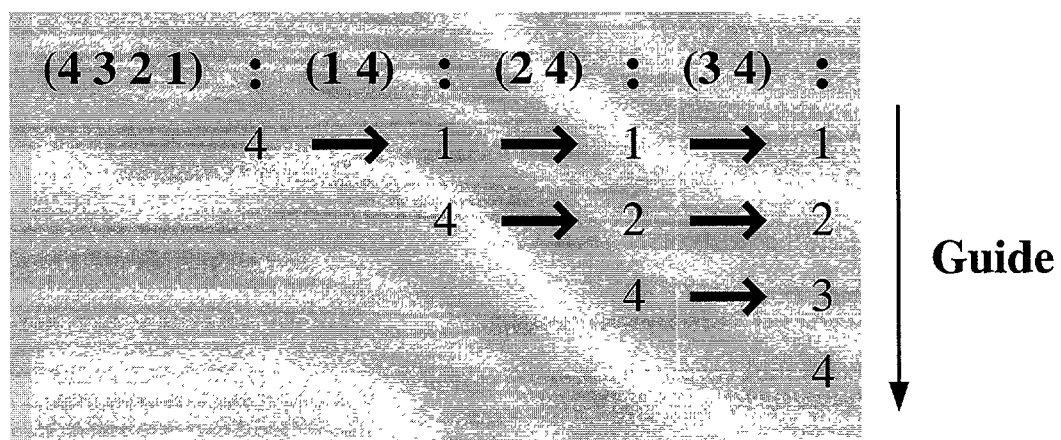

The 16×16 banyan network preceded by the shuffle exchange is [(4 3 2 1):(1 4):(2 4):(3 4):id]. Both the trace and the guide are the monotonic sequence 1, 2, 3, 4, as calculated in the FIGS. 28A and 28B, respectively.

6. Trace and Guide of a Network Constructed by Recursive 2-stage Construction from Cells Recall the definitions in Section B of recursive plain 2-stage, 2X, and X2 constructions from cells. Such constructed networks are all banyan-type networks. In fact, every recursive 2-stage interconnection network of cells is a banyan-type network with monotonically decreasing trace and monotonically increasing guide, every recursive 2X interconnection network of cells is a banyan-type network with monotonically decreasing trace and guide, and every recursive X2 interconnection network of cells is a banyan-type network with monotonically increasing trace and guide.

EXAMPLE 5

Recall FIG. 19 in section B. The 8×8 banyan-type network 1630 is a recursive X2 interconnection network of cells. The network is expressed as [(3 2 1):(3 1):(3 2):]. The trace is calculated to be the sequence 1, 2, 3, and the guide is also the sequence 1, 2, 3. Both sequences are monotonically increasing.

7. Interpretation of Trace and Guide

To elucidate the import of the trace and guide, it is instructive to highlight an example of how the stage-by-stage I/O addresses along a generic route through a 16×16 banyan-type network are obtained.

EXAMPLE 6

FIG. 29 illustrates a route, shown by the "dark-line path", through the 16×16 banyan-type network 2900 [id:(3 4):(1 4):(2 4):(4 3 2 1)]$_4$ from the origination address binary $(I_1 I_2 I_3 I_4)=1100$ to the destination address binary $(O_1 O_2 O_3 O_4)=1110$. Along this route the stage-by stage I/O address progresses as follows in Table 1:

TABLE 1

$I_1 I_2 I_3 I_4 \xrightarrow{\text{Stage 1 switching (at node 2810)}} I_1 I_2 I_3 O_4 \xrightarrow{X_{(3\ 4)}}$ $I_1 I_2 O_2 I_3 \xrightarrow{\text{Stage 2 switching (at node 2820)}} I_1 I_2 O_2 O_4 \xrightarrow{X_{(1\ 4)}}$ $O_4 I_2 O_2 I_1 \xrightarrow{\text{Stage 3 switching (at node 2830)}} O_4 I_2 O_2 O_1 \xrightarrow{X_{(2\ 4)}}$ TABLE 1-continued $$O_4O_1O_2I_2 \xrightarrow{\text{Stage 4 switching (at node 2840)}} O_4O_1O_2O_3 \xrightarrow{X_{(4\,3\,2\,1)}} O_1O_2O_3O_4$$

It is noted that the last bit position in the input bits, listed from top-to-bottom, is the sequence of bits $I_4$, $I_3$, $I_1$, and $I_2$. The subscripts of these bit positions, read in sequence, are 4, 3, 1, 2, which is the trace. Similarly, the last bit position in the output bits, listed from top-to-bottom, is $O_2$, $O_4$, $O_1$, and $O_3$. The subscripts of these bit positions, read in sequence, are 2, 4, 1, 3, which is the guide. All bits in the stage-j output address are the same as in the stage-j input address except that the rightmost bit is prescribed by the switching decision of the stage-j cell. For the illustrated network, bits $I_4$, $I_3$, $I_1$, and $I_2$ of the origination address are rotated to the rightmost bit position upon entering cells at the successive stages and are replaced successively by bits $O_2$, $O_4$, $O_1$, and $O_3$ of the destination address. Again, the subscripts of the input and output sequences of bits are stipulated by the trace and the guide of the network, respectively.

Note that both the trace and the guide include all numbers from 1 to 4. Thus the sequential bit replacements involve all bits in the origination and destination addresses. This fact reflects the network's routability.

EXAMPLE 7

Consider 16×16 non-routable network 2400 [id:(34):(14):(4321):id]$_4$ already illustrated in FIG. 24. By the calculation summarized in FIG. 30A, the trace of this network is the sequence 4, 3, 1, 3. Similarly the guide is the sequence 2, 4, 3, 4 by the calculation summarized in FIG. 30B. Consider the Table 2 below which is determined in the same manner as Table 1:

TABLE 2

$$I_1I_2I_3I_4 \xrightarrow{\text{Stage 1 switching}} I_1I_2I_3O_2 \xrightarrow{X_{(3\,4)}}$$

$$I_1I_2O_2I_3 \xrightarrow{\text{Stage 2 switching}} I_1I_2O_2O_4 \xrightarrow{X_{(1\,4)}}$$

$$I_1I_2O_2I_3 \xrightarrow{\text{Stage 3 switching}} I_1I_2O_2O_4 \xrightarrow{X_{(4\,3\,2\,1)}}$$

$$I_2O_2O_3O_4 \xrightarrow{\text{Stage 4 switching}} I_2O_2O_3O_4$$

Another way to view the stage-by-stage progression of the I/O addresses along the route as conveyed by Table 2 is diagram 3100 of FIG. 31. As depicted, the permutation and replacement of the input bits $I_1I_2I_3I_4$ in the top row are shown in a top-down manner as the bits progress through network 2400 of FIG. 24. The last row shows quite explicitly the fact that that there exists a route from an origination address binary($I_1I_2I_3I_4$) to a destination address binary($O_1O_2O_3O_4$) if and only if $I_2=O_1$. This undesirable situation occurs because the number 2 does not appear in the trace, nor does the number 1 appear in the guide. Hence the bit $I_2$ is never rotated to the rightmost bit position and so is never replaced. Eventually it is rotated to the leftmost bit position. Close scrutiny of the sequential bit substitution finds bit $I_3$ rotated to the rightmost bit position upon entering stage 2 and replaced by a random bit (say Y) at stage 2, while the new bit Y is later rotated to the rightmost bit position upon entering stage 4 and is overwritten. This fact is reflected in the repeated appearance of the number 3 at both the second and the fourth terms in the trace.

In general, the generic term $(\sigma_0\sigma_1\sigma_2 \ldots \sigma_{j-1})^{-1}(n)$ in the trace and the generic term $(\sigma_j\sigma_{j+1} \ldots \sigma_k)(n)$ in the guide can be interpreted as follows. The bit at position $(\sigma_0\sigma_1\sigma_2 \ldots \sigma_{j-1})^{-1}(n)$ in the origination address is relocated to the rightmost bit position through successive exchanges induced by $\sigma_0, \sigma_1, \sigma_2, \ldots, \sigma_{j-1}$. The bit is then replaced by a new bit reflecting the switching decision at stage j. This new bit is eventually rotated to the bit position $(\sigma_j\sigma_{j+1} \ldots \sigma_k)(n)$ of the final destination through successive exchanges induced by $\sigma_j, \sigma_{j+1}, \ldots, \sigma_k$.

Now suppose that a certain number p appears in the trace exactly three times, say, $p=(\sigma_0\sigma_1\sigma_2 \ldots \sigma_{i-1})^{-1}(n)=(\sigma_0\sigma_1\sigma_2 \ldots \sigma_{j-1})^{-1}(n)=(\sigma_0\sigma_1\sigma_2 \ldots \sigma_{m-1})^{-1}(n)$, where $1 \leq i < j < m \leq k$, and all other numbers are present at least once in the trace. Then the bit at position $(\sigma_0\sigma_1\sigma_2 \ldots \sigma_{i-1})^{-1}(n)$ in the origination address is rotated to the rightmost bit position and is replaced by a new bit of the switching decision of stage i. This new bit is rotated to the rightmost bit position and is overwritten by the switching decision at stage j. This switching decision in turn is overwritten at stage m. Finally, the bit of the switching decision at stage m is rotated to the bit position $(\sigma_m\sigma_{m+1} \ldots \sigma_k)(n)$ of the final destination. In this scenario, switching at stages i and j is redundant. In some multi-stage switching designs, redundant stages are present for the purpose of alternate routing.

8. Routability of a Bit-permuting Network

For $k \geq n$, if either the trace or the guide of the network $[\sigma_0:\sigma_1:\sigma_2: \ldots :\sigma_{k-1}:\sigma_k]_n$ includes all numbers from 1 to n, so does the other because of the close relationship between the two sequences. In this case, all bits in the origination address are replaced by switching decisions throughout the stages. Thus every bit in the destination address reflects the switching decision of some stage, which means that the network is routable. In other words, for any $2^n \times 2^n$ bit-permuting network, the routability of the network can easily be tested by examining either the trace or the guide of the network. If either sequence contains all numbers from 1 to n, then so does the other and the network is routable; otherwise, the network is just the superimposition of a plurality of logically disjoint copies of smaller network. An example of non-routable bit-permuting network can be recalled from the network 2400 in FIG. 24.

In particular, for any $2^n \times 2^n$ banyan-type network, the followings are equivalent:

The network is routable.

The trace is a sequence of n distinct integers from 1 to n.

The guide is a sequence of n distinct integers from 1 to n.

The design of a routable k-stage $2^n \times 2^n$ bit-permuting network involves the selection of a particular sequence of k+1 permutations inducing the input exchange, the k−1 interstage exchanges, and the output exchange. When the routability is the only concern for the design, the choice of the permutation for each exchange is arbitrary as long as the resulting network is routable. When n and k are large, the number of possible permutations for each exchange grows rapidly and hence so does the number of combinations of the k+1 permutations. The task for testing the routability by brute force would be difficult. The disclosed method for testing the routability of a bit-permuting network provides a simple, instant, and systematic solution, accrediting the simple calculation of trace and guide: a convenient and powerful analyzing tools for bit-permuting networks.

9. Altering the Trace of a Banyan-type Network by Prepending an Input Exchange and Altering the Guide by Appending an Output Exchange For a sequence $a_1, a_2, \ldots$, an of n distinct integers from 1 to n, there always exists a unique permutation $\sigma$ such that $\sigma(j)=a_j$ for all j. For example, if the sequence is 4, 1, 2, 3, then since $\sigma(1)=4$, $\sigma(2)=1$, $\sigma(3)=2$ and $\sigma(4)=3$, $\sigma$ can readily be completely determined to be the permutation (1 4 3 2). Recall that the trace and the guide of a $2^n \times 2^n$ banyan-type network $[\sigma_0:\sigma_1:\ldots:\sigma_{n-1}:\sigma_n]$ are sequences of n distinct integers from 1 to n. Thus there exists permutations $\sigma$ and $\gamma$ such that the trace is the sequence $\tau(1), \tau(2), \ldots, \tau(n)$ and the guide is the sequence $\gamma(1), \gamma(2), \ldots, \gamma(n)$. The permutation $\tau$ is then said to "induce" the trace of the network, and the permutation $\gamma$ is said to "induce" the guide.

EXAMPLE 8

A $2^n \times 2^n$ banyan-type network whose trace and guide are both the monotonically increasing sequence $1, 2, \ldots, n$ has both the trace and guide induced by id. On the other hand, a $2^n \times 2^n$ banyan-type network whose trace and guide are both the monotonically decreasing sequence $n, n-1, \ldots, 1$, has both the trace and guide induced by $\sigma_\leftrightarrows^{(n)}$, where $\sigma_\leftrightarrows^{(n)} = (1 \; n)(2 \; n-1) \ldots (\lfloor n/2 \rfloor \lceil n/2 \rceil)$.

EXAMPLE 9

The 16×16 banyan-type network 2900 as shown in FIG. 29 is $[id:(3\;4):(1\;4):(2\;4):(4\;3\;2\;1)]_4$. Its trace is the sequence 4, 3, 1, 2 and its guide is the sequence 2, 4, 1, 3. Thus the trace is induced by $\tau=(1\;4\;2\;3)$ and the guide by $\gamma=(1\;2\;4\;3)$.

When a network $[\sigma_0:\sigma_1:\ldots:\sigma_{n-1}:\sigma_n]$ with trace induced by $\tau$ and guide by $\gamma$ is prepended with an additional input exchange $X_\lambda$ and appended with an additional output exchange $X_\pi$, the resulting network $[\lambda\sigma_0:\sigma_1:\ldots:\sigma_{n-1}:\sigma_n\pi]$ will have the trace induced by $\tau'$ and the guide by $\gamma'$ where $\tau'(1)=\lambda^{-1}(\tau(1)), \tau'(2)=\lambda^{-1}(\tau(2)), \ldots, \tau'(n)=\lambda^{-1}(\tau(n))$
and $\gamma'(1)=\pi(\gamma(1)), \gamma'(2)=\pi(\gamma(2)), \ldots, \gamma'(n)=\pi(\gamma(n))$ By comparing the expressions on the two sides of the equality signs, it is readily seen that $\tau'=\tau\lambda^{-1}$ and $\gamma'=\gamma\pi$. On the other hand, if $\tau$ and $\tau'$ are given, $\lambda$ can then be conversely computed as $\lambda=\tau'^{-1}\tau$. Similarly, $\pi$ can be calculated from $\gamma$ and $\gamma'$ as $\pi=\gamma^{-1}\gamma'$. A direct consequence can be drawn that the permutations $\tau$ and $\gamma$ that induce the trace and the guide of a banyan-type network can be changed to any $\tau'$ and $\gamma'$, respectively, by simply prepending the network with an input exchange $X_\lambda$ and appending with an output exchange $X_\pi$, where $\lambda=\tau'^{-1}\tau$ and $\pi=\gamma^{-1}\gamma'$. In other words, the trace $\tau(1), \tau(2), \ldots, \tau(n)$ of any $2^n \times 2^n$ banyan-type network $[\sigma_0:\sigma_1:\ldots:\sigma_{n-1}:\sigma_n]$ can be changed to another sequence $\tau'(1), \tau'(2), \ldots, \tau'(n)$ by prepending the network with an input exchange $X_\lambda$ where $\lambda=\tau'^{-1}\tau$; and the guide $\gamma(1), \gamma(2), \ldots \gamma(n)$ of any $2^n \times 2^n$ banyan-type network $[\sigma_0:\sigma_1:\sigma_{n-1}:\sigma_n]$ can be changed to another sequence $\gamma'(1), \gamma'(2), \ldots, \gamma'(n)$ by appending the network with an output exchange $X_\pi$ where $\pi=\gamma^{-1}\gamma'$.

EXAMPLE 10

For the 8×8 banyan-type network $[(2\;3):(2\;3):(1\;3):id]_3$, the trace is induced by $\tau=(1\;2\;3)$ and the guide by $\gamma=(1\;2)$. Meanwhile an 8×8 network with monotonically decreasing trace and guide has the trace induced by $\tau'=(1\;3)$ and the guide by $\gamma'=(1\;3)$. In order to turn the 8×8 banyan-type network into one with monotonically decreasing trace and guide, the required $\lambda$ can be calculated as $\tau'^{-1}\tau=(1\;3)^{-1}(1\;2\;3)=(3\;1)(1\;2\;3)=(3\;2)$, and the required $\pi=\gamma^{-1}\gamma'=(1\;2)^{-1}(1\;3)=(2\;1)(1\;3)=(2\;3)$.

Note that for a general bit-permuting network $[\sigma_0:\sigma_1:\ldots:\sigma_{k-1}:\sigma_k]_n$, whenever the trace is not a sequence of n distinct integers from 1 to n, and hence neither is the guide, they cannot be written as $\tau(1), \tau(2), \ldots, \tau(n)$, and $\gamma(1), \gamma(2), \ldots, \gamma(n)$, that is, they are not associated with any pair of permutations $\tau$ and $\gamma$. However, the trace and the guide of the network will still be altered when the network is prepended with an additional input exchange and appended with an additional output exchange. Let the trace and the guide of a generic bit-permuting network $[\sigma_0:\sigma_1:\ldots:\sigma_{k'1}:\sigma_k]_n$ be $t_1, t_2, \ldots, t_k$ and $g_1, g_2, \ldots, g_k$, respectively. Then by prepending an input exchange $X_\lambda$ and appended with an additional output exchange $X_\pi$, the resulting network $[\lambda\sigma_0:\sigma_1:\ldots:\sigma_{k-1}:\sigma_k\pi]_n$ will have the new trace $t'_1, t'_2, \ldots, t'_k$ and the new guide $g'_1, g'_2, \ldots, g'_k$ where $t'_j=\lambda^{-1}(t_j)$ and $g'_j=\pi(g_j)$, for each j.

Contrasting the situation of banyan-type networks, the trace and the guide of a bit-permuting network in general cannot be arbitrarily altered by prepending an input exchange and appending an output exchange. For example, a trace 1, 2, 3, 1 can never be changed to another trace 1, 2, 3, 2 by this way. On the other hand, if the trace and the guide of a bit-permuting network can be changed to the trace and the guide of another bit-permuting network by prepending an input exchange and/or appending an output exchange, the two networks are regarded to be equivalent. In particular, all banyan-type networks are equivalent in this sense, the weakest sense of equivalence. Different senses of equivalence among bit-permuting networks and among banyan-type networks will be discusses in section C; after the introduction of "cell rearrangement."

It should be noted that prepending an input exchange and appending an output exchange can be regarded as altering the original input exchange and output exchange, respectively. Recall that the I/O exchanges are due to the different external I/O orderings from the default system, therefore, the alteration of I/O exchanges of a network can be realized by either physically prepending or appending a wiring of exchange pattern S or virtually re-labeling the external I/O addresses.

D. Conditionally Nonblocking Switches

The definition of a "nonblocking switch" in Section A.1 can be paraphrased as follow: An m×n switch is said to be "nonblocking" if, for every sequence of distinct inputs $I_0, I_1, \ldots, I_{k-1}$, and every sequence of distinct outputs $O_0, O_1, \ldots, O_{k-1}$, where $k=\min\{m, n\}$, there exists a connection state that concurrently connects each $I_j$ to $O_j$ for all j. This section deals with "conditionally nonblocking" switches, which are substitutes for nonblocking switches when the input traffic has been preprocessed so as to meet certain "conditions". A compressor, a decompressor, an expander, a UC nonblocking switch, etc., to be defined in the sequel, are conditionally nonblocking switches, where the "conditions" pertain to the correlation between active input addresses and active output addresses.

1. Compressor and Decompressor

Recall from Definition A7 that a switch is said to accommodate a combination of concurrent I/O connections if there exists a connection state of the switch that achieves every I/O connection in the combination. When a combination of concurrent connections is accommodated by a switch, the I/O connections in the qualified connection state covers, but is not limited to, the combination that is being accommodated.

Definition D1: "compressor" and "decompressor". An N×N switch is called a "compressor switch" (resp. "decompressor switch"), or simply a "compressor" (resp. "decompressor"), if it can accommodate every combination of k concurrent connections, k≦N, from k distinct inputs, which are referred to as the k "active inputs" and their addresses the "active input addresses", to k distinct outputs, which are referred to as the k "active outputs" and their addresses the "active output addresses", subject to: there exists a rotation on the ordering of the N output (resp. input) addresses such that the following constraints are met
  (a) the k active output (resp. input) addresses are consecutive after the rotation; and
  (b) the correspondence between active I/O addresses is order preserving after the rotation.

The two constraints, which are some kinds of correlations among the active I/O addresses, are collectively referred to as the "compressor constraint" (resp. "decompressor constraint").

In other words, upon a connection request of routing k incoming signals, k≦N, wherein the k incoming signals arrive at k distinct input ports determining the k active input addresses are destined for k distinct corresponding output ports determining the k active output addresses, the compressor (resp. decompressor) can always accommodate the connection request by activating an appropriate one of its connection states as long as the connection request is compliant to the compressor constraint (resp. decompressor constraint).

The k concurrent connections in the combination are from distinct inputs and hence all are point-to-point connections, but the connection state to accommodate the combination is not necessarily point-to-point.

The phrase "order preserving" employed by the definition to describe the correspondence between active I/O addresses means that when the active addresses on one side (e.g. input side) are arranged according to an ordering of the addresses, e.g. in the increasing order, then the ordering of the corresponding active addresses on the other side is also the same, e.g. also increasing. This preservation of the orderings through the I/O correspondence may be subject to a rotation on the ordering of the addresses on one side.

EXAMPLE 1

An exemplary connection request compliant to the compressor constraint is shown in FIG. 32A. Consider the 5×5 switch 3200 in FIG. 32A. The five input ports (3201, 3202, 3203, 3204, and 3205) and five output ports (3206, 3207, 3208, 3209, and 3210) are respectively labeled from top to bottom with the addresses 0, 1, 2, 3, and 4 before any rotation, and the requested connections are "1→3" (means "a connection from input 1 to output 3"), "3→4" and "4→0", indicated by the arrow 3211, 3212 and 3213, respectively. The combination of these three connections is compliant to the compressor constraint because, when the ordering of the output addresses is rotated in such a way that the five output ports are labeled from top to bottom as 2, 3, 4, 0, 1, for instance, as shown in FIG. 32B, then after this rotation, (1) the new addresses of the three active output ports become 0, 1, and 2, so they are consecutive; (2) the active connection pairs now become "1→0", "3→1" and "4→2", as indicated by the arrow 3221, 3222 and 3223, respectively, and hence the correspondence between active I/O addresses is clearly order preserving.

A compressor/decompressor is a "conditionally nonblocking switch" since it only accommodates certain combinations of concurrent point-to-point connections while a nonblocking switch accommodates every such combination. Note that the condition (a) is equivalent to the followings: imagine when the array of the output (resp. input) ports of the switch is bent into a circular ring, the active output (resp. input) ports become consecutive along the ring. The equivalence of condition (b) is illustrated in the following example.

EXAMPLE 2

FIG. 32C shows five concurrent connections over a compressor. When rectangle 3220 representing the compressor is bent into cylinder 3230, as in FIG. 32D, by abutting (or gluing) the top edge of rectangle 3220 to the bottom edge, lines representing the five connections can be drawn in a nonintersecting manner because of the constraint (b) above in the compressor definition. The mirror images of FIGS. 32C and 32D show the case for a decompressor.

EXAMPLE 3

A 3×3 switch qualifies as a compressor if and only if it accommodates at least the six combinations of concurrent connections depicted by element 3300 in FIG. 33. Connection states to accommodate these six combinations can be ({0},{1},{2}), ({1},{2},{0}), ({2},{0}, {1}), ({1},null,{2}), ({0},null,{1}), ({2},null,{0}). An alternative selection of the connection states is ({0},{1},{2}), ({1},{2},{0}), ({2},{0}, {1}), ({1},{0},{2}), ({0},{2},{1}), ({2},{1},{0}).

EXAMPLE 4

A 2×2 switch qualifies as a compressor or decompressor if and only if it includes both the bar and cross states. Thus the switching cell is both a compressor and decompressor (see FIGS. 2A and 2B). In fact the switching cell is a nonblocking switch unconditionally.

The similarity between the compressor and the decompressor can be seen from their respective definition that interchanges the words "input" and "output" in the condition (a). Therefore, the mirror image of a compressor is a decompressor, and vice versa.

2. Expander

Definition D2: "expander". An N×N switch is called an "expander switch", or simply "expander", if it can accommodate every combination of k concurrent connections, k≦N, from k inputs to k distinct outputs subject to: there exists a rotation on the ordering of the N input addresses such that the following constraints are met
  (a) the k active input addresses are consecutive after the rotation; and
  (b) let input addresses i and j be connected to outputs addresses p and q, respectively; if i precedes j with respect to the rotated ordering, then p<q.

The constraint (b) makes the active output addresses a "multi-valued order-preserving function" with respect to the rotated input addresses. The two constraints are collectively referred to as the "expander constraint".

The concurrent connections in the above definition can be either point-to-point or multicast, because they are not necessarily from distinct inputs. An expander and a decompressor are similar except that a decompressor needs only accommodate combinations of point-to-point connections.

EXAMPLE 5

The multicast connections in element 3400 of FIG. 34 from five input ports to nine output ports can be concurrently accommodated by an expander since the combination of these connections is compliant to the expander constraint. As in FIG. 32D, the lines representing the connections can be drawn in a nonintersecting manner when the rectangle of FIG. 34 is bent into a cylinder.

EXAMPLE 6

A 2×2 switch from the input array {0,1} to the output array {0,1} qualifies as an expander if an only if it includes at least the four connection states ({0},{1}),({1},{0}), ({0,1}), null), and (null, {0,1}) depicted in FIGS. 2C-2F. The 2×2 switch comprising exactly these four connection states is called the "expander cell" in Definition A6.

3. Upturned Versions of Compressor, Decompressor and Expander

Definition D3: "upturned compressor" "upturned decompressor". "upturned expander". An "upturned compressor" (resp. "upturned decompressor") is the same as a compressor (resp. decompressor) except that it is modified by "order reversing" instead of "order preserving" in the constraint (b) in its definition. An "upturned expander" is the same as an expander except that it is modified by "q<p" instead of "p<q" in the constraint (b) in its definition. In other words, an upturned compressor/decompressor/expander means a compressor/decompressor/expander with the input/output/output array in reverse ordering.

The corresponding constraints are respectively referred to as the "upturned-compressor constraint", "upturned-decompressor constraint" and "upturned-expander constraint".

EXAMPLE 7

Alluded to above, the switching cell is both a 2×2 compressor and decompressor, and the expander cell is a 2×2 expander. Furthermore, being a nonblocking switch, the switching cell is automatically an upturned compressor and an upturned decompressor, while the expander cell is an upturned expander.

EXAMPLE 8

A 4×4 switch qualifies as a compressor if and only if it accommodates at least the sixteen combinations of concurrent point-to-point connections depicted by element 3500 of FIGS. 35A-P. In contrast, a 4×4 switch qualifies as a upturned compressor if and only if it accommodates at least the sixteen combinations of concurrent point-to-point connections depicted by element 3500 as in FIGS. 36A-P.

4. UC Nonblocking Switch and CU Nonblocking Switch

The conventional mathematical notation for the set of integers modulo N is $Z_N$. This is a set of N elements arranged in the circular order and hence is regarded as a "discretized circle of length N". A function $f$ defined over the set {0, 1, . . . , N−1} induces a function over $Z_N$ by:

$$f(x \bmod N) = f(x)$$

This bends the domain {0, 1, . . . , N−1} of the function $f$ into a discretized circle.

Definition D4: "circular unimodal" function. A permutation over the set {0, 1, . . . , N−1} is said to be "circular unimodal" if its induced function from the discretized circle $Z_N$ to {0, 1, . . . , N−1} possesses only one local maximum and one local minimum.

In other words, a function $f$ defined over the set {0, 1, . . ., N−1} is circular unimodal if the sequence $f(0), f(1), \ldots, f(N-1)$, when bent into a circle, has only one local maximum and one local minimum. Equivalently, the same sequence, after an appropriate rotation, is the concatenation of a monotonically increasing sub-sequence with a monotonically decreasing sub-sequence.

Definition D5: "unimodal-circular nonblocking" switch and "circular-unimodal nonblocking" switch. An N×N switch is said to be "unimodal-circular nonblocking" or "UC nonblocking" if it can accommodate every complete matching between all input addresses and all output addresses, subject to the following constraint: under the matching, the linear input address is a circular unimodal function of the linear output address. This constraint is referred to as the "UC-nonblocking constraint".

An N×N switch is said to be "circular-unimodal nonblocking" or "CU nonblocking" if it can accommodate every complete matching between all input addresses and all output addresses, subject to the following constraint: under the matching, the linear output address is a circular unimodal function of the linear input address. This constraint is referred to as the "CU-nonblocking constraint".

A complete matching between all input addresses and all output addresses means a combination of N concurrent point-to-point connections. The first letter in either "UC nonblocking" or "CU nonblocking" refers to the input side, and the second letter to the output side. Thus, "UC" stands for bending the output address range into a discretized circle, on which the correspondence with input addresses defines a unimodal function. Symmetrically, "CU" stands for bending the input address range into a discretized circle, on which the correspondence with output addresses defines a unimodal function.

EXAMPLE 9

Every nonblocking switch is automatically UC nonblocking and CU nonblocking. The switching cell is a 2×2 example.

EXAMPLE 10

A 4×4 switch qualifies as a UC nonblocking switch if and only if it accommodates at least the sixteen combinations of concurrent point-to-point connections depicted by element 3600 of FIGS. 37A-P.

EXAMPLE 11

FIG. 38A shows an exemplifying I/O matching (3810) from 10 input ports to 10 output ports which is compliant to the UC-nonblocking constraint and thus can be accommodated by a 10×10 UC nonblocking switch. Bending the output address range into a discretized circle 3811 of length 10 and going along the circle from 0 to 9, the corresponding input addresses are 4, 1, 0, 2, 3, 5, 6, 8, 9, 7. As indicated by the curve 3812 this sequence defines a unimodal function over $Z_{10}$ with the only local maximum "9" and the only local minimum "0". Thus the sequence defines a circular unimodal function. Equivalently, the same sequence can be rotated into 0, 2, 3, 5, 6, 8, 9, 7, 4, 1 and becomes the concatenation of the monotonically increasing sub-sequence "0, 2, 3, 5, 6, 8, 9" and the monotonically decreasing sub-sequence "7, 4, 1". Note that, in the partition into monotonically increasing and decreasing sub-sequences, the maximum and minimum can go to either side. For example, the partition can also be "2, 3, 5, 6, 8, 9" and "7, 4, 1, 0". Similarly, FIG. 38B shows an exemplifying I/O matching (3820) from 10 input ports to 10 output ports which is compliant to the CU-nonblocking constraint and thus can be accommodated by a 10×10 CU nonblocking switch.

5. Circular Expander

Definition D6: "circular expander". Label both input ports and output ports of an N×N switch by $0, 1, \ldots, N-1$. The switch is called a "circular expander switch", or simply "circular expander", if it can accommodate every combination of concurrent connections, point-to-point or multicast, subject to the following constraint: if the input ports j and k are connected to the output ports p and q, respectively, then $\|j-k\|_N \leq |p-q|$, where $\|j--k\|_N = \min\{|j-k|, N-|j-k|\}$ is the distance between j and k on the discrete circle $Z_N$. This constraint is referred to as the "circular-expander constraint".

EXAMPLE 12

The expander cell is a 2×2 circular expander

A UC nonblocking (resp. CU nonblocking) switch is both a compressor (resp. decompressor) and upturned compressor (resp. upturned decompressor). A circular expander is an expander, upturned expander, CU nonblocking switch, decompressor, and upturned decompressor.

6. Preservation of Conditionally Nonblocking Properties by 2X or X2 Interconnection When every node in a 2X interconnection network is filled by a compressor, the network constructs a compressor. That is, 2X interconnection preserves the compressor property of a switch. Recursively, a large compressor can be built by the recursive application of 2X interconnection with each building block filled by a smaller compressor.

When every node in a 2X interconnection network is filled by an upturned compressor, the network constructs an upturned compressor. That is, 2X interconnection preserves the upturned compressor property of a switch. Recursively, a large upturned compressor can be built by the recursive application of 2X interconnection with each building block filled by a smaller upturned compressor.

When every node in a 2X interconnection network is filled by a UC nonblocking switch, the network constructs a UC nonblocking switch. That is, 2X interconnection preserves the UC nonblocking property of a switch. Recursively, a large UC nonblocking switch can be built by the recursive application of 2X interconnection with each building block filled by a smaller UC nonblocking switch.

When every node in an X2 interconnection network is filled by a decompressor, the network constructs a decompressor. That is, X2 interconnection preserves the decompressor property of a switch. Recursively, a large decompressor can be built by the recursive application of X2 interconnection with each building block filled by a smaller decompressor.

When every node in an X2 interconnection network is filled by an upturned decompressor, the network constructs an upturned decompressor. That is, X2 interconnection preserves the upturned decompressor property of a switch. Recursively, a large upturned decompressor can be built by the recursive application of X2 interconnection with each building block filled by a smaller upturned decompressor.

When every node in an X2 interconnection network is filled by a CU nonblocking switch, the network constructs a CU nonblocking switch. That is, X2 interconnection preserves the CU nonblocking property of a switch. Recursively, a large CU nonblocking switch can be built by the recursive application of X2 interconnection with each building block filled by a smaller CU nonblocking switch.

When every node in an X2 interconnection network is filled by an expander, the network constructs an expander. That is, X2 interconnection preserves the expander property of a switch. Recursively, a large expander can be built by the recursive application of X2 interconnection with each building block filled by a smaller expander.

When every node in an X2 interconnection network is filled by an upturned expander, the network constructs an upturned expander. That is, X2 interconnection preserves the upturned expander property of a switch. Recursively, a large upturned expander can be built by the recursive application of X2 interconnection with each building block filled by a smaller upturned expander.

When every node in an X2 interconnection network is filled by a circular expander, the network constructs a circular expander. That is, X2 interconnection preserves the circular expander property of a switch. Recursively, a large circular expander can be built by the recursive application of X2 interconnection with each building block filled by a smaller circular expander.

The relationship among switch attributes that are preserved under 2X or X2 interconnection is depicted by diagram 3900 of FIG. 38.

EXAMPLE 13

Consider a 15×15 compressor 4000 constructed from the 2X version of 2Stg(3,5), as shown in FIG. 39, by filling in the nodes with any compressors (4001, 4002, 4003, 4004, 4005, 4006, 4007, 4008) of appropriate sizes. Suppose seven concurrent connections are requested between the array of external input ports and array of external output ports (4009, 4010):

| | | | |
|---|---|---|---|
| a: | 0 | → | 13 |
| b: | 1 | → | 14 |
| c: | 2 | → | 0 |
| d: | 7 | → | 1 |
| e: | 8 | → | 2 |
| f: | 11 | → | 3 |
| g: | 12 | → | 4 |

The combination of these seven connections is clearly compliant to the compressor constraint and thus must be accommodated by the 15×15 compressor so constructed. To shed some light on why this is true, one can examine the requested connections imposed on each individual node locally by the global connections. For example, the global connection 0→13 imposes the connection 0→1 on the first input node and also the connection 0→4 on the second output node. Thus, for example, three connections are requested on the first input node: 0→1, 1→2, 2→0; one can easily find the combination of these three connections compliant to the compressor constraint and thus can be accommodated by the compressor filling the first input node.

As a conclusion, 2X interconnection preserves the compressor, upturned compressor, and UC nonblocking properties of a switch, while X2 interconnection preserves the decompressor, upturned decompressor, CU nonblocking, expander, upturned expander, and circular expander properties of a switch. The same preservation holds when 2X or X2 interconnection is recursively invoked. In particular, recursive 2X and X2 constructions from cells lead to indefinitely large conditionally nonblocking switches of the aforementioned nine types.

EXAMPLE 14

A special case in preserving the conditionally nonblocking properties is when all the nodes in the network are 2×2 and filled with switching cells. A switching cell is a nonblocking switch (which is also a UC nonblocking switch, CU nonblocking switch, compressor, upturned compressor, decompressor, and upturned decompressor). From switching cells, a recursive 2X (resp. X2) construction realizes a UC nonblocking switch (resp. CU nonblocking switch), which is also a compressor and upturned compressor (resp. a decompressor and upturned decompressor).

EXAMPLE 15

Another case is when all the nodes in the network are 2×2 and filled with expander cells. An expander cell is a 2×2 "nonblocking switch in the multicast sense", i.e., it accommodates every combination of connections without any constraint. It is in particular a circular expander. From expander cells, a recursive X2 construction realizes a circular expander, which is also an expander, upturned expander, CU nonblocking switch, decompressor, and upturned decompressor.

7. Construction of Conditionally Nonblocking Switches

Alluded to above, the recursive 2X interconnection network of cells preserves the compressor, upturned compressor and UC nonblocking properties of a switch. Recall from section C5 that every recursive 2X interconnection network of cells is a banyan-type network with monotonically decreasing trace and guide. In general, any banyan-type network with both of its trace and guide being monotonically decreasing will preserve the same properties. In fact, the following statements are equivalent for a banyan-type network:

Both the trace and the guide are monotonically decreasing.
The network constructs a UC nonblocking switch out of the switching cells.
The network constructs a compressor out of switching cells.
The network constructs an upturned compressor out of switching cells.

Analogously the recursive X2 interconnection network of cells preserves the decompressor, upturned decompressor, CU nonblocking, expander, upturned expander, and circular expander properties of a switch, and every recursive X2 interconnection network of cells is a banyan-type network with monotonically increasing trace and guide. In general, any banyan-type network with both of its trace and guide being monotonically increasing will preserve the same properties. In fact, the following statements are equivalent for a banyan-type network:

Both the trace and the guide are monotonically increasing.
The network constructs a CU nonblocking switch out of the switching cells.
The network constructs a decompressor out of switching cells.
The network constructs an upturned decompressor out of switching cells.
The network constructs a circular expander out of expander cells.
The network constructs an expander out of expander cells.
The network constructs an upturned expander out of expander cells.

In conclusion, each of the aforementioned nine conditionally nonblocking properties of a switch are preserved by two families of networks:

either recursive 2X or recursive X2 constructions with arbitrary sizes of building block, and
banyan-type networks either with both trace and guide being monotonically decreasing or with both trace and guide being monotonically increasing.

The relationship between the two families is summarized by diagram 4100 and 4110, respectively, in FIG. 41.

8. Realization of Conditionally Nonblocking Switches by an Arbitrary Banyan-type Network with Appropriate I/O Exchanges In section C9 it is stated that when a $2^n \times 2^n$ banyan-type network with the trace induced by a permutation $\tau$ and the guide by a permutation $\gamma$ is prepended by an additional input exchange $X_\lambda$ and appended by an additional output exchange $X_\pi$, where $\lambda=\tau'^{-1}\tau$ and $\pi=\gamma^{-1}\gamma'$, the trace becomes induced by the permutation $\tau'$ and the guide by the permutation $\gamma'$. In view of the constructions in section D7, this method of altering the trace and guide is of particular interest when $\tau'=\sigma_{\leftrightarrows}^{(n)}=\gamma'$, that is, the new trace and guide are both monotonically decreasing sequences, or when $\tau'=id=\gamma'$, that is, the new trace and guide are both monotonically increasing sequences.

Thus let the trace of an arbitrarily given banyan-type network $[\sigma_0:\sigma_1:\ldots:\sigma_{n-1}:\sigma_n]$ be the sequence $\tau(1), \tau(2), \ldots, \tau(n)$ and the guide be $\gamma(1), \gamma(2), \ldots, \gamma(n)$. Then, the banyan-type network $[\lambda\sigma_0:\sigma_1:\ldots:\sigma_{n-1}:\sigma_n]$ has monotonically decreasing trace and guide, where $\lambda=\sigma_{\leftrightarrows}^{(n)}\tau$ and $\pi=\gamma^{-1}\sigma_{\leftrightarrows}^{(n)}$. The difference between the two networks is the prepending of the additional input exchange $X_\lambda$ and the appending of the additional output exchange $X_\pi$. Similarly, the banyan-type network $[\lambda\sigma_0:\sigma_1:\ldots:\sigma_{n-1}:\sigma_n\pi]$ has monotonically increasing trace and guide, where $\lambda=\tau$ and $\pi=\gamma^{-1}$.

Different banyan-type networks may be functionally equivalent and can substitute each other in applications. Among all banyan-type networks, those with the minimum layout complexity according to the "2-layer Manhattan model with reserved layers" turn out to be "divide-and-conquer networks", as disclosed by S.-Y R. Li, "Optimal multistage interconnection by divide-and-conquer networks," Proceedings of the IASTED International Conference on Parallel and Distributed Computing and Networks, Brisbane, Australia, published by ACTA Press, Anaheim, Calif., pp. 318-323, 1998.

On the other hand, well-known banyan-type networks, such as the baseline network and the banyan network, all have anti-optimal layout complexities in some sense. Moreover, divide-and-conquer networks are noted for their utmost structural modularity.

When a $2^n \times 2^n$ divide-and-conquer network is appended with the swap exchange, the trace and guide are both monotonically decreasing. In fact, this network attains the minimum layout complexity among all $2^n \times 2^n$ banyan-type networks with monotonically decreasing trace and guide.

Similarly when a $2^n \times 2^n$ divide-and-conquer network is prepended with the swap exchange, the trace and guide are both monotonically increasing. In fact, this network attains the minimum layout complexity among all $2^n \times 2^n$ banyan-type networks with monotonically increasing trace and guide.

EXAMPLE 16

FIG. 42 depicts a recursive 2X interconnection network of cells, which is the 16×16 reverse banyan network (4201) appended with the inverse shuffle exchange (4202). With monotonically decreasing trace and guide, this network realizes a compressor when every cell in it is filled with a switching cell. The same applies to the 16×16 divide-and-conquer network (4301) appended with the swap exchange (4302), which appears in FIG. 43. Both networks are functionally identical, but the latter enjoys superior layout complexity and structural modularity.

E. Equivalence Among Bit-Permuting Networks Under Intra-Stage Cell Rearrangement Consider that every interconnection line inside a multi-stage network is an elastic string with one end affixed to an output of a node at one stage and the other end to an input of a node at the next stage. Let the ordering among nodes (e.g., cells) at a certain stage in the network be scrambled, but keep the elastic strings attached to the said output/input of nodes. An example is shown in FIG. 44A wherein stage 2 (44011) is to be scrambled; the results of scrambling are shown in FIG. 44B—for example, a node designated as node A in FIG. 44A, appearing as the node second from the top in stage 44011, is moved to the node appearing as the third from the top in FIG. 44B. Thus the exchanges immediately before and after the scrambled stage are altered. In fact, the exchange (44012) immediately before the scrambled stage gets multiplied by an "exchange of rearrangement" (44021) from the right-hand side and, meanwhile, the exchange (44013) immediately after the scrambled stage gets multiplied by the inverse (44022) of the "exchange of rearrangement" from the left-hand side. More details pertaining to FIGS. 44A and 44B will be covered in a later example.

Since the internal connectivity of the network is not altered by the scrambling, the networks before and after the scrambling are regarded as "equivalent". This section describes the conditions for such equivalence among bit-permuting networks and also present the mechanism for the conversion between equivalent networks.

1. Cell Rearrangement

Over a $2^n \times 2^n$ bit-permuting network, it is of particular interest when the scrambling of cell ordering within a stage results in another bit-permuting network. This would be the case when the aforementioned "exchange of rearrangement" is a permutation induced exchange, say, $X_\kappa$. However, not every exchange induced by a permutation on integers 1 to n can play the role of this "exchange of rearrangement". The scrambling is among the $2^{n-1}$ cells at the stage but does not scramble the ordering between the two inputs (resp. between the two outputs) of each cell. If $X_\kappa(a_1 a_2 \ldots a_{n-1} x) = b_1 b_2 \ldots b_{n-y}$ for any bits x and y, it implies that the cell at the binary address $a_1 a_2 \ldots a_{n-1}$ is relocated to the new address $b_1 b_2 \ldots b_{n-1}$ and consequently $X_\kappa(a_1 a_2 \ldots a_{n-1} 0) = b_1 b_2 \ldots b_{n-1} 0$ and $X_\kappa(a_1 a_2 \ldots a_{n-1} 1) = b_1 b_2 \ldots b_{n-1} 1$. For the permutation κ to possess this property, the equivalent condition is that κ(n)=n, that is, κ is actually a permutation on just the integers 1 to n−1. This observation leads to the following formal definition.

Definition E1: "cell rearrangement". If κ is permutation on the integers from 1 to n but preserves n, then the induced $2^n \times 2^n$ exchange $X_\kappa$ is called a $2^n \times 2^n$ "cell rearrangement". The application of the cell rearrangement $X_\kappa$ to a particular stage of a bit-permuting network means the multiplication of the exchange immediately before the stage by $X_\kappa$ from the right-hand side together with the multiplication of the exchange immediately after the stage by $X_\kappa^{-1}$ from the left-hand side.

Explicitly, the application of the cell rearrangement $X_\kappa$ to stage j of the $2^n \times 2^n$ k-stage network $[(\sigma_0:\sigma_1:\sigma_2:\ldots:\sigma_{k-1}:\sigma_k]_n$ results in the network $[\sigma_0:\sigma_1:\ldots:\sigma_{j-1}\kappa:\kappa^{-1}\sigma_j:\ldots:\sigma_k]_n$. Let $\kappa_1, \kappa_2, \ldots, \kappa_k$ be permutations on integers from 1 to n that preserve n. Then the application of the $2^n \times 2^n$ cell rearrangement induced by each $\kappa_j$ to stage j, respectively, of the $2^n \times 2^n$ k-stage network $[\sigma_0:\sigma_1:\sigma_2:\ldots:\sigma_{k-1}:\sigma_k]_n$ results in the network $[\sigma_0\kappa_1:\kappa_1^{-1}\sigma_1\kappa_2:\kappa_2^{-1}\sigma_2\kappa_3:\ldots:\kappa_{k-1}^{-1}\sigma_{k-1}\kappa_k:\kappa_k^{-1}\sigma_k]_n$.

A cell rearrangement on any stage of a bit-permuting network $[\sigma_0:\sigma_1:\sigma_2:\ldots:\sigma_{k-1}:\sigma_k]_n$ preserves both the trace and guide of the network.

EXAMPLE 1

FIGS. 44A-C exemplify the application of the cell rearrangement $X_{(3\ 2\ 1)}$ on stage 2 (44011) of the 16×16 baseline network [id: (1 2 3 4):(2 3 4):(3 4):id] 44010 of FIG. 44A; network 44020 of FIG. 44B is the rearranged network before simplifying the pictorial display of the exchanges. The cell rearrangement relocates a stage-2 cell from the generic address binary($b_1 b_2 b_3$) to the new address binary($b_2 b_3 b_1$). In other words, the exchange $X_{(1\ 2\ 3\ 4)}$ (44012) of FIG. 44A immediately before stage 2 is multiplied by $X_{(3\ 2\ 1)}$ (44021) of FIG. 44B from the right-hand side to yield the resulting exchange $X_{(3\ 4)}$ (44031) of FIG. 44C, while the exchange $X_{(2\ 3\ 4)}$ (44013) of FIG. 44A immediately after stage 2 is multiplied by $X_{(1\ 2\ 3)}$ (44022) of FIG. 44B, i.e., the inverse of $X_{(3\ 2\ 1)}$, from the left-hand side to yield the resulting exchange $X_{(4\ 2)(3\ 1)}$ (44032) of FIG. 44C. The cell rearrangement results the network 44030 having a simplified graphical representation:

[id:(1 2 3 4)(3 2 1):(1 2 3)(2 3 4):(3 4):id]=[id:(43): (42)(3 1):(4 3):id]

2. Equivalence Among Banyan-type Networks Under Cell Rearrangement

Every given $2^n \times 2^n$ banyan-type network can be cell-rearranged into any other except possibly for the mismatch of I/O exchanges, and there is only a unique way for such cell rearrangement. More explicitly, given the banyan-type networks $\Phi=[\sigma_0:\sigma_1:\sigma_2:\ldots:\sigma_{n-1}:\sigma_n]$ and $\Psi=[\pi_0:\pi_1:\pi_2:\ldots:\pi_{n-1}:\pi_n]$, there exists a unique sequence $\kappa_1, \kappa_2, \ldots, \kappa_n$ of permutations on integers from 1 to n that preserve n such that the application of the cell rearrangement induced by each $\kappa_j$ to stage j, respectively, of the network $\Phi$ results in a network $\Psi$ in the form of $[\alpha:\pi_1:\pi_2:\ldots:\pi_{n-1}:\beta]$ for some permutations α and β. As noted in the above, cell rearrangement preserves trace and guide and hence the network $\Psi'=[\alpha:\pi_1:\pi_2:\ldots:\pi_{n-1}:\beta]$ shares the same trace and guide with the network $\Phi$. From the definition of trace, the two networks $\Psi$ and $\Psi'$ share a common trace if and only if $\alpha=\pi_0$ and share a common guide if and only if $\beta=\pi_n$. Thus, the two given networks $\Phi$ and $\Psi$ share a common trace if and only if $\alpha=\pi_0$, which is also a necessary and sufficient condition for cell-rearranging $\Phi$ into a network that is identical with $\Psi$ except possibly for a different output exchange. Similarly, the two given networks share a common guide if and only if $\beta=\pi_n$, which is also a necessary and sufficient condition for cell-rearranging $\Phi$ into a network that is identical with $\Psi$ except possibly for a different input exchange.

Since cell rearrangement does not alter the internal connectivity of a multi-stage network, the networks before and after the rearrangement are regarded as "equivalent" to each other and are exchangeable in applications. Thus two $2^n \times 2^n$ banyan-type networks are "equivalent" if and only if they share the same trace and guide. However, this is only the strong sense of "equivalence". There are some weaker senses of the meaning of network "equivalence" through cell rearrangement. For certain applications, the input exchange and/or the output exchange is immaterial and hence two given networks are regarded as "equivalent" to each other when one of the given networks can be cell-rearranged into a form that matches all interstage exchanges in the other given network but without necessarily matching the input exchange and/or the output exchange. Thus, there are four senses of network "equivalence" through cell rearrangement depending on whether or not to require the matching of the input exchange and whether or not to require the matching of the output exchange.

Two banyan-type networks are said to be "equivalent" to each other in the weak sense when one of them can be cell-rearranged into a network that matches all interstage exchanges of the other. All $2^n \times 2^n$ banyan-type networks are equivalent under this weak sense. One intermediate sense of equivalence between two networks is when one of them can be cell-rearranged into a network that matches the input exchange, as well as all interstage exchanges, of the other. The necessary and sufficient condition for the equivalence in this sense is the sharing of a common trace. Another intermediate sense of equivalence between two networks is when one of them can be cell-rearranged into a network that matches the output exchange, as well as all interstage exchanges, of the other. The necessary and sufficient condition for the equivalence in this sense is the sharing of a common guide. These four senses of equivalence among banyan-type networks are arranged into a hierarchical diagram 4500 in FIG. 45.

The equivalence among banyan-type networks without I/O exchanges is worth extra mentioning. Let two banyan-type networks $\Phi=[id:\sigma_1:\sigma_2: \ldots :\sigma_{n-1}:id]$ and $\Psi=[id:\pi_1:\pi_2: \ldots :\pi_{n-1}:id]$ be given. There is a unique way of cell-rearranging the network $\Phi$ into the form of $[\alpha:\pi_1:\pi_2: \ldots :\pi_{n-1}:\beta]$ for some permutations $\alpha$ and $\beta$. This unique way of cell rearrangement leaves the first stage intact if and only if $\alpha=id$, which is equivalent to the sharing of a common trace between the two given networks. Similarly, the unique way of cell rearrangement leaves the final stage intact if and only if $\beta=id$, which is equivalent to the sharing of a common guide between the two given networks. The four senses of equivalence among banyan-type networks without I/O exchanges are arranged into a hierarchical diagram 4600 as shown in FIG. 46.

EXAMPLE 2

Suppose that a chip implements a decompressor with a recursive X2 construction together with the circuitry for preprocessing the input traffic to ensure the compliance with the decompressor constraint. This construction can be replaced by some other banyan-type networks, as long as the decompressor property is preserved. Since the connections to the circuitry for input preprocessing fix the external input order of the network, the new network needs to share the same trace as the original network. On the other hand, since the external output order can be altered outside the chip or relabeled in order to preserve the decompressor property, it is not necessary for the new network to share the same guide as the original network.

3. Equivalence Among Bit-permuting Networks Under Cell Rearrangement

The four senses of equivalence among banyan-type networks extend to all bit-permuting networks and are summarized into a hierarchical diagram 4700 in FIG. 47.

Two bit-permuting networks are equivalent to each other in the strong sense when they can be cell-rearranged into each other. The necessary and sufficient condition is for the two networks to share the same trace and the same guide.

One intermediate sense of equivalence between two networks is when one of them can be cell-rearranged into a network that matches the input exchange, as well as all interstage exchanges, of the other. The necessary and sufficient condition for the equivalence in this sense is the sharing of a common trace. When two $2^n \times 2^n$ bit-permuting networks are equivalent in this sense, there exists a permutation on integers 1 to n that maps the guide of one network term-by-term to the guide of the other.

Another intermediate sense of equivalence between two networks is when one of them can be cell-rearranged into a network that matches the output exchange, as well as all interstage exchanges, of the other. The necessary and sufficient condition for the equivalence in this sense is the sharing of a common guide. When two $2^n \times 2^n$ bit-permuting networks are equivalent in this sense, there exists a permutation on integers 1 to n that maps the trace of one network term-by-term to the trace of the other.

Two bit-permuting networks are equivalent to each other in the weak sense when one of them can be cell-rearranged into a network that matches all interstage exchanges of the other. Two k-stage $2^n \times 2^n$ bit-permuting networks are equivalent in this sense if and only if there exist a permutation on integers 1 to n that maps the trace of one network term-by-term to the trace of the other. This condition is equivalent to the existence of a permutation that maps the guide of one network term-by-term to the guide of the other.

The four senses of equivalence among bit-permuting networks without I/O exchanges are summarized into a hierarchical diagram 4800 in FIG. 48.

Let the permutation a on integers 1 to n map the trace of a $2^n \times 2^n$ bit-permuting network term-by-term to the trace of another. By prepending the first network with the extra input exchange induced by $\sigma^{-1}$, the two networks become sharing a common trace. On the other hand, if $\pi$ maps the guide of the first network term-by-term to the guide of the second, then appending the first network with the extra output exchange $X_\pi$ make the two networks share a common guide. If both the extra input exchange and the extra output exchange are applied, the two networks become sharing a common trace and a common guide. Thus the extra input exchange and/or the extra output exchange turn the equivalence in the weak sense into the equivalence in a stronger sense.

Examples of this technique have appeared in subsection F8 in the conversion of an arbitrarily given banyan-type network into one with monotonically decreasing/increasing trace and guide in order to preserve various conditionally nonblocking properties of a switch.

F. Generalized Divide-and-Conquer Networks

1. Recursive 2-stage Construction Associated with a Binary Tree

Recall the definitions in Section B of "2-stage interconnection", "recursive 2-stage construction", "2-stage tensor product", etc. The following conventions are adopted throughout this section unless otherwise specified:

The term "2-stage interconnection" includes plain 2-stage interconnection, 2X interconnection, and X2 interconnection. Consequently, the terms of a "2-stage tensor product" would include the case of a "2X tensor product", etc.

All building blocks of all constructions are cells, i.e., 2×2 nodes, hence the term "recursive 2-stage construction from cells" is abbreviated as "recursive 2-stage construction" in this section when there is no ambiguity.

All exchanges in the multi-stage interconnection networks are bit-permuting.

Recall from section B that a binary tree logs a procedure for "recursive applications of 2-stage interconnection" or "recursive 2-stage construction" in short. The binary tree is then said to be "associated with" the recursive 2-stage interconnection network yielded by the logged procedure. Paving the way for the description of certain inventive subject matter, this section provides further details in the association between binary trees and recursive 2-stage interconnection networks. Some basic notions pertaining to a binary tree are listed below:

In a binary tree, "leaves" always outnumber "internal nodes" by exactly one. Thus there are exactly k−1 internal nodes on a k-leaf tree.

The "weight" of a node J is defined to be the number of leaves in the sub-tree rooted at j.

When J is a leaf, the sub-tree rooted at J is a single node and hence the weight of a leaf is one.

A binary tree is said to be "balanced" if for every internal node, the weights of its two sons differ from each other by at most one.

A binary tree is said to be "anti-balanced" if for every internal node, at least one of its two son is a leaf. In particular, a "leftist tree" (resp. a "rightist tree") means a binary tree where the right-son (resp. left-son) of every internal node is a leaf.

EXAMPLE 1

FIGS. 49A-E show all five 4-leaf binary trees. The weight of each internal node is labeled on the node. Among the five trees 4910, 4920, 4930, 4940 and 4950, the tree 4910 is the only balanced tree, the tree 4920 is the rightist tree and the tree 4950 is the leftist tree.

The association between binary trees and recursive 2-stage interconnection networks can be built from bottom up through the following recursion:

A single-node binary tree is associated with the single-cell network.

A multi-node binary tree is associated with the 2-stage tensor product of $\Phi$ and $\Psi$, where $\Phi$ and $\Psi$, respectively, are networks associated with sub-trees rooted at the left and right sons of the root node.

EXAMPLE 2

Figure 50A:
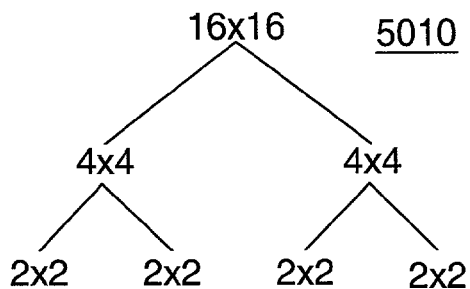
Figure 50B:
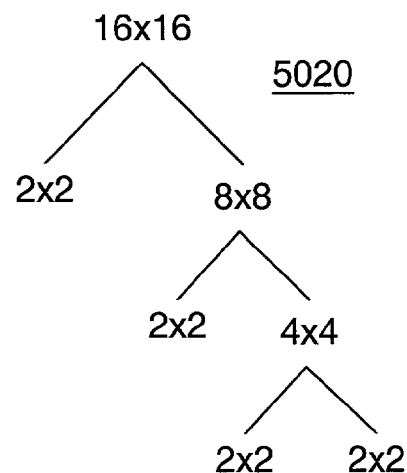
Figure 50C:
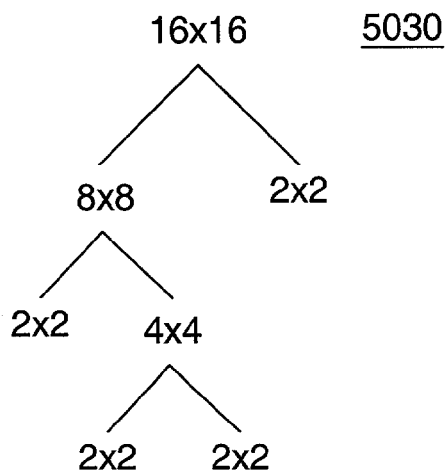
Figure 50D:
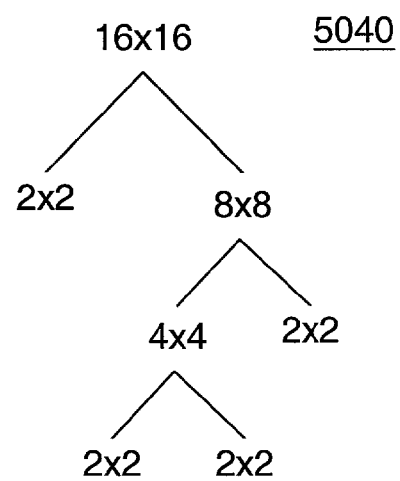
Figure 50E:
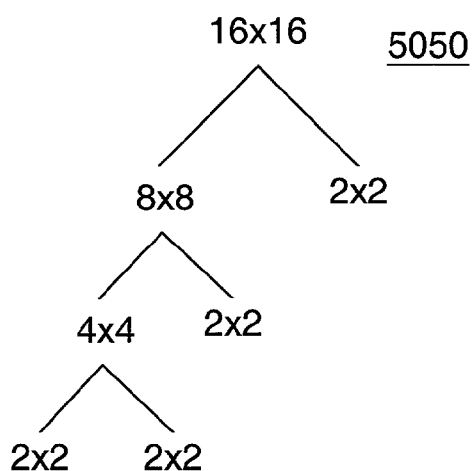

The recursive plain 2-stage interconnection network associated with the balanced tree 5010 of FIG. 50A is the 16×16 network [:(3 4):(1 3)(2 4):(3 4):] 5100 shown in FIG. 51, which will be called the 16×16 "divide-and-conquer network" in a definition in the sequel. The one associated with the rightist tree 5020 of FIG. 50B is the 16×16 baseline network [:(1 2 3 4):(2 3 4):(3 4): ] 5200 shown in FIG. 52. Symmetrically the one associated with the leftist tree 5050 of FIG. 50E is the 16×16 reverse baseline network [:(4 3):(4 3 2):(4 3 2 1):], which is the mirror image of the 16×16 baseline network 5200. If "2X interconnection" is used instead of "plain 2-stage interconnection", the recursive 2-stage interconnection network associated with the balanced tree 5010 is the 16×16 network [:(3 4):(1 3 2 4):(3 4):(1 3 2 4)] 5300 shown in FIG. 53. Meanwhile, the one associated with the rightist tree 5020 is the 16×16 baseline network appended with the swap exchange [:(1 2 3 4):(2 3 4):(3 4):(1 4)(2 3)] 5400 shown in FIG. 54, and the one associated with the leftist tree 5050 is the 16×16 reverse banyan network appended with the inverse shuffle exchange [:(3 4):(2 4):(1 4):(1 2 3 4)] 5500 shown in FIG. 55.

As a convention stated at the beginning of this section, building blocks of a recursive 2-stage interconnection network are cells. Each leaf of the binary tree corresponds to a building block in the recursive 2-stage interconnection network associated with the tree, while a generic internal node J corresponds to the step of 2-stage interconnection in the same recursive 2-stage construction, where each input node at that step is a network associated with the sub-tree rooted at the left son of J and each output node at that step is a network associated with the sub-tree rooted at the right son of J.

EXAMPLE 3

A node of a binary tree corresponds to a building block or a step of 2-stage interconnection in the recursive construction of the network associated with the tree. The dimensions of a building block are 2×2, and the dimensions of the resulting network from each step of 2-stage interconnection is $2^k \times 2^k$ for some k. In this way every node of a binary tree corresponds to the dimensions $2^k \times 2^k$ for some k. For the five 4-leaf binary trees 4910, 4920, 4930, 4940 and 4950 in FIGS. 49A-49E, the corresponding dimensions of each node is indicated in FIGS. 50A-50E, where the five trees 5010, 5020, 5030, 5040, and 5050 are identical with those in FIGS. 49A-49E.

The association between binary trees and recursive 2-stage interconnection networks can be summarized in general as follows: The recursive plain 2-stage interconnection network associated with an n-leaf binary tree is a $2^n \times 2^n$ banyan-type network without I/O exchange, that is, a network in the form $[id:\sigma_1: \ldots :\sigma_{n-1}:id]_n$ or simply $[:\sigma_1: \ldots :\sigma_{n-1}:]_n$.

In particular, the recursive plain 2-stage interconnection network associated with the n-leaf rightist (resp. leftist) tree is the $2^n \times 2^n$ baseline network (resp. reverse baseline network).

The recursive 2X interconnection network associated with an n-leaf binary tree is a $2^n \times 2^n$ banyan-type network with an output exchange and without an input exchange, that is, a network in the form $[id:\sigma_1: \ldots :\sigma_{n-1}:\sigma_n]_n$ or simply $[:\sigma_1: \ldots :\sigma_{n-1}:\sigma_n]_n$. In particular, the recursive 2X interconnection network associated with the n-leaf leftist tree is the $2^n \times 2^n$ reverse banyan network appended with the $2^n \times 2^n$ inverse shuffle exchange.

The recursive 2X interconnection network associated with the n-leaf rightist tree is the $2^n \times 2^n$ baseline network appended with the $2^n \times 2^n$ swap exchange.

The recursive X2 interconnection network associated with an n-leaf binary tree is a $2^n \times 2^n$ banyan-type network with an input exchange and without an output exchange, that is, a network in the form $[\sigma_0:\sigma_1: \ldots :\sigma_{n-1}:id]_n$ or simply $[\sigma0:\sigma_1: \ldots :\sigma_{n-1}:]_n$.

In particular, the recursive X2 interconnection network associated with the n-leaf leftist tree is the $2^n \times 2^n$ reverse baseline network prepended with the $2^n \times 2^n$ swap exchange.

The recursive X2 interconnection network associated with the n-leaf rightist tree is the $2^n \times 2^n$ banyan network prepended with the $2^n \times 2^n$ shuffle exchange.

2. Divide-and-Conquer Network

Definition F1: "divide-and-conquer network". A $2^n \times 2^n$ "divide-and-conquer network" is the recursive plain 2-stage interconnection network associated with an n-leaf balanced binary tree. In particular the 2×2 divide-and-conquer network is just a single cell.

EXAMPLE 4

The only two 3-leaf trees are the leftist and the rightist trees. Both are balanced and also anti-balanced. Thus the 8×8 reverse baseline network is the divide-and-conquer network associated with the 3-leaf leftist tree 5610 in FIG. 56A. The mirror image, i.e., the 8×8 baseline network is the divide-and-conquer network associated with the 3-leaf rightist tree.

EXAMPLE 5

Among the five 4-leaf trees shown in FIGS. 50A-50E, the only balanced tree is the tree 5010. The unique 16×16 divide-and-conquer network 5100, as shown in FIG. 51, is the recursive plain 2-stage interconnection network associated with the 4-leaf balanced tree 5010.

EXAMPLE 6

Associated with the 6-leaf balanced binary tree 5630 in FIG. 56C is the 64×64 divide-and-conquer network 5700 shown in FIG. 57. The middle exchange $X_{(6\ 3)(5\ 2)(4\ 1)}$ 5710 is the coordinate interchange in the 2-stage interconnection with parameters m=8 and n=8. This exchange divides the construction into two sides. There are eight disjoint copies of the 8×8 reverse baseline network 5720 on each side, which is by itself a divide-and-conquer network. The middle exchange $X_{(6\ 3)(5\ 2)(4\ 1)}$ in this 64×64 network is equivalent to the array of contact points between two perpendicular stacks of planes 5801/5802 depicted by FIG. 58. Each plane carries an 8×8 reverse baseline network 5720.

EXAMPLE 7

Associated with the 8-leaf balance tree 5640 in FIG. 56D is the 256×256 divide-and-conquer network [:(8 7):(8 6)(7 5):(8 7):(8 4)(7 3)(6 2)(5 1):(8 7):(8 6)(7 5):(8 7):]. This network can be represented by two orthogonal stacks in the same fashion as FIG. 58 but with every plane carrying a 16×16 divide-and-conquer network 5100 instead of an 8×8 reverse baseline network. The network is divided by the middle exchange $X_{(8\ 4)(7\ 3)(6\ 2)(5\ 1)}$ into two sides, each containing 16 disjoint copies of the 16×16 divide-and-conquer network. As mentioned in an earlier example, this 16×16 network, in turn, is divided by its middle exchange into two sides, each containing four disjoint copies of the 4×4 network. The 4×4 network, in turn, is divided by its exchange into two sides with two cells on each side. The structure of the above 256×256 example is most descriptive of the name "divide-and-conquer."

EXAMPLE 8

According to the nature of a balanced tree, the weight differential between the two sons of every internal node is at most one. Thus, in the recursive 2-stage construction logged by a balanced tree, every step of 2-stage interconnection yields the tensor product between a certain $2^p \times 2^p$ network and a certain $2^q \times 2^q$ network, where $|p-q| \leq 1$. Thus $p=\lceil n/2 \rceil$ and $q=\lfloor n/2 \rfloor$, or $p=\lfloor n/2 \rfloor$ and $q=\lceil n/2 \rceil$, where the notation $\lceil \cdot \rceil$ stands for the arithmetic operation "ceiling" and $\lfloor \cdot \rfloor$ for the arithmetic operation "floor". A $2^n \times 2^n$ divide-and-conquer network can therefore be recursively constructed as the plain 2-stage tensor product 5900 in FIG. 59 between a $2^{\lceil n/2 \rceil} \times 2^{\lceil n/2 \rceil}$ divide-and-conquer network 5901 and a $2^{\lfloor n/2 \rfloor} \times 2^{\lfloor n/2 \rfloor}$ divide-and-conquer network 5902.

A divide-and-conquer network achieves layout optimality under the 2-layer Manhattan model with reserved layers, which has been the most popular layout model for CMOS technologies. Every $2^n \times 2^n$ divide-and-conquer network achieves optimal layout complexity among the class of all $2^n \times 2^n$ banyan-type networks. In contrast, among all recursive 2-stage interconnection networks of cells, those associated with anti-balanced trees, including both baseline and reverse baseline networks attain maximal layout complexity.

Besides layout optimality, another salient characteristic of divide-and-conquer networks is their modular structure. In the layered implementation as will be described in Section I, a generic component such as an IC chips and or a printed circuit board implemented in correspondence with a step of 2-stage interconnection of the recursive construction can fill the roles of both the input node and the output node at the next step of 2-stage interconnection. This minimizes the number of different components required at each step of the recursive construction.

3. Generalize Divide-and-Conquer Network

As mentioned in Section E, banyan-type networks are often exchangeable in applications. Some of them have been constructed from intuition and appeared in the literature. However, except for divide-and-conquer networks, they are all, in one sense or another, ranked among the least desirable choices based on the 2layer Manhattan model. Therefore, in an application of any $2^n \times 2^n$ banyan-type network without I/O exchanges, a $2^n \times 2^n$ divide-and-conquer network can always be deployed instead in order for the layout optimality and the structural modularity. However, some particular applications of banyan-type networks may impose ad hoc constraints that are incompatible with divide-and-conquer networks. It is therefore desirable to identify a another class of networks with similar layout complexity and structural modularity. A wider choice enhances the chance of including one that meets the ad hoc requirements.

Recall from Section C that the interstage exchange in the plain 2-stage interconnection with parameters $2^{n-r}$ and $2^r$ has been called the coordinate interchange. It is a bit-permuting exchange, and explicitly, it is the $r^{th}$ power of $SHUF^{(n)}$. On the other hand, any other bit-permuting exchange can be used as long as it interconnects every input node with every output node, that is, routability is guaranteed. Therefore, a generalized 2-stage interconnection network comprising $2^r 2^{n-r} \times 2^{n-r}$ input nodes and $2^{n-r} 2^r \times 2^r$ output nodes is called a bit-permuting 2-stage interconnection network with parameter $2^{n-r}$ and $2^r$ if and only if the interstage interconnection is in the pattern of a bit-permuting exchange induced by the permutation a on integers from 1 to n such that a maps the numbers r+1, r+2, ..., n into the set {1, 2, ..., n−r}.

Definition F2: "bit-permuting 2-stage tensor product". Let $\Phi$ be a $2^{n-r} \times 2^{n-r}$ (n−r)-stage network and $\Psi$ a $2^r \times 2^r$ r-stage network. Fill the role of each input node in a bit-permuting 2-stage interconnection network with parameter $2^{n-r}$ and $2^r$ with a copy of $\Phi$ and each output node with $\Psi$. Ungroup nodes and lines inside every node so that they become elements directly belonging to the whole construction. The result is an $2^n \times 2^n$ n-stage network, which is called the "bit-permuting 2-stage tensor product of $\Phi$ and $\Psi$".

Definition F3: "recursive bit-permuting 2-stage construction" and "recursive bit-permuting 2-stage interconnection network". The recursive procedure in forming bit-permuting 2-stage tensor products to construct a large multi-stage network is referred to as the "recursive bit-permuting 2-stage construction"; the network so constructed from single-node networks is referred to as the "recursive bit-permuting 2-stage interconnection network".

Every recursive bit-permuting 2-stage interconnection network is routable and in fact qualifies as a banyan-type network. Like the recursive 2-stage construction, every recursive bit-permuting 2-stage construction can be logged by a binary tree. The resulting recursive bit-permuting 2-stage interconnection network is then said to be "associated" with that binary tree. The recursive bit-permuting 2-stage interconnection network associated with every n-leaf binary tree is a $2^n \times 2^n$ banyan-type network without I/O exchanges.

Definition F4: "generalized divide-and-conquer network". A generalized divide-and-conquer network is a recursive bit-permuting 2-stage interconnection network associated with a balanced binary tree.

Let an n-leaf balanced binary tree, n>1, be given. By interchanging the positions between two sons of the root node if necessary, it may be assumed that the weight of the left-son of the root node is $\lceil n/2 \rceil$. A generalized $2^n \times 2^n$ divide-and-conquer network associated with this n-leaf balanced tree can be recursively constructed as a bit-permuting 2-stage tensor product between a generalized $2^{\lceil n/2 \rceil} \times 2^{\lceil n/2 \rceil}$ divide-and-conquer network and a generalized $2^{\lfloor n/2 \rfloor} \times 2^{\lfloor n/2 \rfloor}$ divide-and-conquer network.

Every $2^n \times 2^n$ generalized divide-and-conquer network achieves the same layout complexity and structural modularity as a conventional $2^n \times 2^n$ divide-and-conquer network. Therefore, every $2^n \times 2^n$ generalized divide-and-conquer network also achieves the optimal layout complexity among all $2^n \times 2^n$ banyan-type networks.

The exchanges in the form of the $r^{th}$ power of $SHUF^{(n)}$, where $0 < r < n$, form a 2-parametered family of bit-permuting exchanges. In the conventional recursive 2-stage construction, the interstage interconnection exchange employed at all steps of 2-stage interconnection belong to this family. The following definition introduces another 2-parametered family of bit-permuting exchanges.

Definition F5: "$SWAP^{(n,\,r)}$ exchange". Given integers n and r, $1 \leq r < n$, let $\sigma^{(n,\,r)}$ denote the permutation (1 n)(2 n-1) (3 n-2 ... (r n-r+1) and $SWAP^{(n,\,r)}$ denote the induced $2^n \times 2^n$ exchange. When r=1 or n-1, the permutation $\sigma^{(n,\,r)}$ is simply (1 n) and hence the exchange $SWAP^{(n,\,r)}$ reduces to the banyan exchange $BANY^{(n)}$. On the other hand when $r = \lfloor n/2 \rfloor$ or $\lceil n/2 \rceil$, the permutation $\sigma^{(n,\,r)}$ coincides with $\sigma_{\rightleftarrows}^{(n)}$ and hence the exchange $SWAP^{(n,\,r)}$ reduces to the swap exchange $SWAP^{(n)}$.

Definition F6: "2-swap interconnection network". The "2-swap interconnection network" with parameter $2^{n-r}$ and $2^r$ is composed of $2^r 2^{n-r} \times 2^{n-r}$ input nodes and $2^{n-r} 2^r \times 2^r$ output nodes with the interstage interconnection in the pattern of the exchange $SWAP^{(n,\,r)}$.

Definition F7: "2-swap tensor product". Let $\Phi$ be a $2^{n-r} \times 2^{n-r}$ (n-r)-stage network and $\Psi$ a $2^r \times 2^r$ r-stage network. Fill the role of each input node in a 2-swap interconnection network with parameter $2^{n-r}$ and $2^r$ with a copy of $\Phi$ and each output node with $\Psi$. Ungroup nodes and lines inside every node so that they become elements directly belonging to the whole construction. The result is an $2^n \times 2^n$ n-stage network, which is called the "2-swap tensor product of $\Phi$ and $\Psi$".

Definition F8: "recursive 2-swap construction" and "recursive 2-swap interconnection network". In a recursive bit-permuting 2-stage construction, when the interstage exchange at each step of 2-stage interconnection with parameter $2^{k-r}$ and $2^r$ is $SWAP^{(k,\,r)}$, the construction is called a "recursive 2-swap construction". The resulting network is called a "recursive 2-swap interconnection network".

Let an n-leaf balanced binary tree, n>1, be given. By interchanging the positions between two sons of the root node if necessary, it may be assumed that the weight of the left-son of the root node is $\lceil n/2 \rceil$. A $2^n \times 2^n$ divide-swap-conquer network associated with this n-leaf balanced tree can be recursively constructed as a 2-swap tensor product between a $2^{\lceil n/2 \rceil} \times 2^{\lceil n/2 \rceil}$ divide-swap-conquer network and a $2^{\lfloor n/2 \rfloor} \times 2^{\lfloor n/2 \rfloor}$ divide-swap-conquer network.

EXAMPLE 9

The $2^n \times 2^n$ banyan network (resp. reverse banyan network) is the recursive 2-swap interconnection network associated with the n-leaf rightist tree (resp. leftist tree).

Definition F9: "divide-swap-conquer network". A divide-swap-conquer network is the recursive 2-swap interconnection network associated with a balanced binary tree. It is a special case of a generalized divide-and-conquer network.

EXAMPLE 10

The 16×16 divide-swap-conquer network [:(3 4):(1 4)(2 3):(3 4):] is the network 6000 as shown in FIG. 60.

EXAMPLE 11

The 64×64 divide-swap-conquer network associated with the 6-leaf balanced binary tree 5630 in FIG. 56C is [:(5 6):(4 6):(1 6)(2 5)(3 4):(5 6):(4 6)] and appears as the network 6100 in FIG. 61. The middle exchange $X_{(1\,6)(2\,5)(3\,4)}$ (6110) divides the network into two sides, each containing eight disjoint copies of the 8×8 reverse banyan network (6120).

The family of recursive bit-permuting 2-stage constructions is quite broad because of the wide choices for the interstage exchange at each step of 2-stage interconnection. Divide-and-conquer, baseline, and reverse baseline networks belong to the subfamily of conventional recursive 2-stage constructions and are associated with balanced, rightist, and leftist trees, respectively. Their counterpart in the parallel subfamily of recursive 2-swap constructions are divide-swap-conquer, banyan, and reverse banyan networks, which are also with balanced, rightist, and leftist trees, respectively.

G. Switching Control Associated with a Partially Ordered Set

Recall from Definition A3 that an m×n switch having an array of m input ports and an array of n output ports is defined by a set of at least two different connection states from the input array to the output array such that the set of connection states ensures the connectivity from every input to every output. This abstract notion of a switch refers to a switching fabric in unidirectional transmission and the connection states in the definition map into those connection configurations realizable by the switching fabric. This notion does not specify the control of the selection, activation and transition of the connection configurations of the switching fabric. Such control mechanism employed by a switch is referred to as the "switching control". Therefore, the specification of the switching control complements the abstract notion of a switch.

Note that the switching control in general may cover the control of other parts of a switch besides switching fabric, such as input traffic preprocessing, output multiplexing, admission control, and so forth, as well as other auxiliary functions in a switch. However, the switching control in this context, without otherwise explicit specification, refers to the control of a switch aimed at routing the incoming data units arrived at the input ports to their respective destined output ports by properly selecting, activating, setting, or changing the connection configurations of the switching fabric. Therefore, it is also called the "routing control" of the switch. The circuitry in a switch responsible for the switching control is called the "switching control circuitry", or "routing control circuitry", or even simply "control circuitry" when there is no ambiguity.

A data unit routed through a switch is loosely called a packet. An incoming data unit is sometimes interchangeably called an input signal or an input packet in the context.

1. Centralized Control vs. In-band Control

The switching control can be in-band or out-of-band. A switch employing out-of-band control is illustrated by FIG. 62A. The control circuitry (6201) of this kind of switch is usually referred to as the central control unit, and is separated from the main switching fabric (6202). The connection configurations of the switching fabric, or equivalently, the connection states of the switch, are controlled by the control signals from this central control unit through the control input ports (6204), which are nondata input ports in addition to the array of data input ports (6205). When the switch is a switching network, that is, an interconnection network of switching elements, as exemplified in FIG. 62B, each switching element (e.g. 6211) of the switching network (6210) is controlled by a control signal from the central control unit (6212) through a control input port (6213). Recall that a combination of a connection state in each individual switching element determines a global connection state of the switch; thus by controlling each switching element, the overall switching control is achieved. Some popular switching architectures, such as crossbar switch and shared-buffer-memory switch, normally adopt out-of-band control. In response to the connection request, the central control unit (of a switch employing centralized control) needs to possess global knowledge of the status of the switch, including the addresses of the active I/O corresponding to the request, the existing connections established inside the switch, and the status of each of the switching elements in order to make the appropriated route hunting/selection decision to accommodate the request. Therefore, centralized control usually requires high processing and memory speeds and inevitably imposes a bottleneck on the performance when the number of /O is large. Hence centralized control is only suitable for a small number of I/O.

On the other hand, the control signal of a switch employing in-band control, called the "in-band control signal", is carried along with each input packet. Typically, the in-band control signal is just one or a few bits prefixing the packet. FIG. 63A illustrates a switch (6300) of such type. Every input packet (6301) includes the in-band control signal (6302) followed by a payload (6303). The control signals from all input packets together determine the connection state of the switch. When an input port is idle, the input port will receive a signal of idle expression, e.g. a stream of bits "0". Therefore, an input packet to a switch can be either a real data input signals or an idle expression.

Switching architectures in the type of multi-stage interconnection of switching elements is especially suitable for in-band control. For a switch realized from a multi-stage interconnection network of switching elements employing in-band control, as exemplified in FIG. 63B, the switching elements (6311, 6312, 6313, 6314) are interconnected in such a way that when each switching element (e.g. 6311) of the switching network (6310) determines its own connection state according to the control signals of the local input packets (6321, 6322) arrived at its local data input ports (6331), the global connection state of the switch is thereby determined and incoming signals can then be routed.

2. Generic Control of a Switching Cell

Recall from section A that a switching cell is a 2×2 switch whose two connection states are "Bar" and "Cross". As shown in FIG. 2A, the Bar state 201 refers to the connection state of concurrently connecting input-0 to output-0 and input-1 to output-1. FIG. 2B shows the Cross state 202 which is a connection state concurrently connecting input-0 to output-1 and input-1 to output-0. A switching cell in a switching network employing out-of-band control is depicted in FIG. 64A. The control signal to the switching cell (6401) is from the central control unit (6402) through the control input port (6403), and in the simplest case, a 1-bit signal is sufficient to control the two possible connection states. On the other hand, as shown in FIG. 64B, when the control is by in-band signaling, the two control signals (6411, 6412), each being one or a few bits prefixing the data packet (6413, 6414), arrive at the two data input ports (6415, 6416) of the switching cell (6417) together determine the Bar/Cross state of the cell. As alluded to above, distributed in-band control is preferred to centralized out-of-band control, especially in the switching control of a massive broadband switching network; therefore, the immediate focus of this context is only on the in-band control.

All switching cells hereinafter are referring to in-band-controlled switching cells unless otherwise explicitly specified.

For point-to-point switching (the case of multicast switching will be described in the sub-section G6,) normally there are three types of signals entering a switching cell: (1) data signals intended for output-0 of the cell, called "0-bound signals", (2) data signals intended for output-1 of the cell, called "1-bound signals", and (3) idle expressions, also to be called "idle signals". When two input packets are destined for the same output port, output contention occurs, and there exist many ways in the existing art to resolve output contention. All possible combinations of the two signals arrived at the two inputs of a switching cell and the corresponding connection states are tabulated in Table 1.

TABLE 1

| Connection state of the switching cell | | Signal at input-1 | | |
|---|---|---|---|---|
| | | "idle" | "0-bound" | "1-bound" |
| Signal at input-0 | "idle" | Any | Cross | Bar |
| | "0-bound" | Bar | Contention for output-0 | Bar |
| | "1-bound" | Cross | Cross | Contention for output-1 |

FIG. 65A presents the block diagram 6500 of a generic switching cell under in-band control. A bit pipeline from each of the two data inputs (6501, 6502) enters one of the two shift registers (6503, 6504). The control signals from the two shift registers together determines the state of the automata (6510) which in turn determines the connection state of the switching cell. The connection state is implemented with two 2×1 multiplexers (6505, 6506), one at each of the two outputs (6507, 6508). A 2×1 multiplexer is a 2×1 two-state switch whose two connection states are ({0}, null) and (null, {0}), as respectively depicted in FIGS. 65B and 65C. The two input ports of a multiplexer receives the two bit pipelines, originated from input-0 and input-1, from both shift registers, but only one is routed to its single output, depending on the connection state. When the automata enter the state "BAR" or "CROSS", it signals both multiplexers 6505 and 6506 through the two control channels 6511 and 6512, respectively, to receive bits from the appropriate shift register. To implement the Bar connection state, the upper multiplexer 6505 is set to receive from the upper shift register and the lower multiplexer 6506 is set to receive from the lower shift register. On the other hand, the Cross connection state of the switching cell is achieved by setting each of the two multiplexers 6505 and 6506 to receive from the opposite shift register.

In-band-controlled switching cells are often deployed inside a multi-stage network, where signal synchronization is required not only between the two in-band control signals to each individual cell but also across the whole stage in the network. This ensures the synchronized arrival of two signals at every cell at the next stage regardless of the interstage exchange. The master clocking thus requires nondata input(s) to the cell. Through binary fan-outs, the master frame/bit clock signals (6511, 6512) are broadcast to all cells at the first stage and then propagated from one stage to another.

3. Sorting Cell Associated with a Partially Ordered Set

Definition G1: "partial order". A "partial order" on a set $\Omega$ of symbols means a nonempty subset $\Rightarrow$ of $\{(a, b): a \in \Omega, b \in \Omega, \text{ and } a \neq b\}$, subject to the transitive law:

$$(a,b) \in \Rightarrow \text{ and } (b,c) \in \Rightarrow \prec (a,c) \in \Rightarrow.$$

The set $\Omega$ is thus called a "partially ordered set" under $\Rightarrow$. Note that a partially ordered set must contain at least two elements. A more conventional notation for the statement of $(a, b) \in \Rightarrow$ is $a \prec b$ or simply $a \prec b$ when there is no ambiguity. This reads as "a is smaller than b" or, equivalently, "b is greater than a." The transitive law is then rewritten in the more familiar form:

$$a \prec b \text{ and } b \prec c \prec a \prec c.$$

Simply speaking, a partial order on a set of symbols specifies the ordering relationship, or simply "order", among the symbols, although the ordering does not necessarily exist between every pair of symbols. Note that no symbol can be smaller than itself by definition. Moreover, if $x \prec y$, then $y \prec x$ cannot hold. In fact, if $x \prec y$ and $y \prec x$, then the transitive law implies $x \prec x$, which is a contradiction. The partial order can be an artificial one. Even when the symbols are numbers, the partial order does not have to be consistent with the natural order.

One special case of a partial order is a linear order defined below.

Definition G2: "linear order". A partial order on a set $\Omega$ of symbols qualifies as a "linear order" when it abides by the trinity law:

$$a \neq b \Rightarrow a \prec b \text{ or } b \prec a$$

The set $\Omega$ in conjunction with the linear order is thus called an "ordered set".

EXAMPLE 1

As mentioned in the above, the three types of signals entering a switching cell are 0-bound, 1-bound, or idle. Thus the set of signal values is {'0-bound', 'idle', '1-bound'}. An ideal switching cell for routing these three types of signals is the one which always routes 0-bound signals to output-0 and 1-bound signals to output-1 whenever there is no output contention. To achieve this, one type of simple in-band control logic is for the switching cell to simply compare the two input values based on the following linear '0-bound' $\prec$ 'idle' $\prec$ '1-bound', and then route the signal of the smaller value to output-0 and the one of the larger value to output-1. By this way, since a 0-bound signal (resp. 1-bound signal) is the smallest (largest) among the three types of signals, it will always be routed to output-0 (output-1) unless another 0-bound signal (resp. 1-bound signal) competes with it, upon which the output contention occurs. The resulting connection state is identical to the specification by Table 1.

EXAMPLE 2

A linear order defined on the set of symbols {00, 10, 11} does not necessarily have to be the natural order of $00 \prec 10 \prec 11$. One legitimate linear order is that $10 \prec 00 \prec 11$. This awkward looking order is of practical usefulness, because, as to be explained in Example 4 in the sequel, the three values of a signal entering a switching cell is often encoded as:

'0-bound'=10; '1-bound'=11; and 'idle'=00

EXAMPLE 3

A partial order on the set of symbols {00, 01, 10, 11} is that $10 \prec 00 \prec 11$ and $10 \prec 01 \prec 11$, which does not specify an ordering between 00 and 01. This exemplary order will be seen in the sequel for the routing control of an expander cell.

In broadband applications, it is important to implement in-band control over a switching cell with very simple hardware so as to avoid another source of bottleneck. Conceivably, one of the simplest types of in-band control logic is for the switching cell to simply compare the two input values based on a predetermined ordering among all possible values of an in-band control signal. Such a switching cell will be called a "sorting cell" in the next definition.

Definition G3: "sorting cell". Consider an in-band-controlled switching cell where all possible values in an in-band control signal form a partially ordered set. This switching cell is called a "sorting cell associated with this partially ordered set" if it is under the switching control such that the input signal switched to output-0 is never greater than the one switched to output-1.

Definition G4: "0-1 sorting cell" and "routing cell". The set {0, 1} under the natural order of $0 \prec 1$ forms the "0-1 ordered set", and the associated sorting cell is called the "0-1 sorting cell". A "routing cell" is a sorting cell associated with the set {'0-bound', 'idle', '1-bound'} under the linear order '0-bound' $\prec$ 'idle' $\prec$ '1-bound'.

The correspondence between the input control signals and the connection states is summarized in Table 2 for a 0-1 sorting cell, and in Table 3 for a routing cell.

TABLE 2

| | Input-1 control Signal | |
|---|---|---|
| Connection state | 0 | 1 |
| Input-0 control Signal 0 | Any | Bar |
| Input-0 control Signal 1 | Cross | Any |

TABLE 3

| | | Input-1 control signal | | |
|---|---|---|---|---|
| Connection state | | 0-bound | idle | 1-bound |
| Input-0 control Signal | 0-bound | Any | Bar | Bar |
| | idle | Cross | Any | Bar |
| | 1-bound | Cross | Cross | Any |

EXAMPLE 4

A signal entering a switching cell is either a real data signal or an idle expression. An idle expression is naturally a stream of '0' bits. Thus every real data packet is prefixed by an activity bit '1' in order to differentiate from an idle expression. To perform the switching, it is also important to distinguish between packets intended for output-0 from those intended for output-1. Thus the activity bit '1' is followed by the address bit, which indicates the preference between the two outputs of the cell. The two bits together form the in-band control signal. Meanwhile, for an idle packet, the 2-bit in-band control signal is 00. Thus there are three possible values for an in-band control signal with the following coding: '0-bound'=10; '1-bound'=11; and 'idle'=00 smaller than the other according to the linear order of $10 \prec 00 \prec 11$. In reaction to the prompt the automata then enters a new state of "BAR" or "CROSS" and the connection state of the switching cell is latched accordingly. Subsequent bits then flow through the latched connection state of the cell.

An additional prompt to the automata is the frame clock from a nondata input, which resets the automata to the state "INITIAL". Table 4 summarizes the automata action triggered by a prompt, but skips the detail in the arbitration of output contention.

TABLE 4

| Prompt at input port | | | Output at output port | |
|---|---|---|---|---|
| 0 | 1 | Automata state | 0 | 1 |
| 00 | 00 | | 0 | 0 |
| 00 | 10 | "INITIAL" → "CROSS" | 1 | 0 |
| 00 | 11 | "INITIAL" → "BAR" | 0 | 1 |
| 10 | 00 | "INITIAL" → "BAR" | 1 | 0 |
| 10 | 10 | Arbitration of output contention | | |
| 10 | 11 | "INITIAL" → "BAR" | 1 | 1 |
| 11 | 00 | "INITIAL" → "CROSS" | 0 | 1 |
| 11 | 10 | "INITIAL" → "CROSS" | 1 | 1 |
| 11 | 11 | Arbitration of output contention | | |
| Frame clock (at nondata input) | | "BAR"/"CROSS" → "INITIAL" | | |

As mentioned in example 1, an ideal switching control is then to route every 0-bound packet to output-0 and every 1-bound packet to output-1 whenever there is no output contention. This can be achieved when the switching cell is a routing cell. Its associated linear order of '0-bound' $\prec$ 'idle' $\prec$ '1-bound' gives a real data packet the priority to choose between the two outputs over an idle packet. Therefore, a routing cell can ideally implement the switching cell in the majority cases.

4. Control of a Routing Cell

Recall that a sorting cell is a switching cell with special kind of in-band routing control—routing by sorting. Note that both the 0-1 sorting cell and the routing cell are sorting cells, each associated with a special partially ordered set upon which the sorting is based on. The different partially ordered set the in-band-controlled switching cell associated with leads to different implementation of the routing control.

A simple switching control for a routing cell can be described by a finite-state automata with the three states "INITIAL", "BAR" and "CROSS". The automata state "BAR" (resp. "CROSS") corresponds to the Bar (resp. Cross) connection state of the switching cell. The automata state "INITIAL" is associated with an arbitrary connection state. Initially, the switching cell is in an arbitrary connection state, and the automata state is "INITIAL". The prompt to the automata consists of the two leading bits (00='idle', 10='0-bound', 11='1-bound') from each of the two synchronous data inputs. These inputs generate a total of nine different prompts.

When both input packets present 10 in the leading bits or both present 11, output contention occurs. It can be arbitrated in various ways, e.g., by misrouting or blocking of one of the two packets. When both control signals are idle expressions 00, the automata state can be arbitrarily changed or remain INITIAL. For the remaining six prompts, the two control signals differ from each other and hence one of them is The optimal circuitry of switching control over a sorting cell is usually tailored to the underlying partial order in the particular application. This often necessitates an elaborate automata with many more detailed states than just three. The detailed state is represented by a number of registers, typically including one binary register for the connection state. Often the switching control is implemented in a way that absorbs one control bit at a time from each of the two inputs in order to simplify the logic for the computation of the connection state.

EXAMPLE 5

An exemplifying implementation of a routing cell by a 12-state automata is as follows. A state in the automata is represented by a pair (x, y). The x register is binary and represents the connection state: 0 for Bar and 1 for Cross. It directly controls the two output multiplexers in the block diagram of FIG. 65A. The y register assumes six possible values:

"INITIAL", "0&0", "0&1", "1&0", "1&1", and "LATCHED"

The initial y value is "INTIAL". Upon the arrival of an activity bit from each data input, it becomes 0&0, 0&1, 1&0, or 1&1, reflecting the obvious nomenclature of these states. Upon receiving the second bit from each input, the automata action includes the change of the y value to "LATCHED" and the delivery of the two activity bits to the two outputs through the latched connection state. Table 5 summarizes the state transition, where the arbitration of output contention always favors input 0. (Given this bias, the two y values 1&0 and 1&1 can be merged into one, unless the y value is needed in the regeneration of the activity bit.)

Once the y value becomes "LATCHED", bit pipelines from the two inputs simply flow through the latched connection state. The effective prompt to the automata is then the frame clock signal to reset the y value to "INITIAL". The only modification of a packet traversing this routing cell is the deletion of the second bit so that the third bit becomes the new second bit.

TABLE 5

| Old State | | Prompt | | New State | |
|---|---|---|---|---|---|
| y | x | Input 0 | Input 1 | y | x |
| Initial | Any | 0 | 0 | 0&0 | Any |
|  |  | 0 | 1 | 0&1 | Any |
|  |  | 1 | 0 | 1&0 | Any |
|  |  | 1 | 1 | 1&1 |  |
| 0&0 | Any | Any | Any | Latched | Any |
| 0&1 | Any | Any | 0/1 | Latched | 1/0 |
| 1&0 | Any | 0/1 | Any | Latched | 0/1 |
| 1&1 | Any | 0/1 | Any | Latched | 0/1 |
| Latched | 0/1 | Any | Any | Latched | 0/1 |

5. Control of a 0-1 Sorting Cell

When control signals are k-bit, the sorting cell needs to absorb, say, k bits from each input before the connection state can be latched so that the two bit streams can flow through. However, some of the initial k bits in each stream may flow out before the latching of the connection state. The next example illustrates an ideal situation where the sorting cell buffers only one bit of each input stream at a time.

EXAMPLE 6

Consider a sorting cell with the following characteristics:

The in-band control signal is a fixed length, say, k bits.

All the $2^k$ possible values are linearly ordered according to the lexicographic binary value.

The sorting cell routes two synchronized packets without altering their contents. Such a sorting cell can be implemented so that the two synchronized input bit streams pipeline through the cell with only a 1-bit delay: The sorting cell examines the two control signals bit by bit. The two bit streams are pipelined to the two outputs through an arbitrary connection state until the two signals start to differ, at which time the connection state is latched. All remaining bits then flow through the latched connection state. Note that although the sorting cell is associated with a linear order over the $2^k$ possible values (according to their lexicographic binary value), a simple sorting cell similar to the 0-1 sorting cell as defined in Definition G4 suffices for the purpose since at each time, one bit from each input is compared.

EXAMPLE 7

The switching control of a 0-1 sorting cell may be implemented with a 4-state automata. Two binary registers x and y represent the automata state. The 0/1 value of x indicates the Bar/Cross connection state of the cell, respectively. It directly controls the two output multiplexers in the block diagram 6500 of FIG. 65A. The 0/1 value of y indicates the unlatched/latched status of the connection state, respectively. Initially, x is arbitrary and y=0. A control signal is pipelined bit by bit into the cell from each of the two data inputs. The state transition of the automata is summarized in Table 6.

TABLE 6

| Old State | | Prompt | | New State | |
|---|---|---|---|---|---|
| y | x | Input 0 | Input 1 | y | x |
| 0 | 0 | 0 | 0 | 0 | Any |
|  |  | 0 | 1 | 1 | 0 |
|  |  | 1 | 0 | 1 | 1 |
|  |  | 1 | 1 | 0 | Any |
|  | 1 | 0 | 0 | 0 | Any |
|  |  | 0 | 1 | 1 | 0 |
|  |  | 1 | 0 | 1 | 1 |
|  |  | 1 | 1 | 0 | Any |
| 1 | 0/1 | Any | Any | 1 | 0/1 |

In a state y=0, the prompt to the automata is a pair of bits, one from each data input. If the two bits match, the x register remains arbitrary and y remains 0. When the two bits differ, the connection state x of the cell is set accordingly and latched; that is, the state becomes (0,1) or (1,1). Whether or not the two bits differ, they are sent to the two outputs through the prevailing connection state after the automata action. When the y register becomes 1, the effective prompt to the automata is the frame clock signal to reset y to 0. Meanwhile, bit streams from the two inputs continue to progress through the latched connection state.

6. Bicast Cell

Definition G5: "bicast-0 and bicast-1 connection states". The 2×2 connection state that connects input-0 to both output-0 and output-1 is called the "bicast-0 connection state." Similarly, the 2×2 connection state that connects input-1 to both output-0 and output-1 is called the "bicast-1 connection state."

Recall that an "expander cell" is a 2×2 switch with the four connection states as shown in FIGS. 2C-F: bar (211), cross (212), bicast-0 (213), and bicast-1 (214). This terminology is independent of the switching control mechanism. Besides 0-bound, 1-bound, and idle packets, another type of signals that enter an expander cell are those data signals intended for multicasting to both output-0 and output-1 of the cell. These are called "bicast signals". Note that when one of the two input signals to an expander cell is a bicast signal, if the other signal is an idle signal, of course the bicast signal will be routed to both outputs; on the other hand, if the other signal is a unicast signal, either 0-bound or 1-bound, it is fair to route the unicast signal to its intended output port and the bicast signal to the other output port; moreover, if the other signal is also a bicast signal, it is more fair to route each bicast signal to one of the two outputs than to route one bicast signal to both outputs and block the other, so in this case, the connection state of the expander cell should be either bar or cross, but not bicast-0 and bicast-1. Under this natural assumption, all possible combinations of the two signals arrived at the two inputs of an expander cell and the corresponding connection states are tabulated in Table 7.

TABLE 7

| Connection state of the expander cell | | Signal at input-1 | | | |
|---|---|---|---|---|---|
|  |  | "idle" | "0-bound" | "1-bound" | "bicast" |
| Signal at input-0 | "idle" | Any | Cross | Bar | Bicast-1 |
|  | "0-bound" | Bar | Contention for output-0 | Bar | Bar |
|  | "1-bound" | Cross | Cross | Contention for output-1 | Cross |
|  | "bicast" | Bicast-0 | Cross | Bar | Bar/Cross |

Definition G6: "bicast cell". A "bicast cell" is an expander cell under the following in-band-control. If one of the two inputs presents a bicast packet and the other presents an idle packet, the bicast packet is "bicasted", which means:

(1) a copy of the bicast packet is sent to each of the two outputs through the bicast-0 or bicast-1 connection state;
(2) the copy received by output-0 assumes the status of a 0-bound packet instead of a bicast packet, i.e., the control signal of the copy received by output-0 is set to be '0-bound'; and
(3) the copy received by output-1 assumes the status of a 1-bound packet instead of a bicast packet, i.e., the control signal of the copy received by output-1 is set to be '1-bound'.

Else, the switching control is identical to that in a sorting cell associated with the partially ordered set {'0-bound', '1-bound', 'idle', 'bicast' } under the partial order of '0-bound' ≺ 'idle' ≺ '1-bound' and '0-bound' ≺ 'bicast' ≺ '1-bound'.

In the text or drawing where '0-bound', '1-bound', 'idle', 'bicast' are applicable, the symbols '0', '1', 'I' and 'B' respectively represent or symbolize 0-bound, 1-bound, idle and bicast packets, or control signals corresponding to 0-bound, 1-bound, idle and bicast.

FIG. 65D shows the scenario when the two input packets at input-0 (6560) and input-1 (6561) of a bicast cell (6551) are a bicast packet (6581) and an idle packet (6582), respectively. The connection state of the bicast: cell is then set to be bicast-0 (6550). The bicast packet at input-0 is then bicasted through this connection state, that is, the control signals of the two copies of the bicast packet at output-0 (6570) and output-1 (6571) are respectively set to be '0-bound' and '1-bound'. Similarly, FIG. 65E shows the scenario with an idle packet at 0-input and a bicast packet at 1-input of the bicast cell. The connection state is then bicast-1 (6551), and the control signals at output-0 and output-1 are again respectively set to be '0-bound' and '1-bound'. Note that these are the only two cases in a bicast cell wherein the control signal of an input packet, actually, bicast packet only, is changed when the packet is routed to the output. In other words, when a bicast packet arrives at a bicast cell, unless the packet at the other input is an idle packet, otherwise, exactly one copy of the bicast packet will be routed to one of the outputs of the cell, and it is still a bicast packet.

Just as when a routing cell is a switching cell under certain switching control related to sorting, a bicast cell is an expander cell under certain switching control related to sorting. If a generic expander cell is regarded as the multicast counterpart of a generic switching cell, then a bicast cell can be regarded as the multicast counterpart of a routing cell.

The routing control of a bicast cell is similar to that of a routing cell, thus the block diagram 6500 for a generic switching cell can be readily adapted for a generic expander cell, with the automata 6510 having more states to correspond to the additional bicast-0 and bicast-1 connection states.

H. Self-Routing Control over a Multi-Stage Switching Network

Recall from the previous section, centralized control for a switch is fast only when the number of I/O is small. Similarly when a switching network is composed of a large number of switching nodes, centralized control over the network cannot be fast. Therefore in-band-controlled switching elements are often deployed inside a multi-stage network. An ideal style of distributed control over the network is to leave the switching decision to each individual switching element, which selects a connection configuration purely by the in-band control signals to that element and independently of all other concurrent input signals in the network regardless the scale of the network. Such control over the network appears as if the routing of each individual signal through the network is guided by the signal itself; the in-band control mechanism is sometimes referred to as "self-routing" in the literature.

The distributed nature of self-routing control thus enables fast switching control over large-scale switching devices constructed from massive interconnection networks of switching elements. Moreover, in broadband applications, the in-band control signal to a switching element needs to be contained in as few bits as possible so that the switching decision can be swiftly executed.

1. Conventional Self-routing over Certain Banyan-type Networks

As alluded to in the Background Section, the concept of "self-routing" began with the in-band control mechanism for switching cells in the Omega network (defined earlier); this control mechanism is further elaborated upon now as a prelude to the description in accordance with the present invention.

Upon entering a $2^n \times 2^n$ Omega network (prepended with the shuffle exchange), a data packet composed of a sequence of bits is prepended with another sequence of bits which is its binary destination address $d_1 d_2 \ldots d_n$.

The bit $d_j$ indicates the preference between the two outputs of the stage-j cell. The leading bit $d_1$ is the in-band control signal of a data packet to the stage-1 switching cell. A switching cell at any stage takes the leading bit in each of its two input packets as the in-band control signal and selects its bar/cross connection state accordingly. In particular a stage-1 switching cell takes the leading bit $d_1$ in a data packet as the in-band control signal and consumes the bit $d_1$ afterwards. Thus the leading bits in a data packet become $d_2 d_3 \ldots d_n$ after exiting stage 1. A stage-2 switching cell takes the leading bit $d_2$ in a data packet as the in-band control signal and consumes the bit $d_2$ afterwards. Thus the leading bits in a data packet become $d_3 d_4 \ldots d_n$ after exiting stage 2. And so on.

This self-routing mechanism has also been applied to the banyan network prepended with the shuffle exchange. As to be explained shortly below the theoretical basis for this self-routing mechanism is actually based on the fact that the guide of the particular banyan-type network is the monotonic sequence 1, 2, ... , n. The same self-routing mechanism however does not apply to other banyan-type networks in general. Like the baseline network, both the Omega network and the banyan network are among those banyan-type networks well studied in the literature. It is ironical that these widely studied networks are all in anti-optimal topology in one sense or another with regard to the layout complexity under the 2-layer Manhattan model with reserved layers. It would be desirable to generalize the self-routing mechanisms to all banyan-type networks, including those in the optimal topology.

2. Inventive Self-routing by the Guide of a Bit-permuting Network

In accordance with the present invention, for a generic $2^n \times 2^n$ banyan-type network with the guide $\gamma(1), \gamma(2), \ldots, \gamma(n)$, the self-routing mechanism can be generalized as follows. A packet destined for the output address binary($d_1 d_2 \ldots d_n$) is prefixed with the binary control stream $d_{\gamma(1)} d_{\gamma(2)} \ldots d_{\gamma(n)}$, or $1 d_{\gamma(1)} d_{\gamma(2)} \ldots d_{\gamma(n)}$ if activity bit is present; either $d_{\gamma(1)} d_{\gamma(2)} \ldots d_{\gamma(n)}$ or $1 d_{\gamma(1)} d_{\gamma(2)} \ldots d_{\gamma(n)}$, depending upon the context, is called the "routing tag". In this context, the routing tag usually contains the activity bit. Thus the format of the whole packet entering the switching network, assuming the presence of the activity bit, is depicted by packet 6000 in FIG. 66A.

For each stage j, the in-band control signal used by the routing control at that stage is a two-bit sequence comprising the activity bit and $d_{\gamma(j)}$, the j-th bit of binary stream $d_{\gamma(1)} d_{\gamma(2)} \ldots d_{\gamma(n)}$. Note that the in-band control signal changes from stage to stage but is conveniently derived from the initial routing tag.

Here a point should be noted that, if the routing tag remains the same when entering each stage, the control circuitries at different stages should then have different configurations in order to read different bit positions of the routing tag to extract the stage-specific control information, which is obviously undesirable. Therefore, a simple mechanism for manipulating the routing tag at each stage to facilitate the extraction of the right control information from the tag is described as follows: instead of being located at different positions from stage to stage, the two-bit in-band control signal should be always at the fixed position, say, the first two bits of the tag, such that the control circuitry at each stage can always read the leading two bits of the routing tag to make the routing decision. To achieve this, when a packet reached the output port of a stage and before entering the next stage, the second bit of the routing tag is shifted to the end of the tag, or just removed from the tag, by a simple dedicate 1×1 switching circuitry which is appended to every output port. In other words, each stage here actually performs the routing of the packet and the re-generation of the routing tag for the next stage. In this way, the first two bits are $1d_{\gamma(1)}$ when entering stage 1, and $1d_{\gamma(2)}$ when entering stage 2, and so on, that is, the leading two bits of the routing tag of the packet entering each stage j are always $1 d_{\gamma(j)}$, the right control signal required by the control circuitry of that stage. As a consequence, the control circuitries can be identical at all stages.

When output contention occurs, one of the two packets intended for the same output may be deflected to the other output. However, in some applications, packet misrouting is more undesirable than blocking. In such cases, the switching cell simply blocks any intended 0-bound (resp. intended 1-bound) packet that has been deflected to output 1 (resp. output 0). This can usually be implemented inside the aforementioned 1×1 switching circuitry as well.

Figure 67A:
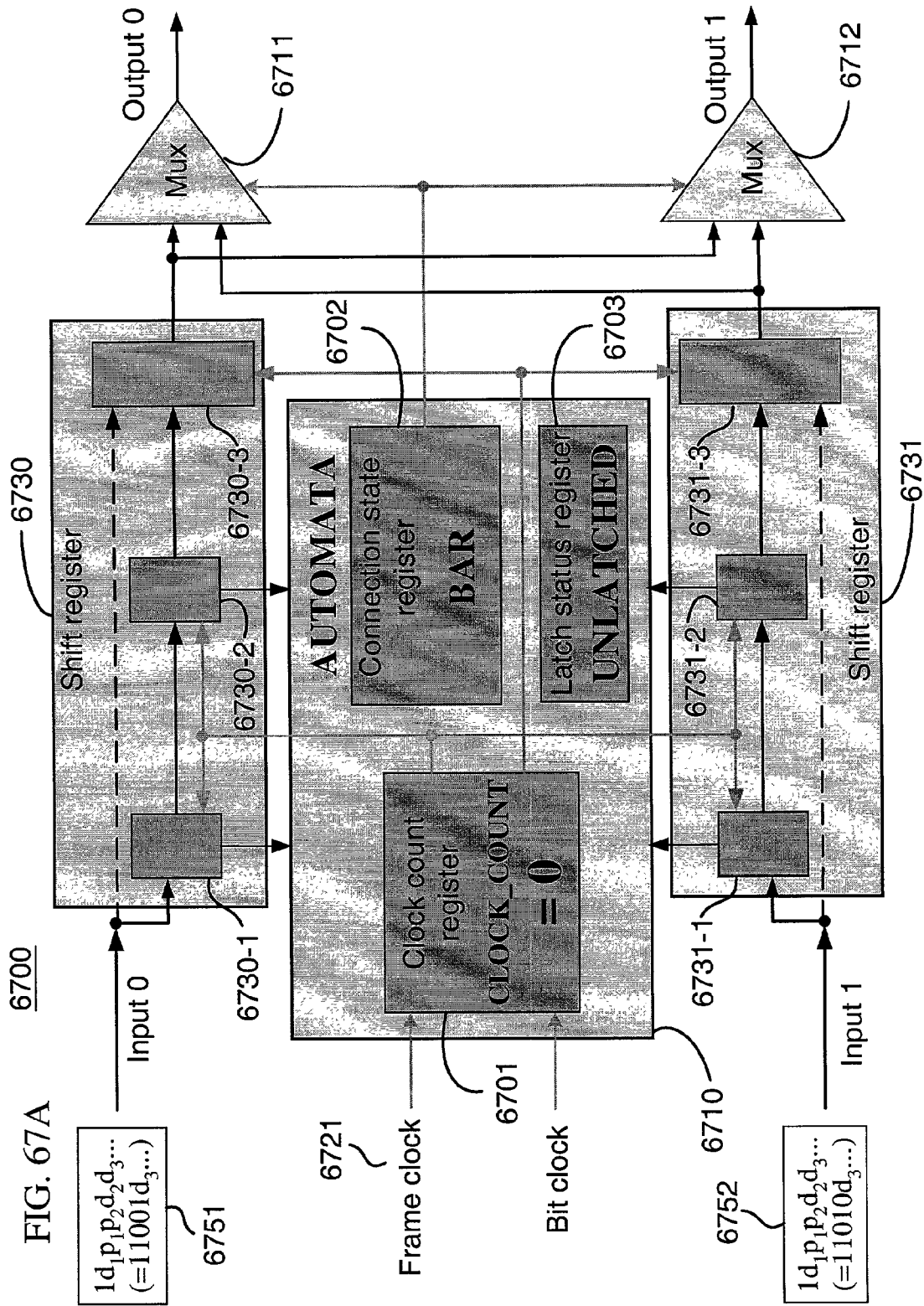

Note that such a 1×1 switching circuitry can either be physically implemented as a separated device appended to the main switching cell, as shown in FIG. 66C in the following example, or be a logical block in description but physically implemented as integrated into the circuitry of the main switching cell, as shown in FIG. 67A, which is a block diagram of a switching cell including bit consumption and rotation.

Assuming the second approach of removing the second bit is adopted, FIG. 66B summarizes the format of a generic routing tag (6601) of a data packet entering stage j, and FIG. 66C illustrates how the routing tag is changed at various locations in a generic stage j. When the routing tag 6610-1 has reached stage j, the segment $d_{\gamma(1)}d_{\gamma(2)} \ldots d_{\gamma(j-1)}$ has been consumed in the previous j−1 stages so that only the bits $1d_{\gamma(j)}d_{\gamma(j+1)} \ldots d_{\gamma(n)}$ remain in the tag. The two leading bits (6611) are $1d_{\gamma(j)}$, and the switching control of the cell 6615 in stage-j reads just these two bits as the in-band control signal. Two identical aforementioned 1×1 switching circuits 6616 are appended at each of the two output ports of the cell 6615. When the packet leaves the cell from one of its output ports, the routing tag 6610-2 is still $1d_{\gamma(j)}d_{\gamma(j+1)} \ldots d_{\gamma(n)}$. Then it enters the 1×1 switching circuitry 6616 attached at that output port, which removes the second bit of the routing tag, so the routing tag 6610-3 at the output of 6616 becomes $1d_{\gamma(j+1)} \ldots d_{\gamma(n)}$.

EXAMPLE 1

To demonstrate this generalized self-routing mechanism, consider network 2900 of FIG. 29. The destination address binary($d_1 d_2 d_3 d_4$) for a packet is 1110. The guide has been computed earlier as the sequence 2, 4, 1, 3. Thus, $d_{\gamma(1)} = d_2 = 1$, $d_{\gamma(2)} = d_4 = 0$, $d_{\gamma(3)} = d_1 = 1$, and $d_{\gamma(4)} = d_3 = 1$, so the data packet is prepended with the binary stream $1d_{\gamma(1)}d_{\gamma(2)}d_{\gamma(3)}d_{\gamma(4)} = 11011$ as the routing tag. Each cell in the network is a sorting cell with respect to the linear order of 10 ('0-bound') ≺ 00 ('idle'0) ≺ 11 ('1-bound').

Recall that such a routing cell always routes 0-bound signal (with control bits 10) to output 0 and 1-bound signal (with control bits 11) to coutput-1 when there is no output contention. Therefore, assuming no output contention occurs at each of the nodes along the path, upon entering the first stage at routing cell 2910, the two leading control bits, namely, 11, are used to set the connection state of the cell 2910 to "cross" in this case since the signal enters the routing cell from its upper input, resulting in routing the packet to the lower output of the cell, that is, to the output address 1101 at that stage. Meanwhile the second bit of the in-band control signal, namely 1, is consumed by the appended 1×1 device (omitted in the drawing) and thus the new in-band control signal to the next stage becomes 10. Next, exchange $X_{(3\ 4)}$ leads the packet from the output address 1101 of stage 1 to the input address 1110 of stage 2. Then the new in-band control signal, namely 10, is used to set the stage-2 cell 2920 to the "bar" state, resulting in routing to output address 1110. Meanwhile the second bit of the in-band control signal, namely 0, is again consumed and thus the new in-band control signal to the next stage (stage 3) becomes 11. Next, exchange $X_{(1\ 4)}$ leads the packet from the output address 1110 of stage 2 to the input address 0111 of stage 3. Then the new 2-bit control sequence, namely 11, are used to set cell 2930 to the bar state, resulting in routing the packet to the output address 0111. Then the second bit of the in-band control signal, namely 1, is again consumed before entering stage 4. Finally, exchange $X_{(2\ 4)}$ leads the packet from the output address 0111 of stage 3 to the input address 0111 of stage 4. The remaining two control bits, namely 11, is used to set the cell 2940 to the bar state, then the packet is routed to the output address 0111, and finally led to its desired destination address 1110 through the output exchange $X_{(4\ 3\ 2\ 1)}$.

Note that when idle expressions are disallowed in the system, the similar routing mechanism as shown in the above example can be used without the activity bit in the routing tag. In that case, the in-band control signal to a generic stage-j cell is the single bit $d_{\gamma(j)}$, which is also consumed by stage j.

The above self-routing mechanism can be extended to $2^n \times 2^n$ k-stage bit-permuting networks. Consider a generic $2^n \times 2^n$ k-stage bit-permuting network with the guide $\gamma(1)$, $\gamma(2), \ldots, \gamma(k)$, where $\gamma$ is a mapping from the set $\{1, 2, \ldots, k\}$ to the set $\{1, 2, \ldots, n\}$. A packet destined for the binary output address $d_1 d_2 \ldots d_n$ is initially prefixed with the routing tag $1d_{\gamma(1)}d_{\gamma(2)} \ldots d_{\gamma(k)}$. The in-band control signal to a stage-j switching cell is $1d_{\gamma(j)}$, and the second bit in this control signal is consumed at stage j. By induction on j, the in-band control signal is always in front of the packet upon entering any stage.

As already mentioned in the Background Section, and now well understood because of the foregoing description, the main reason behind the trial-and-error procedure of prior art was that such techniques had not had the benefit of a fundamental theoretical approach of determining the routing tag $d_{\gamma(1)}d_{\gamma(2)} \ldots d_{\gamma(n)}$ or $1 d_{\gamma(1)}d_{\gamma(2)} \ldots d_{\gamma(n)}$ from the guide of a bit-permuting network. The routing tag for the particular $2^n \times 2^n$ networks studied in the prior art is the destination address $d_{12} \ldots d_n$ of a packet plus possibly an activity bit up front. By happenstance, the general routing tag $d_{\gamma(1)}d_{\gamma(2)} \ldots d_{\gamma(n)}$ coincides with the destination address $d_1 d_2 \ldots d_n$ in the special case when the guide of a banyan-type network is the monotonically increasing sequence (i.e., the sequence 1, 2, ..., n). As is now readily deduced, the destination address can be used as the routing tag only for those $2^n \times 2^n$ banyan-type networks with monotonically increasing guide.

3. Priority Treatment

Let the guide of a $2^n \times 2^n$ banyan-type network be the sequence $\gamma(1), \gamma(2), \ldots, \gamma(n)$. Fill every node in the network with a routing cell adopting the coding scheme of 'idle'=00; '0-bound'=10; '1-bound'=11

Thus the routing cell means a sorting cell with respect to the linear order of $10 \triangleleft 00 \triangleleft 11$. By adopting the self-routing mechanism as introduced above, a packet with the binary destination address $d_1 d_2 \ldots d_n$ is preceded by the bit pattern $1 d_{\gamma(1)} d_{\gamma(2)} \ldots d_{\gamma(n)}$ upon entering the switching network. At stage j, $1 \leq j \leq n$, the in-band control signal consists of the two leading bits, and the stage consumes the bit $d_{\gamma(j)}$. Thus the in-band control signal at stage j is $1 d_{\gamma(j)}$ for a real data packet and is 00 for an idle expression.

Now suppose that there are $2^r$ priority classes of 0-bound or 1-bound packets. The priority class can be coded in an r-bit string $p_1 \ldots p_r$, and the coding for priority class may vary from one detailed design to another. To simplify the notation hereafter, r is assumed to be 2 and smaller code values represent higher priority classes. One way to blend the priority code $p_1 p_2$ into the aforementioned self-routing scheme is as follows: Upon entering the switching network, a packet with the destination address $d_1 d_2 \ldots d_n$ is preceded by the bit pattern $1 d_{\gamma(j)} p_1 p_2 d_{\gamma(j+1)} \ldots d_{\gamma(n)}$ as illustrated by data packet 6650 in FIG. 66D. The generic routing cell in the network is now replaced by a sorting cell with respect to the linear order 1000 1001 1010 1011 0000 1111 1110 1101 1100 on the initial four bits of the packet. Moreover, the cell consumes the second bit and rotates the third and fourth bits to the position behind the fifth bit. Thus the initial four bits are $1 d_{\gamma(j)} p_1 p_2$ upon entering each stage j, $1 \leq j \leq n$. Thus, the sorting cell is essentially with respect to the linear order $10 \triangleleft 00 \triangleleft 11$ on the two leading bits but uses the ensuing priority code $p_1 p_2$ as the tiebreaker.

The block diagram 6500 in FIG. 65A is adapted into the block diagram 6700 as shown in FIG. 67A for the inclusion of bit consumption and rotation. It assumes that $\gamma(1)=1$, $\gamma(2)=2$, $\gamma(3)=3$, etc. Three registers (6701, 6702, and 6703) represent the state of the automata (6710): As in FIG. 65A, there is the binary "connection state register" (6702) that indicates the prevailing bar/cross connection state and controls the two multiplexers (6711, 6712). There is also the binary "latch status register" (6703) that indicates whether the connection state is in the latched status or not. It is reset to UNLATCHED by the frame clock signal (6721). The "clock count register" (6701) stores the value CLOCK_COUNT, which advances along the bit clock from 0 to 5 and stays at 5 until the frame clock signal (6721) resets it to 0.

Figure 67B:
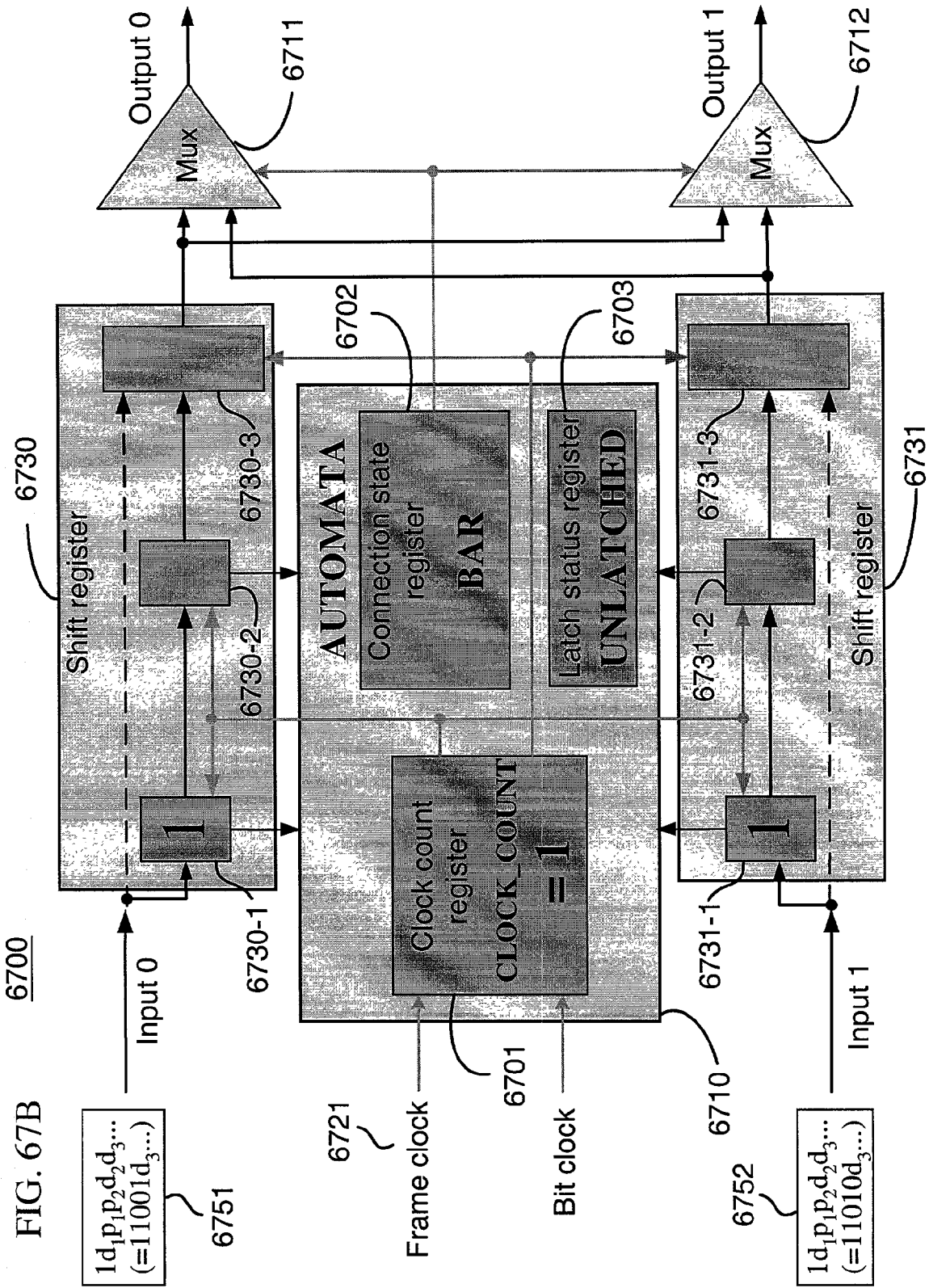

The illustrated scenario is when the packet 6751 starting with the bits $1 d_1 p_1 p_2 d_2 \ldots$ (=11011 ...) and packet 6752 starting with the bits $1 d_1 p_1 p_2 d_2 \ldots$ (11001 ...) are ready to enter inputs 0 and 1, respectively. Then the frame clock signal (6721) arrives and resets the CLOCK_COUNT to 0 and the latch status register 6703 to UNLATCHBD. The value of the connection state register 6702, which happens to be BAR in this case, remain s unchanged At CLOCK_COUNT=1, the first bit of the packet 6751, namely, '1', enters the first slot 6730-1 of the shift register (6730) connected to the input 0, and the first bit of the packet 6752, namely, '1', enters the first slot 6731-1 of the shift register (6731) connected to the input 1, as shown in FIG. 67B. Since the automata cannot make decision until the leading two bits from each of the packets have been read, nothing happens in the automata at this time.

Figure 67C:
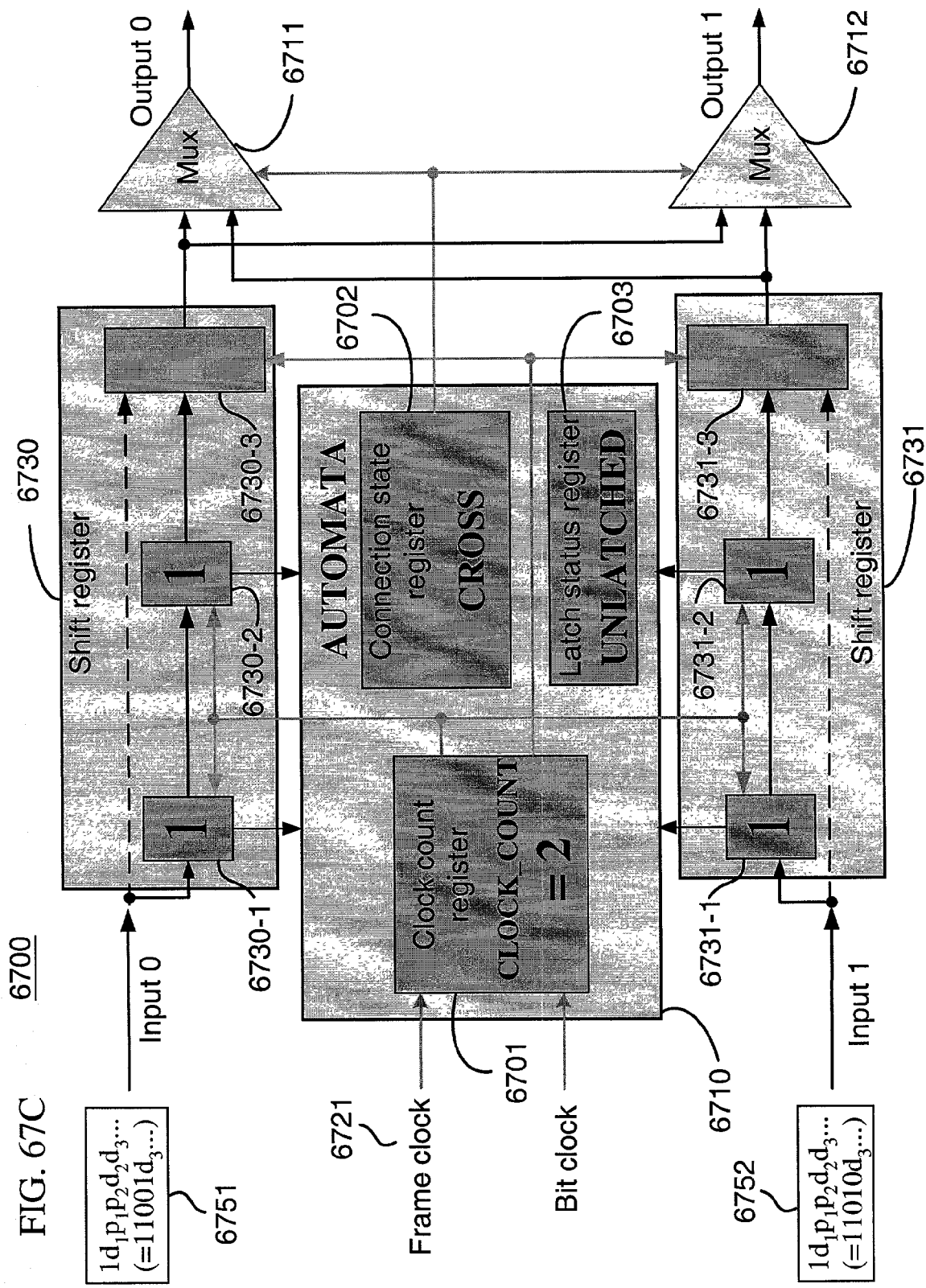

At CLOCK_COUNT2, the bit in the first slot of the shift register 6730 (resp. 6731) is shifted to the second slot 6730-2 (resp. 6731-2). The second bit of the packet 6751 (resp. packet 6752), namely, '1' (resp. '1'), enters the first slot of shift register 6730 (resp. shift register 6731). The automata sorts the initial two bits according to the linear order of $10 \triangleleft 00 \triangleleft 11$ with the bias toward input 0. Simply put, the 0/1 value of the second bit from input 0 determines the new BAR/CROSS state. In this case, the value of the connection state register is changed to CROSS but the latch status register remains UNLATCHED, as shown in FIG. 67C.

Figure 67D:
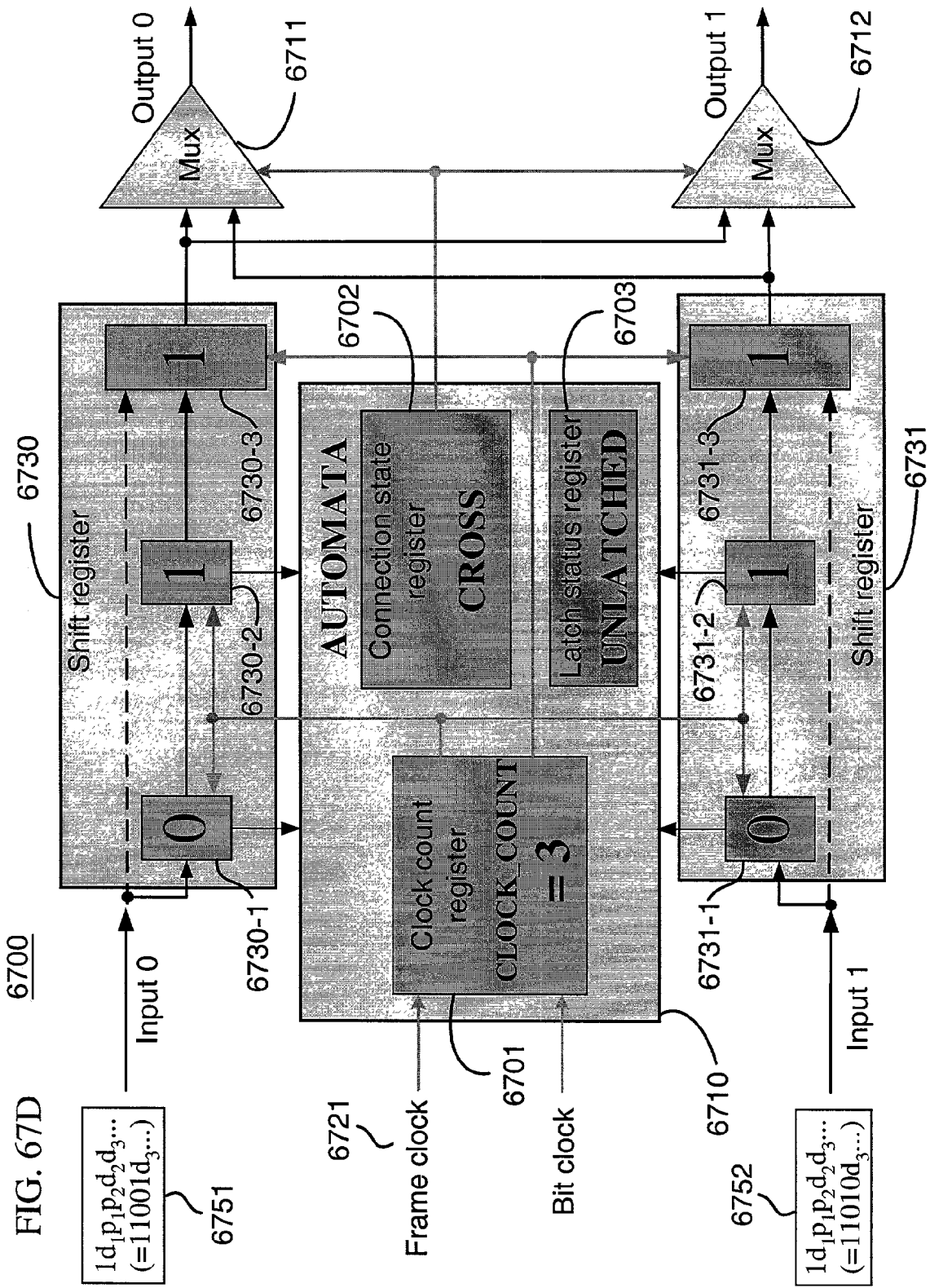

At CLOCK_COUNT=3, each bit is further shifted to the next slot, namely, the bits in slots 6730-1, 6731-1, 6730-2, and 6731-2, are respectively shifted to slots 6730-2, 6731-2, 6730-3, and 6731-3. The third bit of the packet 6751 (resp. packet 6752), which is the first priority bit, namely, '0' (resp. '0'), enters the first slot of shift register 6730 (resp. shift register 6731). The automata starts using the priority code in tie breaking. It sorts the third input bit with respect to the linear order of $0 \triangleleft 1$ (resp. $1 \triangleleft 0$) when the connection state is bar (resp. cross). In this case, the connection state is cross, and the sorting result is again a tie. Thus the connection state register remains CROSS and the latch status register remains UNLATCHED, as shown in FIG. 67D. Meanwhile, the automata action readies the following path connections for the next clock tick.

The bit in the third slot of each of the shift registers, namely, slot 6730-3, and slot 6731-3, will not be shifted out.

The bit in the second slot of each of shift registers, namely, slot 6730-2, and slot 6731-2, will be shifted out but will arrive nowhere. That is, the bit will be discarded.

Figure 67E:
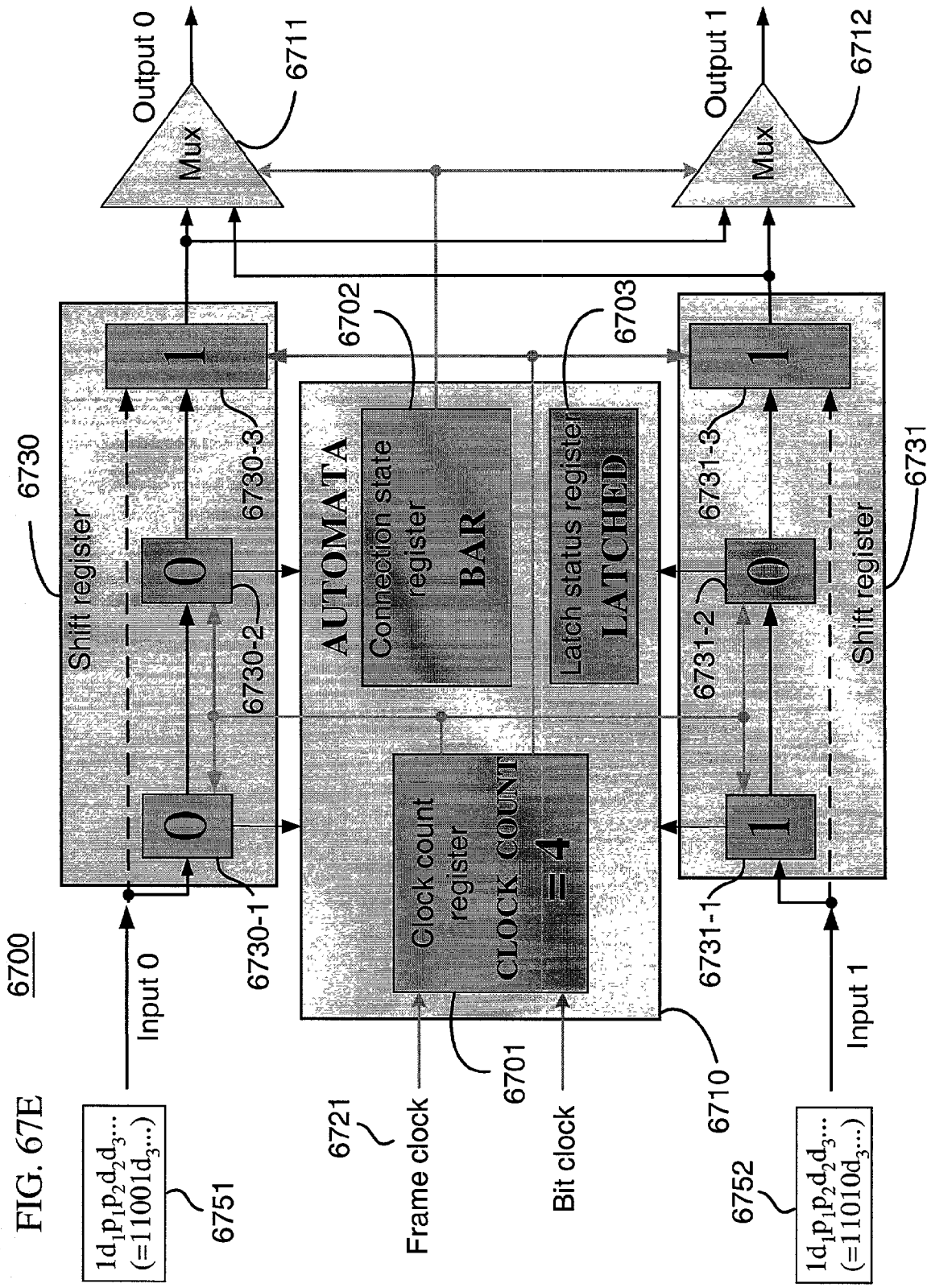

At CLOCK_COUNT=4, the bits in the second slots (6730-2, 6731-2) are discarded. The bits in the first slots 6730-1 and 6731-1 are shifted to the second slots 6730-2 and 6731-2, respectively. The fourth bit of the packet 6751 (resp. packet 6752), which is the second priority bit, namely, '0' (resp. '1'), enters the first slot of shift register 6730 (resp. shift register 6731). The automata uses this fourth input bit in another attempt of tie breaking. It sorts with respect to the linear order of $0 \triangleleft 1$ (resp. $1 \triangleleft 0$) when the connection state is bar (resp. cross). In this case, the connection state is cross before the sorting. The sorting result is decisive this time. It latches the connection state into bar, so the values of the connection state register and the latch status register become BAR and LATCHED, respectively, as shown in FIG. 67E. Meanwhile, the automata action readies the following path connections for the next clock tick.

The bit in the third slot of each of shift registers, namely, slot 6730-3, and slot 6731-3, will be shifted out but will arrive nowhere. That is, the bit will be discarded.

The bits in the other slots of each shift register will not be shifted out.

The next bit from each input will go directly to the third slot of the shift register instead of the usual first slot.

Figure 67F:
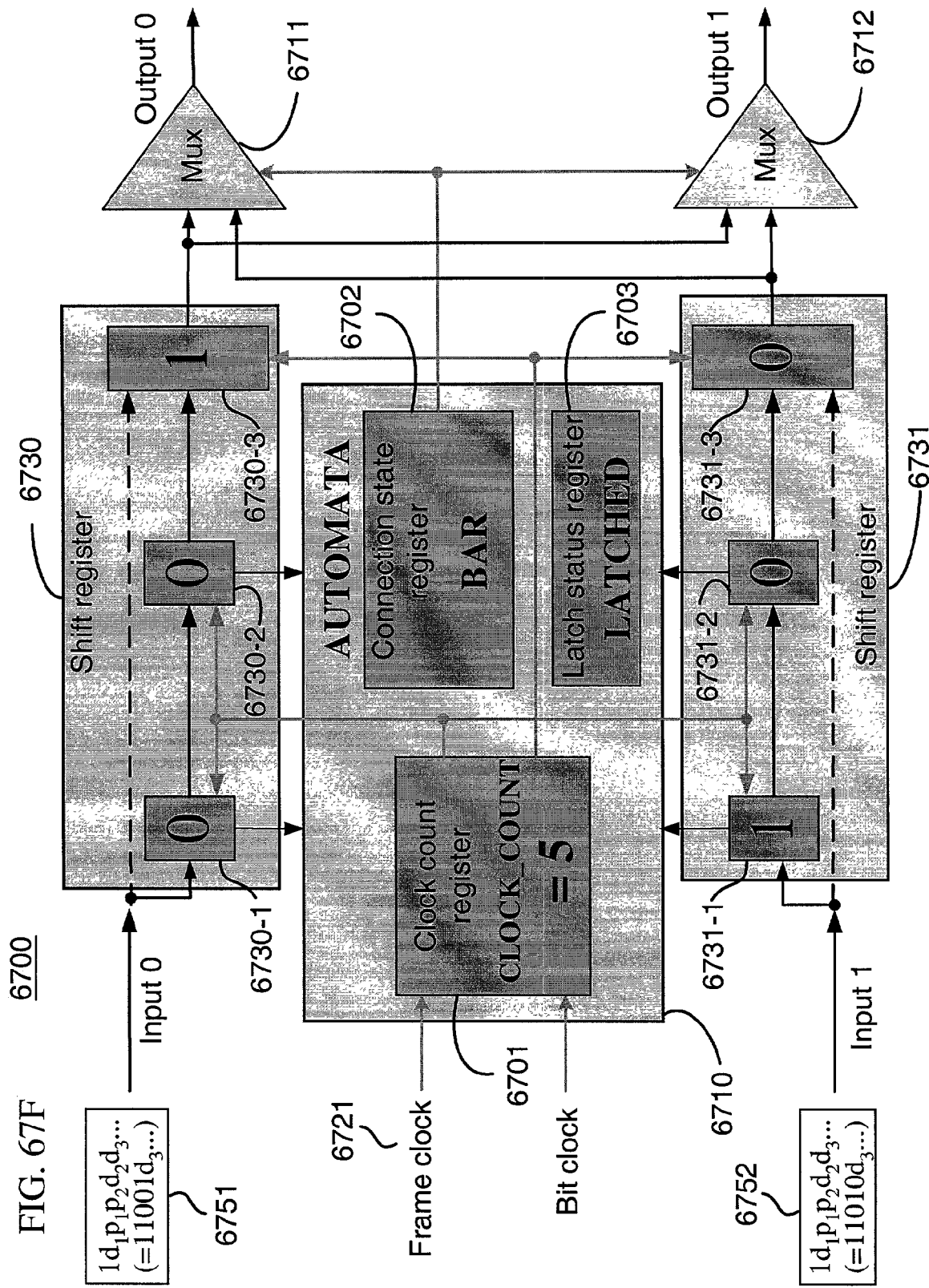

At CLOCK_COUNT=5, the activity bit in each shift register reaches a multiplexer (6711, or 6712) through the prevailing connection state, which is bar in the present scenario, and exits from the sorting cell. All path connections in the shift registers are reset to the normal shifting, and the connection state remains latched in bar. This scenario is shown in FIG. 67F. The CLOCK_COUNT is now at its maximum value of 5 and will remain at 5 at subsequent bit clock signals. Thus the automata action will simply repeat. Eventually the next frame clock signal will reset the CLOCK_COUNT to 0.

Remarks. Besides the switching function, the above-described sorting cell performs the consumption of an address bit and the backward rotation of the priority code. It is quite common for a routing cell in a particular application to perform ad hoc operations that modify packets. Below are some examples of such operations.

(1) Upon entering an n-stage routing network a packet is initially prefixed by the in-band control signal $1g_1g_2 \ldots g_n$. The stage-1 cell has to remove bit $g_1$ from the prefix so that the two leading bits in the control signal entering stage 2 will be $1g_2$ instead of $1g_1$. Suppose that the complete input packet, including the in-band control signal, must emerge intact upon exiting the routing network. In that case, the bit gi has to be preserved somehow. The simplest way is for the stage-1 cell to rotate the in-band control signal $1g_1g_2 \ldots g_n$ into $1g_2 \ldots g_ng_1$. Similarly, the stage-d cell, $1 \leq j \leq n$, rotates the in-band control signal $1g_jg_{j+1} \ldots g_ng_1 \ldots g_{j-1}$ into $1g_{j+1} \ldots g_ng_1 \ldots g_{j-1}g_j$. This bit rotation requires the buffering of $\Omega(n)$ bits by shift registers inside the routing cell. The natural implementation is the same as for the backward rotation of the priority code described above.

(2) Another common modification pertains to the switching function when it detects output contention at the sorting cell. Consider the scenario when two 0-bound packets arrive at a cell simultaneously. Only one of them may be routed to output 0; the other has to be deflected to output 1 through the bar/cross state. Typically, once a packet is misrouted at some stage, it does not matter whether it is correctly routed at subsequent stages. The control signals in front of deflected packets can then be deliberately altered to yield priority to others. One possibility is to change the control signal into the new value 01 and use it throughout the remaining stages. Such bit alteration can be easily implemented with shift registers similar to those in FIG. 67A. Concomitantly the underlying linear order $10 \prec 00 \prec 11$ among values of control signals needs to be extended to the partial order $10 \prec 0x \prec 11$. That is, every cell after stage 1 needs to be a sorting cell with respect to this partial order.

(3) In some applications, packet misrouting is more undesirable than blocking. In such a case, the switching cell simply blocks the deflected packet upon output contention, effectively turning the packet into a string of 0s. The implementation is trivial.

4. Multi-stage Interconnection Network of Sorting Cells

Definition H1: "routing network". A "routing network associated with a partially ordered set" is a multi-stage network composed of sorting cells associated with the said partially ordered set and possibly 1×1 switches, where the in-band control signal of a packet may change from stage to stage. This is simply called a "routing network" when the partially ordered set is understood or not of the concern in the context.

EXAMPLE 2

A banyan-type network employing the self-routing mechanism as elucidated in Example 1 above is a routing network. This routing network is composed of routing cells associated with the set $\{00, 10, 11\}$ under the linear order of $10 \prec 00 \prec 11$, plus 1×1 switches at each stage for changing the in-band control signal. The above linear order is due to the presence of the activity bit. When activity bit is not present, the routing network can be constructed similarly but with routing cells replaced by 0-1 sorting cells associated with the set $\{0, 1\}$ under the linear order of $0 \prec 1$. In either case, the in-band control signals are changed from stage to stage, as described in Example 1.

Definition H2: "partial sorting network". A "partial sorting network associated with a partially ordered set" is a multi-stage network composed of sorting cells associated with the partially ordered set and possibly 1×1 switches, where the in-band control signal at the beginning of a packet is preserved through every stage for reuse at the next stage. When the partial order is understood or not of the concern in the context, it is simply called a "partial sorting network".

The term "partial sorting" suggests that the network does not necessarily completely sort all input signals into a linear order. Commonly seen examples of sorting cells inside a partial sorting network are the 0-1 sorting cell and the routing cell.

Note that the routing control over a partial sorting network naturally qualifies as a form of self-routing. The switching decision at a cell in the network is determined simply by the comparison between the in-band control signals carried by the two input packets to the cell. The whole packet, including the in-band control signal is preserved through every stage.

EXAMPLE 3

Consider the 4×4 network 6800 as shown in FIG. 68. Let the control signals be 3-bit. Fill each of the cells (6801) in the network with a sorting cell with respect to the natural order among 3-bit numbers. The network then qualifies as a partial sorting network. The 1×1 delay elements (6802) in the network serve only to maintain packet synchronization across stages.

5. Concentrators and the Method of Statistical Line Grouping over a Banyan-type Network Self-routing over a banyan-type network is of interest because of the simple distributed control. However, all banyan-type networks are blocking. One way to adapt banyan-type networks into switch designs is to choose a network with the monotonically increasing (or decreasing) trace and guide and utilize the conditionally nonblocking properties of its switch realizations. In order to invoke such a "conditionally" nonblocking property, the "condition" must first be met though. For instance, the condition for the decompressor property is the existence of a rotation on the input addresses such that after the rotation, the active input addresses are consecutive, and the correspondence between the active I/O addresses are order-preserving. With the proper preprocessing and buffering at the inputs, the self-routing mechanism described in the above becomes nonblocking for the point-to-point switching over a decompressor constructed from a banyan-type network.

Another way to adapt banyan-type networks to switch designs is by statistical line grouping. Statistical line grouping creates a "multi-lined version" of any type of structure that involves interconnection lines among its internal elements. This technique replaces an interconnection line between two nodes with a bundle of lines. Concomitantly, the number of I/O of every node expands proportionally, i.e., node is proportionally dilated. The underlying statistical principle is the "large-group effect" in diluting the blocking probability. This method is very practical since it does not require preprocessing and buffering of the input traffic.

When the method of statistical line grouping is applied to a $2^n \times 2^n$ banyan-type network, it replaces every interconnection line by a bundle of, say, b lines and also dilates every 2×2 cell into a 2b×2b node. The resulting $b2^n \times b2^n$ network is called the b-line version of the $2^n \times 2^n$ network. The following example shows an 8-line version of the 16×16 divide-and-conquer network.

EXAMPLE 4

With reference to FIG. 69, application of statistical line grouping with the line-bundle size 8 to the 16×16 divide-and-conquer network results in a 128×128 network (6900) comprising 16×16 nodes (e.g. 6901). Instead of having two input ports and two output ports, each cell is dilated into a node (6901) with two groups (6902, 6903) of input ports and two groups (6904, 6905) of output ports. The two output groups are called 0-output group (6904) and the 1-output group (6905). Similarly, the two input groups are called 0-input group (6902) and the 1-input group (6903). The output groups of all nodes at a stage are connected to the input groups of nodes at the next stage.

The key issue on the method of statistical line grouping lies in the choice of the 2b×2b switch for filling the dilated node. In principle a 2b×2b switching fabric of any style, such as a crossbar or a shared-buffer-memory switch, can fill the dilated node provided the complexity is satisfactorily low in both the switching control and the switching elements. The following criteria are usually considered when choosing the switch to fill the dilated node:

Ideally the switching control of the 2b×2b switch need be compatible with self-routing over banyan-type networks.

Moreover, the switch does not have to be nonblocking but needs to possess some "partial property" of being nonblocking that is articulated in the sequel.

Definition H3: "m-to-n concentrator". For n<m, an m-to-n concentrator is an m×m switch having a "0-output group" comprising the m−n outputs with the smallest addresses, that is, from 0 to m−n−1, and a "1-output group" comprising the remaining n outputs such that when the given input signals to the concentrator are subject to a partial order, then any signal routed to the 0-output group is never greater than any signal routed to the 1-output group under the said order. Thus, an m-to-n concentrator can be regarded as a device which is capable of partitioning the m input signals (including real data input signals and artificial idle expressions) into two groups: the group of n largest signals, which are routed to the 1-output group, and the group of m−n smallest signals, which are routed to the 0-output group. As per the graph representation, by default the m-to-n concentrator is the one wherein the upper m−n output ports form the 0-output group and the lower n output ports form the 1-output group.

In some references in the background art, there is notion of an "m×n concentrator", which means an m×n switch, n<m, such that the largest n input signals are routed the n output ports. Thus an m-to-n concentrator defined above can be reduced to an "m×n concentrator" by not implementing the output ports in the 0-output group. In order to avoid terminology ambiguity, the notion of an "m×n concentrator" will not be adopted. Every concentrator in this context refers to an m-to-n concentrator for some m and some n, n<m.

EXAMPLE 5

FIG. 70A shows an 8-to-4 concentrator 7000 constructed by an 8×8 partial sorting network which is a 4-stage interconnection network of sorting cells. The control signals are 3-bit. All sorting cells (7001, 7002) are associated with the natural order among 3-bit numbers except that the two outputs of each of the sorting cells 7002 are inversely positioned. As shown in the figure, the arrow on a sorting cell always points to output-1, which receives the signal with the larger value between the two. The figure demonstrates a test run over this concentrator. The eight output signals are partitioned into two groups (7020, 7021), with the group of smallest four signals (7020), namely, 000, 011, 101, and 100, at the 0-output group (7010) of the concentrator, and the group of largest four signals (7021), namely, 111, 110, 110, and 110, at the 1-output group (7011). Note that the order among signals within each group is arbitrary.

EXAMPLE 6

FIG. 70B shows a test run of 2-bit signals through another 8to-4 concentrator 7050 which shares the same underlying 8×8 partial sorting network employed by the concentrator 7000 in Example 5. This time the sorting cells (7051, 7052) in the network are routing cells, i.e., sorting cells associated with the linear order of 10 ≺00 ≺11. Again, the two outputs of each of the sorting cells 7052 are inversely positioned. The eight output signals are partitioned into two groups (7070, 7071), with the group of smallest four signals (7070), namely, 00, 10, 00, and 10, at the 0-output group (7060) of the concentrator, and the group of largest four signals (7071), namely, 11, 11, 00, and 11, at the 1-output group (7061).

Remark. Sorting cells associated with different partially ordered sets incurs different complexities in their physical implementation. For example, the implementation of a sorting cell supporting priority treatment, as shown in FIGS. 67A-F, is much more complex than one which does not support. The concentrator 7000 in Example 5 and the concentrator 7050 in Example 6 share the same network structure, but the sorting cells in them are associated with two different partially ordered sets and hence the two concentrators are physically different.

One of the criteria mentioned in the above in choosing the proper switch to fill the dilated node in a b-line version of a banyan-type network is a "partial property" of being nonblocking. Explicitly this partial property means the guarantee to route the maximum possible number of 0-bound signals to the 0-output group and the maximum possible number of 1-bound signals to the 1-output group. For a 2b-to-b concentrator is composed of interconnected routing cells (plus possibly 1×1 elements), the nature of a concentrator in routing the smallest m−n signals to the 0-output group and the largest n signals to the 1-output group is precisely equivalent to this guarantee. Therefore, a 2b-to-b concentrator is composed of interconnected routing cells meets this criterion perfectly for filling the dilated node in a b-line version of a banyan-type network.

The other criterion in choosing the proper switch to fill the dilated node in a b-line version of a banyan-type network is the compatibility with self-routing over the banyan-type network. The 2b-to-b concentrator is composed of interconnected routing cells again meets the criterion perfectly. As a switch constructed by a partial sorting network, a concentrator possess a natural self-routing mechanism. When the 2b-to-b concentrator fills every dilated node of the b-line version of the banyan-type network, the whole network becomes a large multi-stage interconnection network of routing cells. The marriage between the self-routing mechanism over the partial sorting networks with the self-routing mechanism over the banyan-type network, as to be detailed in the next sub-section, creates a self-routing mechanism over the said large multi-stage interconnection network of sorting cells.

Remark. As before, if idle expressions are disallowed in the system, the 2b-to-b concentrator is composed of interconnected routing cells can be substituted by a 2b-to-b concentrator composed of interconnected 0-1 sorting cells. The same applies throughout the next sub-section.

6. Self-routing over a Multi-stage Interconnection Network of Concentrators

Hereafter unless otherwise specified, all concentrators refer to those constructed by partial sorting networks.

Recall the classification of multi-stage networks of sorting cells into routing networks and partial sorting networks. The in-band control signal of a packet is preserved through a partial sorting network. On the other hand, it changes from stage to stage when the packet traverses a routing network, e.g., a banyan-type network under basic self-routing control. The b-line version of a $2^n \times 2^n$ banyan-type network is a hybrid between a routing network and a partial sorting network when every dilated node in it is filled with a 2b-to-b concentrator composed of interconnected routing cells. The hybrid network may be viewed as composed of n "super stage" of concentrators. At each super stage, a packet traverses through a partial sorting network, which is by itself a multi-stage network of routing cells, and the in-band control signal of a packet changes only between super-stages.

The $b2^n$ outputs of the hybrid network are in $2^n$ groups of the size b. The destination of a packet is an output group rather than an individual output in an output group. In accordance with the present invention, upon entering a generic $2^n \times 2^n$ banyan-type network with the guide $\gamma(1), \gamma(2), \ldots, \gamma(n)$, a packet destined for the output at the address $d_1 d_2 \ldots d_n$ is preceded by the routing tag $1 d_{\gamma(1)} d_{\gamma(2)} \ldots d_{\gamma(n)}$ and the in-band control signal to stage-j switching cell is $1 d_{\gamma(j)}$. The same routing tag still applies in the b-line version of the banyan-type network in which every dilated node is filled by a 2b-to-b concentrator when the packet is destined for the output group at the address $d_1 d_2 \ldots d_n$, and, for $1 \leq j \leq n$, and the in-band control signal to a concentrator in the $j^{th}$ super-stage is $1 d_{\gamma(j)}$. More explicitly, the in-band control signal to every routing cell in a concentrator at the $j^{th}$ super-stage is $1 d_{\gamma(j)}$. As the packet progressed through the hybrid network composed of many stages of routing cells, the in-band control signal to a routing cell changes only upon the exit from a concentrator. That is, the bit $d_{\gamma(j)}$ is consumed not by any generic routing cell inside a concentrator at the $j^{th}$ super-stage but rather by certain extra circuitry installed at the output end of the concentrator. This extra circuitry handles each packet separately and hence consists of 2b parallel 1×1 switching elements. There may exist other 1×1 elements in the 2b-to-b concentrator, e.g., delay elements in maintaining the synchronization across the stage and annihilators of misrouted packets.

EXAMPLE 7

The guide of the 16×16 divide-and-conquer network is the sequence 1, 2, 3, 4 The network 6900 shown in FIG. 69 is the 8-line version of the 16×16 divide-and-conquer network. This is a 128×128 network, and each of the dilated nodes is 16×16. Thus fill every dilated nodes (e.g. 6901) with a 16-to-8 concentrator consists of multi-stage interconnected routing cells plus 1×1 elements. The 128 outputs of this network are partitioned into 16 output groups of the size 8. Each output group is associated with a 4-bit address. A packet is destined for an output group rather than a specific output in the group. That is, the routing of a signal to any port within a group is just as good as routing to any other port in the group. When the destined output group is at the address $d_1 d_2 d_3 d_4$, the initial routing tag of the packet is $1 d_{\gamma(1)} d_{\gamma(2)} d_{\gamma(3)} d_{\gamma(4)} = 1 d_1 d_2 d_3 d_4$. The in-band control of the packet to every routing cell in the concentrator at the $1^{st}$ super-stage is $1 d_1$. Upon exiting that concentrator, the bit $d_1$ in the routing tag is consumed by a 1×1 element in the concentrator. Thus the routing tag upon entering the $2^{nd}$ super-stage is $1 d_2 d_3 d_4$. And so on.

A practical switch must cope with output contention, traffic fluctuation, burstiness, and so forth, and some alternate-routing ingredients, explicitly or implicitly, help resolve these problems. The key is not to complicate the switching control too much through alternate routing. From the macro perspective, the above described hybrid network inherits the unique-routing characteristic from the banyan-type network and thereby allows very simple control. The micro view, on the other hand, reveals the alternate-routing nature concealed inside individual concentrators. The good news is the natural marriage between the self-routing control of concentrators and the self-routing control over the banyan-type network into an extremely simple self-routing control over the hybrid network.

Recall that the self-routing control mechanism over $2^n \times 2^n$ banyan-type networks can be extended to $2^n \times 2^n$ k-stage bit-permuting networks. Therefore, when the underlying banyan-type network of the above hybrid network is replaced by a bit-permuting network, the overall self-routing control over the resulting hybrid network is extremely similar to the above, that is, it is simply the marriage between the self-routing control of concentrators and the self-routing control over the replacing bit-permuting network. More precisely, when the replacing bit-permuting network is a $2^n \times 2^n$ k-stage bit-permuting network with the guide $\gamma(1), \gamma(2), \ldots, \gamma(k)$, where $\gamma$ is a mapping from the set $\{1, 2, \ldots, k\}$ to the set $\{1, 2, \ldots, n\}$, a packet destined for the binary output group address $d_1 d_2 \ldots d_n$ is initially prefixed with the routing tag $1 d_{\gamma(1)} d_{\gamma(2)} \ldots d_{\gamma(k)}$. For $1 \leq j \leq k$, the in-band control signal to a concentrator in the $j^{th}$ super-stage is $1 d_{\gamma(j)}$, and the second bit in this control signal is consumed upon the exit from the concentrator.

7. Multicast Concentrators

A concentrator composed of interconnected routing cells is a point-to-point switch that routes 0-bound, 1-bound, and idle packets to 0- and 1-output groups; it satisfies the desirable characteristic of always routing the maximum possible number of 0-bound (resp. 1-bound) signals to its 0-output group (resp. 1-output group). For a multicast switch that routes 0-bound, 1-bound, idle, and bicast packets to 0- and 1-output groups, a corresponding desirable characteristic is to route the maximum total number of 0-bound and bicast signals to the 0-output group and the maximum total number of 1-bound and bicast signals to the 1-output group. This concept is formulated in the next definition.

Definition H4: "m-to-n multicast concentrator". For n<m, an m×m switch having a "0-output group" comprising the m−n outputs with the smallest addresses, that is, from 0 to m−n−1, and a "1-output group" comprising the remaining n outputs and receiving 0-bound, 1-bound, idle and bicast input signals is called an m-to-n "multicast concentrator" if it routes the maximum total number of 0-bound and bicast signals to the 0-output group and the maximum total number of 1-bound and bicast signals to the 1-output group.

An m-to-n multicast concentrator, by its definition, always guarantees that the total number of 0-bound (resp. 1-bound)

and bicast signals routed to its 0-output group is the maximum possible. This guarantee can be equivalently expressed as: by letting the numbers of 0-bound, 1-bound, bicast, and idle signals that arrive at an m-to-n multicast concentrator be $x_0$, $x_1$, $x_b$, and $m-x_0-x_1-x_b$, respectively, then the total number of 0-bound and bicast signals that arrive at 0-output group of the multicast concentrator is $\min\{m-n, x_0+x_b\}$, and the total number of 1-bound and bicast signals that arrive at 1-output group is $\min\{n, x_1+x_b\}$. A multicast concentrator is a switch serving for the combined objective of concentration and multicasting. In the absence of bicast signals, its function reduces to the same as a concentrator.

In accordance with the present invention, an m-to-n multicast concentrator can be constructed from an m-to-n concentrator as follows: an m-to-n concentrator constructed from a partial sorting network of interconnected routing cells can be adapted into an m-to-n multicast concentrator by replacing each of the routing cells with a bicast cell as defined in Definition G6.

EXAMPLE 8

The 8-to-4 concentrator 7000 depicted in FIG. 70A can be adapted into an 8-to-4 multicast concentrator 7100 depicted in FIG. 71A as follows. The underlying interconnection network is unchanged, but a bicast cell replaces every sorting cell in the concentrator. As before, the arrow on a bicast cell always points to output-1. In the test run of routing packets through this multicast concentrator as illustrated in FIG. 71A, the eight input packets a, b, c, d, e, f, g, and h are respectively idle, 0-bound, bicast, 0-bound, bicast, bicast, 1-bound, and 1-bound and respectively represented as 'a(I)', 'b(0)', 'c(B)', 'd(0)', 'e(B)', 'f(B)', 'g(1)', and 'h(1)'. Among the three bicast packets, only packet c(B) is bicasted, that is, it successfully converts itself into a 0-bound copy and a 1-bound copy, and this conversion occurs at the bicast cell 7102-1 when 'c(B)' meets the idle packet 'a(I)' and thereby produces 'c(0)' and 'c(1)'. The other two bicast packets 'e(B)' and 'f(B)' remain bicast packets throughout the multicast concentrator.

FIG. 71B shows another test run, with the same input packets as before except for idle packets d and g in this run. This time two of the bicast packets, c(B) and e(B), are bicasted into 0-bound and 1-bound copies at the bicast cells 7101-1 and 7102-2. The third bicast packet f(B) remains a bicast packet throughout the multicast concentrator despite the presence of three idle packets at the beginning. Recall that an m-to-n multicast concentrator only guarantees that the total number of 0-bound and bicast packets routed to 0-output group is $\min\{m-n, x_0+x_b\}$ and the total number of 1-bound and bicast packets to 1-output group is $\min\{m-n, x_1+x_b\}$. In this case, m=8, n=4, $x_0=2$, $x_1=0$, $x_b=3$ and $\min\{m-n, x_0+x_b\}=\min\{8-4, 2+3\}=4$. The total number of 0-bound and bicast packets routed to 0-output group is indeed equal to $\min\{m-n, x_0+x_b\}$, as verified by the four packets at the 0-output group 7110, namely, the two 0-bound packets b(0) and h(0), and the two 0-bound copies c(0) and e(0) of the two bicast packets c and e, respectively. Similarly, the total number of 1-bound and bicast packets routed to 1-output group is $\min\{4, 0+3\}=3$, as verified by the bicast packet f(B) and the two 1-bound copies, c(1) from c and e(1) from e, at the 1-output group 7171.

Priority classification of 0-bound and 1-bound signals can be easily blended into the in-band control of the bicast cell as a tiebreaker upon output contention. Suppose the '0-bound' value of a signal is replaced with the values 'hi 0-bound', ..., 'lo 0-bound', and the '1-bound' value with the values 'hi 1-bound', ..., 'lo 1-bound' (Here "hi" and "lo" are shorthand for the highest and lowest priorities.) Then the in-band control of a bicast cell can be modified into:

(1) When the input signals to the bicast cell are a bicast signal and an idle signal, then output-0 (resp. output-1) produces a lo 0-bound (resp. lo 1-bound) signal.

(2) Otherwise, the bicast cells perform sorting with respect to the partial order:
'hi 0-bound' ≺ . . . ≺'lo 0-bound' ≺'idle' ≺'lo 1-bound' ≺ . . . ≺'hi 1-bound' and
'hi 0-bound' ≺ . . . ≺'lo 0-bound' ≺'bicast' ≺'lo 1-bound' . . . ≺'hi 1-bound'.

Such a modified multicast concentrator then guarantees that the total number of 0-bound (resp. 1-bound) and bicast signals at the 0-output group (resp. 1-output group) is the maximum possible according to the priority class. This guarantee does not hold, however, if the rule (1) were allowed to generate packets not of the lowest priority.

EXAMPLE 9

Figure 72B:
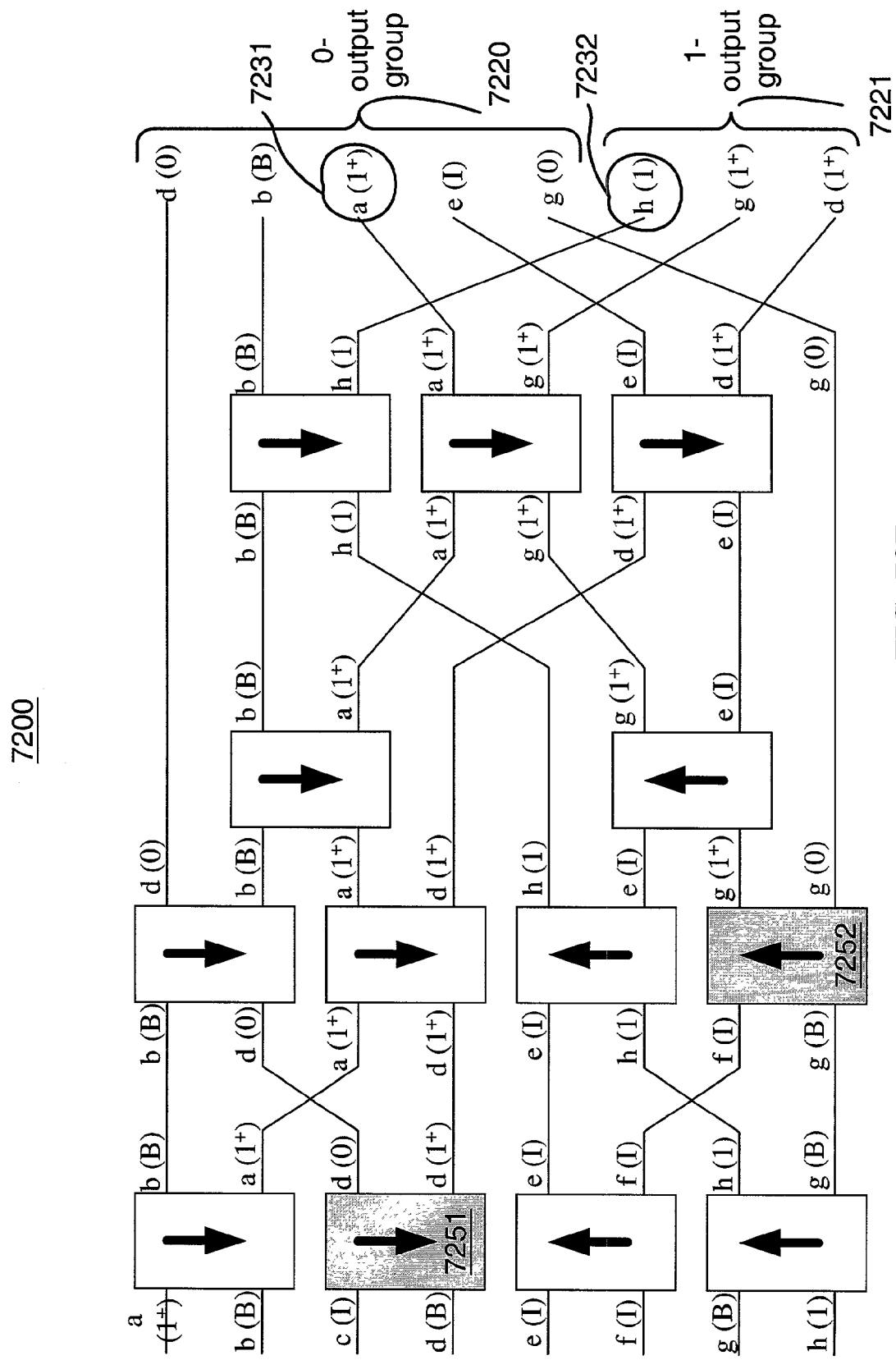

FIG. 72A illustrates the operation of the multicast concentrator 7200 with priority treatment. In this example, the 0-bound and 1-bound packets are simply divided into two priority classes, the normal 0- and 1-bound packets and the priority 0- and 1-bound packets, indicated by a superscript '+', e.g. the packet 'a(1$^+$)'. If the aforementioned rule (1) were to generate packets not of the lowest priority, and in this particular example, generate priority 0- and 1-bound packets out of a non-priority bicast packet, as illustrated in FIG. 72B where the bicast packet 'd(B)' are bicasted into a normal 0-bound packet 'd(0)' and a priority 1-bound packet 'd(1)' at the bicast cell 7251, and the bicast packet 'g(B)' are bicasted into a normal 0-bound packet 'g(0)' and a priority 1-bound packet 'g(1)' at the bicast cell 7252, then a normal 1-bound packet, in this case, the packet 'h(1)'(7232), would reach the 1-output group (7221) while a priority 1-bound packet, in this case, the packet 'a(1$^+$)' (7231), would reach the 0-output group (7220).

8. Self-routing Multicasting over a Banyan-type Network

A $2^n \times 2^n$ multicast switch allows a packet to be destined for an arbitrary subset of the $2^n$ output addresses. The overhead in encoding an arbitrary set of destination addresses is costly. In fact, the number of bits cannot be reduced to less than $2^n$. However, this excessive overhead can be drastically trimmed when certain practically reasonable constraints are imposed on the set of the destinations of a packet. One constraint is that the set of destination addresses of every packet should be a "rectangle", as defined in the sequel.

Definition H5: "rectangle". Regard the entirety of $2^n$ output addresses as the n-dimensional binary cube $\{0, 1\} \times \{0, 1\} \times \ldots \times \{0, 1\}$. A subset in the form of $S_1 \times S_2 \times \ldots \times S_n$, where each $S_j$ is a nonempty subset of $\{0, 1\}$, will be called a "rectangular set of output addresses", or simply a "rectangle". If a rectangle contains $2^k$ output addresses, it is called a "k-dimensional rectangle".

EXAMPLE 10

A generic binary address of a $2^6 \times 2^6$ banyan-type network is $b_1 b_2 b_3 b_4 b_5 b_6$. The entirety of $2^6$ output addresses is a 6-dimensional binary cube $S_1 \times S_2 \times \ldots \times S_6$, where each $S_j = \{0, 1\}$ corresponds to the two possible values of $b_j$. One of the rectangles of this 6-dimentional binary cube can be the subset in the form of $\{0, 1\} \times \{0\} \times \{0, 1\} \times \{1\} \times \{0, 1\} \times \{1\}$, which contains 23 output addresses, namely, 000101, 000111, 001101, 001111, 100101, 100111, 101101, and 101111, so this is a 2-dimentional rectangle. The number of 3-dimensional rectangles in the 6-dimensional binary cube is $2^{6-3} *_6 C_3 = 8*(6*5*4)/(3*2) = 160$.

The aforementioned constraint requires that the set of destination addresses of every packet to be a rectangle. For a practical application under this restriction, output addresses of the switch must be tactically assigned so that a packet's multicast destinations are usually covered tightly by just a rectangle or two. For example, on a broadband switch for heterogeneous applications, a rectangle of output addresses may be assigned to cable TV subscribers.

An inventive self-routing mechanism over the multicast switching in any $2^n \times 2^n$ banyan-type network based on such a constraint are disclosed as follows. Consider a generic quaternary symbol with the four values '0-bound', '1-bound', 'idle', and 'bicast'. The four values correspond to subsets of $\{0, 1\}$ by:

$\{0\}$='0-bound'
$\{1\}$='1-bound'
$\{0, 1\}$='bicast'
null='idle'

Thus a generic rectangle $S_1 \times S_2 \times \ldots \times S_n$ can be represented by a quaternary sequence $Q_1, Q_2, \ldots, Q_n$, where each $Q_j$ here is a quaternary symbol in any of the three values: '0-bound', '1-bound', and 'bicast'. Each symbol Q cannot be equal to 'idle', because in a rectangle, each $S_j$ cannot be a null set. When a packet is destined for a set of output addresses that happens to be a rectangle represented as $Q_1, Q_2, \ldots, Q_n$, each $Q_j$ indicates the preference of the j-th bit of its destination addresses.

A quaternary symbol can be encoded by two bits. A natural coding scheme here is '0-bound'=10, '1-bound'=11, 'idle'=00, and 'bicast'=01. For example, the rectangle $\{0, 1\} \times \{0\} \times \{0, 1\} \times \{1\} \times \{0, 1\} \times \{1\}$ in Example 10 can be represented by a quaternary sequence $Q_1$='bicast', $Q_2$='0-bound', $Q_3$='bicast', $Q_4$='1-bound', $Q_5$='bicast', $Q_6$='1-bound', or under the natural coding scheme, $Q_1$='01', $Q_2$='10', $Q_3$='01', $Q_4$='11', $Q_5$='01', $Q_6$='11'. Conversely, if the destination addresses of a packet is represented by a sequence $Q_1$='11', $Q_2$='10', $Q_3$='01', $Q_4$='11', $Q_5$='10', $Q_6$='01', the packet is said to be destined for the rectangle $\{1\} \times \{0\} \times \{0, 1\} \times \{1\} \times \{0\} \times \{0, 1\}$ which comprises the output addresses 100100, 100101, 101100, and 101101.

In accordance with the present invention, when a packet first enters a $2^n \times 2^n$ banyan-type network with the guide $\gamma(1), \gamma(2), \ldots, \gamma(n)$, the packet destined for the rectangle $Q_1, Q_2, \ldots, Q_n$, is prefixed with the routing tag $Q_{\gamma(1)} Q_{\gamma(2)} \ldots Q_{\gamma(n)}$ The idle packet has the routing tag in which all quaternary symbols are 'idle' and is a string of '0' bits under the natural coding scheme.

For each stage j, $1 \leq j \leq n$, the in-band control signal used by the routing control at that stage is the symbol $Q_{\gamma(j)}$, which is then either consumed or rotated to the end of the routing tag at the stage. As a result, the leading symbol upon entering each stage j, $1 \leq j \leq n$, is $Q_{\gamma(j)}$. The self-routing control at each stage can be perfectly executed by filling each cell of the $2^n \times 2^n$ banyan-type network with a bicast cell.

This self-routing mechanism for multicast switching can be extended to $2^n \times 2^n$ k-stage bit-permuting networks. Consider a generic $2^n \times 2^n$ k-stage bit-permuting network with the guide $\gamma(1), \gamma(2), \ldots, \gamma(k)$, where $\gamma$ is a mapping from the set $\{1, 2, \ldots, k\}$ to the set $\{1, 2, \ldots, n\}$. A packet destined for the rectangle $Q_1, Q_2, \ldots, Q_n$, is prefixed with the routing tag $Q_{\gamma(1)} Q_{\gamma(2)} \ldots Q_{\gamma(k)}$. The in-band control signal of a packet to a bicast cell at each stage j, $1 \leq j \leq k$, is the leading symbol $Q_{\gamma(j)}$.

Priority treatment can be integrated into this self-routing mechanism in the same way as before. Thus let the r-bit pattern $p_1 \ldots p_r$ represent the priority class. When a packet first enters the network, the packet header is prefixed with $Q_{\gamma(1)} p_1 \ldots p_r Q_{\gamma(2)} \ldots Q_{\gamma(n)}$ The bicast cell can be modified for the priority treatment similarly as before. The primary in-band control signal used at each stage j is still $Q_{\gamma(j)}$, while the priority code $p_1 \ldots p_r$ serves as the tiebreaker when the two packets arrived at the same cell are both 0-bound or both 1-bound. The switching control at each stage consumes the leading quaternary symbol (or rotated it to the end of the routing tag) and rotates the priority code to the position behind the next quaternary symbol. Therefore, the underlying methodology for the realization of this (multicast) self-routing mechanism over a banyan-type network and the implementation of the related circuitry is very similar to the case of basic (point-to-point) self-routing mechanism employed in banyan-type network.

9. Statistical Line Grouping over a Banyan-type Network for Multicast Switching

In parallel with the self-routing mechanism over a multistage interconnection network of concentrators, a similar inventive self-routing mechanism is disclosed for the multistage interconnection network of multicast concentrators.

Take an m-to-n concentrator constructed from a partial sorting network of interconnected routing cells. As stated in the sub-section H7, such a concentrator can be adapted into an m-to-n multicast concentrator by replacing each of the routing cells with a bicast cell. Given a $2^n \times 2^n$ banyan-type network, say, with the guide $\gamma(1), \gamma(2), \ldots, \gamma(n)$. Fill each dilated node in the b-line version of the banyan-type network with a 2b-to-b multicast concentrator so constructed. The result is a multicast version of the hybrid network described in the sub-section H6 and hence will be referred to as the "multicast hybrid network". The multicast hybrid network is composed of n "super stage" of multicast concentrators. A self-routing mechanism over this multicast hybrid network, in a fashion much parallel to the point-to-point case, is disclosed below.

The $b2^n$ outputs of the multicast hybrid network are in $2^n$ groups of size b. Each destination of a packet is an output group rather than an individual output in an output group. At a super stage, a packet traverses through a multicast concentrator, which is a multi-stage interconnection network of bicast cells. In accordance with the present invention, upon entering the multicast hybrid network, a packet destined for output groups with the rectangular set of addresses encoded by $Q_1, Q_2, \ldots, Q_n$ is prefixed with the routing tag $Q_{\gamma(1)} Q_{\gamma(2)} \ldots Q_{\gamma(n)}$. The in-band control signal to a multicast concentrator in the $j^{th}$ super-stage is $Q_{\gamma(j)}$, and this quaternary symbol in the routing tag is consumed or rotated to the end of the routing tag by the $j^{th}$ super-stage. More explicitly, the in-band control signal to every bicast cell in a multicast concentrator at the $j^{th}$ super-stage is $Q_{\gamma(j)}$ except that a bicast packet (with $Q_{\gamma(j)}$='bicast') and an idle packet (with $Q_{\gamma(j)}$='idle') are replaced by a 0-bound packet (with $Q_{\gamma(j)}$='0-bound') and a 1-bound packet (with $Q_{\gamma(j)}$='1-bound') when they meet at a bicast cell. The consumption of the quaternary symbol $Q_{\gamma(j)}$ or its rotation to the end of the routing tag is not by any generic bicast cell inside a multicast concentrator at the $j^{th}$ super-stage but rather by certain extra circuitry installed at the output end of the multicast concentrator. This extra circuitry handles each packet separately and hence consists of 2b parallel 1×1 switching elements. There may exist other 1×1 elements in the 2b-to-b multicast concentrator, e.g., delay elements in maintaining the synchronization across the stage and annihilators of misrouted packets.

Similar to the case of self-routing over a multi-stage interconnection network of concentrators, when the underlying banyan-type network of a multi-stage interconnection network of multicast concentrators is replaced by a more general bit-permuting network, the self-routing control mechanism still applies. More precisely, when the replacing bit-permuting network is a $2^n \times 2^n$ k-stage bit-permuting network with the guide $\gamma(1), \gamma(2), \ldots, \gamma(k)$, where $\gamma$ is a mapping from the set $\{1, 2, \ldots, k\}$ to the set $\{1, 2, \ldots, n\}$, a packet destined for output groups with the rectangular set of addresses encoded by $Q_1, Q_2, \ldots, Q_n$ is prefixed with the routing tag $Q_{\gamma(1)} Q_{\gamma(2)} \ldots Q_{\gamma(k)}$. For $1 \leq j \leq k$, the in-band control signal to a multicast concentrator in the $j^{th}$ super-stage is $Q_{\gamma(j)}$, and this quaternary symbol in the routing tag is consumed or rotated to the end of the routing tag by the $j^{th}$ super-stage. Note that if $\gamma(p) = \gamma(q)$ in the guide of the network, where p<q, the q-th symbol of the routing tag $Q_{\gamma(p)}$ will repeat the p-th symbol $Q_{\gamma(p)}$, when $Q_{\gamma(p)}$='bicast', the packet may be bicasted at stage-p and then be bicasted again at stage-q such that undesired extra copies of the packet will be produced. Therefore, whenever $\gamma(p) = \gamma(q)$ in the guide of the network, the bicasting function of the whole stage of switching nodes at either stage-p or stage-q should be disabled to prevent such situation. The remaining parts of the control coincide with the above.

I: Physical Implementation of Switching Fabrics Constructed from Recursive 2-Stage Interconnection As mentioned in Sections B, a switching fabric can be based on recursive invocation of the technique of 2-stage construction. That is, a multi-stage network is constructed by a recursive procedure where the generic step is "2-stage interconnection" and then each node in the multi-stage network so constructed is filled with an appropriate switching element. Throughout this section,
(a) the term "2-stage interconnection" includes plain 2-stage interconnection, 2X interconnection, X2 interconnection, and generalized 2-stage interconnection, unless otherwise specified,
(b) the procedure of the recursive invocation of the 2-stage interconnection is called the "recursive 2-stage interconnection" or "recursive 2-stage construction", and
(c) the multi-stage network so constructed is called a "recursive 2-stage interconnection network".

FIG. 14 in Section B depicts a 30×18 3-stage network 1400 from such a recursive 2-stage construction. Sometimes the method of statistical line grouping may be applied so that a switching fabric is actually based on a multi-line version of a recursive 2-stage interconnection network. FIG. 69 depicts the example of the 8-line version of the 16×16 divide-and-conquer network (6900), which constructs a 128×128 switch when every node in it is filled by an appropriate 16×16 switching element.

A generic step of recursive 2-stage interconnection is between an array of input nodes and an array of output nodes. The physical implementation of this generic step is by wiring between an array of "input switching elements" and an array of "output switching elements". In the case of a step of 2-stage interconnection in a b-line version of a recursive 2-stage interconnection network, there would be a bundle of b wires connecting between every input switching element and every output switching element. This physical implementation can be at any of the following five levels.

1. Level I: Inside-chip implementation. The inside-chip implementation means physical realization inside an IC chip. The I/O switching elements are usually some primitive switching circuitries. The most common primitive switching circuitry is a 2×2 switching cell. A trivial physical realization for it has been depicted in FIG. 65A. Some other primitive switching circuitries, to name a few, can be 2×1 multiplexer, 1×2 demultiplexer, 2×2 expander cell, and so on. This level of implementation can be recursively applied within an IC chip. This level is simply referred to as "chip-level" or just "C-level".

For example, the 16×16 divide-and conquer network (5100) shown in FIG. 51, which is constructed from the recursive 2-stage interconnection of cells, can be physically realized inside an IC chip where all switching elements are 2×2 switching cell.

2. Level II: PCB implementation. The PCB implementation means physical realization on a PCB (printed circuit board). Each I/O switching element for this level is an IC chip. This level of implementation can be recursive applied within a PCB. This level is simply referred to as "PCB-level" or just "P-level".

For example, the recursively constructed 30×18 network 1400 as depicted in FIG. 14 can be implemented on a PCB wherein the three types of nodes, namely, 2×2 nodes 1401, 3×3 nodes 1402 and 5×3 nodes 1404, are implemented by three different IC chips.

3. Level III: Orthogonal packaging. This level of implementation is the physical realization of an "orthogonal package", which includes two orthogonal stacks, one stack consisting of input switching elements and the other of output switching elements such that every input switching element contacts every output switching element perpendicularly and the interconnection between them is through the contact point. Each I/O switching element for this level is a PCB, or an IC chip packaged into an equivalent of a small board. This level is simply referred to as "orthogonal-level" or just "O-level".

The implementation of plain 2-stage interconnection by orthogonal package is depicted by FIG. 73A. External input and output ports are 7300 and 7301 respectively, and the I/O switching elements deployed are PCBs 7302 and 7303. For the plain 2-stage interconnection the interconnection between input switching elements and output switching elements is through the contact points 7304; to implement the generalized 2-stage interconnection, some local rearrangement on 7305 and 7306 prior to the interconnection may be needed.

Note that this level of implementation requires both the I/O switching elements to be planar. Since an orthogonal package is not planar, it cannot be recursively used in another step of orthogonal packaging. Therefore, the next level, interface-board packaging, is invented to carry on recursive construction in the fashion of perpendicular placements of switching elements.

4. Level IV: Interface-board packaging. This level of implementation is the physical realization of an "interface-board package". The interface-board package includes a printed circuit board as the "interface board", attached with a number of input switching elements and a number of output switching elements such that the wiring on the interface board creates the interconnection between every input switching element and every output switching element. By the wirings on the interface board, any output port of any input switching element can in principle be connected to any input port of any output switching element, in other words, all kinds of 2-stage interconnections between I/O switching elements can be achieved by the presence of this "magic" interface board. Therefore, the attachment of the I/O switching elements to the board as well as their orientation can be in various ways, varying from design to design, as long as the output ports from the input switching elements and the input ports from the output switching elements are in contact with the appropriated wirings on the interface board such that those wirings achieve the required interconnection. For example, both the I/O switching elements can be attached on the same side of the interface board; or the input switching elements are attached on one side of the interface board, and the output switching elements on the opposite side; or even a mixture of I/O switching elements are attached on one side of the interface board, and a mixture of I/O switching elements on the opposite side. To simplify the description but without losing generality, it is assumed in this context that all the input switching elements are on one side and all the output switching elements on the opposite side. Each I/O switching element for this level can be an IC chip, a PCB, or an orthogonal package; it can also be an interface-board package when this level of implementation is recursively applied. This level is simply referred to as "interface-level" or just "I-level".

In the example of FIG. 73B, the interface board 7307 is inserted between two orthogonal stacks of PCBs in order to implement the generalized 2-stage interconnection.

In the example of FIG. 74, the I/O switching elements are orthogonal packages, 7402 and 7403. The input switching elements are marshaled on the upper surface 7407 of a rectangular interface boards, and the output switching elements are marshaled on the lower surface 7408. FIG. 74B provides more detail of the construction above the interface board. The interface board 7409 turns the 2-dimensional output array 7405 of an input switching element 7402 into a linear horizontal array 7410. Symmetrically, the interface board also turns the 2-dimensional input array of an output switching element into a linear vertical array. Thus the relative orthogonal placement between the linear horizontal arrays (7410) from input switching elements above the interface board and the linear vertical arrays from output switching elements below the interface board is logically equivalent to that in orthogonal packaging.

5. Level V: Fiber-array packaging This level of implementation is the physical realization of an "fiber-array package". Each I/O switching element in a fiber-array package can be an IC chip, a PCB, an orthogonal package, or an interface-board package; it can also be a fiber-array package when this level of implementation is recursively invoked. Interconnection lines between input switching elements and output switching elements are implemented by physically flexible communication medium, exemplified by optic fibers. This level is simply referred to as "fiber-level", or just "F-level".

It is worth pointing out a difference between the recursive application at the C- or P-level and the recursive application at the I- or F-level. A step at the I- or F-level results an interface-board package or a fiber-array package, which can be used in the next recursive step. In contrast, a step at the C- or P-level does not necessarily result in a whole IC chip or PCB; rather, such a step only logically results in a larger input or output switching element for the next step of implementation. For example, the 6×6 networks 1403 constructed from the 2-stage interconnection of 2×2 nodes (chips) 1401 and 3×3 nodes (chips) 1402 are not PCBs, they are just used to interconnect with another group of 5×3 nodes (chips) 1404 in the next step to produce the resulting 30×18 network, and the whole process is on a single PCB.

In practice there is an ordering of precedence relationship among these five levels of physical implementation. A step of inside-chip implementation can be followed by steps of implementation at any of the five levels. A step of PCB implementation can be followed by steps of implementation at any level except the C-level because a PCB cannot be used as an I/O switching element for the recursive construction inside an IC chip. A step of orthogonal packaging can be followed by a step of implementation at only the I- or F-level because an orthogonal package cannot be used as an I/O switching element in the construction inside an IC chip, on a PCB, or in another orthogonal package. A step at the I- or F-level can be followed by a step of implementation at only the I- or F-level for similar reasons.

Recall that the procedure of the recursive invocation of the technique of 2-stage interconnection can be logged by a binary tree diagram. For example, the recursive procedure leading to the 30×18 3-stage network 1400 can be logged by FIG. 15 in Section B. Meanwhile, the recursive procedure leading to the 16×16 divide-and-conquer network 5100 is logged by the 4-leaf balanced tree 5010 shown in FIG. 50A. As stated in Section B, when each leaf in a binary tree is associated with a prescribed network, then the tree is "associated with" or "corresponding to" a recursive 2-stage interconnection network with the prescribed networks being the "building blocks" in the construction. Each internal node of the tree corresponds to a particular step of 2-stage interconnection in the associated recursive 2-stage construction. When a binary tree is applied to the physical implementation of the recursive 2-stage construction, such correspondence can be summarized as follows:

(a) Each leaf of the tree corresponds to a switch that is a building block of the overall a construction and cannot be implemented in any of the aforementioned levels. Such a switching device can be a primitive switching circuitry as stated above, an existing switching chipset, or an existing switch on a PCB, etc.

(b) Internal nodes in the binary tree correspond one-to-one to steps of 2-stage interconnection in the associated recursive 2-stage construction. Thus the step corresponding to each internal node can be implemented at a particular one of the aforementioned five levels. In short, an internal node is said to be corresponding to a particular level if the internal node corresponds to a step of recursive construction wherein the step can be implemented at that level.

One point should be noted here. The father-son relationship among internal nodes in a binary tree suggests a precedence ordering among the steps of 2-stage interconnection: when an internal node is the father node of an other, the step corresponding to the son node must be executed before the step corresponding to the father node. This precedence ordering must be consistent with the aforementioned ordering of precedence relationship among the five levels in the physical implementation of a switch based upon a recursive 2-stage construction. For example, if the step of 2-stage interconnection corresponding to an internal node is implemented on a PCB, then the step corresponding to its father node can also be implemented on the same PCB but cannot be inside a chip.

FIG. 75A depicts an example of mapping each internal node of a binary tree 20010 to one of the levels of physical implementation, where each of the internal nodes 20011, 20012, 20013, 20014, and 20015 corresponds to a 2-stage interconnection implemented at C-, P-, O-, I-, and F-level, respectively. In this mapping the father-son relationship is consistent with the precedence relationship among the five levels in the physical implementation.

The same tree appears in FIG. 75B with exemplifying dimensions of the building block corresponding to each leaf and also of the network constructed at each step of 2-stage interconnection corresponding to each internal node. The whole construction yields a 4096K×4096K switching network; the dimensions of the switching network would be further enlarged when the method of statistical line grouping is applied.

FIG. 75C shows an exemplifying list of generic components in the physical structure of this 4096K×4096K switching network 20061. The generic components include Chip-1 20051, Chip-2 20052, Chip-3 20053, Chip-4 20054, PCB-1 20055, PCB-2 20056, PCB-3 20057, an orthogonal package 20058, an interface-board package 20059, and a crossbar switch 20060. The IC chip 20052, PCB 20056 and the crossbar switch 20060 are building blocks, each corresponding to one or more leaves in the binary tree. Chips are organized into PCBs. The generic PCB-1 20055 implements the recursive 2-stage interconnection network associated with the sub-tree rooted at the internal node 20071. The generic PCB-3 20057 implements the recursive 2-stage interconnection network associated with the sub-tree rooted at the internal node 20072. PCBs are interconnected into orthogonal packages. The generic orthogonal package 20058 implements the recursive 2-stage interconnection network associated with the sub-tree rooted at the internal node 20073. Then the PCB-1 20055 and the orthogonal package 20058 are interconnected into the interface-board package 20059. Finally, the 4096K×4096K fiber-array package 20061 implements the recursive 2-stage interconnection network associated with the whole binary tree.

J. Self-Routing Multicasting to an Arbitrary Set of Output Addresses over a Banyan-Type Network 1. Multicasting to an Arbitrary Set of Output Addresses over a Banyan-type Network Consider a $2^n \times 2^n$ multicast switch allows a packet to be destined for an arbitrary subset of the $2^n$ output addresses. A straightforward encoding scheme by $2^n$ bits is to use one bit for each output to indicate whether this output is included in the set of destination addresses. In general, the number of bits required in encoding an arbitrary set of destination addresses is at least $2^n$. The switching control mechanism has to read all the $2^n$ bits before making the decision and thus incurs $\Omega(2^n)$ latency. If a self-routing switch were to implement this multicast function, then every primitive switching element in it would have to buffer $2^n$ bits and thereby incurs $\Omega(2^n)$ complexity in both the hardware and the latency.

The present disclosure presents a self-routing mechanism for multicasting packets to an arbitrary set of output addresses over a generic $2^n \times 2^n$ banyan-type network, where the destination set is encoded in $2^n - 1$ quaternary symbols, the hardware complexity of a stage-j 2×2 switching element is O(j), and the switching delay through the element is O(1).

Definition J1: "guiding sequence of a packet". For a $2^n \times 2^n$ banyan-type network with the guide $\gamma(1), \gamma(2), \ldots, \gamma(n)$ where y is a permutation of the integers from 1 to n, if the destination addresses of a packet include the address $d_1 d_2 \ldots d_n$ then $d_{\gamma(1)} d_{\gamma(2)} \ldots d_{\gamma(n)}$ is said to be a "guiding sequence" of that packet.

For example, for a $2^6 \times 2^6$ banyan-type network with the guide being 5, 4, 6, 1, 3, 2, if the destination addresses of a multicast packet in this network comprise 001010 (address 1), 011001 (address 2) and 110101 (address 3), for address 1 where $d_1 d_2 d_3 d_4 d_5 d_6 = 001010$, that is, $d_1=0$, $d_2=0$, $d_3=1$, $d_4=0$, $d_5=1$, and $d_6=0$, then $d_{\gamma(1)} d_{\gamma(2)} d_{\gamma(3)} d_{\gamma(4)} d_{\gamma(5)} d_{\gamma(6)} = d_5 d_4 d_6 d_1 d_3 d_2 = 100010$ is a guiding sequence of this packet; for address 2 where $d_1 d_2 d_3 d_4 d_5 d_6 = 011001$, $d_{\gamma(1)\gamma(2)\gamma(3)\gamma(4)\gamma(5)\gamma(6)} = d_5 d_4 d_6 d_1 d_3 d_2 = 001011$ is also a guiding sequence of this packet; for address 3 where $d_1 d_2 d_3 d_4 d_5 d_6 = 110101$, $d_5 d_4 d_6 d_1 d_3 d_2 = 011101$ is another guiding sequence of this packet.

In accordance with the present invention, the $2^n \times 2^n$ multicast switch is constructed from a $2^n \times 2^n$ banyan-type network of bicast cells. A coding scheme that uses $2^n - 1$ quaternary symbols (equivalent to $2^{n+1} - 2$ bits) is adopted to encode the arbitrary set of the destination addresses of a multicast packet. As before, the four values of a generic quaternary symbol are '0-bound', '1-bound', 'idle', and 'bicast'. Associated with every binary string S of a length from 0 to n−1 is a quaternary symbol $Q_S$. The information of the destination addresses of a packet is encoded by a sequence of quaternary symbols. Upon entering the first stage, the packet is prefixed with the following sequence of quaternary symbols as the routing tag $Q_- Q_0 Q_1 Q_{00} Q_{10} Q_{01} Q_{11} Q_{000} Q_{100} Q_{010} Q_{110} Q_{001} Q_{101} Q_{011} Q_{111} Q_{0000} Q_{1000} \cdots$ That is, quaternary symbols associated with shorter strings precede those associated with longer strings. Among symbols associated with equally long strings, the order is right-to-left lexicographical.

Consider a generic $2^n \times 2^n$ banyan-type network with the guide being the sequence $\gamma(1), \gamma(2), \ldots, \gamma(n)$. By definition, $d_{\gamma(1)} d_{\gamma(2)} \ldots d_{\gamma(n)}$ is a guiding sequence of a packet when the destination addresses of a packet include the address $d_1 d_2 \ldots d_n$. The assignment of value to $Q_S$ pertains to the guiding sequence as follows:

$Q_S$='idle' if S is not a prefix of any guiding sequence, or $Q_S$='0-bound' if S0 is a prefix of a guiding sequence but S1 is not, or $Q_S$='1-bound' if S1 is a prefix of a guiding sequence but S0 is not, or $Q_S$='bicast' if both S0 and S1 are prefixes of guiding sequences.

The in-band control signal used by the bicast cell at each stage is the leading quaternary symbol in the routing tag of the packet. Recall the control of a bicast cell, if the leading quaternary symbol of one of the two packets arrived at the bicast cell is 'bicast' and that of the other packet is 'idle', then the former packet is bicasted to both outputs of the bicast cell; otherwise, the bicast cell sorts the two packets according to their leading quaternary symbols with respect to the partial order of '0-bound' 'idle' ≺'1-bound' and '0-bound' ≺'bicast' ≺'1-bound'. This describes the switching control over a single bicast cell. Meanwhile, in accordance with the present invention, there is also the switching control at the network level, which modifies the routing tag of a packet when the packet exits from one stage for the next stage as described below.

A packet routed to output-0 of a stage-1 cell retains only every other quaternary symbol starting with the second symbol in the routing tag. Those non-retained symbols in between are replaced by space fillers in order to maintain the bit pipelining, which assume arbitrary quaternary values. The routing tag thus becomes $Q_0 \square Q_{00} \square Q_{01} \square Q_{000} \square Q_{010} \square Q_{001} \square Q_{011} \square Q_{0000} \square \cdots$ where the symbol "$\square$" indicates a space filler. Similarly, a packet routed to output-1 of a stage-1 cell retains only every other quaternary symbol starting with the third symbol in the routing tag. The routing tag thus becomes $Q_1 \square Q_{10} \square Q_{11} \square Q_{100} \square Q_{110} \square Q_{101} \square Q_{111} \square Q_{1000} \square \cdots$ A packet routed to output-0 of a stage-j cell retains only every other real quaternary symbol starting with the second real symbol in the routing tag, while a packet routed to output-1 of a stage-j cell retains only every other quaternary symbol starting with the third real symbol in the routing tag. Note that space fillers are not regarded as real quaternary symbols. Again, space fillers replace those non-retained symbols in order to maintain the bit pipelining. After stage-2, the routing tag becomes one of the following:

$Q_{00}\square\square\square Q_{000}\square\square\square Q_{001}\square\square\square Q_{0000}\square\square\square \ldots$
$Q_{01}\square\square\square Q_{010}\square\square\square Q_{011}\square\square\square Q_{0100}\square\square\square \ldots$
$Q_{10}\square\square\square Q_{100}\square\square\square Q_{101}\square\square\square Q_{1000}\square\square\square \ldots$
$Q_{11}\square\square\square Q_{110}\square\square\square Q_{111}\square\square\square Q_{1100}\square\square\square \ldots$ By induction, upon entering stage-j, there are $2^{j-1}$ space fillers between every two consecutive real quaternary symbols. Each stage-j output preserves every $2^j$-th symbol starting at a certain real quaternary symbol. A bit-clock counter is required to count from 1 to $2^j$ in order to implement this operation. The hardware complexity of such a counter is O(j).

EXAMPLE 1

FIG. 76 illustrates the multicasting of a first packet (7601) toward two outputs namely, 000 and 011, and a second packet (7602) toward four outputs, namely, 010, 100, 101, and 111, of an 8×8 banyan network (7600). The coding of the destination addresses information as a sequence of quaternary symbols into the routing tag of each packet is as follows. The quaternary symbols '0-bound', '1-boun', 'idle', and 'bicas' are abbreviated as 0, 1, I, and B, respectively. Since the guide of the 8×8 banyan network, γ(1), γ(2), γ(3), is simply the monotonic sequence 1, 2, 3, the guiding sequence of a packet corresponding to its destination address $d_1d_2d_3$ is $d_{\gamma(1)}d_{\gamma(2)}d_{\gamma(3)}=d_1d_2d_3$. Therefore, the guiding sequences for the first packet are 000 and 011, and those for the second packet are 010, 100, 101, and 111. For the first packet, the first symbol Q_in the muting tag is 0 because according to the rules of the assignment of value to each $Q_S$ as described above, the string S now is a null string, thus since the string S0="0" is a prefix of a guiding sequence, that is, 000, of the first packet, but S1="1" is net a prefix of any guiding sequence of the first packet, the condition for the case $Q_S$='0-bound' is matched; for the second symbol $Q_0$, S="0" now and hence both S0 ("00") and S1 ("0l") are prefixes of the guiding sequences of the first packet, so $Q_0$=B; the third symbol $Q_1$=I because S="1" now which is not a prefix of any guiding sequence of the first packet; and so on. The routing tag for the first packet is thus generated as "0BI0I1I" (7611). Similarly, the routing tag for the second packet is thus generated as "B1BIB01" (7621). The first packet enters the bicast cell (7631) in the first stage from its input-1, since its leading symbol is "0" and the other input of the veil is idle, the cell sets its connection state to be cross and routes the first packet to its output-0. Meanwhile, the second, fourth, and sixth symbols, that is, "B", "0", and "1", are retained in the routing tag (7612) as the first packet exits from the cell 7631. From now on only the routing tag of the packet is shown in the drawing for simplicity. Then the first packet enters the bicast cell (7632) in the second stage with the leading symbol "B". Since the other input of the cell 7632 is idle, the packet is bicasted to both outputs. On exiting from the cell 7632, the copy of the packet at the output-0 retains every other real quaternary symbol starting with the second real symbol in the routing tag "B□0□1□"(7612), "0", and thus the new routing tag "0□□□" while the copy of the packet at the output-1 retains every other real quaternary symbol starting with the third real symbol in the routing tag "B□0□1□" (7612), "1", and thus gives the new routing tag "1□□□"(7614). And so on. By this way, the packets are successfully multicasted to their respective destinations.

Note that since banyan-type networks are blocking, because of the possible packet collision inside the network, there is no guarantee that a packet will reach all or any of the intended destinations. By applying the technique of statistical line grouping as described in Section H, the blocking problem can be alleviated while the self-routing mechanism can still be applied.

2. Construction of Self-routing Nonblocking Switches in both Point-to-point and Multicast Senses Recall that the recursive plain 2-stage interconnection network of cells associated with the n-leaf rightist tree is the $2^n \times 2^n$ baseline network. The first recursive step in this construction is depicted in FIG. 77A for n=4. Similarly, the recursive 2-swap construction associated with the n-leaf rightist tree is the $2^n \times 2^n$ banyan network. Both networks are examples of recursive bit-permuting 2-stage construction (as defined in Section F) associated with the n-leaf rightist tree. Take the first recursive step in such a recursive construction and replace the whole input stage, as indicated by the reference numeral 7701 in FIG. 77A, with a single $2^n \times 2^n$ node (7711) as shown in FIG. 77B. The result is a 2-stage network with a single $2^n \times 2^n$ input node and two $2^{n-1} \times 2^{n-1}$ output nodes. Let the generic step in the recursive construction be changed so that the interconnection is according to this 2-stage network. Unfolding this modified recursive construction, $2^n \times 2^n$ n-stage unique-routing network results with FIG. 77C depicting the resulting network (7720) for n—4.

By filling every node in this network with a $2^k$-to-$2^{k-1}$ concentrator with the appropriate k, the resulting n-stage switching network constructs a $2^n \times 2^n$ self-routing nonblocking switch. This n-stage switching network is a hybrid between a routing network and a partial sorting network, to which the self-routing mechanism over the baseline or banyan network, including the priority treatment in Section H, can now be ported over (Note that the guide of the $2^n \times 2^n$ baseline or banyan network is simply the sequence 1, 2, . . . , n.) Assuming the presence of the activity bit and the number of priority classes being $2^r$, upon entering the switching network, a packet with the binary destination address $d_1d_2 \ldots d_n$ is preceded by the bit pattern $1d_1p_1 \ldots p_rd_2 \ldots d_n$. The in-band control signal of the packet to a sorting cell is $1d_jp_1 \ldots p_r$, which changes only upon the exit of a concentrator. A generic sorting cell inside a concentrator does not alter the in-band control signal carried in the routing tag of the packet. At every output port of the concentrator, a 1×1 element may be installed for the necessary alteration on the routing tag of the packet. When the input traffic has no output contention, such a switching network is a self-routing nonblocking switch. Any packet from any input to any output can be guaranteed.

This construction of a self-routing nonblocking switch can be readily converted into a construction of a self-routing switch that is "nonblocking in the multicast sense", that is, there is no internal blocking whenever there is no output contention among requested connections, point-to-point or multicast. Thus fill every node in the aforementioned n-stage hybrid network with a $2^k$-to-$2^{k-1}$ multicast concentrator with the appropriate k. Then, the possible values of an in-band control signal to the concentrator are 0-bound, 1-bound, idle, and bicast. As mentioned in Section H, a multicast concentrator guarantees the maximum possible throughputs at both 0-output group and 1-output group. The multicast concentrator realizes a nonblocking multicast switch when the self-routing multicast mechanism toward an arbitrary set of output addresses as described in the sub-section J1 is ported. over. This $2^n \times 2^n$ self-routing switch guarantees the transmission of every packet to all of its destined outputs as long as there is no output contention among the input traffic. In those applications where each packet is destined for a rectangular set of output addresses, the simpler self-routing multicast mechanism as described in Section H can be used instead. This self-routing multicast mechanism for packets destined for rectangular sets of addresses involves a shorter routing tag and simpler switching control at the network level.

K. Optimizing Switching Element for Minimal Latency

1. Overview

Recall from Section G that, in a massive broadband switch, the switching control mechanism usually prefers distributed in-band control over centralized out-of-band control as the former is independent of the size of the switch. The distributed in-band controlled switching is usually associated with packet switching. The in-band control signal is embedded in each one of the data packets traversing the switch. It usually is composed of a number of bits prefixing the data packet. An in-band controlled switch is typically made up of many interconnected switching elements. Each switching element determines its own connection state by just the in-band control signals arriving at that element, independently of signals arriving at parallel elements. Thus the switching decision can be made on-the-fly. Hence the latency of an in-band controlled switch is small in comparison to a centralized controlled switch. Note that when the switch is constructed from a multistage switching network, the in-band control signals for switching elements at different stages may be different. It is also possible that switching elements at some of the stages share an in-band control signal. All in-band control signals reside in the routing header of the packet.

In packet switching, the bits of the input packets synchronously arrive at a switching element in discrete time intervals. The time interval between the arrivals of two consecutive bits of a packet is referred to as one "bit time" and denoted as $\Delta t$, which is typically one or a few cycles of the master clock driving the switching element. So the bit streams of the packets move forward one bit at a bit time. The delay experienced by a packet to traverse a single switching element is the number of bit times elapsed from the instant when the first bit of the packet enters the element until the first bit of the output packet exits from the element. The delay is $n\Delta t$ if and only if n bits are received by the switching element before it can produce the first bit at each output. This delay is mainly determined by the two factors described in the following.

First, the switching element makes use of the in-band control signal of a packet specifically designated for this element, say, R bits, in making its local switching decision. These R bits will be referred to as the "local routing bits". As the bit stream of each input packet is pipelined through the switching element, the switching element needs to buffer all R local routing bits during its process of making the switching decision. If these R bits are not in the front of the packet, more than R bits would have to be buffered in making the switching decision. Therefore, smart designs usually put the local routing bits up front. Yet the buffering of these R bits still introduces a delay, to be referred to as the "local buffering delay", of up to R bit times.

Second, the switching element also needs an amount of time to compute the switching decision and execute it, which is referred to as the "local switching delay" in the context. This local switching delay is correlated to the number of local routing bits and the number of the I/O ports of the switching element. The larger the value of R, the more complicated the combinatorial logic could potentially be in making the switching decision. The more I/O ports on the switching element, the longer time is potentially required to set up the connections between I/O ports. Therefore, most preferred switching element in an in-band controlled switch are of minimal sizes, typically just 2×2.

When there are m different connection states in a 2×2 switching element, the total number of local routing bits, 2R, in the two input packets should at least be $\log_2 m$. The intuitive design of the switching element in the existing art usually has all the log2m bits buffered before it can produce the first output bit. However, in accordance with the present invention, concerted heuristics can be applied to both the coding of the in-band control signal and the design of the switching element so that the switching element can start to produce output bits without waiting for all the $\log_2 m$ bits. In other words, when the first few of the $\log_2 m$ bits arrive, the switching element already can determine its first output bit, and as more and more local routing bits arrive, the switching can determine more and more initial output bits before it finalizes the selection of a connection state between input ports and output ports.

FIG. 78 illustrates the summary of the relations between the routing header (7801), and the local routing bits (in-band control signal) (7802) inside a packet (7800) for a switching element.

Assume that the switching element needs $R_j$ bits from each of the two input packets in order to determine the $j^{th}$ output bit at both of the output ports. Then, the local buffering delay is $\max_j \{R_j - j\}$. Because of the local switching delay, the total local delay incurred at the 2×2 switching element may turn out to be, for example, $\max_j \{R_j - j\} + 1$.

Recall from the Sections G, H and K that the self-routing multicast switch employs the bicast cells as the primitive switching elements. In accordance with the present invention, the in-band control signal of the packet traversing the bicast cell is smartly encoded in such a way that the local buffering delay, $\max_j \{R_j - j\}$, can be reduced to 0, that is, $R_j = j$ for all j. In other words, every time the bicast cell receives one bit from each of its two input ports, it becomes able to determine one more output bit for each of its two output ports. Therefore, the present invention optimizes the switching element for minimal latency for any practical applications.

2. Inventive Coding Scheme

Recall from Section G that a bicast cell has four connection states, namely, bar (211), cross (212), bicast-0 (213) and bicast-1 (214), as shown in FIGS. 2C-F, and is associated with the partial order over the set {'0-bound', '1-bound', 'idle', 'bicast'} by '0-bound' $\prec$ 'idle' $\prec$ '1-bound' and '0-bound' $\prec$ 'bicast' $\prec$ '1-bound'

When the two input packets to the bicast cell are a bicast packet and an idle packet, the bicast packet is copied, or bicasted, to both output ports of the bicast cell, with the in-band control signal of the copy of the bicast packet routed to or reproduced at output-0 being changed from 'bicast' to '0-bound' and that of the copy routed to or reproduced at output-1 being changed from 'bicast' to '1-bound'.

Also recall from Section G that a routing cell has two connection states, namely, bar (211) and cross (212), and is associated with the partial order over the set {'0-bound', '1-bound', 'idle'} by '0-bound' $\prec$ 'idle' $\prec$ '1-bound'

Since this partial order is consistent with that associated with the bicast cell, any method applicable to the bicast cell also applies to the routing cell.

2.1 An Example of an Arbitrary Coding Scheme with Deficiency:

Two bits are used to encode the four possible in-band control signals associated with the bicast cell or the three possible in-band control signals associated with the routing cell. Table 1 gives an arbitrary coding scheme for each case.

TABLE 1

| | In-band control signal | Coding bits |
|---|---|---|
| Bicast cell | 'Idle' | "00" |
| | '0-bound' | "10" |
| | '1-bound' | "11" |
| | 'Bicast' | "01" |
| Routing cell | 'Idle' | "00" |
| | '0-bound' | "10" |
| | '1-bound' | "11" |

The deficiency of the coding scheme for each case is that the concerned switching element, no matter a routing cell or a bicast cell, has to read both coding bits for the in-band control signal before it can determine the first output bit on each of its two output ports. For instance, if the first input bit of the input packet on one input port is '0' and the first input bit of the input packet on the other input port is '1', the input packet starting with a '1' can be either '0-bound' or '1-bound'. For the '0-bound' case, the first output bit on output-0 should be '1' and that on output-1 should be '0'; for the '1-bound' case, the first output bit on output-0 should be '0' and that on output-1 should be '1'. In other words, the switching element must wait for the second bits from each of the input packets before it can determine the first output bit on each of its two output ports. Therefore, $R_1=2$ and hence the local buffering delay $\max_j\{R_j-j\} \geq R_1-1$ under such kind of coding scheme.

2.2 New Coding Scheme in Accordance with the Present Invention

The new coding scheme in accordance with the present invention removes the deficiency presented in the above exemplifying coding scheme such that the local buffering delay $\max_j\{R_j-j\}$ is zero. In particular, upon receiving the first bit of each of the input packets, the switching element can determine the first bit for each of the two output packets.

In accordance with the broadest aspect of the present invention, under the new coding scheme, the four possible types of in-band control signals to a bicast cell or the three possible types of in-band control signals to a routing cell are encoded by two bits in such a way that the first bit of the code corresponding to '0-bound' packet should be different from the first bit of the code corresponding to '1-bound' packet.

EXAMPLE

Consider the bicast cell associated with the following coding scheme.

TABLE 2

| In-band control signal | Coding bits |
|---|---|
| 'Idle' | "00" |
| '0-bound' | "01" |
| '1-bound' | "11" |
| 'bicast' | "10" |

To enhance the understanding, the detailed description of the present invention will proceed with the adoption of the exemplifying coding scheme given in Table 2. However, the method of the invention is not limited to said exemplifying coding scheme and generalizes in the straightforward manner to the case adopting any other coding scheme wherein the first bit of the code corresponding to '0-bound' packet is different from the first bit of the code corresponding to '1-bound' packet.

FIGS. 79-82 shows all of the possible cases for the input packets that the bicast cell will encounter. The bicast cell is represented in all of the figures in such a manner that the two input ports are on the left hand side, the upper one being input-0 and the lower one being input-1, and the two output ports are on the right hand side, the upper one being output-0 and the lower one being output-1. Moreover, the description of the scenarios adopts the notation $I_t$ and $O_t$ as follows.

The expression $I_t=AB$ is an abbreviation for the t-th input bit of the input packet at input-0 and the t-th input bit of the input packet at input-1 to be A and B, respectively.

The expression $O_t=AB$ is an abbreviation for the t-th output bit of the output packet at output-0 and the t-th output bit of the output packet at output-1 to be A and B, respectively.

For example, $I_1=01$ represents the scenario that the two first input bits of the two input packets at input-0 and input-1 are '0' and '1', respectively.

The method to achieve local buffering delay in the bicast cell is described case by case as follows.

Case 1: $I_1=01$

Figure 79:
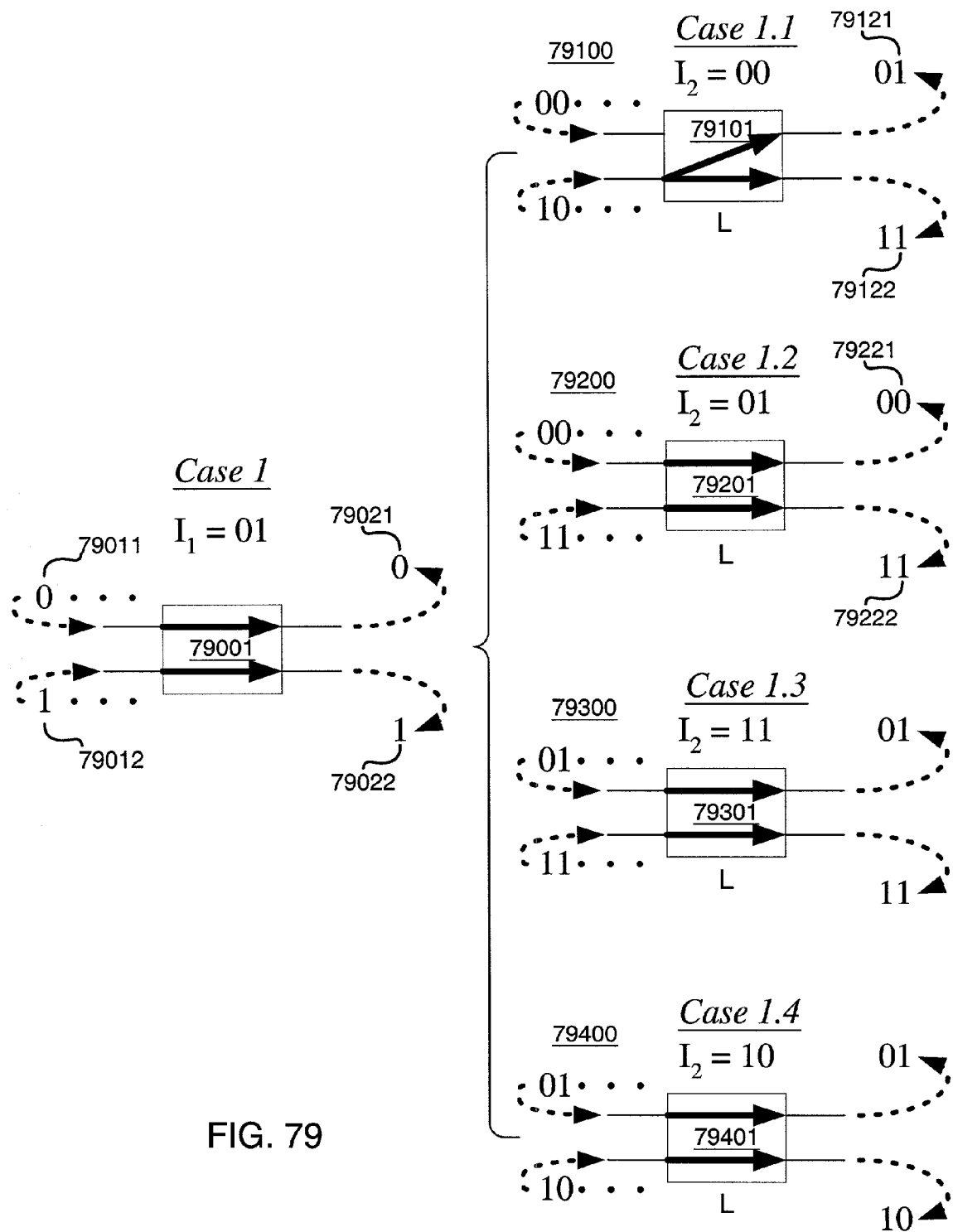

FIG. 79 shows the case where the first input bit (79011) of the input packet at input-0 is '0' and the first input bit (79012) of the input packet at input-1 is '1'. Then the connection state is temporarily set to bar (79001), and the first output bit (79021) at output-0 is '0' and the first output bit (79022) at output-1 is '1', that is, $O_1=01$. There will be four possible combinations of the two input packets when $O_1=01$. It will be shown that no matter which of the four combinations it is, $I_1=01$ is always correct. In other words, $R_1=1$.

Case 1.1: $I_2=00$

For the case of $I_2=00$ (79100), that is, the input packets at input-0 and input-1 are respectively 'idle' and 'bicast', the 'bicast' packet can be bicasted to the both output ports, and the copy produced at output-0 will be changed to a '0-bound' packet and the copy produced at output-1 will be changed to a '1-bound' packet. Therefore, the connection state is set to bicast-1 (79101) and latched (indicia 'L' under indicates a connection state is latched), and the second output bit (79121) at output-0 is '1' and the second output bit (79122) at output-1 is '1', that is, $O_2=11$. In this way, the in-band control signal of the output packet at output-0 is '01' (0-bound) and that of the output packet at output-1 is '11' (1-bound). All the remaining bits of the two input packets will go through the latched connection state and hence the desired switching is correctly accomplished.

Case 1.2: $I_2=01$

For the case of $I_2=01$ (79200), that is, the input packets at input-0 and input-1 are respectively 'idle' and '1-bound', the '1-bound' packet can be routed to its destined output port, output-1. Therefore, the connection state is set to bar (79201) and latched, and the second output bit (79221) at output-0 is '0' and the second output bit (79222) at output-1 is '1', that is, $O_2=01$. By this way, the in-band control signal of the output packet at output-0 is '00' (idle) and that of the output packet at output-1 is '11' (1-bound). All the remaining bits of the two input packets will go through the latched connection state and hence the desired switching is correctly accomplished.

Case 1.3: $I_2=11$

This case (79300) is similar to the case of $I_2=01$. The input packets at input-0 and input-1 are respectively '0-bound' and '1-bound'. Therefore, the connection state is set to bar (79301) and latched, and $O_2$=11.

Case 1.4: $I_2$=10

This case (79400) is similar to the case of $I_2$=01. The input packets at input-0 and input-1 are respectively '0-bound' and 'bicast'. Therefore, the connection state is set to bar (79401) and latched, and $O_2$=10.

Case 2: $I_1$=10

Figure 80:
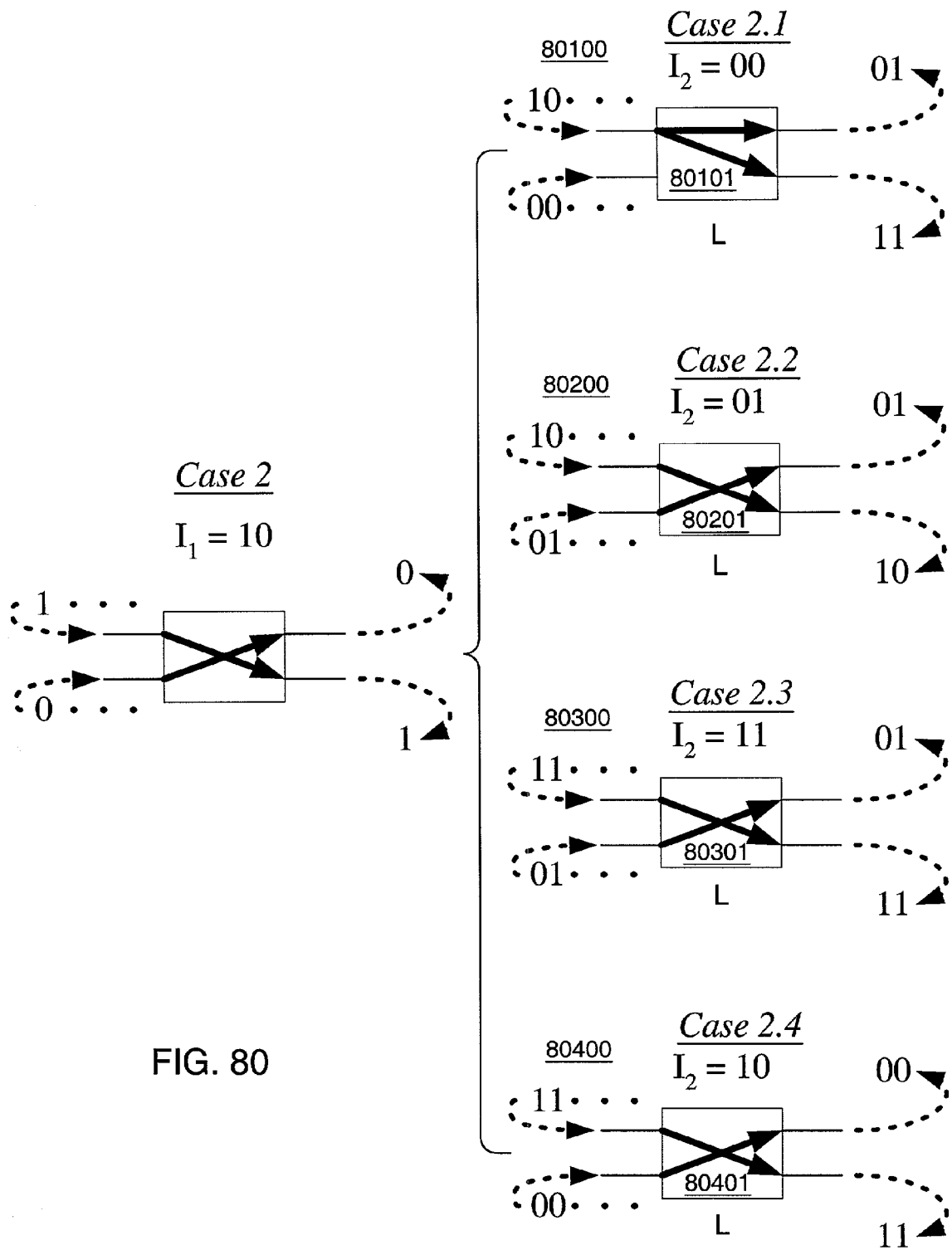

FIG. 80 shows the case for $I_1$=10, which is symmetric to Case 1. $O_1$=10 in this case. It will be shown that $O_1$=10 is also always correct no matter which of the four combinations of the two input packets it will be.

Case 2.1: $I_2$=00 (80100)

The input packets at input-0 and input-1 are respectively 'bicast' and 'idle'. Therefore, the connection state is set to bicast-0 (80101) and latched, and $O_2$=11.

Case 2.2: $I_2$=01 (80200)

The input packets at input-0 and input-1 are respectively 'bicast' and '0-bound'. Therefore, the connection state is set to cross (80201) and latched, and $O_2$=10.

Case 2.3: $I_2$=11 (80300)

The input packets at input-0 and input-1 are respectively '1-bound' and '0-bound'. Therefore, the connection state is set to cross (80301) and latched, and $O_2$=11.

Case 2.4: $I_2$=10 (80400)

The input packets at input-0 and input-1 are respectively '1-bound' and 'idle'. Therefore, the connection state is set to cross (80401) and latched, and $O_2$=01.

Case 3: $I_1$=00

Figure 81:
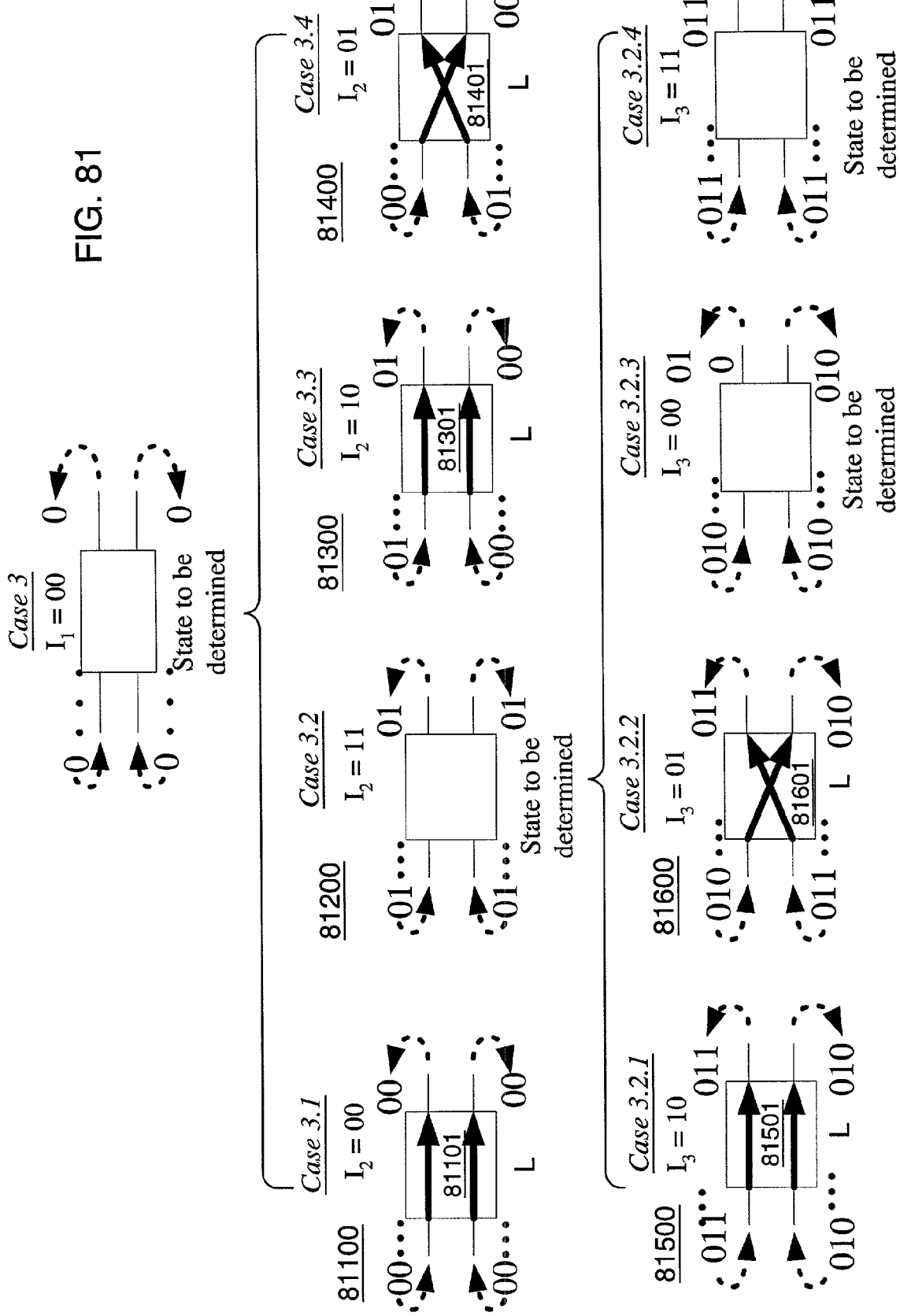

FIG. 81 shows the case for $I_1$=00. $O_1$=00 in this case. It is also always correct no matter which of the four combinations of the two input packets it will be.

Case 3.1: $I_2$=00 (81100)

The two input packets are idle packets. The connection state can be set to anything, latched or unlatched, and $O_2$=00. Potentially there may be some as hoc reason to, for example, choose to set the connection state to bar and latch it (81101) as shown in FIG. 81.

Case 3.2: $I_2$=11

The case where $I_2$=11 (81200) implies that the two input packets are both 0-bound packets. The connection state can be set to either bar or cross, latched or unlatched, and $O_2$=11. Potentially there may be some as hoc reason to leave the connection state unlatched. For example, if the input packets are divided into a number of priority classes, the priority classes will be encoded as a number of bits, called "priority bits", immediately following the in-band control signal, as elucidated in the Section H. The connection state can then be set up and latched once the further incoming of the priority bits start to differ. In this case, since the two input packets are 0-bound, the packet having a higher priority will have the privilege to be switched to output-0. Therefore, if $I_3$=10 (81500), it implies the input packet at input-0 has a higher priority than that at input-1, and hence the connection state is determined to be bar and latched (81501). $I_3$=01 (81600) is the opposite and the connection state latched is cross (81601). If the priority bits are totally the same for the two input packets, basically there is no difference between selecting bar or cross as the connection states. In some implementations, all of the remaining bits may be used as the tie-breaking bits. In all implementations, the local buffering delay is still 0.

Case 3.3: $I_2$=10 (81300)

The input packets at input-0 and input-1 are respectively '0' and 'idle'. Therefore, the connection state is set to bar and latched (81301), and $O_2$=10.

Case 3.4: $I_2$=01 (81400)

The input packets at input-0 and input-1 are respectively 'idle' and '0-bound'. Therefore, the connection state is set to cross and latched (81401), and $O_2$=10.

Case 4: $I_1$=11

Figure 82:
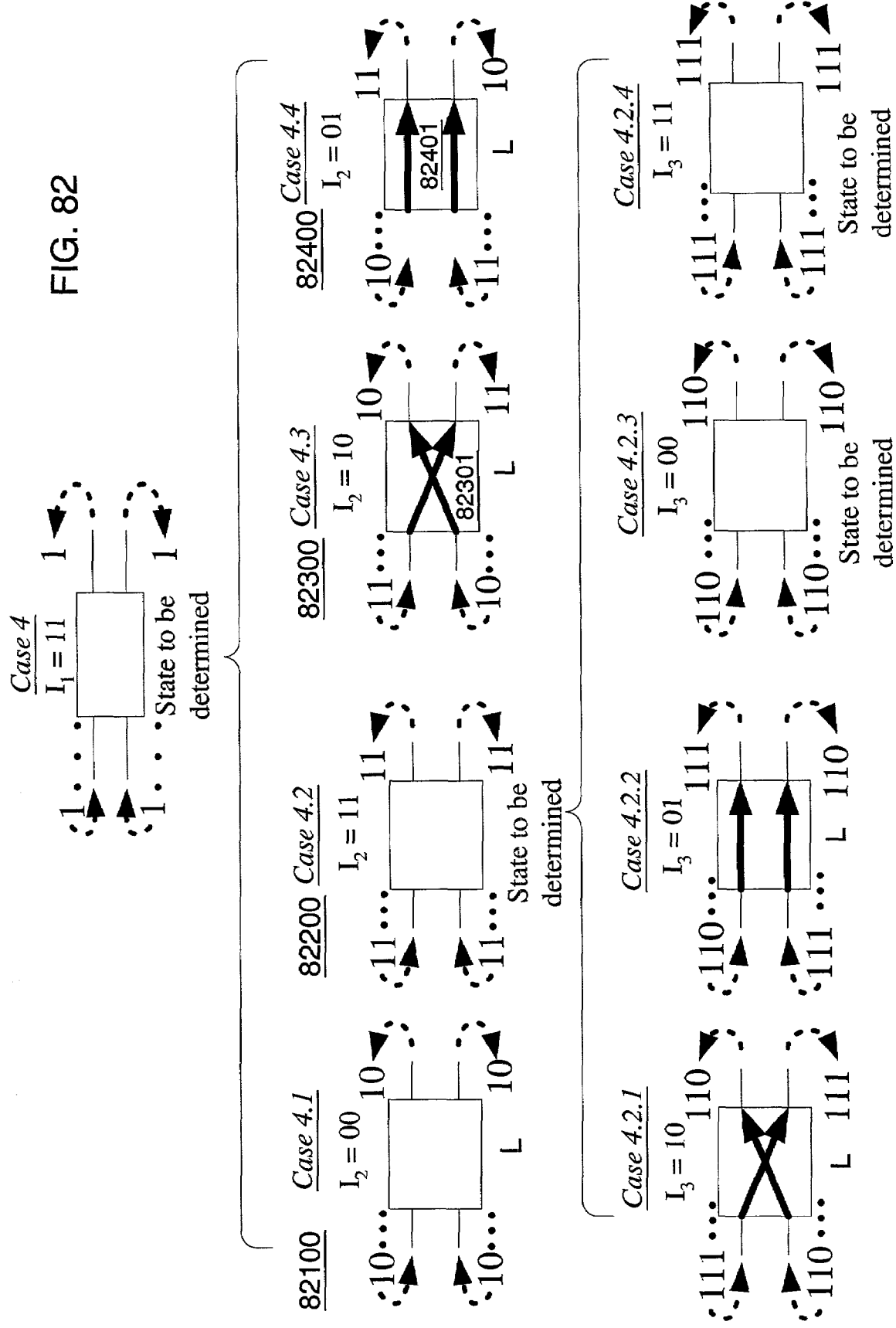

FIG. 82 shows the case for $I_1$=11. This is basically similar to the case of $I_1$=00. $O_1$=11.

Case 4.1: $I_2$=00 (82100)

The two input packets are all bicast packets. The connection state can be set to either bar or cross, latched or unlatched, and $O_2$=00. Whether there are different priority classes among bicast packet or not, both bar and cross states seem equally good.

Case 4.2: $I_2$=11

The case where $I_2$=11 (82200) implies that the two input packets are both 1-bound packets. This is another situation of a tie. The connection state can be set to either bar or cross, latched or unlatched, and $O_2$=11. Potentially there may be some as hoc reason to leave the connection state unlatched, for example, to let the ensuing priority bits break the tie.

Case 4.3: $I_2$=10 (82300)

The input packets at input-0 and input-1 are respectively '1-bound' and 'bicast'. Therefore, the connection state is set to cross and latched (82301), and $O_2$=01.

Case 4.4: $I_2$=01 (82400)

The input packets at input-0 and input-1 are respectively 'bicast' and '1-bound'. Therefore, the connection state is set to bar and latched (82401), and $O_2$=01. As a result, under this coding scheme, the total buffering delay is always 0.

The above described method is associated with just the exemplifying coding scheme given in Table 2. The four entries, "00", "01", "11" and "10" in the right column of Table 2 can be permuted to give rise to other possible new coding schemes as long as the scheme is compliant to the requirement that the first bits of the codes for '0-bound' and '1-bound' are different. Moreover, the above method applies to the routing cell as well as the bicast cell, when the routing cell adopts the same coding for 'idle', '0-bound', and '1-bound' packets as the bicast cell and is compliant to the same requirement.

When the switch is constructed from multistage interconnection network, the total latency of the switch is dominated by the product of the number of stages of the switching elements and the total local delay in each switching element. Therefore, the total latency can proportionately be saved when the total local delay in each of the switching elements is saved, or alternatively, when the total local delay in each of the switching elements is saved by a certain proportion, the total latency can also be saved by approximately the same proportion. When comparing the two examples elucidated above, which respectively adopting an arbitrary coding scheme with deficiency and the new coding scheme in according with the present invention, the difference between 1 and 0 in the local buffering delay per 2×2 switching element accumulates in a network composed of many stages of 2×2 switching elements.

Although the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements which, although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. A method for routing packets through a switching network, wherein the switching network includes multiple stages of switching elements, each one of the switching elements receiving packets as local input packets on its input ports and producing packets as local output packets on its output ports, each of the packets having a plurality of in-band control signals where each one of the in-band control signals is utilized in a corresponding one of the switching elements as the local in-band control signal for the corresponding switching element to make switching decisions, the method comprising:
    coding each one of the in-band control signals of the packets into a plurality of bits based on a predetermined coding scheme, and
    generating, with reference to the coding scheme, the output bits of the local output packets at each one of the switching elements based on a subset of the bits in the corresponding one of the in-band control signals for said each one of the switching elements to route the local input packets arriving at the corresponding switching element, wherein each one of the switching elements is a bicast cell, and the local input packets to each one of the switching elements includes idle, 0-bound, 1-bound and bicast packet types, and wherein each one of the packet types corresponds to a distinct in-band control signal, the coding includes coding each of the in-band control signals by two bits, and the coding scheme includes coding the bits such that a bit in a left-most position of the code for the in-band control signal corresponding to a 0-bound packet type is different from a bit in a left-most position of the code for the in-band control signal corresponding to a 1-bound packet type.

2. The method of claim 1, further comprising:
    determining when two of the local input packets comprise idle and bicast packet types that are received at respective ones of the input ports;
    bicasting or copying the bicast packet to generate at least two copies of the bicast packet and sending each of the copied bicast packets to respective ones of output ports; and
    changing the copied bicast packet sent to one of the output ports to a 0-bound packet type and changing the copied bicast packet sent to the other output port to a 1-bound packet type.

3. The method of claim 1, wherein the input ports comprise first and second input ports and wherein bit in the left-most position of the code corresponding to the 0-bound packet type is the first bit received at the first input port and the bit in the left-most position of the code corresponding to the 1-bound packet type is the first bit received at a second input port.

4. A method for routing packets through a switching network, wherein the switching network includes multiple stages of switching elements, each one of the switching elements receiving packets as local input packets on its input ports and producing packets as local output packets on its output ports, each of the packets having a plurality of in-band control signals where each one of the in-band control signals is utilized in a corresponding one of the switching elements as the local in-band control signal for the corresponding switching element to make switching decisions, the method comprising:
    coding each one of the in-band control signals of the packets into a plurality of bits based on a predetermined coding scheme, and
    generating, with reference to the coding scheme, the output bits of the local output packets at each one of the switching elements based on a subset of the bits in the corresponding one of the in-band control signals for said each one of the switching elements to route the local input packets arriving at the corresponding switching element, wherein each one of the switching elements is a routing cell, and the local input packets to each one of the switching elements includes idle, 0-bound, and 1-bound packet types, and wherein each one of the packet types corresponds to a distinct in-band control signal, the coding includes coding each of the in-band control signals by two bits, and the coding scheme includes coding the bits such that a bit in a left-most position of the code for the in-band control signal corresponding to a 0-bound packet type is different from the a bit in a left-most position of the code for the in-band control signal corresponding to a 1-bound packet type.

5. The method of claim 4, further comprising:
    determining when two of the local input packets comprise idle and bicast packet types that are received at respective ones of the input ports;
    bicasting or copying the bicast packet to generate at least two copies of the bicast packet and sending each of the copied bicast packets to respective ones of output ports; and
    changing the copied bicast packet sent to one of the output ports to a 0-bound packet type and changing the copied bicast packet sent to the other output port to a 1-bound packet type.

6. The method of claim 4, wherein the input ports comprise first and second input ports and wherein bit in the left-most position of the code corresponding to the 0-bound packet type is the first bit received at the first input port and the bit in the left-most position of the code corresponding to the 1-bound packet type is the first bit received at a second input port.

7. A system for routing packets comprising:
    multiple stages of switching elements, each one of the switching elements
    receiving packets as local input packets on its input ports and producing packets as local output packets on its output ports, each of the packets having a plurality of in-band control signals where each one of the in-band control signals is utilized in a corresponding one of the switching elements as the local in-band control signal for the corresponding switching element to make switching decisions,
    an encoder for coding each one of the in-band control signals of the packets into a plurality of bits based on a predetermined coding scheme, and a generator for generating, with reference to the coding scheme, the output bits of the local output packets at each one of the switching elements based on a subset of the bits in the corresponding one of the in-band control signals for said each one of the switching elements to route the local input packets arriving at the corresponding switching element, wherein each one of the switching elements is a bicast cell, and the local input packets to each one of the switching elements includes idle, 0-bound, 1-bound and bicast packet types, and wherein each one of the packet types corresponds to a distinct in-band control signal, the coding includes coding each of the in-band control signals by two bits, and the coding scheme includes coding the bits such that a bit in a left-most position of the code for the in-band control signal corresponding to a 0-bound packet type is different from a bit in a left-most position of the code for the in-band control signal corresponding to a 1-bound packet type.

8. The system of claim 7, wherein the generator is further configured to:
   determine when two of the local input packets comprise idle and bicast packet types that are received at respective ones of the input ports;
   bicast or copy the bicast packet to generate at least two copies of the bicast packet and sending each of the copied bicast packets to respective ones of output ports; and
   change the copied bicast packet sent to one of the output ports to a 0-bound packet type and changing the copied bicast packet sent to the other output port to a 1-bound packet type.

9. The system of claim 7, wherein the input ports comprise first and second input ports and wherein bit in the left-most position of the code corresponding to the 0-bound packet type is the first bit received at the first input port and the bit in the left-most position of the code corresponding to the 1-bound packet type is the first bit received at a second input port.

10. A system for routing packets comprising:
    multiple stages of switching elements, each one of the switching elements receiving packets as local input packets on its input ports and producing packets as local output packets on its output ports, each of the packets having a plurality of in-band control signals where each one of the in-band control signals is utilized in a corresponding one of the switching elements as the local in-band control signal for the corresponding switching element to make switching decisions,
    an encoder for coding each one of the in-band control signals of the packets into a plurality of bits based on a predetermined coding scheme, and
    a generator for generating, with reference to the coding scheme, the output bits of the local output packets at each one of the switching elements based on a subset of the bits in the corresponding one of the in-band control signals for said each one of the switching elements to route the local input packets arriving at the corresponding switching element, wherein each one of the switching elements is a routing cell, and the local input packets to each one of the switching elements includes idle, 0-bound, and 1-bound packet types, and wherein each one of the packet types corresponds to a distinct in-band control signal, the coding includes coding each of the in-band control signals by two bits, and the coding scheme includes coding the bits such that a bit in a left-most position of the code for the in-band control signal corresponding to a 0-bound packet type is different from a bit in a left most position of the code for the in-band control signal corresponding to a 1-bound packet type.

11. The system of claim 10, wherein the generator is further configured to:
    determine when two of the local input packets comprise idle and bicast packet types that are received at respective ones of the input ports;
    bicast or copy the bicast packet to generate at least two copies of the bicast packet and sending each of the copied bicast packets to respective ones of output ports; and
    change the copied bicast packet sent to one of the output ports to a 0-bound packet type and changing the copied bicast packet sent to the other output port to a 1-bound packet type.

12. The system of claim 10, wherein the input ports comprise first and second input ports and wherein bit in the left-most position of the code corresponding to the 0-bound packet type is the first bit received at the first input port and the bit in the left-most position of the code corresponding to the 1-bound packet type is the first bit received at a second input port.

* * * * *

UNITED STATES PATENT AND TRADEMARK OFFICE
CERTIFICATE OF CORRECTION

PATENT NO.        : 7,609,695 B2                           Page 1 of 1
APPLICATION NO. : 10/082450
DATED             : October 27, 2009
INVENTOR(S)       : Zhu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1595 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,609,695 B2  Page 1 of 1
APPLICATION NO. : 10/082450
DATED : October 27, 2009
INVENTOR(S) : Zhu et al.

It is certified that error appears in the above-identified patent and that said Letters Patent is hereby corrected as shown below:

<u>Column 94,</u>

Line 32, "different from the a bit" should read --different from a bit--.

Signed and Sealed this
Twenty-second Day of February, 2011

David J. Kappos
*Director of the United States Patent and Trademark Office*